(12) United States Patent
Wheeler et al.

(10) Patent No.: US 7,558,965 B2
(45) Date of Patent: Jul. 7, 2009

(54) ENTITY AUTHENTICATION IN ELECTRONIC COMMUNICATIONS BY PROVIDING VERIFICATION STATUS OF DEVICE

(75) Inventors: Lynn Henry Wheeler, Greenwood Village, CO (US); Anne M. Wheeler, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 458 days.

(21) Appl. No.: 10/343,619

(22) PCT Filed: Aug. 6, 2001

(86) PCT No.: PCT/US01/41562

§ 371 (c)(1),
(2), (4) Date: Feb. 3, 2003

(87) PCT Pub. No.: WO02/13116

PCT Pub. Date: Feb. 14, 2002

(65) Prior Publication Data

US 2004/0005051 A1 Jan. 8, 2004

Related U.S. Application Data

(60) Provisional application No. 60/223,076, filed on Aug. 4, 2000.

(51) Int. Cl.
*H04L 9/00* (2006.01)
*G06K 9/00* (2006.01)
*G05B 19/00* (2006.01)

(52) U.S. Cl. ........................ 713/186; 382/115; 340/5.82

(58) Field of Classification Search ................ 713/186; 382/115; 340/5.82
See application file for complete search history.

(56) References Cited

U.S. PATENT DOCUMENTS

| 3,962,539 A | 6/1976 | Ehrsam et al. |
| 4,200,770 A | 4/1980 | Hellman et al. |

(Continued)

FOREIGN PATENT DOCUMENTS

| CA | 2271178 | 5/1999 |

(Continued)

OTHER PUBLICATIONS

Supplemental European Search Report of EP 01 95 6178.

(Continued)

*Primary Examiner*—Matthew B Smithers
*Assistant Examiner*—Techane J Gergiso
(74) *Attorney, Agent, or Firm*—Sutherland Ashill & Brennan LLP

(57) ABSTRACT

A current verification status of a device (256) is identified out of a plurality of predefined verification data input (250) into the device (256) and data prestored within the device.(254) The indicator (272) reveals neither the prestored data nor the verification data. One of the predefined verification statuses is representative of the verification data being the same as the prestored data, and another verification status is representative of the verification data being different from the prestored data. An identified verification status is used by one entity in determining risk regarding an electronic communication from another entity, especially where the electronic communication comprises a request. The prestored data is for a Secret or a biometric characteristic of the first entity.

80 Claims, 51 Drawing Sheets

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 4,408,203 A | 10/1983 | Campbell | |
| 4,424,414 A | 1/1984 | Hellman et al. | |
| 4,652,698 A | 3/1987 | Hale et al. | |
| 4,734,564 A | 3/1988 | Boston et al. | |
| 4,748,668 A | 5/1988 | Shamir et al. | |
| 4,797,920 A | 1/1989 | Stein | |
| 4,823,388 A | 4/1989 | Mizutani et al. | |
| 4,825,050 A | 4/1989 | Griffith et al. | |
| 4,850,017 A | 7/1989 | Matyas, Jr. et al. | |
| 4,856,077 A * | 8/1989 | Rothfjell | 382/123 |
| 4,868,877 A | 9/1989 | Fischer | |
| 4,885,788 A | 12/1989 | Takaragi et al. | |
| 4,944,021 A * | 7/1990 | Hoshino et al. | 382/125 |
| 4,995,086 A * | 2/1991 | Lilley et al. | 382/124 |
| 5,018,196 A | 5/1991 | Takaragi et al. | |
| 5,029,208 A | 7/1991 | Tanaka | |
| 5,097,504 A | 3/1992 | Camion et al. | |
| 5,140,634 A | 8/1992 | Guillou et al. | |
| 5,214,703 A | 5/1993 | Massey et al. | |
| 5,225,978 A | 7/1993 | Petersen et al. | |
| 5,231,668 A | 7/1993 | Kravitz | |
| 5,280,527 A | 1/1994 | Gullman et al. | |
| 5,422,953 A | 6/1995 | Fischer | |
| 5,453,601 A | 9/1995 | Rosen | |
| 5,455,865 A | 10/1995 | Perlman | |
| 5,502,766 A | 3/1996 | Boebert et al. | |
| 5,509,071 A | 4/1996 | Petrie, Jr. et al. | |
| 5,534,855 A | 7/1996 | Shockley et al. | |
| 5,539,828 A | 7/1996 | Davis | |
| 5,557,518 A | 9/1996 | Rosen | |
| 5,563,946 A | 10/1996 | Cooper et al. | |
| 5,577,120 A | 11/1996 | Penzias | |
| 5,586,036 A | 12/1996 | Pintsov | |
| 5,590,197 A | 12/1996 | Chen et al. | |
| 5,598,474 A * | 1/1997 | Johnson | 713/186 |
| 5,604,801 A | 2/1997 | Dolan et al. | |
| 5,606,609 A | 2/1997 | Houser et al. | |
| 5,615,266 A | 3/1997 | Altschuler et al. | |
| 5,615,268 A | 3/1997 | Bisbee et al. | |
| 5,619,574 A | 4/1997 | Johnson et al. | |
| 5,623,637 A | 4/1997 | Jones et al. | |
| 5,625,690 A | 4/1997 | Michel et al. | |
| 5,636,280 A | 6/1997 | Kelly | |
| 5,659,616 A | 8/1997 | Sudia | |
| 5,659,626 A * | 8/1997 | Ort et al. | 382/125 |
| 5,671,279 A | 9/1997 | Elgamal | |
| 5,671,285 A | 9/1997 | Newman | |
| 5,677,953 A | 10/1997 | Dolphin | |
| 5,677,955 A | 10/1997 | Doggett et al. | |
| 5,694,471 A | 12/1997 | Chen et al. | |
| 5,705,993 A * | 1/1998 | Alesu | 340/5.86 |
| 5,708,780 A | 1/1998 | Levergood et al. | |
| 5,715,314 A | 2/1998 | Payne et al. | |
| 5,719,950 A * | 2/1998 | Osten et al. | 382/115 |
| 5,721,779 A | 2/1998 | Funk | |
| 5,724,424 A | 3/1998 | Gifford | |
| 5,745,886 A | 4/1998 | Rosen | |
| 5,751,813 A | 5/1998 | Dorenbos | |
| 5,778,072 A | 7/1998 | Samar | |
| 5,781,723 A | 7/1998 | Yee et al. | |
| 5,787,172 A | 7/1998 | Arnold | |
| 5,790,677 A | 8/1998 | Fox et al. | |
| 5,796,840 A | 8/1998 | Davis | |
| 5,796,857 A * | 8/1998 | Hara | 382/124 |
| 5,809,144 A | 9/1998 | Sirbu et al. | |
| 5,812,666 A | 9/1998 | Baker et al. | |
| 5,825,884 A | 10/1998 | Zdepski et al. | |
| 5,848,161 A | 12/1998 | Luneau et al. | |
| 5,862,327 A | 1/1999 | Kwang et al. | |
| 5,870,475 A | 2/1999 | Allan et al. | |
| 5,878,142 A | 3/1999 | Caputo et al. | |
| 5,883,810 A | 3/1999 | Franklin et al. | |
| 5,887,131 A | 3/1999 | Angelo | |
| 5,903,882 A | 5/1999 | Asay et al. | |
| 5,910,988 A | 6/1999 | Ballard | |
| 5,910,989 A | 6/1999 | Naccache | |
| 5,943,423 A | 8/1999 | Muftic | |
| 5,949,881 A | 9/1999 | Davis | |
| 5,956,404 A | 9/1999 | Schneier et al. | |
| 5,963,648 A | 10/1999 | Rosen | |
| 5,970,147 A | 10/1999 | Davis | |
| 6,000,522 A | 12/1999 | Johnson | |
| 6,000,832 A | 12/1999 | Franklin et al. | |
| 6,002,787 A * | 12/1999 | Takhar et al. | 382/125 |
| 6,009,177 A | 12/1999 | Sudia | |
| 6,011,858 A * | 1/2000 | Stock et al. | 382/115 |
| 6,021,202 A | 2/2000 | Anderson et al. | |
| 6,023,509 A | 2/2000 | Herbert et al. | |
| 6,029,150 A | 2/2000 | Kravitz | |
| 6,044,154 A | 3/2000 | Kelly | |
| 6,047,051 A | 4/2000 | Ginzboorg et al. | |
| 6,061,794 A | 5/2000 | Angelo et al. | |
| 6,061,799 A | 5/2000 | Eldridge et al. | |
| 6,069,970 A * | 5/2000 | Salatino et al. | 382/124 |
| 6,070,154 A | 5/2000 | Tavor et al. | |
| 6,073,242 A | 6/2000 | Hardy et al. | |
| 6,084,969 A | 7/2000 | Wright et al. | |
| 6,092,202 A | 7/2000 | Veil et al. | |
| 6,102,287 A | 8/2000 | Matyas, Jr. | |
| 6,104,815 A | 8/2000 | Alcorn et al. | |
| 6,105,012 A | 8/2000 | Chang et al. | |
| 6,108,644 A | 8/2000 | Goldschlag et al. | |
| 6,111,956 A | 8/2000 | Field et al. | |
| 6,125,349 A | 9/2000 | Maher | |
| 6,134,325 A | 10/2000 | Vanstone et al. | |
| 6,140,939 A * | 10/2000 | Flick | 340/825.69 |
| 6,144,949 A | 11/2000 | Harris | |
| 6,154,543 A | 11/2000 | Baltzley | |
| 6,161,180 A | 12/2000 | Matyas et al. | |
| 6,161,181 A | 12/2000 | Haynes et al. | |
| 6,167,518 A | 12/2000 | Padgett et al. | |
| 6,189,096 B1 | 2/2001 | Haverty | |
| 6,192,130 B1 | 2/2001 | Otway | |
| 6,192,405 B1 | 2/2001 | Bunnell | |
| 6,199,052 B1 | 3/2001 | Mitty et al. | |
| 6,202,151 B1 | 3/2001 | Musgrave et al. | |
| 6,205,437 B1 | 3/2001 | Gifford | |
| 6,213,391 B1 | 4/2001 | Lewis | |
| 6,230,269 B1 | 5/2001 | Spies et al. | |
| 6,233,565 B1 | 5/2001 | Lewis et al. | |
| 6,240,091 B1 | 5/2001 | Ginzboorg et al. | |
| 6,243,812 B1 | 6/2001 | Matyas et al. | |
| 6,253,027 B1 | 6/2001 | Weber et al. | |
| 6,253,322 B1 | 6/2001 | Susaki et al. | |
| 6,256,737 B1 * | 7/2001 | Bianco et al. | 713/186 |
| 6,263,447 B1 | 7/2001 | French et al. | |
| 6,279,112 B1 | 8/2001 | OToole, Jr. et al. | |
| 6,282,522 B1 | 8/2001 | Davis et al. | |
| 6,285,991 B1 | 9/2001 | Powar | |
| 6,299,062 B1 | 10/2001 | Hwang | |
| 6,314,519 B1 | 11/2001 | Davis et al. | |
| 6,324,525 B1 | 11/2001 | Kramer et al. | |
| 6,373,950 B1 | 4/2002 | Rowney | |
| 6,424,249 B1 * | 7/2002 | Houvener | 340/5.82 |
| 6,484,260 B1 | 11/2002 | Scott et al. | |
| 6,510,516 B1 | 1/2003 | Benson et al. | |
| 6,523,067 B2 | 2/2003 | Mi et al. | |
| 6,532,451 B1 | 3/2003 | Schell et al. | |
| 6,565,000 B2 | 5/2003 | Sehr | |
| 6,571,339 B1 | 5/2003 | Danneels et al. | |
| 6,587,837 B1 | 7/2003 | Spagna et al. | |
| 6,594,633 B1 | 7/2003 | Broerman | |

| | | | |
|---|---|---|---|
| 6,615,191 B1 * | 9/2003 | Seeley | 705/54 |
| 6,671,805 B1 | 12/2003 | Brown | |
| 6,741,729 B2 * | 5/2004 | Bjorn et al. | 382/124 |
| 6,898,299 B1 * | 5/2005 | Brooks | 382/115 |
| 6,957,337 B1 * | 10/2005 | Chainer et al. | 713/186 |
| 6,983,061 B2 * | 1/2006 | Ikegami et al. | 382/115 |
| 7,020,308 B1 * | 3/2006 | Shinzaki et al. | 382/124 |
| 7,027,617 B1 * | 4/2006 | Frischholz | 382/107 |
| 2001/0000535 A1 | 4/2001 | Lapsley et al. | |
| 2001/0036297 A1 * | 11/2001 | Ikegami et al. | 382/115 |
| 2002/0053857 A1 * | 5/2002 | Scott et al. | 310/314 |
| 2002/0120846 A1 | 8/2002 | Stewart et al. | |

FOREIGN PATENT DOCUMENTS

| | | | |
|---|---|---|---|
| EP | 0956818 | A | 11/1999 |
| GB | 2237670 | A | 5/1991 |
| WO | 9809227 | A | 3/1998 |
| WO | 9815924 | A | 4/1998 |
| WO | 9850875 | A2 | 11/1998 |

OTHER PUBLICATIONS

PKCS #9, Selected Object Classes and Attribute Types Version 2.0, RSA Laboratories, Redwood City, CA, pp. 1-42.

Digital Signature Guidelines Tutorial ; ABA Network, (web site at http://www.abanet.org/scietech/ec/isc/dsg-tutorial.html), date of capture Feb. 18, 2003, pp. 1-7, Feb. 18, 2003.

Gerck, Ed, Overview of Cerification Systems; x.509, PKIX, CA, PGP & SKIP—Do you understand digital cerificates? Do you know what they warrant? pp. 1-18, Jul. 18, 2000.

Linn, John, Trust Models and Management in Public-Key Infrastructures; RSA Laboratories, pp. 1-13, Nov. 6, 2000.

PKCS #5, v2.0: Password-Based Cryptography Standard, RSA Laboratories, Redwood City, CA; pp. 1-30, Mar. 25, 1999.

PKCS #9, v2.0: Selected Object Classes and Attribute Types, RSA Laboratories, Redwood City, CA; pp. 1-34, Feb. 25, 2000.

PKCS #10, v1.7: Certificate Request Syntax Standard, RSA Laboratories, Redwood City, CA; pp. 1-10, May 26, 2000.

PKCS #12, V1.0: Personal Information Exchange Syntax, RSA Laboratories, Redwood City, CA; pp. 1-23, Jun. 24, 1999.

PKCS #15: Conformance Profile Specification; RSA Laboratories, Redwood City, CA; pp. 1-8, Aug. 1, 2000.

Pepe, M., Smart Cards Gaining Traction; CRN.com—Point of Sale: Trends, Markets and Technologies; Dec. 31, 2002 (http://cm.channelsupersearch.com/news/cm/39163.asp) Feb. 18, 2003.

Guide to Internet Security; Public Key Cryptography (web site at http://www.e-certify.com/library/pkc_guide.htm) captured on Feb. 18, 2003.

Private Server Product Description; (web site at http://www.bnn.com.tr/assets/cserver_prodesc.html), date of capture Feb. 18, 2003, pp. 1-11.

Cylink atm encryptor (web site at http//securitytools.hypermart.net/security_1/cylink_atm_encryptor.html), date of capture Feb. 18, 2003, p. 1.

BAL's PGP Public Key Server; The Computer Law Resource 1996; (web site at http://www.complaw.com/pgp/webkeyserver.html) date of capture Feb. 18, 2003; pp. 1-2.

Baltimore; Solutions; A New Era in Secure and Trusted E-Business; (web site at http://www.baltimore.com/solutions/index.asp) date of capture Feb. 18, 2003; p. 1.

(PGP) Pretty Good Privacy; What's? com; Dec. 27, 2000; (web site at http://whatis.techtarget.com/Whatis_Definition_Page/0. 4152,214292,00.html) date of capture Dec. 27, 2000; pp. 1-3.

An Introduction to Cryptography; Network Associates, Inc. PGP, Version 6.5.1; Jun. 1999; pp. 1-88.

Turnbill, J., "Cross-Certification and PKI Policy Networking"; Entrust, Inc; pp. 1-10, Aug. 2000.

Some Suggestions For Automatic Encryption and Identity Verificatiion in the IBM Internal Computing Network; pp. 1-13, Dec. 28, 1985.

Arthur, D., AADS Option for Buyer Authentication; Response to NACHA/IC ANT 2 RFI; pp. 1-3, Sep. 14, 1998.

Internet Counsel; Consumer Internet Purchases Using ATM Cards Successfully Processed by NACHA Pilot Participants; pp. 1-4, Feb. 23, 2003.

Internet Counsel; NACHA to Test ATM Card Payments for Consumer Internet Purchases; pp. 1-3, Feb. 23, 2003.

News Release: Digital Signatures Can Secure ATM Card Payments on the Internet, NACHA Pilot Concludes; pp. 1-2, Jul. 23, 2001.

Kutler, Jeffrey, Privacy Broker: Likely Internet Role for Banks? Digital Frontiers; pp. 1-6, Oct. 8, 1998.

Hettinga's Best of the Month, Journal of Internet Banking and Commerce; Array Development, web site at http://www.arraydev.com/commerce/JIBC/9801-20.htm, pp. 1-4, Mar. 31, 1999.

Denny, Stephanie, The Electronic Commerce Challenge, Journal of Internet Banking and Commerce; Array Dev., http://www.arraydev.com/commerce/JIBC/9811-06.htm, pp. 1-2, Mar. 31, 1999.

Kaliski, Burton S., Jr., Some Examples of the PKCS Standards, An RSA Laboratories Technical Note, RSA Laboratories, Redwood City, CA., pp. 1-15, Nov. 1, 1993.

Kaliski, Burton S., Jr., A Layman's Guide to a Subset of ASN.1, BER, and DER, An RSA Laboratories Technical Note, RSA Laboratories, Redwood City, CA., pp. 1-36, Nov. 1, 1993.

PKCS Editor, PKCS #1 v2.1: RSA Cryptography Standard, RSA Laboratories, Draft 2, RSA Laboratories, Bedford, MA, pp. 1-60, Jan. 5, 2001.

PKCS #3: Diffie-Hellman Key-Agreement Standard, An RSA Laboratories Technical Note, Version 1.4, RSA Laboratories, Redwood City, CA. pp. 1-8, Nov. 1, 1993.

PKCS #6: Extended-Certificate Syntax Standard, An RSA Laboratories Technical Note, Version 1.5, RSA Laboratories, Redwood City, CA. pp. 1-11, Nov. 1, 1993.

PKCS #8: Private-Key Information Syntax Standard, An RSA Laboratories Technical Note, Version 1.2, RSA Laboratories, Redwood City, CA. pp. 1-5, Nov. 1, 1993.

Wiener, M., Performance Comparison of Public-Key Cryptosystems, Technical Newsletter of RSA Laboratories, a div of RSA Data Security, Inc., Summer 1998, vol. 4, No. 1, pp. 1-23.

Apostolopoulos, G., Securing Electronic Commerce: Reducing the SSL Overhead, IEEE Network, Jul./Aug. 2000, vol. 14, Issue 4, pp. 1-16.

Maurer, Modeling a Public-Key Infrastructure, Sep. 1996, Dept. of Computer Science, Swiss Federal Institute of Technology, pp. 1-26.

Security Requirements for Cryptographic Modules, FIPStandards Pub. 140-1, pp. 1-45, CSL Bulletin for FIPS 140-1 pp. 1-6, 2001/2000.

Heroux, M., A Private Key Storage Server for DCE—Functional Specification, Open Software Foundation Request for Comments; 94.1, (http://www.opengroup.org/rfc/mirror) Nov. 1996.

Cox, P., Bench-Marking SmartGate, Establishing the Scaleability of V-ONE's SmartGate Security System, Internet SmartWare Ltd., pp. 1-7, Jul. 24, 1997.

Answers to Frequently Asked Questions about Today's Cryptography, RSA Data Security, Inc., Revision 2.0, pp. 1-44, Oct. 5, 1993.

Announcing the Standard for Digital Signature Standard (DSS), Federal Information Processing Standards Publication 186, pp. 1-18, May 19, 1994.

Boeyen, Sharon, Certificate Policies and Certification Practice Statements, Entrust Technologies White Paper, Version 1.0, pp. 1-7, Feb. 1997.

Public-Key Infrastructure (PKI)—The VeriSign Difference, Copyright 1999, VeriSign, Inc. pp. 1-21, Feb. 3, 2001.

Moreau, Thierry, Thirteen Reasons to Say 'No' To Public Key Cryptography, Draft paper, CONNOTECH Experts-Conseils, Inc., Montreal, Quebec, Canada, pp. 1-5, Mar. 4, 1998.

"X9 Overview," American Bankers Association web page (web site at http://www.x9.org/aboutX9.htm), 1998, date of capture Jan. 11, 1999, 3 pp.

July 1997 Meeting Report, Electronic Payments Forum (web site at http://www.epf.net/PrevMtngs/July97Report.htm), date of capture Jan. 11, 1999, 2 pp.

Kaliski, Burton S., Jr. An Overview of the PKCS Standards, RSA Laboratories Technical Note, RSA Data Security, Inc. Public-Key Cryptography Standards (PKCS), pp. 1-27, Nov. 1, 1993.

Public Key Cryptography, NIST Special Publication 800-2, reprinted at http://csrc.nist.gov/publications/nistpubs/800-2/800-2.txt), pp. 1-138, Apr. 1991.

Guideline for Implementing Cryptography in the Federal Government, NIST Special Publication 800-21, pp. 1-138, Nov. 1999.

Guideline for the Use of Advanced Authentication Technology Alternatives, FIPS Pub. 190, reprinted at http://csrc.nist.gov/publications/fips/fips190/fip190.txt), pp. 1-55.

Building a Foundation of Trust in the PC, The Trusted Computing Company Platform Alliance (web site at http://www.trustedpc.org), pp. 1-9, Jan. 2000.

Trusted Platform Module (TPM) Security Policy (A Part of the "TCPA Security Policy"), Version 0.45, pp. 1-13, Oct. 2, 2000.

Trusted Platform Module Protection Profile (TPMPP) (A Part of the "TCPA Security Policy"), Version 0.45, pp. 1-151, Sep. 14, 2000.

TCPA PC Specific Implementation Specification, Version 0.95, pp. 1-70, Jul. 4, 2001.

Common Criteria for Information Technology Security Evaluation, Smart Card Security User Group, Smart Card Protection Profile, draft Version 2.1d, pp. 1-194, Mar. 21, 2001.

X.9.84-2000, Biometric Information Management Security for the Financial Services Industry, draft version, pp. 1-141, Mar. 21, 2001.

Security Requirements for Cryptographic Modules, FIPS Publication 140-2, pp. 1-62, May 25, 2001.

Secure Hash Standard, FIPS Publication 180-1, pp. 1-24, Apr. 17, 1995.

Digital Signature Standard (DSS), FIPS Publication 186-2, pp. 1-72, Jan. 27, 2000.

Entity Authentication Using Public Key Cryptography, FIPS Publication 196, pp. 1-52, Feb. 18, 1997.

Computer Data Authentication, FIPS Publication 113, (web site at www.itl.nist.gov/fipspubs/fip113.htm), date of capture Jan. 16, 2001, pp. 1-7, May 30, 1985.

Sales Brochure for APPROVEIT, electronic approval management software, by Silanis Technology, Inc., pp. 1-12, Jul. 18, 2000.

Public Key Infrastructure, An NSS Group White Paper, by Bob Walder, undated, reprinted http://www.nss.co.uk/WhitePapers/PublicKeyInfrastructure.htm on Jan. 25, 2001, pp. 1-18.

Smart Card & Security Basics, Carlogix, Inc. brochure, Ref. Date Q1-Q2 2000, pp. 3-36.

Understanding Public Key Infrastructure (PKI), Technology White Paper, by RSA Security, Inc., 1999, pp. 1-10.

Chan, S.C., An Overview of Smart Card Security, reprinted from website http://home.hkstar.com/~alanchan/papers/smarCardSecurity, captured on Jan. 27, 2001, pp. 1-7, Aug. 17, 1997.

Taschler, S., Technical Introduction to CIP 3.0, reprinted from website http://www.datakey.com/cardpage/cip.htm, captured on Jan. 25, 2001, pp. 1-6, Sep. 30, 1997.

Smart Cards: Enabling Smart Commerce in the Digital Age, CREC/KPMG White Paper (Draft), pp. 1-22, May 1998.

List Serve Posting dated Dec. 29, 1999 regarding Attacks on PKI, Dec. 29, 1999.

List Serve Posting dated Dec. 30, 1999 regarding Attacks on PKI, Dec. 30, 1999.

List Serve Posting dated Feb. 7, 2000 regarding Questions about PKI, Feb. 7, 2000.

List Serve Posting dated Feb. 14, 2000 regarding RealNames Hacked—Firewall Issues, Feb. 14, 2000.

List Serve Posting dated Dec. 3, 1998 regarding EU Digital Signature Initiative Stalled, Dec. 3, 1998.

List Serve Posting dated Dec. 12, 1999 regarding QC Bio-Info Leak?, Dec. 12, 1999.

List Serve Posting dated Apr. 2, 2000 regarding Biometrics and Electronic Signatures, Apr. 2, 2000.

List Serve Posting dated Dec. 11, 1998 regarding AADS Strawman, Dec. 11, 1998.

List Serve Posting dated May 24, 1999 regarding [ECARM] Cardtech / Securetech & CA PKI, May 24, 1999.

List Serve Posting dated May 25, 1999 regarding [ECARM] Cardtech / Securetech & CA PKI, May 25, 1999.

List Serve Posting dated May 30, 1999 regarding [ECARM] Cardtech / Securetech & CA PKI, May 30, 1999.

List Serve Posting dated Jul. 16, 1999 regarding Common Misconceptions, was Re: KISS for PKIX, Jul. 16, 1999.

List Serve Posting dated Aug. 15, 1999 regarding Risk Management in AA / draft X9.59, Aug. 15, 1999.

"X9.59 Working Draft" ABA; American National Standard X9.59-199X, For the Financial Services Industry: Account-Based Secure Payment Objects, pp. 1-26, Sep. 25, 1998.

Account Authority Digital Signature Model web page (http:www.garlic.com/~lynn/aadsover.htm) believed available at website after Nov. 8, 1997, date of capture Oct. 2, 2001, 5 pp.

"How PGP Works," web pages from www.pgpi.org, containing basic information.

PGP Certificate Server, Total Network Security, Network Associates, 3965 Freedom Circle, Santa Clara, CA 95044-1203.

"PGP Desktop Security 7.0," PGP Security, 2965 Freedom Circle, Santa Clara, CA 95054-1203.

"Policy Management Agent for SMTP," Network Associates, 3965 Freedom Circle, Santa Clara, CA 95054-1203.

"Inside PGP Key Reconstruction: Technical Details," Revision by Will Price, dated Jul. 25, 2000, A PGP Security, Inc. White Paper.

Stewart, D., "Account Authority Digital Signatures: Enabling Secure Internet Transactions via Existing Payment Processes & Infrastructure," www.garlic.com/~lynn/aadswp.htm.

O'Mahoney, "Electronic Payment Systems," Artech House, Inc., pp. 51 and 77-80 (1961).

* cited by examiner

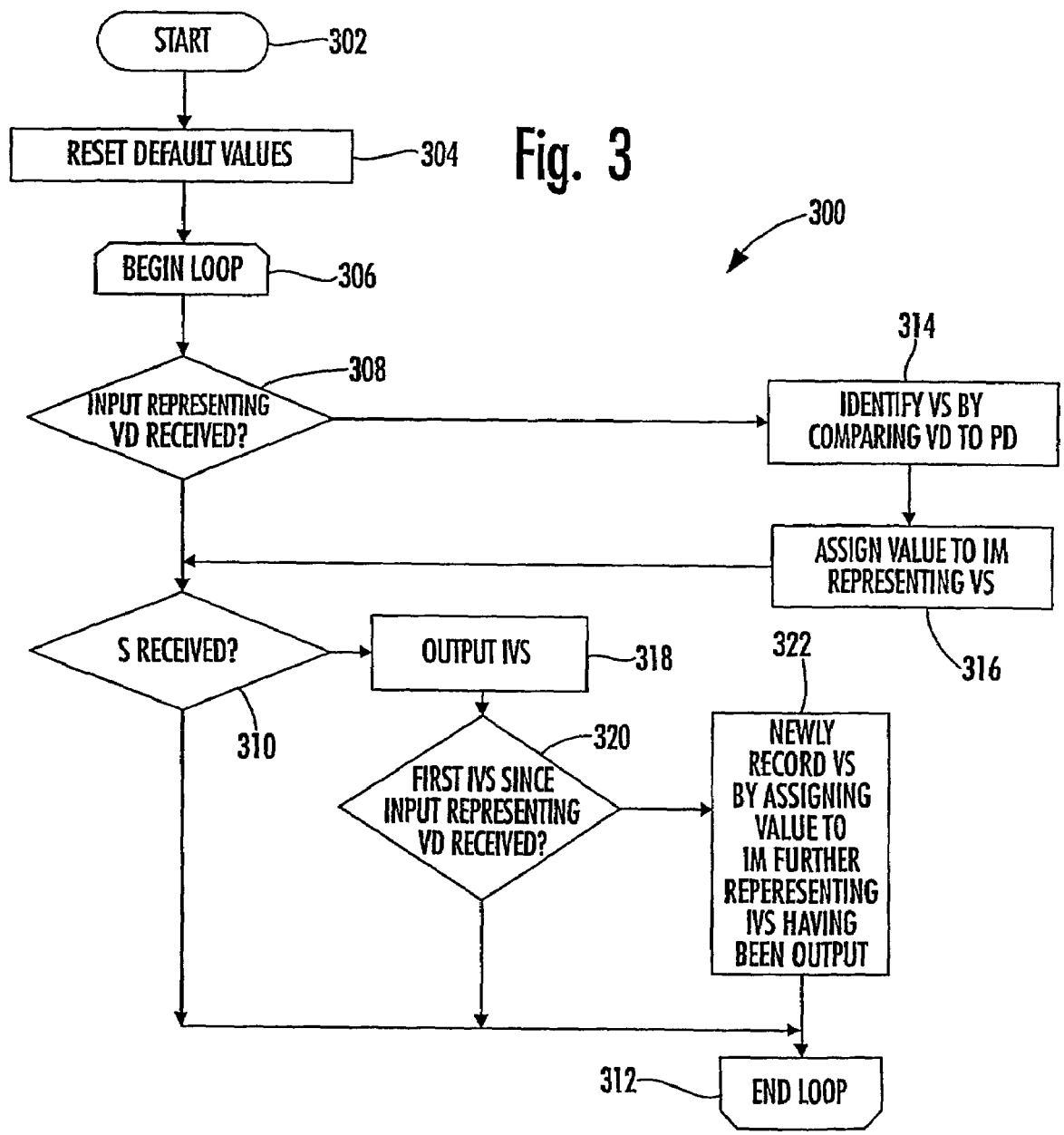

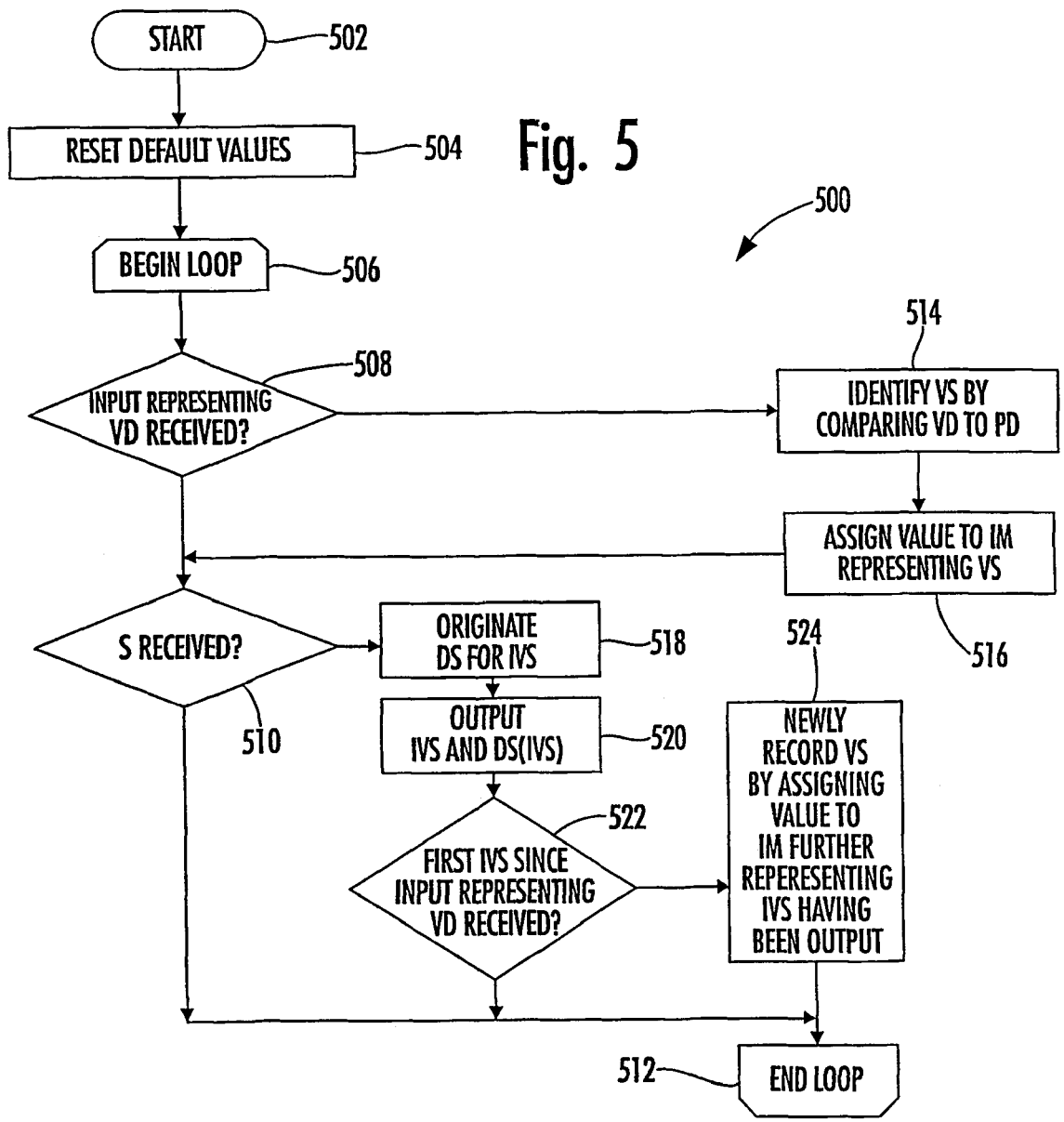

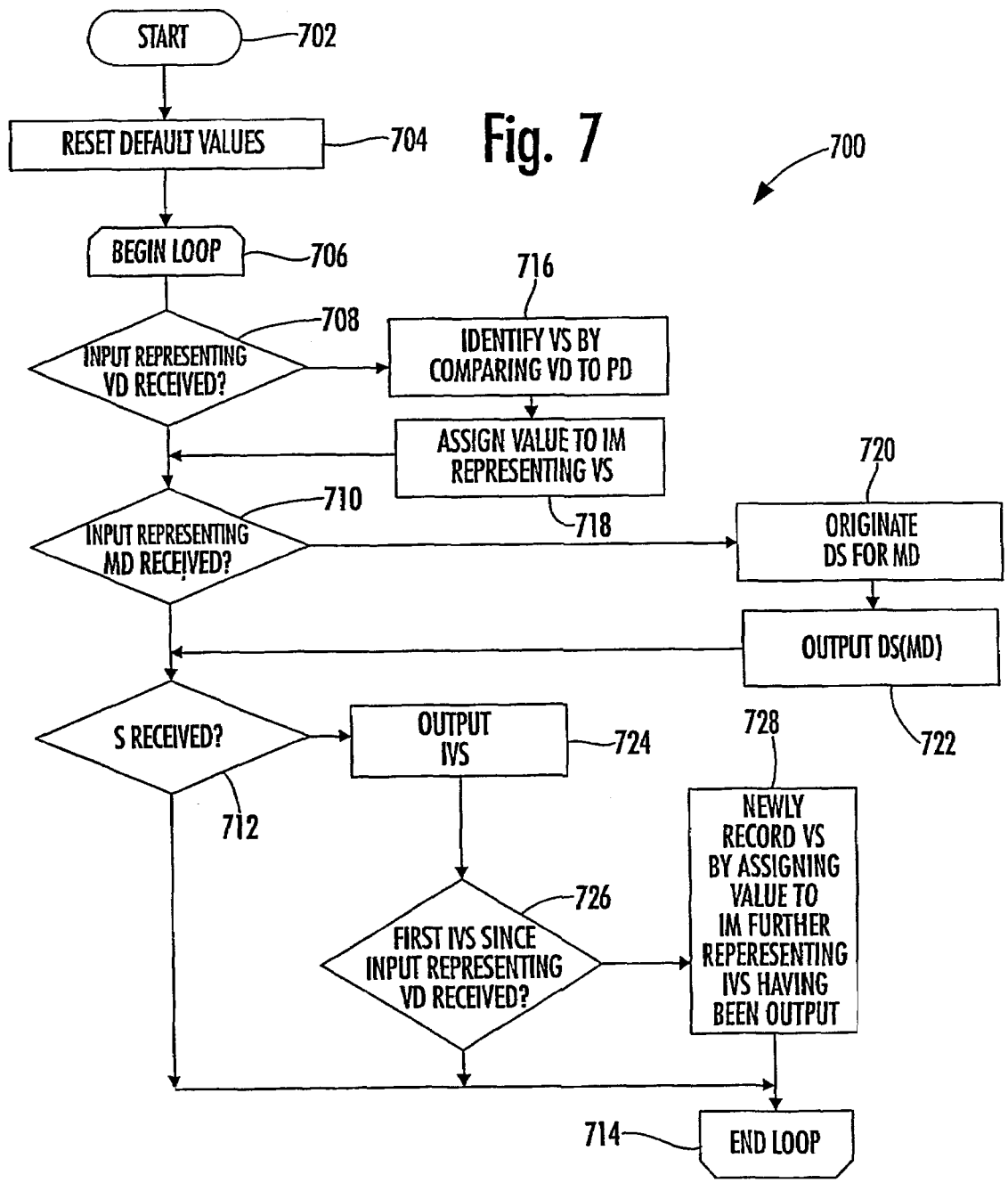

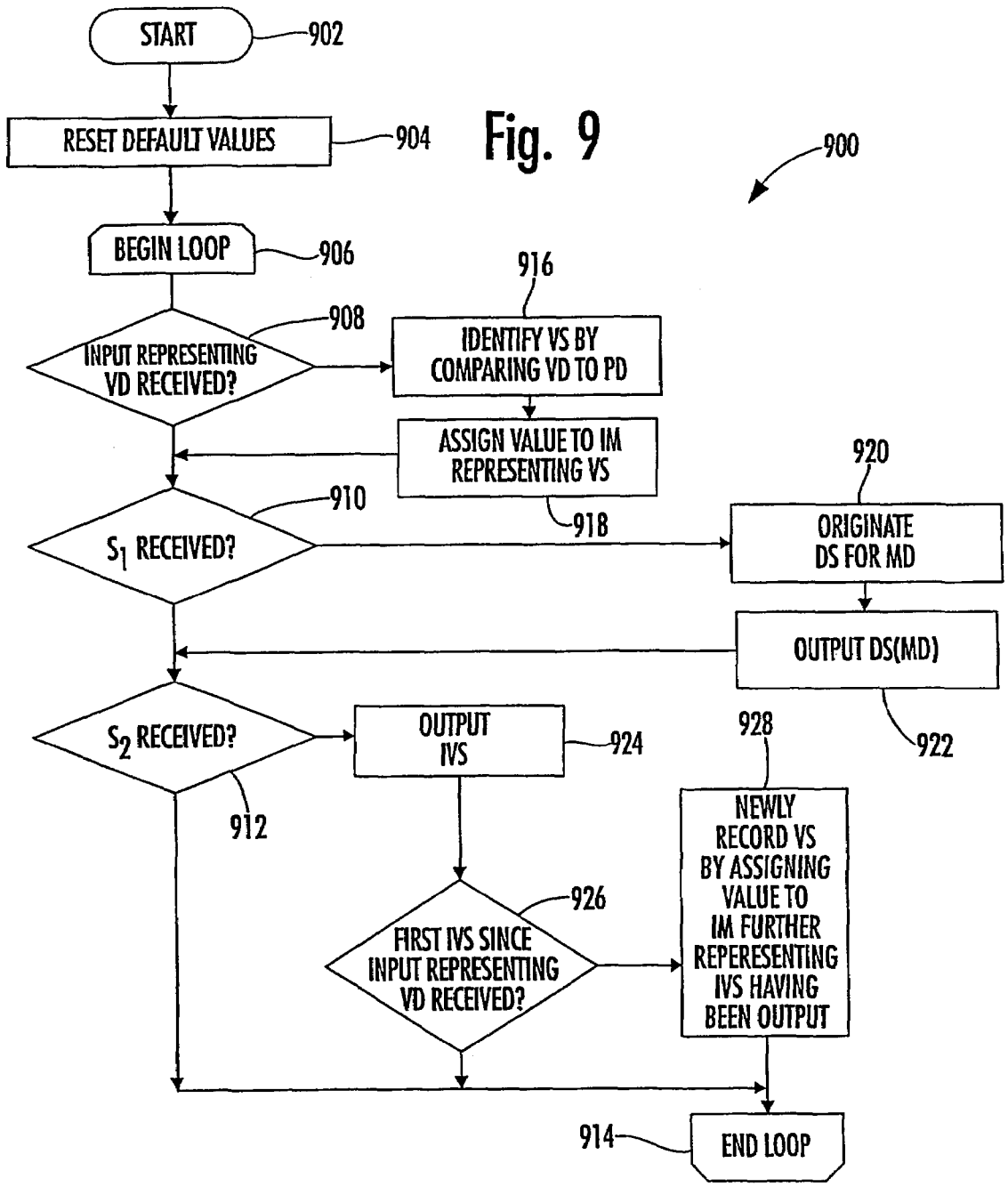

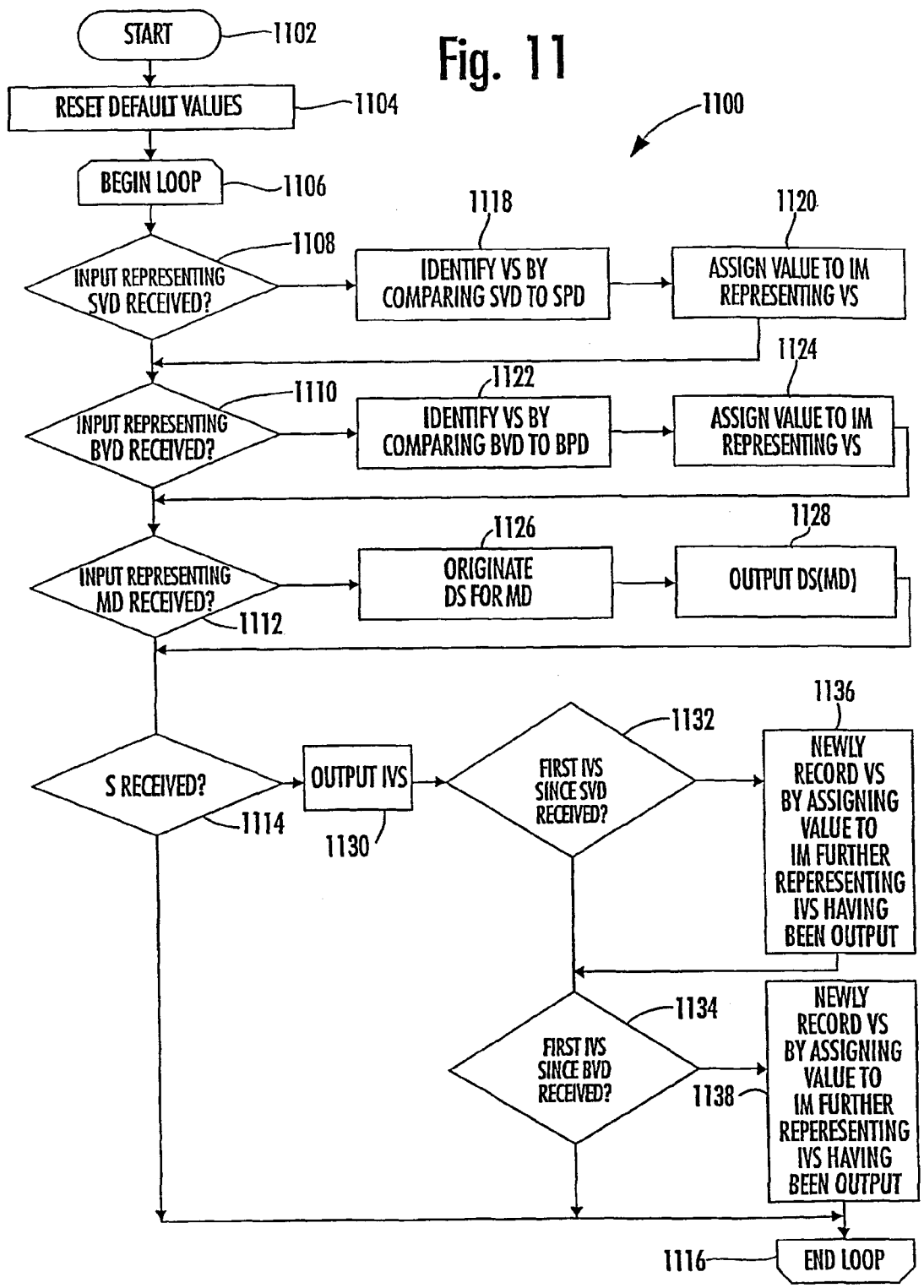

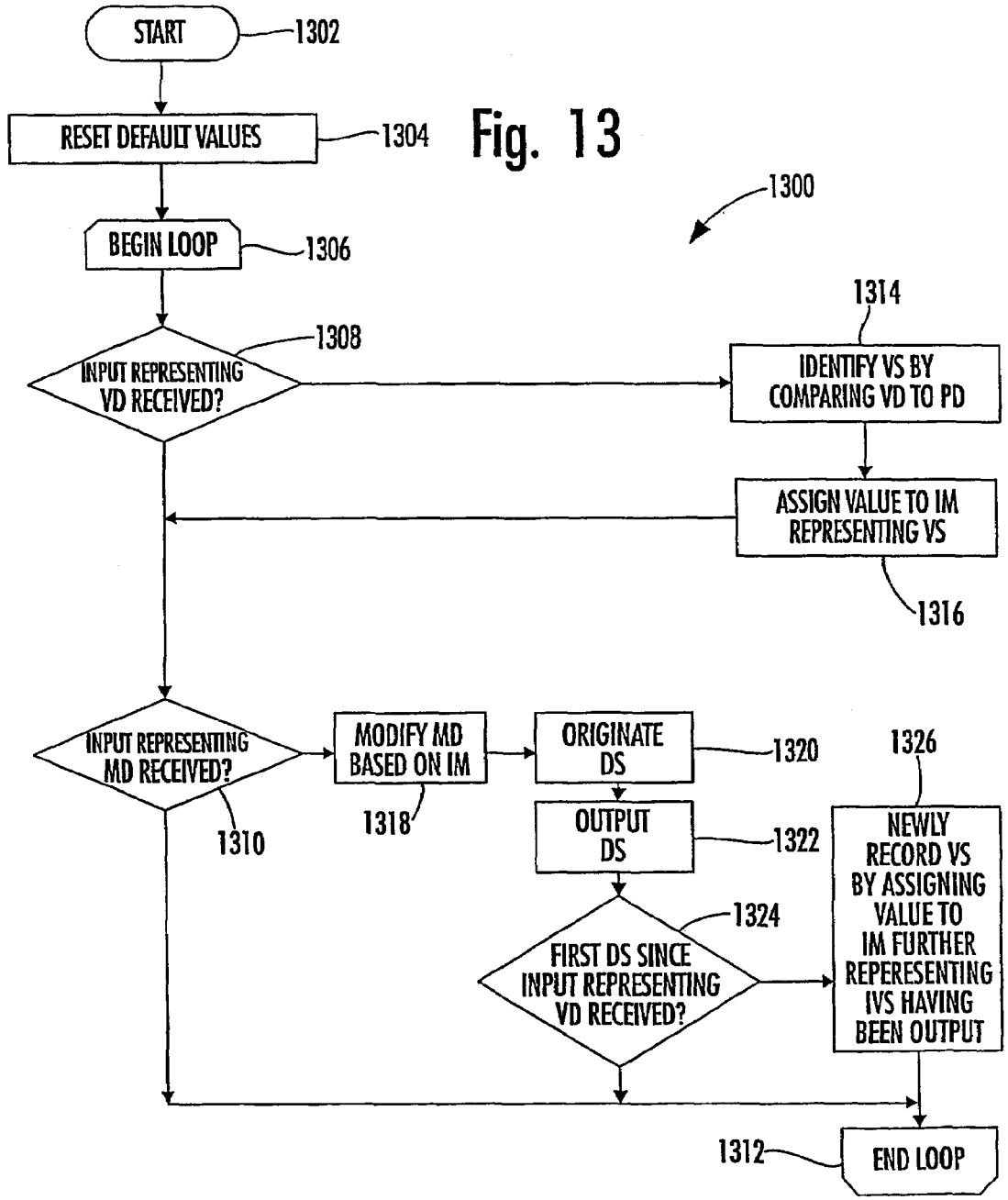

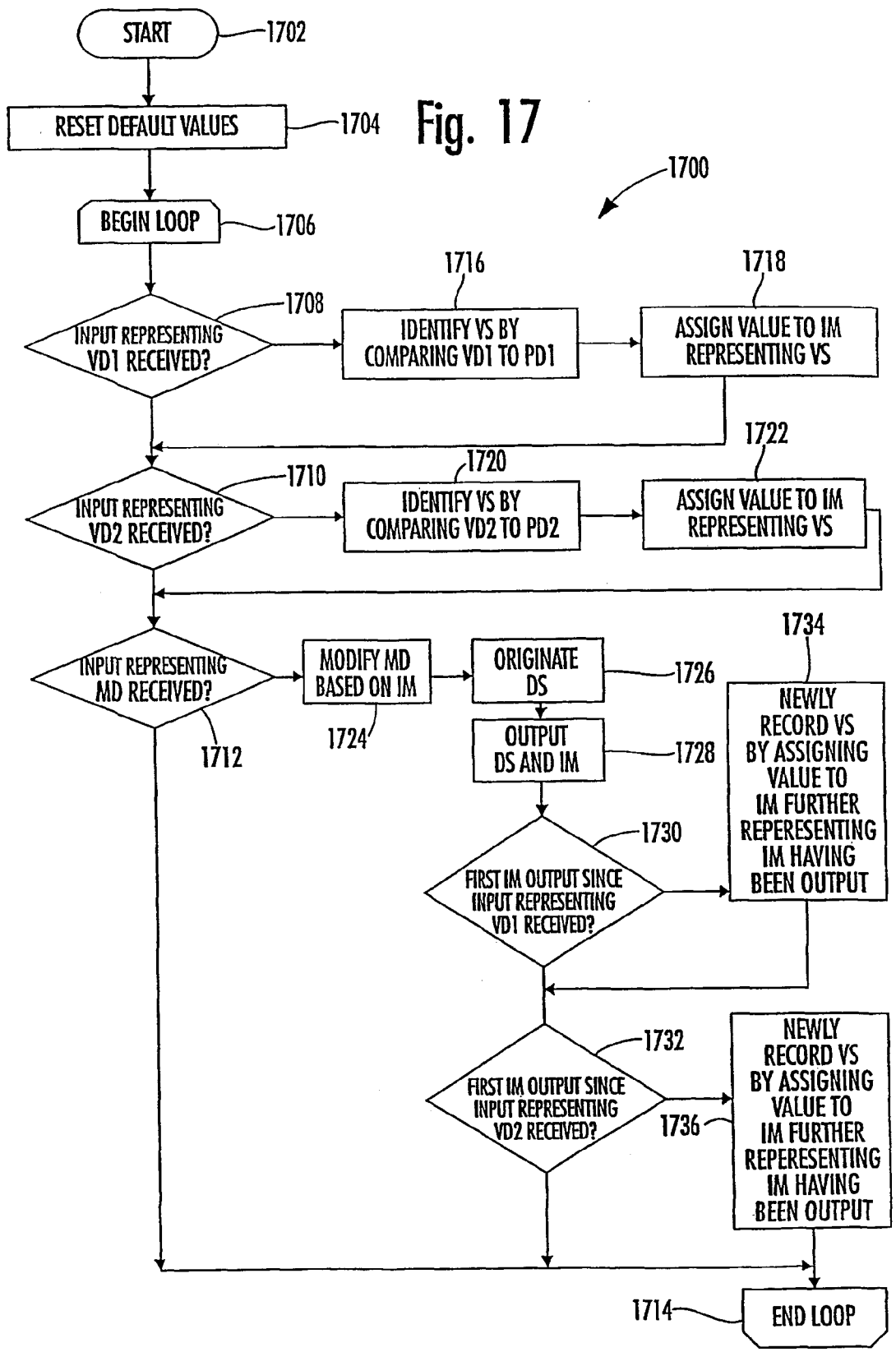

| TYPE (2002) OF DATA | VALUE (AUTHORIZED USER) (2006) |
|---|---|
| PIN | PD=SPD=abcdef |

Fig. 20a

| TYPE (2002) OF DATA | VALUE (AUTHORIZED USER) (2006) |
|---|---|
| BIO:******** | PD=BPD=########## |

Fig. 20b

| TYPE (2002) OF DATA | IDENTIFIER (2004) | VALUE (AUTHORIZED USER) (2006) PD= |
|---|---|---|
| PIN | 001 | abcdef |
| BIO: FINGERPRINT (R-THUMB) | 002 | ################ |
| BIO: FINGERPRINT (R-INDEX) | 003 | ################ |
| BIO: FINGERPRINT (R-MIDDLE) | 004 | ################ |
| BIO: FINGERPRINT (R-RING) | 005 | ################ |
| BIO: FINGERPRINT (R-PINKY) | 006 | ################ |
| BIO: FINGERPRINT (L-THUMB) | 007 | ################ |
| BIO: FINGERPRINT (L-INDEX) | 008 | ################ |
| BIO: FINGERPRINT (L-MIDDLE) | 009 | 0 |
| BIO: FINGERPRINT (L-RING) | 010 | ################ |
| BIO: FINGERPRINT (L-PINKY) | 011 | ################ |
| BIO: HANDPRINT (R) | 012 | ################ |
| BIO: HANDPRINT (L) | 013 | ################ |
| BIO: HAND GEOMETRY SCAN (R) | 014 | ################ |
| BIO: HAND GEOMETRY SCAN (L) | 015 | 0 |
| BIO: RETINA SCAN (R) | 016 | ################ |
| BIO: RETINA SCAN (L) | 017 | ################ |
| BIO: IRIS SCAN (R) | 018 | ################ |
| BIO: IRIS SCAN (L) | 019 | 0 |
| BIO: VOICE RECOGNITION | 020 | ################ |
| BIO: FACIAL RECOGNITION | 021 | 0 |
| BIO: WRITTEN SIGNATURE | 022 | ############ |
| BIO: WRITING SAMPLE | 023 | ############ |
| BIO: DNA SAMPLE | 024 | ################ |

Fig. 20c

| VERIFICATION STATUS (PIN) | $Rs_1$ (2502) | $Rs_2$ (2504) | $Rs_3$ (2506) |
|---|---|---|---|
| NO PIN INPUT | 0 | 00 | "NO INPUT" |
| PIN CORRECT | 1 | 01 | "MATCH" |
| PIN NOT CORRECT | 2 | 10 | "NO MATCH" |

Fig. 25a

| VERIFICATION STATUS (PIN) | $Rs_1$ (2508) | $Rs_2$ (2510) | $Rs_3$ (2512) |
|---|---|---|---|
| NO PIN INPUT | 0 | 00 | "NO INPUT" |
| PIN CORRECT, 1ST OUTPUT | 1 | 01 | "MATCH, FIRST OUTPUT SINCE INPUT REPRESENTING VERIFICATION DATA RECEIVED" |
| PIN NOT CORRECT | 2 | 10 | "NO MATCH" |
| PIN CORRECT, PREVIOUS OUTPUT | 3 | 11 | "MATCH, BUT NOT FIRST OUTPUT SINCE INPUT REPRESENTING VERIFICATION DATA RECEIVED" |

Fig. 25b

| VERIFICATION STATUS (BIO) | $Rb_1$ (2602) | $Rb_2$ (2604) | $Rb_3$ (2606) |
|---|---|---|---|
| NO BIO INPUT | 00 | 0.00 | "NO BIOMETRIC DATA ENTERED" |
| (BVD/BPD) "% MATCH" | ## | 0.## | <##> "% DEGREE OF MATCH" |
| [(BVD-BPD)]/BVD "% DIFFERENCE | ## | 0.## | <##> "% DEGREE OF DIFFERENCE" |

Fig. 26

| ACTIONS IN SEQUENCE | IM | | | | |
|---|---|---|---|---|---|
| | Rs | Rb002 | DSFLAG (002) | Rb016 | DSFLAG (016) |
| 1. START UP/RESET | 00 | 00 | 0 | 00 | 0 |
| 2. INCORRECT PIN | 10 | 00 | 0 | 00 | 0 |
| 3. CORRECT PIN | 01 | 00 | 0 | 00 | 0 |
| 4. 1ST DS & OUTPUT OF IVS | 11 | 00 | 1 | 00 | 1 |
| 5. 2ND DS & OUTPUT OF IVS | 11 | 00 | 1 | 00 | 1 |
| 6. CORRECT PIN | 01 | 00 | 1 | 00 | 1 |
| 7. R. THUMB PROVIDED (85%) | 01 | 85 | 0 | 00 | 1 |
| 8. R. RETINA PROVIDED (90%) | 01 | 85 | 0 | 90 | 0 |
| 9. 3RD DS & OUTPUT OF IVS | 11 | 85 | 1 | 90 | 1 |
| 10. 2ND R. THUMB PROVIDED (88%) | 11 | 88 | 0 | 90 | 1 |
| 11. INCORRECT PIN | 10 | 88 | 0 | 90 | 1 |
| 12. 4TH DS & OUTPUT OF IVS | 10 | 88 | 1 | 90 | 1 |
| 13. 2ND R. RETINA PROVIDED (89%) | 10 | 88 | 1 | 89 | 0 |

Fig. 27

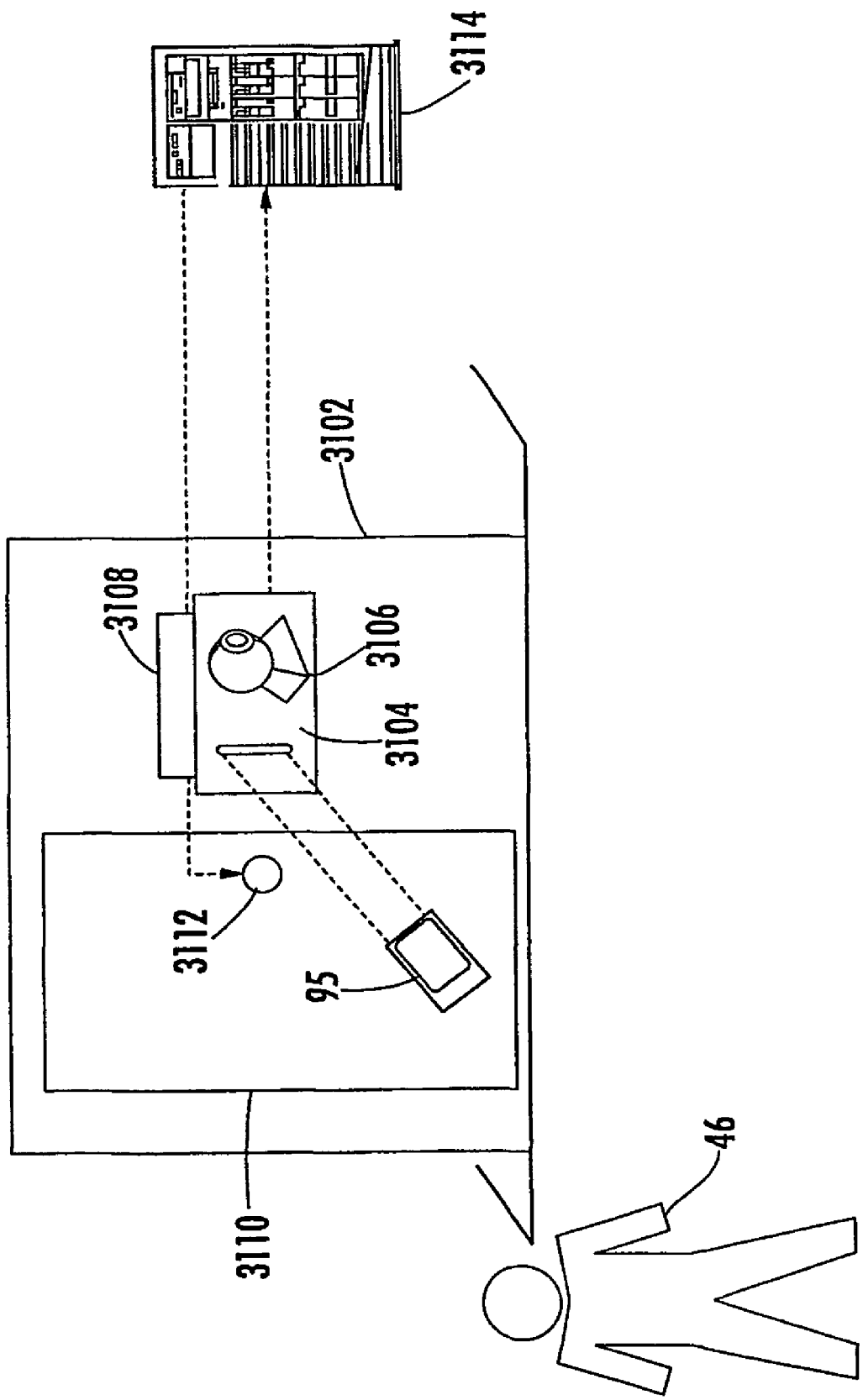

ENTITY AUTHENTICATION IN ELECTRONIC COMMUNICATIONS BY PROVIDING VERIFICATION STATUS OF DEVICE

I. CROSS-REFERENCE TO RELATED APPLICATIONS

This patent application claims priority in the United States under 35 U.S.C. 119, and under the Paris Convention worldwide, to the benefit of the filing date of Wheeler et al. U.S. provisional patent application serial No. 60/223,076, which was filed on Aug. 4, 2000, and which is incorporated herein by reference. This application also incorporates herein by reference each of three international patent applications and three U.S. patent application to Anne and Lynn Wheeler filed concurrently herewith on Aug. 6, 2001, in the U.S. Patent & Trademark Office and bearing serial number PCT/US01/41587 (titled "Person-Centric Account-Based Digital Signature System") and Ser. No. 09/923,179 (titled "Account-Based Digital Signature (ABDS) System"); serial number PCT/US01/41562 (titled "Entity Authentication in Electronic Communications by Providing Verification Status of Device") and Ser. No. 09/923,075 (titled "Modifying Message Data and Generating Random Number Digital Signature Within Computer Chip"); serial number PCT/US01/24572 (titled "Linking Public Key of Device to Information During Manufacture") and Ser. No. 09/,923,213 (titled "Manufacturing Unique Devices That Generate Digital Signatures"); and serial number PCT/US01/24563 (titled "Trusted Authentication Digital Signature (TADS) System").

II. FIELD OF THE PRESENT INVENTION

The present invention generally relates to entity authentication and, in particular, to entity authentication in the field of electronic communications.

III. BACKGROUND OF THE PRESENT INVENTION

As used herein, an electronic communication. ("EC") is considered to be any communication in electronic form. ECs have become an integral part of transacting business today, especially with the growth of the Internet and e-commerce. An EC can represent, for example, a request for access to information or a physical area, a financial transaction, such as an instruction to a bank to transfer funds, or a legal action, such as the delivery of an executed contract.

Over recent years, digital signatures also have become an important part of e-commerce. The origination of a digital signature generally comprises: (1) the calculation of a message digest—such as a hash value; and (2) the subsequent encryption of the message digest. The message digest is encrypted by an electronic device generally using a private key of a key pair used in public-private key cryptography (also known as asymmetric cryptography). The resulting ciphertext itself usually constitutes the digital signature, which typically is appended to the message to form the EC. The second part of originating the digital signature—using encryption with a private key—is referred to herein as "generating" the digital signature, and the combined two steps is referred to herein as "originating" the digital signature. Furthermore, while the generation of the digital signature is conventionally understood as the encryption of the message digest, it is contemplated herein that generating the digital signature also may include simply encrypting the message rather than the message digest. Digital signatures are important because any change whatsoever to the message in an EC is detectable from an analysis of the message and the digital signature. In this regard, the digital signature is used to "authenticate" a message contained within the EC (hereinafter referred to as "Message Authentication").

For example, a message digest may be calculated by applying a hashing algorithm—such as the SHA-1 algorithm—to the message. The hashing algorithm may be applied either within the device or external to the device with the resulting hash value then being transmitted to the device for generation of the digital signature. In order to perform Message Authentication in this example, the recipient of the EC must know or be able to obtain both the identity of the hashing algorithm applied to the message as well as the public key ("PuK") corresponding to the private key used to encrypt the message digest. With this knowledge, the recipient applies the appropriate hashing algorithm to the message to calculate a hash value, and the recipient decrypts the digital signature using the public key. If the hash value calculated by the recipient equals the hash value of the decrypted digital signature, then the recipient determines that the content of the message contained in the EC was not altered in transmission, which necessarily would have changed the hash value.

In performing Message Authentication, the recipient also authenticates the sender of the EC, in so much as the recipient thereby confirms that the sender of the EC possessed the private key corresponding to the public key used successfully to authenticate the message. This is one type of entity authentication and is based on what the sender "has" (hereinafter referred to as "Factor A Entity Authentication"). Factor A Entity Authentication is useful when the recipient of the EC has trusted information regarding the identity of the owner of the private key. Such trusted information may arise from a digital certificate issued by a trusted third party that accompanies the EC and binds the identity of the private key owner with the public key. This trusted knowledge also may comprise actual knowledge of the identity of the private key owner, such as in the case where the recipient itself has issued the private key or device containing the private key to the owner.

As will be appreciated, trust in the digital signature system depends upon the legitimate possession and use of the private key, i.e., upon the sender of the EC actually being the private key owner. A fraudulent use of a private key to generate a digital signature of an EC currently cannot be detected through the above-described Message Authentication and Factor A Entity Authentication procedures. The digital signature system therefore is susceptible to fraud if a private key of a device is stolen, either by discovery of the private key therein and subsequent copying and use in another device capable of generating digital signatures, or by physical theft of the device containing the private key.

To guard against discovery of a private key and subsequent copying and use in another device, devices are manufactured with electronic shielding, zeroization, auditing, tamper evidence and tamper response, and other security features that safeguard the private key (and other protected data) contained therein. Such security features include hardware, software, and firmware and are well known in the art of manufacturing secure computer chips and other devices having cryptographic modules.

The requirements of such security features are specified, for example, in *Federal Information Processing Standards Publication* 140-1, *Security Requirements for Cryptographic Modules,* US DOC/NBS, Jan. 11, 1994 (herein "FIPS PUB 140-1"), which is incorporated herein by reference and which is available for download at http://csrc.nist.gov/publications/fips; and *Federal Information Processing Standards Publication* 140-2, *Security Requirements for Cryptographic Modules,* US DOC/NBS, May 25, 2001 (herein "FIPS PUB 140-2"), which is incorporated herein by reference and which is available for download at http://csrc.nist.gov/publications/fips. FIPS PUB 140-1 and 140-2 also define security levels that may be met by a device based on the device's security features, with each of these defined security levels generally representing a various level of difficulty—in terms of time and money—that would be encountered in attempting to discern a private key of a device. Currently, four security levels are defined with security level 4 being the highest level of security available.

Specifications for such security features also are set forth in *Trusted Computing Platform Alliance Trusted Platform Module Protection Profile Version* 0.45, TRUSTED COMPUTING PLATFORM ALLIANCE, September 2000; *Trusted Platform Module (TPM) Security Policy Version* 0.45, TRUSTED COMPUTING PLATFORM ALLIANCE, October 2000; and *TCPA PC Implementations Specification Version* 0.95, TRUSTED COMPUTING PLATFORM ALLIANCE, Jul. 4, 2001, which are incorporated herein by reference (collectively "TCPA Documents"), and which are available for download at http://www.trustedpc.com; and Common *Criteria for Information Technology Security Evaluation, Smart Card Protection Profile, Draft Version* 2.1d, SMART CARD SECURITY USER GROUP, Mar. 21, 2001, which is incorporated herein by reference (hereinafter "Smart Card Protection Profile"), and which is available for download at http://csrc.nist.gov.

To guard against fraudulent use of a device through theft of the device itself, a personal identification number (PIN), password, or passphrase (collectively referred to herein as "Secret") is typically prestored within the device and must be input into the device before it will operate to generate digital signatures. Alternatively, the Secret is shared with the recipient beforehand and, when the EC later is sent to the recipient, the Secret also is sent to the recipient in association with the message. In the first case, verification of the Secret authenticates the user of the device (hereinafter "User Authentication"), and in the second case, verification of the Secret authenticates the sender of the EC (hereinafter "Sender Authentication"). In either case, confirmation of the Secret represents entity authentication based on what the user or sender "knows" (hereinafter "Factor B Entity Authentication").

Another countermeasure against fraudulent use of the device through physical theft includes the verification of a biometric characteristic—like a fingerprint—of the user of the device or sender of the EC. This type of authentication is based on what the user or sender "is" (hereinafter "Factor C Entity Authentication"). As with the Secret, a biometric value is either maintained within the device for User Authentication, or is shared with the recipient beforehand for Sender Authentication by the recipient.

While Factor B Entity Authentication and Factor C Entity Authentication both reduce the risk of a fraudulent use of a device to generate a digital signature for a message, both also include significant drawbacks. For instance, if the Secret or biometric value is communicated to the recipient in association with a message for sender authentication by the recipient, then the Secret or biometric value first must have been shared with the recipient beforehand and safeguarded by the recipient as part of an established relationship. This conventional paradigm therefore precludes both Factor B Entity Authentication and Factor C Entity Authentication between entities having no such preexisting relationship.

This paradigm also exposes the Secret or biometric value itself to a greater risk of theft. First, the transmission of the Secret or biometric value for verification carries with it the risk of interception and discovery during transit. Second, the Secret or biometric value must be safeguarded by the recipient, thereby exposing the Secret to theft from the recipient. This is especially significant in the corporate context where a rogue employee may steal the safeguarded Secret or biometric value (insider fraud historically has been the greatest risk).

The potential damages also are extensive when the Secret or biometric value is stolen under this paradigm. Since it is difficult for an individual to remember multiple Secrets for multiple recipients, it is common for the same Secret to be used by an individual with different recipients. For example, with regard to credit cards, the same Secret usually is shared with all credit card companies as a matter of convenience, and usually comprises the mother's maiden name of the account holder. The theft of the Secret from one credit card company puts all of the other credit card accounts at jeopardy, at least until the Secret is changed. In the case of the theft of a biometric value, the damages are even more severe, as a person's biometric characteristic cannot be changed and, once lost, potentially compromises any future entity authentication therewith.

Alternatively, when the Secret or biometric value is prestored and maintained within the device for User Authentication, the risks associated with safeguarding of the Secret or biometric value by the recipient and associated with transmission of the Secret or biometric value to the recipient are avoided. In this conventional paradigm, the recipient does not actually perform the verification—it is done at the device level.

A drawback to this alternative paradigm, however, is that because the device remains inoperable until the correct Secret or biometric value of the user is entered, the recipient is unable to monitor repeated attempts to guess the Secret or biometric value. Furthermore, when the device is enabled by the entry of the correct Secret or a biometric value resulting in a match, the device typically remains enabled for a predefined period of time thereafter, such as until it is powered off or resets. Under this alternative paradigm, a recipient is unable to determine whether a particular EC sent during such a time period includes a fraudulently generated digital signature, as the device may have been stolen after being enabled but before its deactivation. Accordingly, while there is User Authentication under this alternative paradigm, there is no provision per se for Sender Authentication.

Yet another drawback is that this alternative paradigm does not particularly accommodate the use of the device to send ECs to different recipients when a biometric value is prestored and maintained within—and Factor C Entity Authentication is performed by—the device. In this regard, different recipients may have different requirements as to what constitutes a biometric "match" so as to be a successful verification; a biometric match is a determination of whether a biometric value input is sufficiently close to a stored biometric value so as to meet at least a minimum security threshold. A security threshold is subjectively set by each recipient and includes factors such as the nature of the communication and the extent of liability to the recipient for actions and responses based on a fraudulently sent EC. Different recipients cannot make their own match/no-match determinations based on their own requirements, standards, and criteria if each recipient does not receive beforehand the biometric value of the sender, make its own comparison thereof with each additional biometric value that is received in association with a message, and apply its own business judgment as to whether the comparison is sufficiently close so as to be a match.

Accordingly, a need exists for a new paradigm in which Factor B Entity Authentication and/or Factor C Entity Authentication is used, but in which the aforementioned drawbacks of the conventional paradigms that use such authentication procedures are overcome. In particular, a need exists for such a paradigm that provides for both User Authentication as well as for Sender Authentication using either or both of Factor B Entity Authentication and Factor C Entity Authentication, and all without requiring a recipient to safeguard either a Secret or a biometric value. In this regard, a need exists for such a paradigm in which Factor B Entity Authentication and Factor C Entity Authentication can be reliably inferred by the recipient without the recipient being privy to the authenticating information, thereby addressing privacy concerns. Furthermore, a need exists in such a paradigm for the recipient to be able to determine, in its own subjective business judgment, what constitutes a successful biometric match when Factor C Entity Authentication is used. A need also exists for such a paradigm in which the recipient is able to monitor repeated attacks on a device to guess a Secret or a biometric value, and for such a paradigm that further accommodates the use of a single device for the sending of ECs to various, unrelated recipients.

IV. SUMMARY OF THE PRESENT INVENTION

A. First Aspect of the Present Invention

A first aspect of the present invention relates to the provision of a verification status of a device and includes the steps of identifying within the device a current verification status out of a plurality of predefined verification statuses of the device as a function of verification data input into the device and data prestored within the device; and, independent of the verification status identified, transmitting the identified verification status to an electronic apparatus external to the device. One of the predefined verification statuses is representative of the verification data being the same as the prestored data, and at least one other verification status is representative of the verification data being different from the prestored data. An indicator of the identified verification status is output from the device.

In a variation of this aspect of the invention, the verification status regards an entity authentication using a device. This variation includes the steps of receiving within the device input comprising verification data of an entity; identifying within the device a current verification status out of a plurality of predefined verification statuses of the device as a function of the verification data and data prestored within the device; and, independent of the verification status identified, outputting from the device an indicator of the identified verification status. Again, one of the predefined verification statuses being representative of the verification data being the same as the prestored data, and at least one other verification status being representative of the verification data being different from the prestored data.

In another variation, a first entity is authenticated to a second entity. In this variation, data of the first entity is stored within a verification component of a device during a personalization of the verification component. Later, verification data is input into the device and received within the verification component of the device, and a current verification status is identified as a function of the verification data and prestored data within the verification component of the device. The verification status identified is one out of a plurality of predefined verification statuses of the device that include a verification status representative of the verification data being the same as the prestored data, and at least one other verification status representative of the verification data being different from the prestored data. Independent of the verification status identified, such verification status is communicated to the second entity. The verification status is communicated to the second entity by outputting an indicator of the verification status from the verification component and transmitting the output indicator to the second entity.

In a fourth variation of this aspect of the present invention, a verification status regarding an entity authentication is provided wherein no verification data is yet received by a device. In particular, the method in this case includes the steps of maintaining within the device prestored data of an entity for identifying a verification status of the device as a function of the prestored data and verification data later input into the device; identifying within the device a current verification status of the device representing the lack of input of any verification data during a predefined period of time; and outputting from the device an indicator of the identified verification status for evaluation thereof. Preferably at some point thereafter, input comprising verification data is received within the device, a current verification status is identified within the device out of a plurality of predefined verification statuses of the device by comparing the received verification data with the prestored data; and an indicator of the identified verification status is again output from the device for evaluation thereof, wherein the second indicator reveals the identified verification status based on the comparison. Preferably, one verification status out of the plurality of predefined verification statuses of the device is representative of the verification data being the same as the prestored data, and at least one other predefined verification status is representative of the verification data being different from the prestored data.

In preferred embodiments of this aspect of the present invention: the prestored data represents either a Secret or biometric characteristic, or both; the verification status identified as the current verification status represents a relational correspondence between the verification data and the prestored data without revealing either of the verification data or the prestored data; and the device is capable of generating digital signatures. Additionally, a request is evaluated with business logic based on the identified verification status.

B. Second Aspect of the Present Invention

A second aspect of the present invention relates to the provision of a verification status of a device and includes the steps of identifying within the device a current verification status out of a plurality of predefined verification statuses of the device as a function of biometric verification data input into the device and biometric data prestored within the device; and, independent of the verification status identified, transmitting an indicator of the identified verification status to an electronic apparatus external to the device, the indicator revealing the identified verification status without revealing either of the verification data or the prestored data. The indicator of the identified verification status is output from the device.

In a variation of this aspect of the invention, the verification status regards an entity authentication using the device. This variation includes the steps of receiving within the device input comprising biometric verification data of an entity; identifying within the device a current verification status out of a plurality of verification statuses of the device as a function of the verification data and biometric data prestored within the device; and, independent of the verification status identified, outputting from the device an indicator of the identified verification status, the indicator revealing the identified verification status without revealing either of the verification data or the prestored data.

In another variation, a first entity is authenticated to a second entity. In this variation, biometric data of the first entity is stored within a verification component of a device during a personalization of the verification component. Later, biometric verification data is input into the device and received within the verification component of the device, and a current verification status is identified as a function of the verification data and prestored data within the verification component of the device. Independent of the verification status identified, such verification status is communicated to the second entity by outputting from the verification component an indicator of the identified verification status and transmitting the output indicator to the second entity. The indicator reveals the identified verification status without revealing either of the verification data or the prestored data.

In a fourth variation of this aspect of the present invention, a verification status regarding an entity authentication is provided wherein no verification data is yet received by a device. In particular, the method in this case includes the steps of maintaining within the device prestored biometric data of an entity for identifying a verification status of the device as a function of the prestored data and biometric verification data later input into the device; identifying within the device a current verification status of the device representing the lack of input of any verification data during a predefined period of time; and outputting from the device an indicator of the identified verification status for evaluation thereof. Preferably at some point thereafter, input comprising verification data is received within the device, a current verification status is identified within the device out of a plurality of predefined verification statuses of the device by comparing the received verification data with the prestored data; and an indicator of the identified verification status is again output from the device for evaluation thereof, wherein the second indicator reveals the identified verification status based on the comparison without revealing either of the verification data or the prestored data.

In preferred embodiments of this aspect of the present invention: one verification status out of the plurality of predefined verification statuses of the device is representative of the verification data being the same as the prestored data, and at least one other predefined verification status is representative of the verification data being different from the prestored data; and the device is capable of generating digital signatures. Additionally, a request is evaluated with business logic based on the identified verification status.

C. Third Aspect of the Present Invention

A third aspect of the present invention relates to the provision of a verification status of a device and includes the steps of identifying within the device a current verification status out of a plurality of predefined verification statuses of the device; generating within the device a digital signature for a message as a function of the identified verification status, including modifying within the device data representing the message as a function of the identified verification status of the device such that the generated digital signature comprises an indicator of the identified verification status; and, transmitting the generated digital signature to an electronic apparatus external to the device. The identification of the current verification status is a function of verification data input into the device and data prestored within the device.

In a variation of this aspect of the invention, the verification status regards an entity authentication. This variation includes the steps of receiving within the device input comprising verification data of an entity; identifying within the device a current verification status out of a plurality of predefined verification statuses of the device as a function of the verification data and data prestored within the device; generating within the device a digital signature for a message as a function of the identified verification status, including modifying within the device data representing the message as a function of the identified verification status of the device such that the generated digital signature comprises an indicator of the identified verification status; and outputting from the device the generated digital signature.

In another variation, a first entity is authenticated to a second entity. In this variation, data of the first entity is stored within a verification component of a device during a personalization of the verification component. Later, verification data is input into and received within the verification component of the device, and a current verification status is identified as a function of the verification data and prestored data within the verification component of the device. The verification status identified is one out of a plurality of predefined verification statuses of the device. A digital signature then is generated within the device for a message as a function of the identified verification status and includes modifying within the device data representing the message as a function of the identified verification status of the device. The generated digital signature comprises an indicator of the identified verification status. The digital signature is output from the verification component of the device and, thereafter, communicated to the second entity.

In a fourth variation of this aspect of the present invention, a verification status regarding an entity authentication is provided wherein no verification data is yet received by a device. In particular, the method in this case includes the steps of maintaining within the device prestored data of an entity for identifying a verification status of the device as a function of the prestored data and verification data, later input into the device; identifying within the device a current verification status of the device representing the lack of input of any verification data during a predefined period of time; generating within the device a digital signature for a message such that the generated digital signature comprises an indicator of the identified verification status; and outputting from the device the generated digital signature for evaluation of the identified verification status. Preferably at some point thereafter, input comprising verification data is received within the device; a current verification status is identified within the device out of a plurality of predefined verification statuses of the device by comparing the received verification data with the prestored data; and another digital signature is generated within the device for a message as a function of the identified verification status. In this regard, data representing the message is modified within the device as a function of the identified verification status of the device. The, second generated digital signature comprising an indicator of the identified verification status is then output from the device for evaluation thereof.

In preferred embodiments of this aspect of the present invention, one verification status out of the plurality of predefined verification statuses of the device is representative of the verification data being the same as the prestored data, and at least one other predefined verification status is representative of the verification data being different from the prestored data; the indicator of the identified verification status neither reveals the prestored data nor the verification data; the prestored data represents a Secret; and the prestored data represents a biometric characteristic. Additionally, a request is evaluated with business logic based on the identified verification status.

The generation of the digital signature includes encrypting within the device using a private key of a public private key pair a message digest calculated within the device for the modified data. In a preferred embodiment, the digital signature for the modified data representing the message is output from the device, but the modified data itself is not output from the device.

In some preferred embodiments, the message is composed within the device by a user of the device. Preferably, the message for which a digital signature is generated is displayed on a display screen of the device for review and approval by the user. Alternatively, the message is composed within an I/O support element external to the device which, in turn, transmits the input representing the message into the device through an interface of the device. In other preferred embodiments, a portion of the message is composed within an I/O support element external to the device which, in turn, transmits input representing the portion of the message into the device through an interface of the device, and a remaining portion of the message is composed within the device. The I/O support element may comprise, for example, a point of sale terminal, a biometric scanner, a card reader, or a computer.

The message itself may be for the performance of a financial transaction, the performance of a legal action, access to a database, access to a physical space, access to a web site, or access to a computer program. The message also may be predetermined and static, and may be stored within the device itself. Verification data also may not be required to be input into the device for other types of messages, or for a predefined period of time such as the time between approval of a request embodied in a message and a powering off of the device.

The data representing the message comprise a hash value of the message or, alternatively, the data representing the message comprise a message digest for the message. The data representing the message may be stored within the device. The modification of the data representing the message preferably includes: embedding the assigned value of an identification marker within the data representing the message; appending the assigned value of the identification marker to the data representing the message; appending the assigned value of the identification marker to the beginning of the data representing the message; and appending the assigned value of the identification marker to the end of the data representing the message.

In preferred embodiments, verification data may be required to be input into the device following a predefined period of time after a last successful verification, and verification data may be required to be input into the device for each one of a particular type of message. The particular type of message may comprise, for example, a request for a financial transaction.

Additional preferred embodiments include message authentication using the digital signature generated within the device, and include the steps of: modifying data representing the message embodying the request as a function of a suspected verification status of the device, calculating a message digest as a function of the modified data, decrypting the generated digital signature using the public key of the public-private key pair, and concluding the verification status of the device as being the suspected verification status of the device when the calculated message digest matches the decrypted digital signature.

The device preferably identifies the current verification status of the device by assigning an identification marker within the device equal to a value out of a set of predefined values corresponding to the predefined verification statuses. In a preferred embodiment, the identification marker is assigned a value equated with a successful verification, and the assigned value further represents whether a digital signature was generated since verification data was last input into the device. Furthermore, the generated digital signature preferably comprises the indicator.

D. Fourth Aspect of the Present Invention

A fourth aspect of the present invention relates to the provision of a verification status of a device and includes the step of identifying within the device a current verification status out of a plurality of predefined verification statuses of the device as a function of verification data input into the device and data prestored within the device. This step includes comparing verification data representing a Secret with the data prestored within the device and assigning, based on the comparison, a first comparison marker within the device equal to a value out of a set of predefined values; and comparing verification data representing biometric data with the data prestored within the device and assigning, based on the comparison, a second comparison marker within the device equal to a value out of a set of predefined values. Data representing a message is modified within the device as a function of the assigned values for the first and second comparison markers. Thereafter, a digital signature is generated within the device for the modified data such that the generated digital signature comprises an indicator of the identified verification status. The generated digital signature then is transmitted to an electronic apparatus external to the device.

In a variation of this aspect of the invention, the verification status regards an entity authentication using a device. This variation includes the steps of receiving within the device input comprising verification data of an entity, the verification data representing both a Secret and a biometric characteristic of the entity; identifying within the device a current verification status out of a plurality of predefined verification statuses of the device as a function of the verification data and data prestored within the device; modifying within the device data representing a message as a function of the identified verification status and generating within the device a digital signature for a message such that the generated digital signature comprises an indicator of the identified verification status; and outputting from the device the generated digital signature. The identification of the verification status includes comparing verification data representing the Secret with the data prestored within the device and assigning, based on the comparison, a first comparison marker within the device equal to a value out of a set of predefined values; and comparing verification data representing biometric data with the data prestored within the device and assigning, based on the comparison, a second comparison marker within the device equal to a value out of a set of predefined values. The modification of the message data includes modifying the data as a function of the assigned values for the first and second comparison markers.

In another variation, a first entity is authenticated to a second entity. In this variation, data representing both a Secret and biometric data of the first entity is stored within a verification component of a device during a personalization of the verification component. Later, verification data is input into the device and received within the verification component of the device, and a current verification status is identified as a function of the verification data and prestored data within the verification component of the device. The identification of the verification status includes comparing verification data representing the Secret with data prestored within the device and assigning, based on the comparison, a first comparison marker within the device equal to a value out of a set of predefined values; and comparing verification data representing biometric data with data prestored within the device and assigning, based on the comparison, a second comparison marker within the device equal to a value out of a set of predefined values. A digital signature is generated within the device for a message by first modifying within the device data representing the message as a function of the assigned values for the first and second comparison markers, and then encrypting the modified data such that the digital signature comprises an indicator of the identified verification status. The digital signature then is output from the verification component and transmitted to the second entity.

In preferred embodiments of this fourth aspect of the present invention: one verification status out of the plurality of predefined verification statuses of the device is representative of the verification data being the same as the prestored data, and at least one other predefined verification status is representative of the verification data being different from the prestored data; the assigned value of the first comparison marker, the assigned value of the second comparison marker, or the assigned values of the first and second comparison markers are output from the device with the generated digital signature; and the modification of the message includes embedding the assigned value of the first comparison marker, the assigned value of the second comparison marker, or both, within the data representing the message, or appending such assigned value(s) to the data representing the message, including appending to the beginning or the end of the message data. Additionally, a request is evaluated with business logic based on the identified verification status.

In alternative embodiments to this fourth aspect of the present invention, the data representing the message is modified as a function of only one of the assigned values for the first and second comparison markers. Furthermore, the generated digital signature for the message and the other of the assigned values for the first and second comparison markers is transmitted to the second entity.

E. Fifth Aspect of the Present Invention

A fifth aspect of the present invention relates to determining a current verification status of a device that generates a digital signature and includes the steps: receiving a digital signature; decrypting the digital signature using a public key of a public-private key pair; for each one of a plurality of predefined verification statuses of the device, modifying data representing a message as a function of the predefined verification status; and identifying the current verification status of the device as being the predefined verification status for which the modified data matches the decrypted digital signature. In a variation of this aspect, a message digest is calculated as a function of the modified data following the modification. The calculation of the message digest as a function of the modified data may include the calculation of a hash value for the modified data.

In preferred embodiments of this fourth aspect of the present invention, each one of the verification statuses represents a relational correspondence between verification data input into the device and data prestored within the device. Furthermore, each verification status neither reveals verification data nor prestored data of the device for which the current verification status is determined.

Preferably, the current verification status is associated with a request. The request, for example, may be for the performance of a financial transaction or for the performance of a legal action. The request, for example, may be predetermined and static and included in a predefined message. The request may be for access to a physical space, access to a web site, access to a database, or access to a computer program. Preferably, the request is received in association with the digital signature and evaluated based on the current verification status indicated by the digital signature. The evaluation of the request includes the step of considering an assurance level of the device generating the digital signature. The request may be implicit in the receipt of the digital signature. The request may be communicated over an electronic communications medium such as a computer network, whether public or private.

Additionally, in preferred embodiments, one of the predefined verification statuses represents an unsuccessful verification; one of the predefined verification statuses represents a successful verification; one of the predefined verification statuses additionally represents whether a digital signature has been generated by the device since verification data was last input into the device; one of the predefined verification statuses additionally represents whether a digital signature has been generated subsequent to a comparison of verification data input into the device with data prestored within the device; one of the predefined verification statuses additionally represents whether any verification data has been input into the device within a predetermined time period comprising, for example, the time since a last successful verification or the time since a resetting of the device.

Additionally, in preferred embodiments, one of the predefined verification status represents a difference between verification data input into the device and data prestored within the device; one of the predefined verification statuses represents a degree of match between biometric verification data input into the device and biometric data prestored within the device; one of the predefined verification statuses additionally represents a percentage of match between biometric verification data input into the device and biometric data prestored within the device; one of the predefined verification statuses additionally represents whether a digital signature has been generated by the device since verification data was last input into the device; one of the predefined verification statuses additionally represents whether a digital signature has been generated subsequent to a comparison of verification data input into the device with data prestored within the device; one of the predefined verification statuses additionally represents whether any verification data has been input into the device within a predetermined time period.

F. Features of the Present Invention

In features of the aforementioned aspects of the present invention, the device preferably identifies the current verification status of the device by assigning an identification marker within the device equal to a value out of a set of predefined values corresponding to the predefined verification statuses. In preferred embodiments, the identification marker is assigned a value equated with a successful verification when the comparison results in a match, including an exact match (e.g., when the data represents a Secret); the identification marker is assigned a value equated with a successful verification when the comparison results in a match, but not an exact match (e.g., when the data represents a biometric characteristic); and, the identification marker is assigned a value equated with an unsuccessful verification when a comparison between the verification data and the prestored data does not result in a match.

Additionally in preferred embodiments, the identification marker is assigned a value representing a difference determined from a comparison between the verification data and the prestored data; the identification marker is assigned a value representing a degree of match between the verification data and the prestored data; the identification marker is assigned a value equated with a percentage, of match between the verification data and the prestored data; and the identification marker is assigned a value representing whether any verification data was input into the device within a predefined time period, such as the time since a last successful verification or the time since a resetting of the device.

In preferred embodiments wherein the identification marker is assigned a value equated with a successful verification, the assigned value further represents whether an indicator was output subsequent to the successful verification or whether an indicator was output since verification data was last input into the device. In additional features, the indicator comprises the assigned value of the identification marker, and the assigned value further represents whether a digital signature was generated by the device since verification data was last input into the device. Furthermore, the device preferably generates a digital signature in response to an external inquiry received by the device, in response to receipt of data representing the message, or in response to receipt of input comprising the verification data.

Other features of the present invention include the verification data being input directly into the device by a user; and, alternatively, input representing the verification data being received within an I/O support element external to the device and then transmitted into the device. The I/O support element may include, for example, a point of sale terminal, a biometric scanner, a card reader, an ATM machine, or a computer.

In yet additional features, the indicator points definitively (i.e., without ambiguity) to a single predefined verification status of the device; neither the prestored data comprising a Secret and/or biometric data nor the verification data input into the device are exported from the device; and the device prestores data for a plurality of users of the device; a digital signature is generated within the device and output from the device with the value of the identification marker.

When the prestored data comprises biometric data, the identification marker is assigned a value representing the type of the biometric data in a feature of the present invention. Furthermore, the biometric data may represent, for example, a digitized fingerprint, a digitized handprint or hand geometry, a digitized retina, a digitized iris, a digitized voice print, a digitized facial scan, a digitized written signature, or a digitized DNA sample. In such case, the device may include a biometric scanner for inputting of the verification data. The device also may prestore data for a plurality of different types of biometric data, whether for one person or for several persons.

In other features of the present invention wherein a request is evaluated based on the identified verification status, verification data is required to be input into the device for each one of a particular type of request such as, for example, a financial transaction. Verification data may not be required to be input into the device for other types of requests. Verification data also may be required to be input into the device for a particular type of request, but only until an evaluation of the request results in an approval, and then verification data may not be required to be input into the device for additional requests of such type during a predefined period of time thereafter, such as the time between the approval of the request and a resetting of the device.

Random numbers are utilized in may computer applications, such as in security protocols like secure socket layer (SSL) protocol and pretty good privacy (PGP) for the creation of session keys. Yet another feature of the present invention includes the generation of a digital signature using a digital signature algorithm, with the resulting digital signature being used in such an application as a random number.

The device of the methods of the present invention preferably is a personal device of the sender of the EC. The device also preferably includes a device interface such as, for example, an alphanumeric keypad, an electrical contact, a touch screen display, a standard electronic interface with a computer bus, or an antenna. The device interface also may comprise a port the device, such as a wireless communications port, a serial port, a USB port, a parallel port, or an infrared port. The device preferably is portable and of a handheld form factor. The device preferably includes a computer chip and/or integrated circuitry, and may be, for example, a cell phone, a PDA, a digitized key, a dongle, a subcutaneous implant, jewelry, an integrated circuit card (IC Card), a credit card, a debit card, smart card, a security card, an ID badge, or a computer.

Other features of the present invention include: a device with a computer-readable medium having computer-executable instructions that perform one or more steps of a method of the present invention; integrated circuitry that performs one or more steps of a method of the present invention; and a computer chip that performs one or more steps of a method of the present invention.

V. BRIEF DESCRIPTION OF THE DRAWINGS

Benefits and further features of the present invention will be apparent from a detailed description of preferred embodiments thereof taken in conjunction with the following drawings, wherein like reference numbers refer to like elements, and wherein:

FIG. 2b illustrates a variation of the embodiment of FIG. 2a;

FIG. 2c illustrates a variation of the embodiment of FIG. 2a;

FIG. 3 illustrates a preferred mode of operation of the device of FIGS. 2a, 2b, and 2c;

FIG. 4b illustrates a variation of the embodiment of FIG. 4a;

FIG. 4c illustrates a variation of the embodiment of FIG. 4a;

FIG. 5 illustrates a preferred mode of operation of the device of FIGS. 4a, 4b, and 4c;

FIG. 6b illustrates a variation of the embodiment of FIG. 6a;

FIG. 6c illustrates a variation of the embodiment of FIG. 6a;

FIG. 7 illustrates a preferred mode of operation of the device of FIGS. 6a, 6b, and 6c;

FIG. 8b illustrates a variation of the embodiment of FIG. 8a;

FIG. 8c illustrates a variation of the embodiment of FIG. 8a;

FIG. 8d illustrates a variation of the embodiment of FIG. 8a;

FIG. 9 illustrates a preferred mode of operation of the device of FIGS. 8a, 8b, and 8c;

FIG. 10b illustrates a variation of the embodiment of FIG. 10a;

FIG. 10c illustrates a variation of the embodiment of FIG. 10a;

FIG. 11 illustrates a preferred mode of operation of the device of FIGS. 10a, 10b, and 10c;

FIG. 12b illustrates a variation of the embodiment of FIG. 12a;

FIG. 12c illustrates a variation of the embodiment of FIG. 12a;

FIG. 13 illustrates a preferred mode of operation of the device of FIGS. 12a, 12b, and 12c;

FIG. 14b illustrates a variation of the embodiment of FIG. 14a;

FIG. 14c illustrates a variation of the embodiment of FIG. 14a;

FIG. 16b illustrates a variation of the embodiment of FIG. 16a;

FIG. 16c illustrates a variation of the embodiment of FIG. 16a;

FIG. 17 illustrates a preferred mode of operation of the device of FIGS. 16a, 16b, and 16c;

FIG. 18b illustrates a variation of the embodiment of FIG. 18a;

FIG. 18c illustrates a variation of the embodiment of FIG. 18a;

Figure 21A:
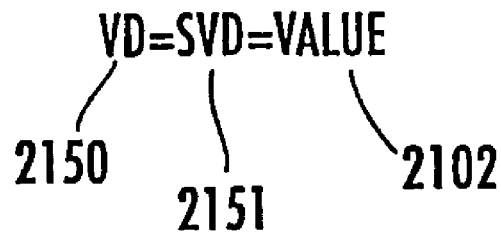
Figure 21B:
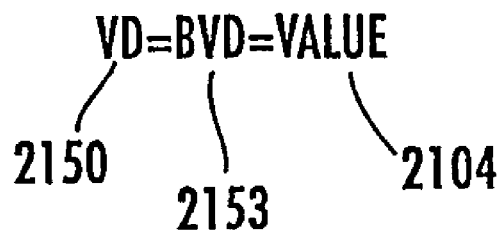
Figure 21C:
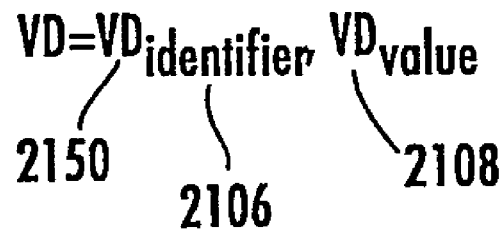
Figure 22:
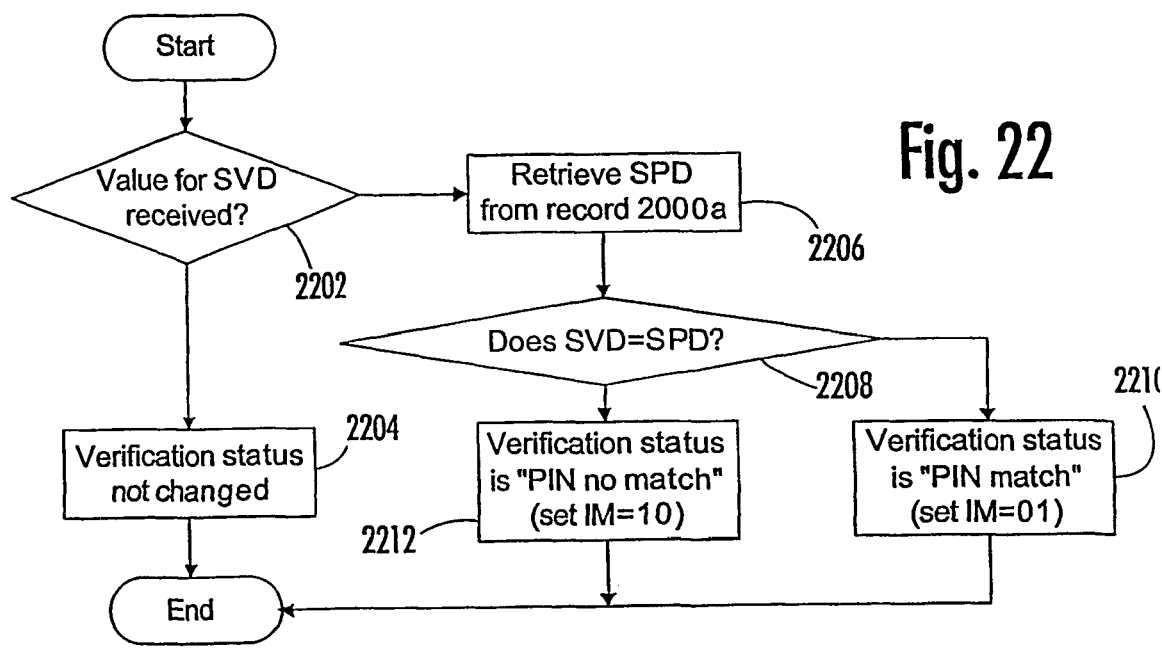
Figure 23A:
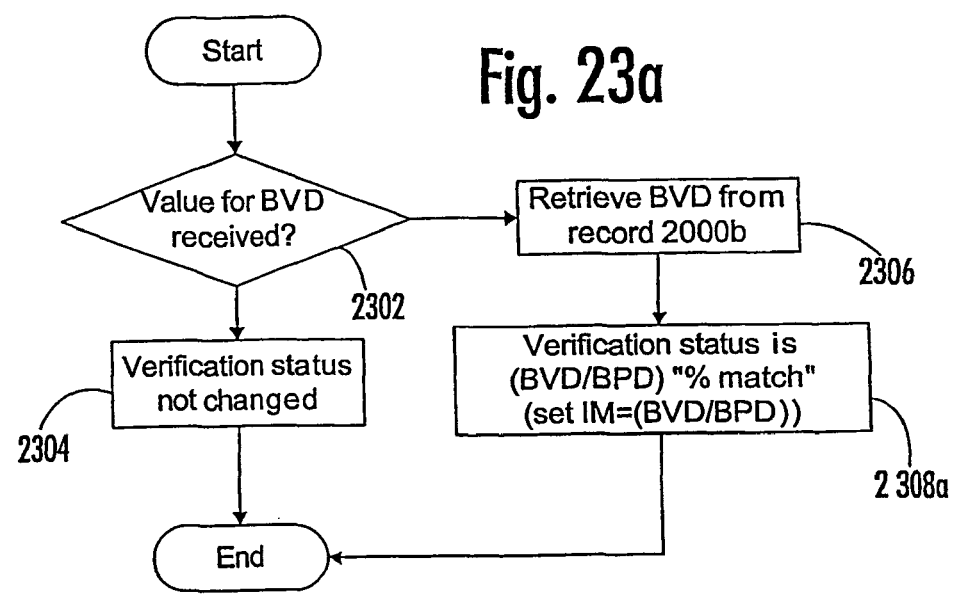
Figure 23B:
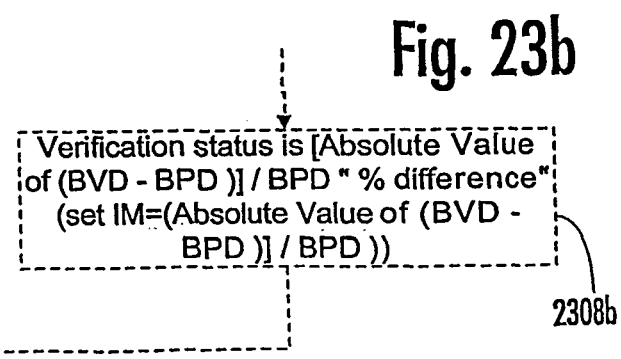
Figure 24:
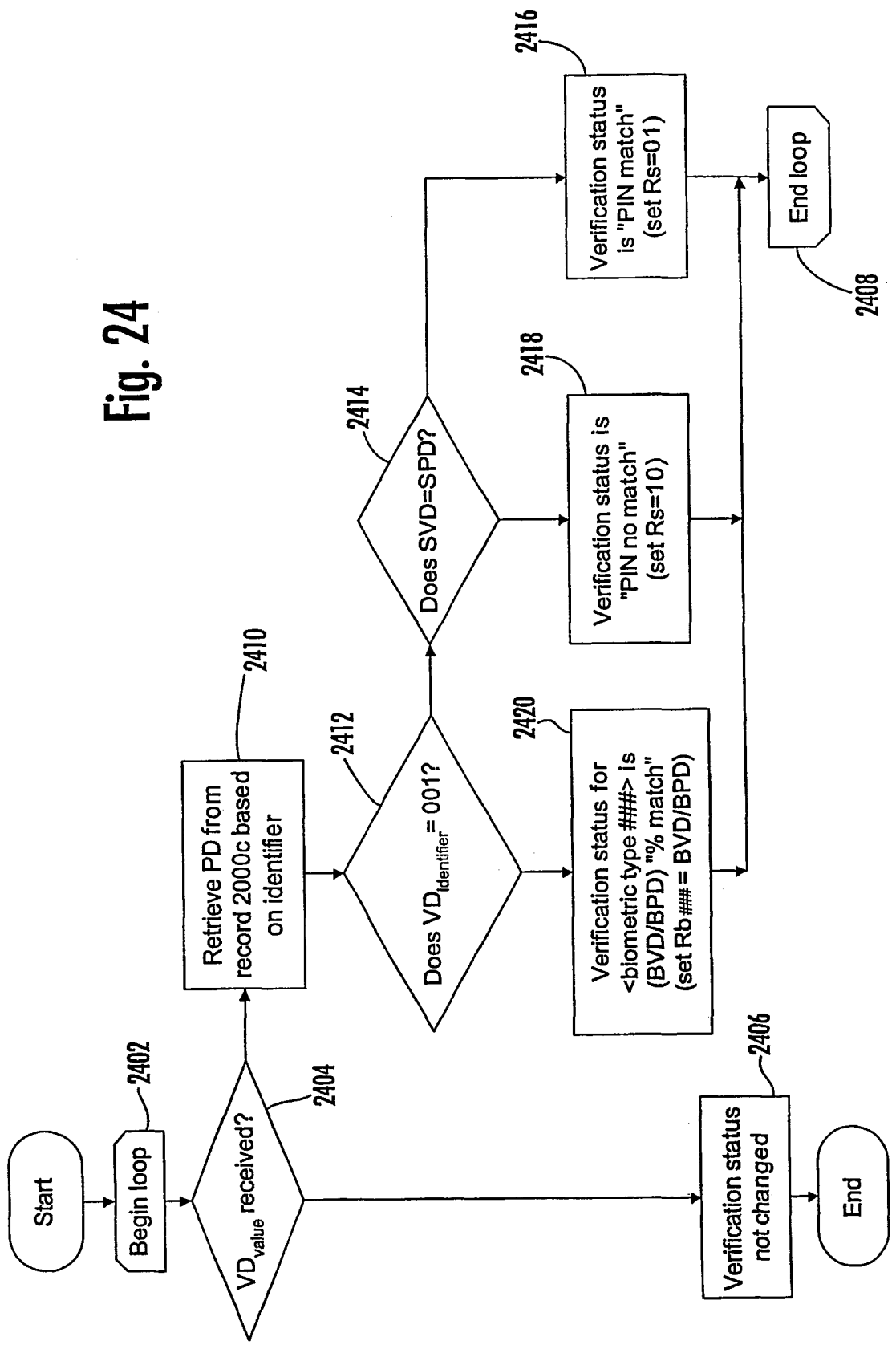
Figure 28:
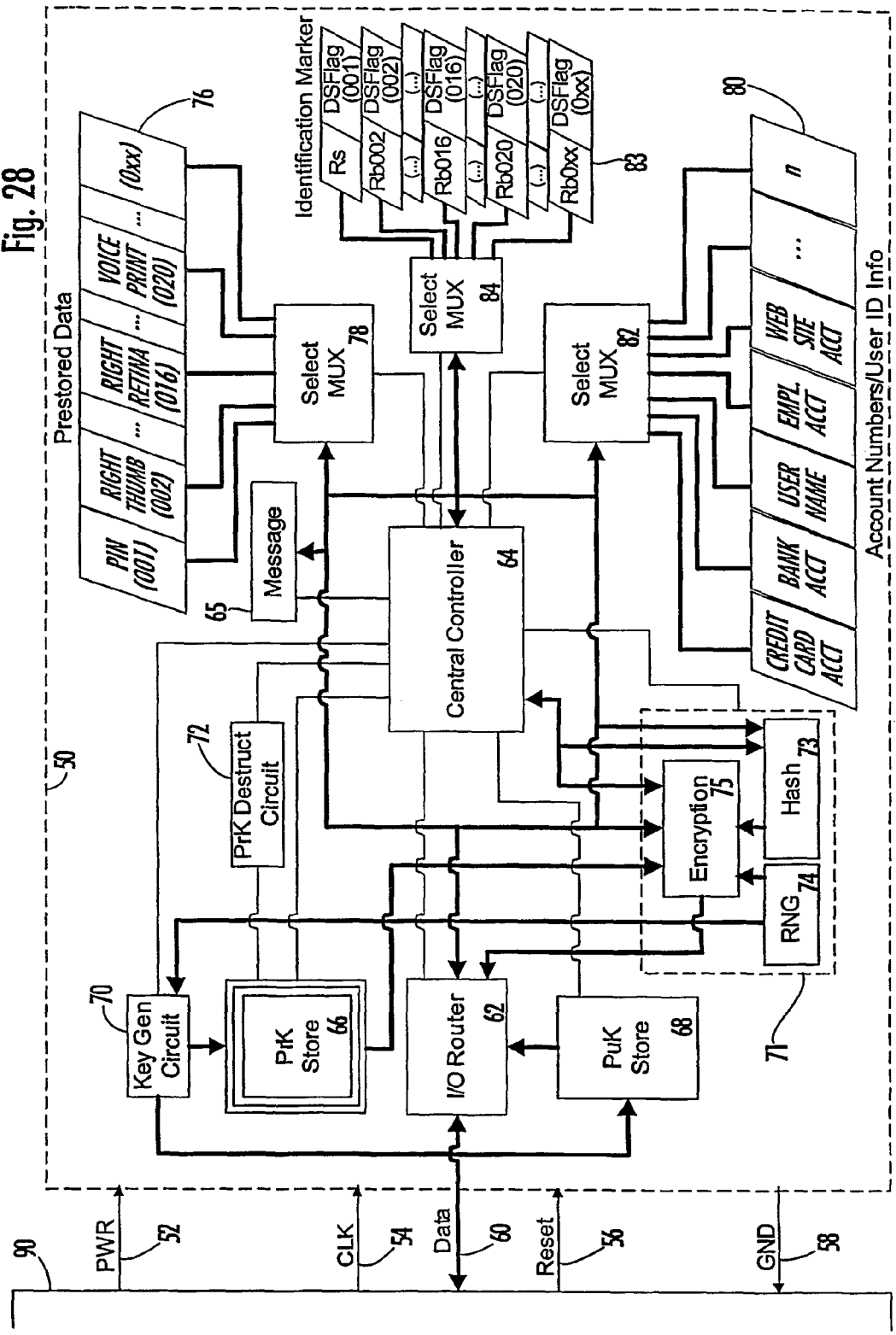
Figure 29:
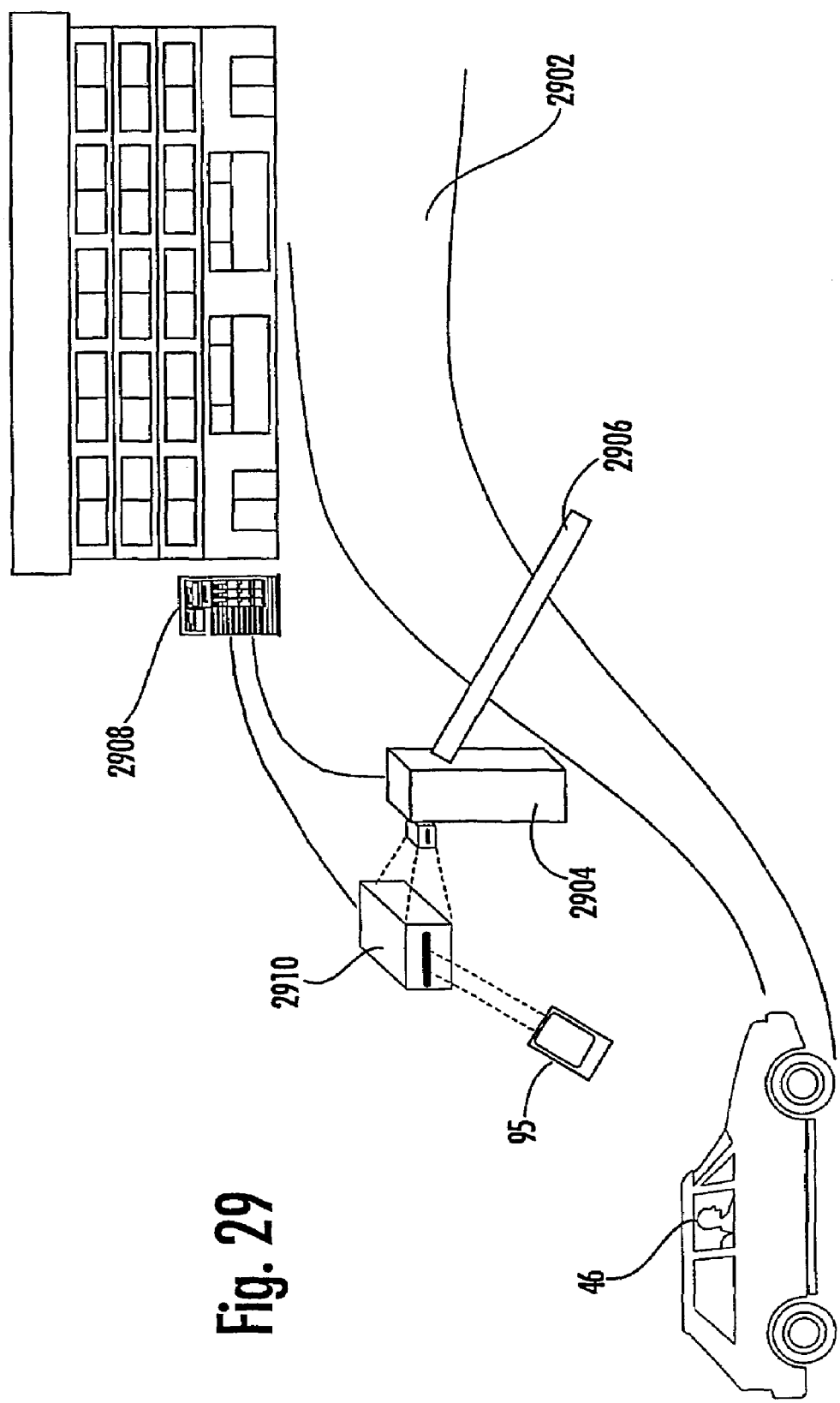
Figure 30:
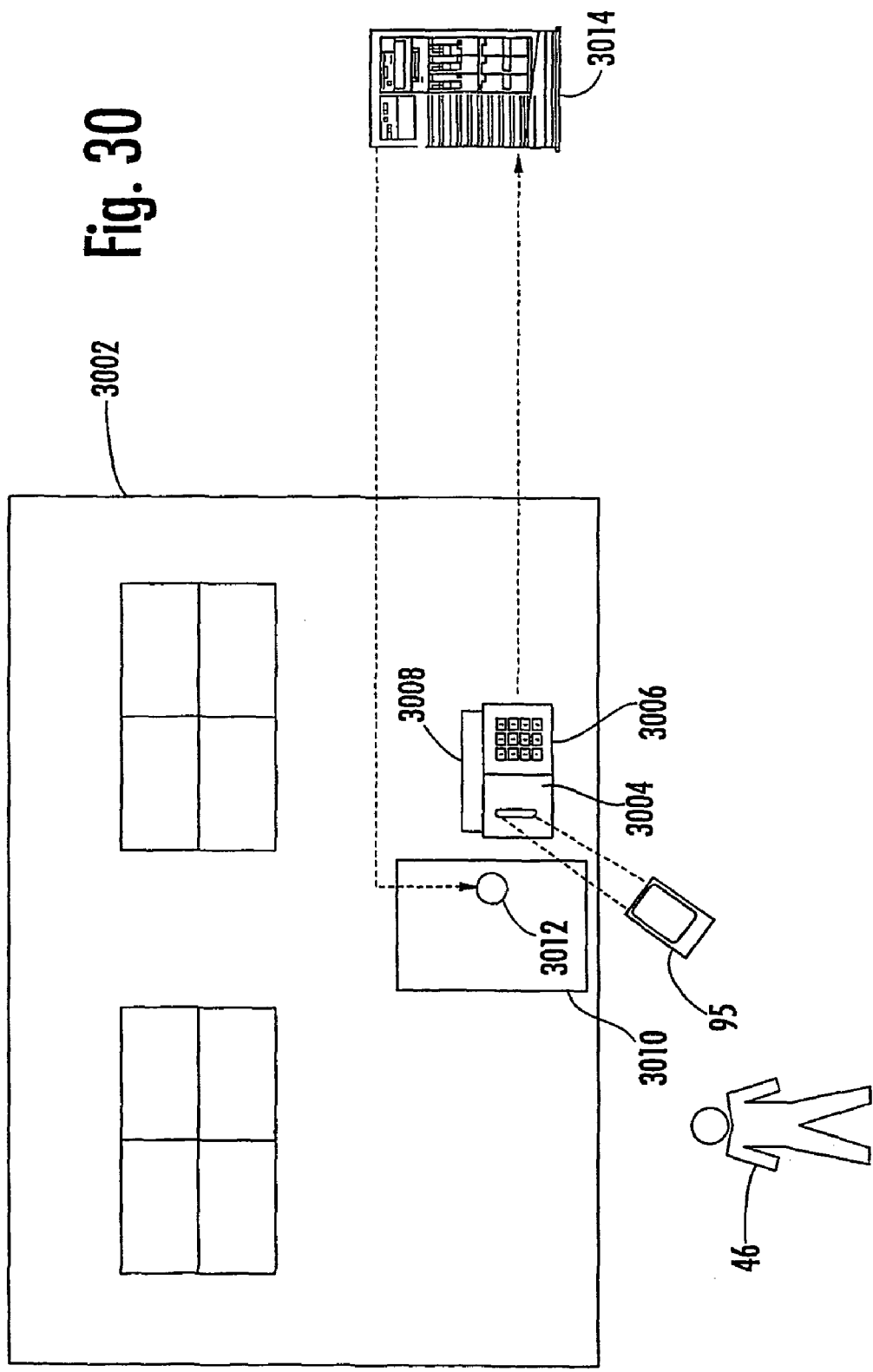
Figure 32A:
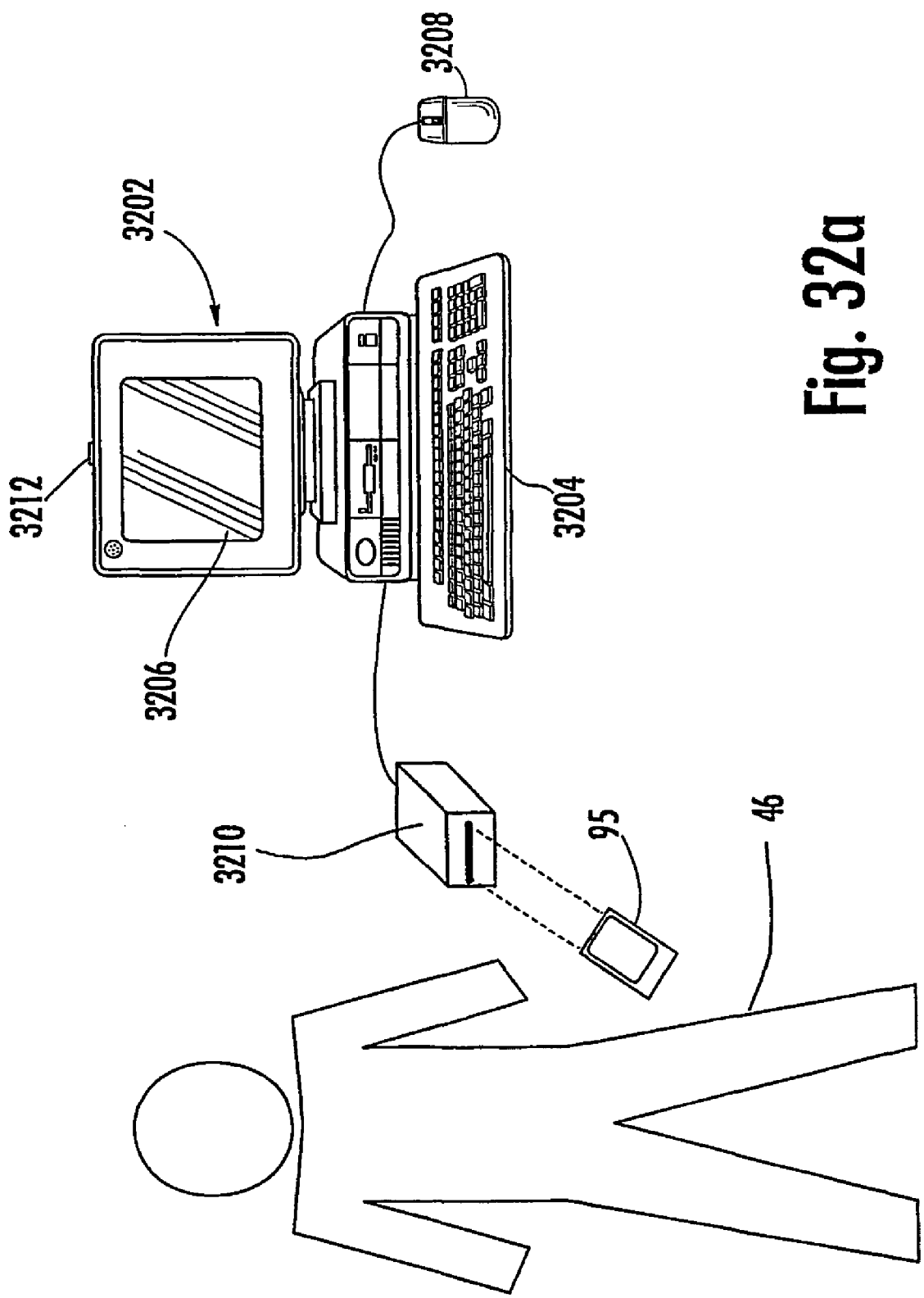
Figure 32B:
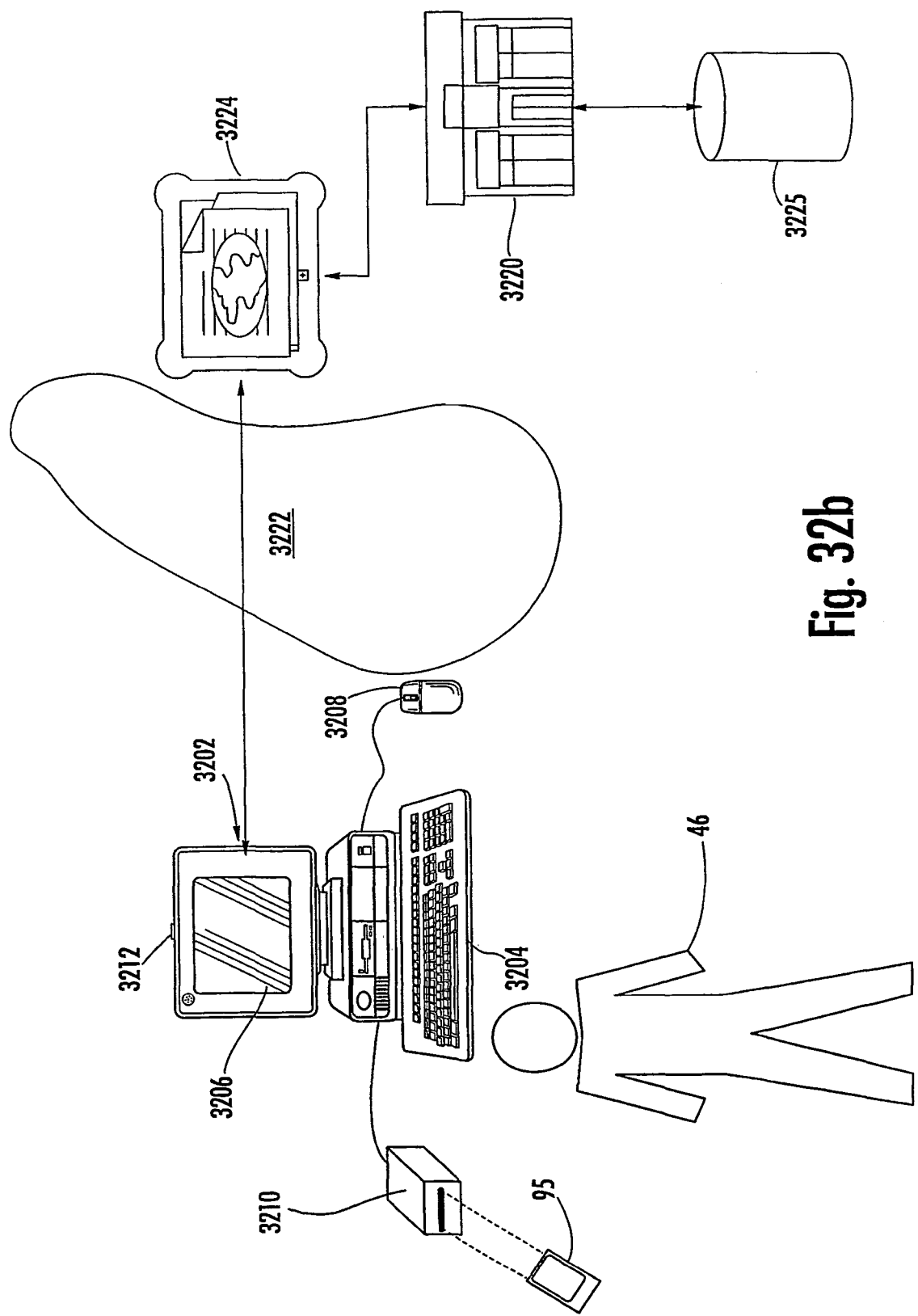
Figure 33:
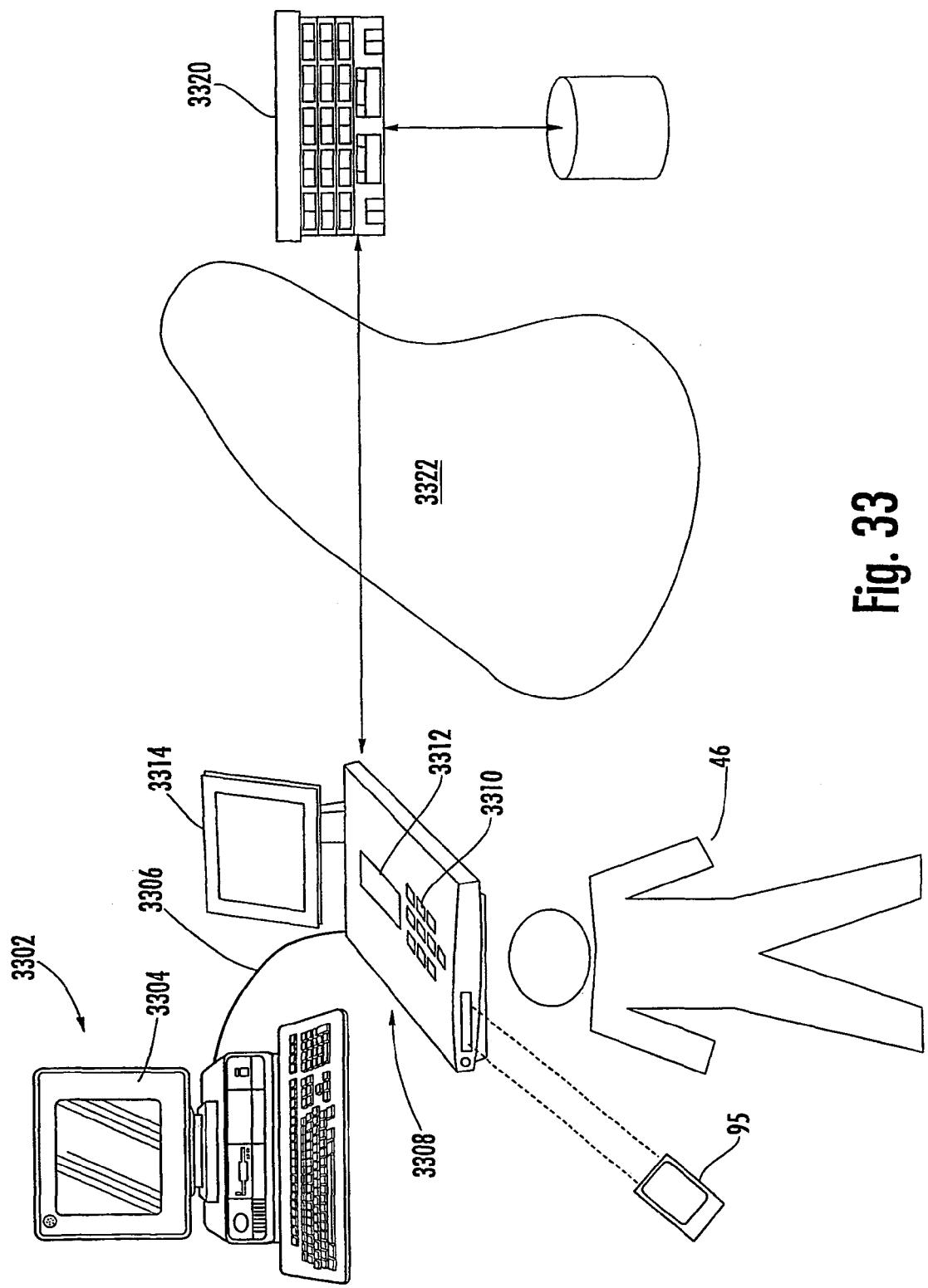

FIGS. 20a, 20b, and 20c illustrate preferred formats of prestored data of the present invention;

FIGS. 21a, 21b, and 21c illustrate preferred formats of verification data of the present invention;

FIG. 22 illustrates a preferred comparison and verification status identification process;

FIGS. 23a and 23b illustrate preferred comparison and verification status identification processes;

FIG. 24 illustrates a preferred comparison and verification status identification process;

FIGS. 25a and 25b illustrate preferred formats of identification markers of the present invention;

FIG. 26 illustrates preferred formats of identification markers of the present invention;

FIG. 27 illustrates a table of identification markers resulting from a hypothetical sequence of verification data inputs in accordance with the present invention;

FIG. 28 illustrates a preferred data flowchart within an implementation of the present invention using a computer chip;

FIG. 29 illustrates a first specific implementation of the present invention using an IC card;

FIG. 30 illustrates a second specific implementation of the present invention using an IC card;

FIG. 31 illustrates a third specific implementation of the present invention using an IC card;

FIGS. 32a and 32b illustrate fourth and fifth specific implementations of the present invention using an IC card; and FIG. 33 illustrates a sixth specific implementation of the present invention using an IC card.

VI. DETAILED DESCRIPTION OF PREFERRED EMBODIMENTS

As a preliminary matter, it readily will be understood by those persons skilled in the art that, in view of the following detailed description of the devices, systems, and methods of the present invention, the present invention is susceptible of broad utility and application. Many embodiments and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred embodiments, it is to be understood that this detailed description only is illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

A. Overview of the Present Invention

Figure 1:
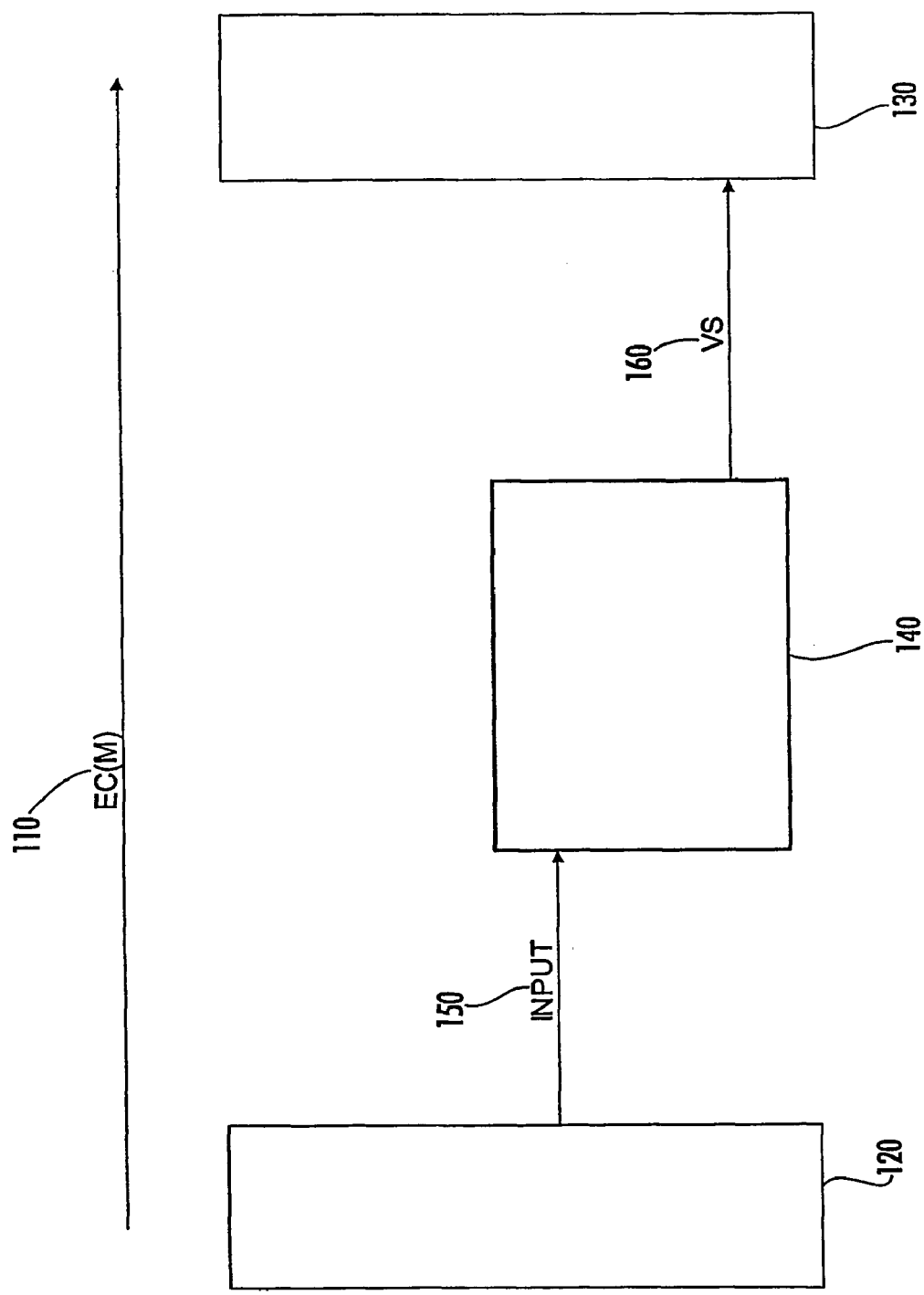
FIG. 1 illustrates in block diagram a conceptual framework of the present invention.

Conceptually, the present invention is illustrated best in FIG. 1, wherein an EC 110 including a message from a sender 120 is received by a recipient 130. In accordance with the present invention, a device 140 includes a verification component thereof that performs the functions of: receiving input 150 representing verification data of the sender 120; identifying a current verification status of the device 140; and communicating the identified verification status (VS) 160 to the recipient 130 in association with the EC 110. The verification data represented by the input 150 comprise a Secret or a biometric value.

In preferred embodiments of the present invention, discussed in detail below, the verification status 160 preferably is identified within the device by maintaining prestored data of the sender 120 and by comparing the prestored data with the verification data that is input. Accordingly, the prestored data comprises a Secret or a biometric value, too.

In preferred embodiments, the device 140 also includes a plurality of predefined verification statuses, each representing a relational correspondence between the verification data and the prestored data. None of the verification statuses, however, actually reveals the verification data or the prestored data; thus, there need be no "shared secret" between the sender 120 and the recipient 130. The device 140 identifies one of the predefined verification statuses as being the current verification status 160 based on the comparison of the verification data with the prestored data, and the device 140 communicates the identified verification status 160 to the recipient 130 by outputting from the device 140 an indicator of the identified verification status that then is transmitted to the recipient 130. The indicator may or may not actually comprise the verification status 160; however, the indicator does indicate to the recipient 130 (or enables the recipient 130 to determine) the verification status 160 identified within the device.

Additionally, the device 140 preferably includes a predefined verification status representing that no input 150 was received within a predefined period of time. The device 140 identifies this verification status as being the current verification status 160 if no input 150 is received within such predefined period of time and, when appropriate, communicates such verification status to the recipient 130 in association with an EC 110. The predefined period of time may comprise, for example, the time since a resetting of the device 140 or simply a predetermined amount of time. Further, for devices 140 that "power on" only when voltage or an appropriate signal is provided to the device 140 (e.g., voltage from an internal power supply, voltage from an external power supply, receipt of an RF signal, and the like), the predefined amount of time may comprise the time since the device 140 was, in fact, "powered on."

Examples of possible verification statuses include "match" and "no match" between the verification data and the prestored data, and degrees of match or difference between the verification data and prestored data (e.g., when the verification data and prestored data comprises biometric values). The verification statuses also may further represent whether a verification status has been provided to the recipient 130 within a predefined period of time. The predefined period of time may comprise, for example, the time since the last comparison of verification data with prestored data that resulted in a successful verification, the time since the last receipt of input 150 representing verification data, or simply a predetermined amount of time, as discussed above.

The recipient 130 preferably has the ability of determining a level of risk associated with the EC 110 based on the verification status 160. Because of this determined level of risk associated with the EC 110, the recipient 130 is better able to evaluate the message of the EC 110. The recipient 130 preferably is represented by an electronic apparatus that includes an interface for receiving the indicator transmitted from device 140 and logic circuitry or software incorporating business logic for evaluating the EC 110 from the sender 120 based on the received indicator. The electronic apparatus may be located remote to the device 140 but disposed in electronic communication therewith, such as over an electronic communications network (e.g. Internet, intranet, wireless network, and the like).

It should be understood that, depending upon the context in which the sender 120 and recipient 130 are interacting, the message may be explicit or implicit. If implicit, the content of the message may be predefined. For example, the actual act of receiving an indicator of the verification status of the device 140 by the recipient 130 may, in itself, represent a message agreed upon between the sender 120 and the recipient 130. In such a case, no EC 110 containing a message need be sent. Furthermore, when an EC 110 actually is sent from the sender 120 to the recipient 130, part or all of the EC 110 may be composed and sent from the device 140, rather than separate from the device 140 as shown in FIG. 1.

B. Preferred Embodiments of the Present Invention

1. First Preferred Embodiment (Basic Model)

Figure 2A:
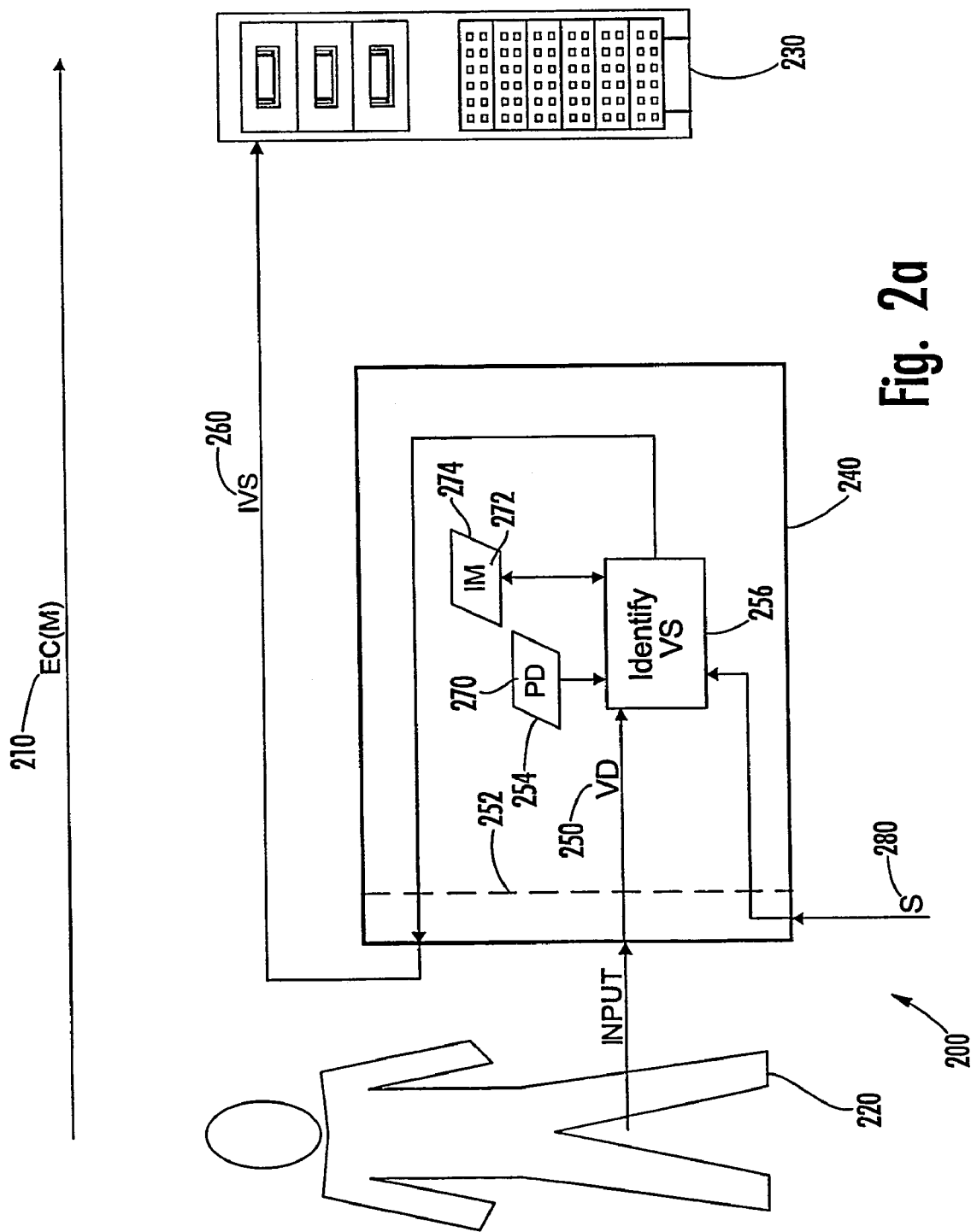
FIG. 2a illustrates a first preferred embodiment of the present invention.

A first preferred embodiment 200 of the present invention is illustrated in FIG. 2a, wherein an EC 210 including a message from a sender 220 is received by a recipient represented by an electronic apparatus 230, and wherein a device 240 receives input representing verification data (VD) 250 at a device interface 252. The device 240 includes a verification component therein that maintains data (PD) 270 of the sender 220 prestored in memory 254 of the device 240. The verification data 250 and prestored data 270 represent Secret or biometric values.

The verification component identifies at 256 a current verification status of the device 240 based on a comparison of the verification data 250 with the prestored data 270. Upon receipt of a signal (S) 280, the last identified (i.e., "current") verification status of the device 240 is communicated to the recipient by outputting from the device 240 an indicator 260 that then is transmitted to the recipient in association with the EC 210. The signal 280 is sent to the device 240, which triggers the device 240 to output the indicator 260. The signal 280 represents, for example, a request or command for the provision of the verification status to the recipient and is generated by the sender 220, by the electronic apparatus 230, or by another apparatus (not shown). The device interface 252 includes, as appropriate, one or more of the following: a user interface such as an alphanumeric keypad, a touch screen display, or a biometric scanner for receiving input directly from the sender 220; an electrical contact; a standard electronic interface with a computer bus; an antenna; or a communications port, such as a serial port, USB port, parallel port, infrared port, or other wireless communications port.

The device 240 also includes a set of predefined verification statuses each representing a relational correspondence between the verification data 250 and the prestored data 270. Verification statuses of the set further represent whether an indicator 260 has been output from the device 240 since the last successful verification or since the last receipt of input representing verification data. The set also contains one additional predefined verification status representing the lack of input representing verification data 250 since a resetting after a timeout or a powering on of the device 240. The indicator 260 output from the device 240 is based on the last comparison of the verification data 250 with the prestored data 270, but only if input representing verification data 250 has been received since the resetting of the device 240. Otherwise, the indicator 260 indicates the lack of input representing verification data 250 since the resetting of the device 240. In either case, the indicator 260 is transmitted in association with the EC 210, whereby the recipient is able to identify the indicator 260 as relating to the EC 210. The electronic apparatus 230 includes an interface (not shown) capable of receiving the indicator 260 from device 240, and also includes logic circuitry or software incorporating business logic therein for determining the verification status based on the indicator 260 and for evaluating the EC 210 received from the sender 220 based on the verification status of the device 240.

When the verification data 250 and the prestored data 270 comprise a Secret, the predefined set of verification statuses includes at least four verification statuses, comprising: a first verification status representing the lack of verification data 250 since a resetting of the device; a second verification status representing a match between the verification data 250 and the prestored data 270, and further representing no other indicator 260 being output from the device 240 since the match; a third verification status representing a failed match between the verification data 250 and the prestored data 270; and a fourth verification status representing a match between the verification data 250 and the prestored data 270, and further representing that an indicator 260 has been output since the match. The device 240 preferably includes an identification marker ("IM") 272 stored in memory 274 and comprising one of four binary numbers that represents the current verification status identified by the device 240. The four binary numbers respectively correspond to the four verification statuses and include: "00" identifying the first verification status; "01" identifying the second verification status; "10" identifying the third verification status; and "11" identifying the fourth verification status. Furthermore, the indicator 260 output from the device 240 preferably includes the value of the identification marker 272, with the correspondence of the value with the predefined verification statuses of the device 240 being previously known by the recipient. None of the verification statuses actually reveal the verification data 250 or the prestored data 270; thus, no "shared secret" is required between the sender 220 and the recipient. However, the recipient can infer correct knowledge of the Secret from the verification status.

Alternatively, when the verification data 250 and the prestored data 270 comprise biometric values, the set of predefined verification statuses comprises the possible percentages of match—or degrees of difference—between the verification data 250 and prestored data 270, together with a verification status representing the lack of input representing verification data 250 since a resetting of the device 240. For example, the predefined verification statuses comprising the percentage match of the verification data 250 with the prestored data 270 may comprise the set of percentages ranging from 0% to 100% in increments of 1%. Preferably each one of the verification statuses representing a percentage match also further represents whether an indicator 260 has been output from the device 240 since the last receipt of input representing verification data 250. The device 240 preferably includes the identification marker 272 for storing a value representing the verification status identified by the device 240 as the current verification status. Furthermore, the indicator 260 output from the device 240 preferably comprises the value of the identification marker 272, with the correspondence of such value with the predefined verification statuses of the device being previously known by the recipient. Again, none of the verification statuses actually reveal either of the verification data 250 or the prestored data 270; thus, no biometric value representing the sender's irreplaceable biometric characteristic is communicated to the recipient. However, the recipient can infer from the verification status the presence of the sender 220 from the reading of the biometric characteristic.

Figure 2B:
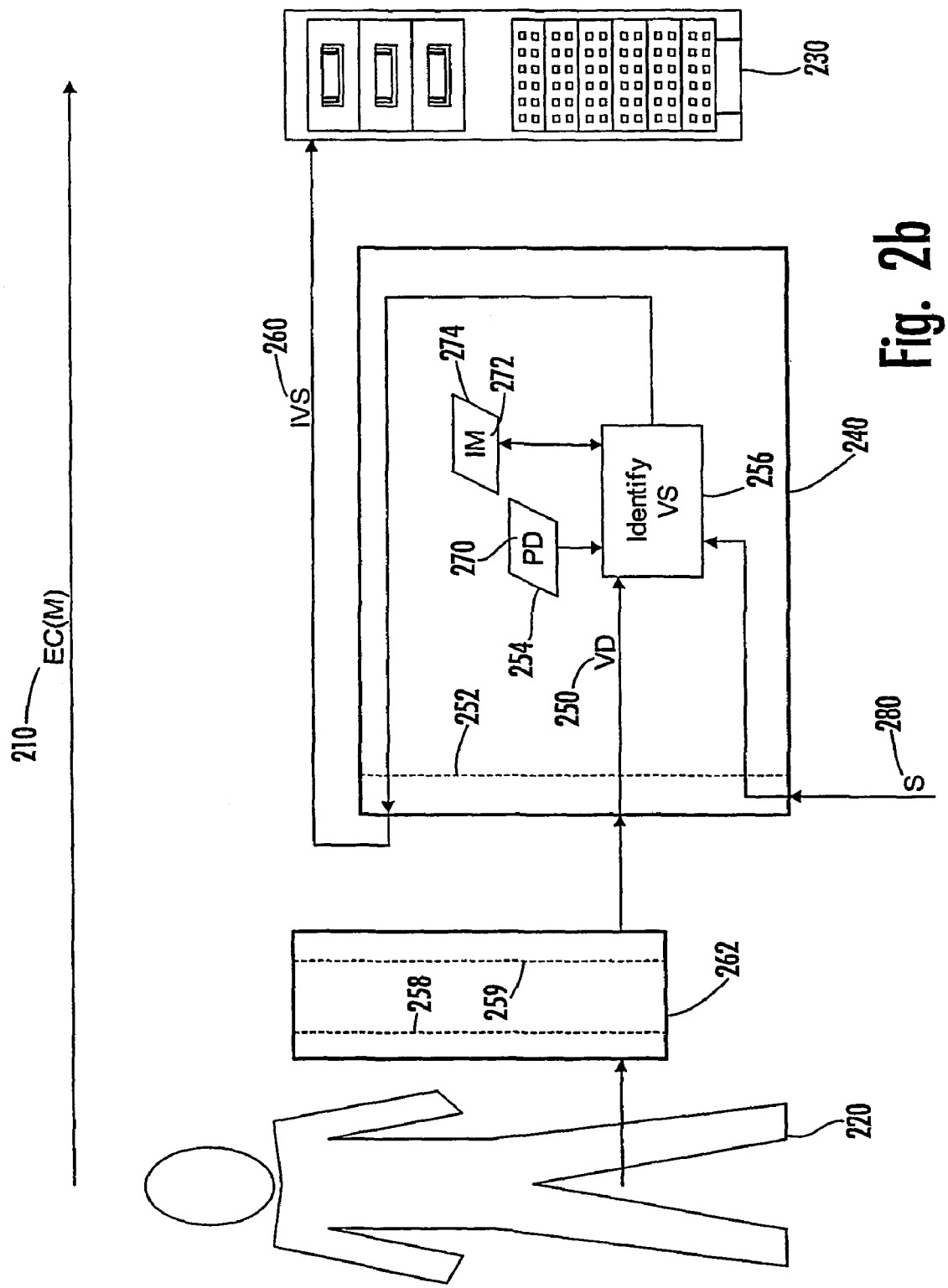

A variation based on the first preferred embodiment 200 of FIG. 2a is shown in FIG. 2b, and includes an I/O support element 262 from which the input representing the verification data 250 is received at the device interface 252. The I/O support element 262 includes a user interface 258 from which input from the sender is received and an I/O interface 259 that communicates the input representing the verification data 250 to the device 240. Yet an additional variation thereof is shown in FIG. 2c, wherein the I/O support element 262 receives the indicator 260 output from the device 240 and, in turn, transmits the indicator 260 to the electronic apparatus 230.

As shown, the indicator 260 transmitted from the I/O support element 262 is the same as the indicator 260 output from the device 240. However, the indicator transmitted from the I/O support element 262 may be different from the indicator output from the device 240, so long as the recipient is able to determine the verification status as indicated by the indicator 260 output from the device 240. For instance, the indicator transmitted from the I/O support element 262 may indicate not only the verification status of the device 240, but also a verification status of the I/O support element 262 when the I/O support element 262 itself identifies a verification status. Furthermore, the indicator 260 transmitted from the I/O support element 262 may be packaged or embedded within another communication—including additional information that is digitally signed by the I/O support element 262.

Figure 2C:
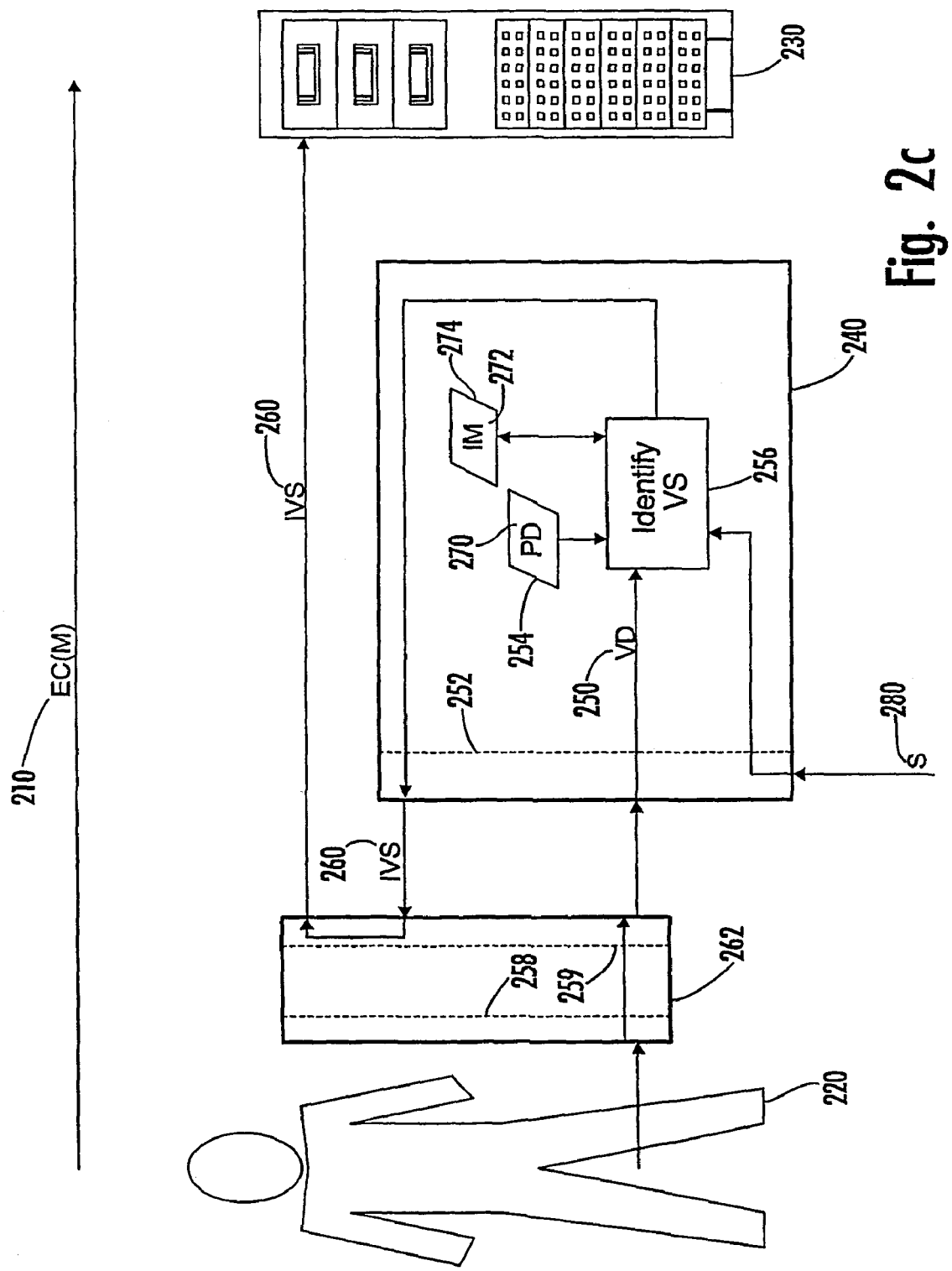

In FIGS. 2a, 2b, and 2c, the EC 210 is shown as being transmitted separate from the indicator 260. However, in the preferred embodiment of FIG. 2a and variations thereof, the indicator 260 equally may be associated with the EC 210 by being transmitted as part of the EC 210. Furthermore, the EC 210 may be output from the device 240, an associated I/O support element 262 (not shown in FIG. 2a), or other apparatus.

A preferred mode 300 of operation of the device of FIGS. 2a, 2b, and 2c is illustrated in FIG. 3 and begins with a resetting Step 304 of the device following a timeout or powering on of the device at 302. During the reset, the identification marker is assigned a value corresponding to a verification status representing the receipt of no input representing verification data and further representing the fact that that no indicator has yet been output. The device then enters a repeating loop that begins at 306 and ends at 312 and continues within this loop until the device is reset, is powered off, or deactivates after a predetermined amount of time. The first step in the loop preferably includes the determination Step 308 whether any input representing verification data (VD) is received by the device. If the determination in Step 308 is positive, the current verification status (VS) of the device is identified Step 314 by comparing the verification data (VD) with the data prestored (PD) in memory of the device. The verification status identified then is recorded by assigning Step 316 a value to the identification marker stored within the memory of the device equal to the predefined value corresponding to the identified verification status.

If no input representing verification data is received in Step 308 or after the value of the identification marker has been assigned in Step 316, a determination is then made of whether a signal (S) has been or is being received by the device. If a signal is not received, then the loop restarts Step 306. When a signal is received, the determination in Step 310 is positive and the indicator of the current verification status of the device is output Step 318. As set forth above, the indicator comprises the value of the identification marker maintained in memory within the device. Following the output of the indicator, the determination is made Step 320 whether the indicator output is the first indicator output since receipt of input representing verification data. The loop restarts Step 306 if the determination in Step 320 is negative. If the determination in Step 320 is positive, then the verification status is newly recorded by assigning Step 322 a value to the identification marker that further represents the fact that an indicator has been output since input representing verification data was received in Step 308. The loop then restarts Step 306.

2. Second Preferred Embodiment (Digital Signature for Indicator)

Figure 4A:
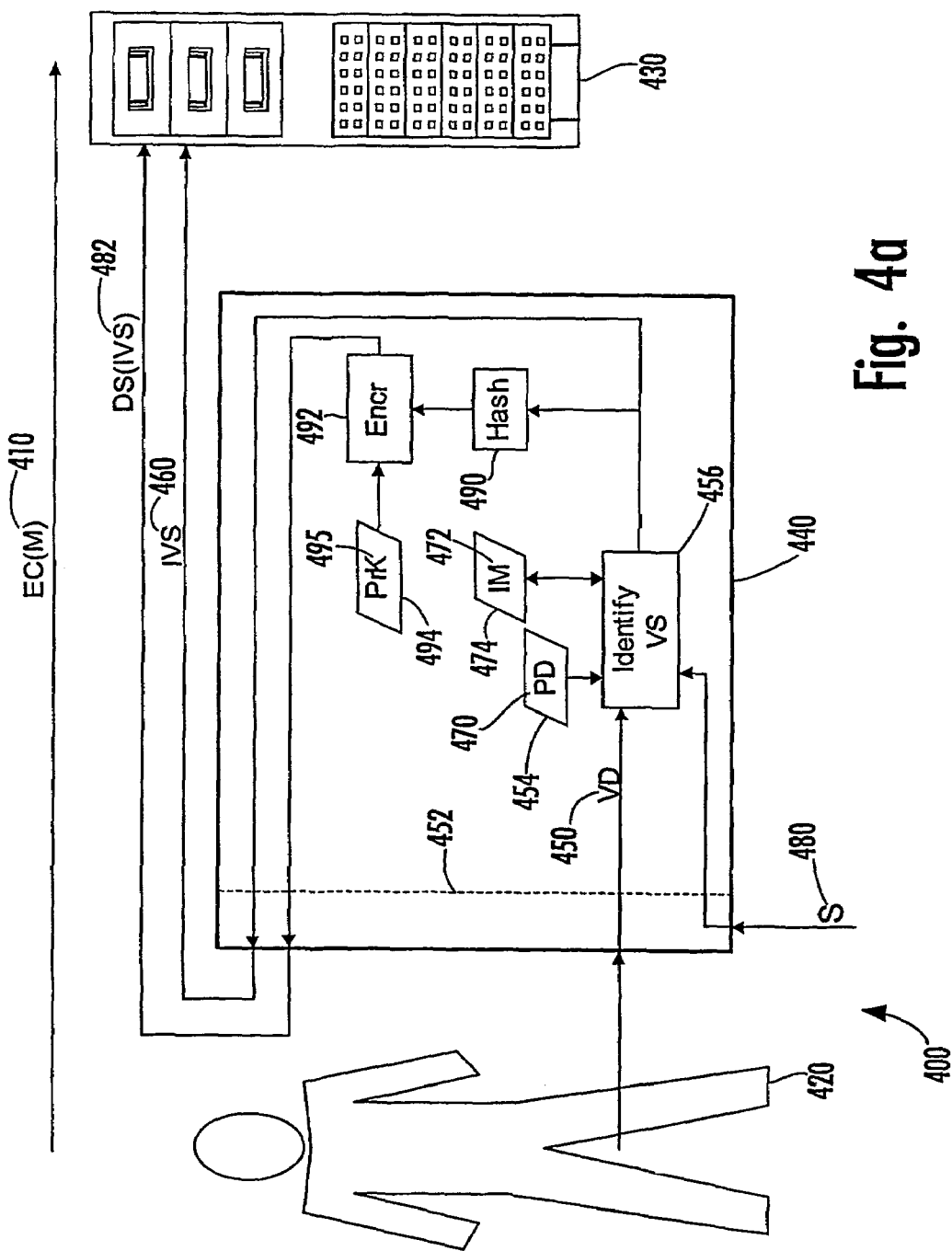
FIG. 4a illustrates a second preferred embodiment of the present invention.

A second preferred embodiment 400 of the present invention is illustrated in FIG. 4a, wherein an EC 410 including a message from a sender 420 is received by a recipient represented by an electronic apparatus 430, and wherein a device 440 receives input representing verification data (VD) 450 at a device interface 452. The device 440 includes a verification component therein that maintains data (PD) 470 of the sender 420 prestored in memory 454 of the device 440. The verification data 450 and prestored data 470 represent Secret or biometric values.

The verification component identifies at 456 a current verification status of the device 440 based on a comparison of the verification data 450 with the prestored data 470. Upon receipt of a signal (S) 480, the last identified (i.e., "current") verification status of the device 440 is communicated to the recipient by outputting from the device 440 an indicator 460 that then is transmitted to the recipient in association with the EC 410. Also upon receipt of the signal 480, a digital signature component of the device 440 originates a digital signature (DS) 482 for the indicator 460 by calculating a hash value for the indicator at 490 and then encrypting the hash value at 492 using a private key 495 of a public-private key pair. The digital signature 482 then is output from the device 440 and transmitted to the recipient with the indicator 460. For increased reliability and trust, the private key 495 is retained securely within memory 494 so that it is never exported from the device 440 and is not discoverable from outside of the device 440.

In this preferred embodiment, the digital signature is originated in accordance with an elliptical curve digital signature algorithm (ECDSA) as specified in *Federal Information Processing Standards Publication* 186-2, *Digital Signature Standard,* US DOC/NBS, Jan. 11, 1994 (hereinafter "FIPS PUB 186-2"), which is incorporated herein by reference and which is available for download at http://csrc.nist.gov/publications/fips. Accordingly, the digital signature 482 is generated using a random number generator, and the hash function at 490 is performed using the secure hash algorithm ("SHA-1"), which generates a 20-byte output regardless of the size of the input received from component 456. The SHA-1 itself is specified in *Federal Information Processing Standards Publication* 180-1, *Secure Hash Standard,* US DOC/NBS, Apr. 17, 1995 (hereinafter "FIPS PUB 180-1"), which is incorporated herein by reference and which is available for download at http://csrc.nist.gov/publications/fips.

The signal 480 is sent to the device 440, which triggers the device 440 to output the indicator 460. The signal 480 represents, for example, a request or command for the provision of the verification status to the recipient and is generated by the sender 420, by the electronic apparatus 430, or by another apparatus (not shown). The device interface 452 includes, as appropriate, one or more of the following: a user interface such as an alphanumeric keypad, a touch screen display, or a biometric scanner for receiving input directly from the sender 420; an electrical contact; a standard electronic interface with a computer bus; an antenna; or a communications port, such as a serial port, USB port, parallel port, infrared port or other wireless communications port.

The device 440 also includes a set of predefined verification statuses each representing a relational correspondence between the verification data 450 and the prestored data 470. Verification statuses of the set further represent whether an indicator 460 has been output from the device since the last successful verification or since the last receipt of input representing verification data. The set also contains one additional predefined verification status representing the lack of input representing verification data 450 since a resetting after a timeout or a powering on of the device 440. The indicator 460 output from the device 440 is based on the last comparison of the verification data 450 with the prestored data 470, but only if input representing verification data 450 has been received since the resetting of the device 440. Otherwise, the indicator 460 indicates the lack of input representing verification data 450 since the resetting of the device 440. In either case, the indicator 460 is transmitted with the digital signature 482 therefor in association with the EC 410, whereby the recipient is able to identify the indicator 460 as relating to the EC 410.

The electronic apparatus 430 includes an interface (not shown) capable of receiving the indicator 460 and digital signature 482 from device 440. The electronic apparatus 430 also includes logic circuitry or software incorporating business logic therein for determining the verification status of the device based on the indicator 460 and for evaluating the EC 410 received from the sender 420 based on the verification status of the device 440. The electronic apparatus 430 also decrypts the digital signature 482 to confirm the authenticity of the indicator 460 (i.e., the electronic apparatus 430 conducts Message Authentication with respect to the indicator 460). The decryption is performed using the public key, which corresponds to the private key 495 and which may be received in association with the digital signature 482 or otherwise known or obtained beforehand by the recipient.

When the verification data 450 and the prestored data 470 comprise a Secret, the predefined set of verification statuses includes at least four verification statuses, comprising: a first verification status representing the lack of verification data 450 since a resetting of the device; a second verification status representing a match between the verification data 450 and the prestored data 470, and further representing no other indicator 460 being output from the device 440 since the match; a third verification status representing a failed match between the verification data 450 and the prestored data 470; and a fourth verification status representing a match between the verification data 450 and the prestored data 470, and further representing that an indicator 460 has been output since the match. The device 440 preferably includes an identification marker ("IM") 472 stored in memory 474 and comprising one of four binary numbers that represents the current verification status identified by the device 440. The four binary numbers respectively correspond to the four verification statuses and include: "00" identifying the first verification status; "01" identifying the second verification status; "10" identifying the third verification status; and "11" identifying the fourth verification status. Furthermore, the indicator 460 output from the device 440 preferably includes the value of the identification marker 472, with the correspondence of the value with the predefined verification statuses of the device 440 being previously known by the recipient. None of the verification statuses actually reveal the verification data 450 or the prestored data 470; thus, no "shared secret" is required between the sender 420 and the recipient. However, the recipient can infer correct knowledge of the Secret from the verification status.

Alternatively, when the verification data 450 and the prestored data 470 comprise biometric values, the set of predefined verification statuses comprises the possible percentages of match—or degrees of difference—between the verification data 450 and prestored data 470, together with a verification status representing the lack of input representing verification data 450 since a resetting of the device 440. For example, the predefined verification statuses comprising the percentage match of the verification data 450 with the prestored data 470 may comprise the set of percentages ranging from 0% to 100% in increments of 1%. Each one of the verification statuses representing a percentage match also further represents whether an indicator 460 has been output from the device 440 since the last receipt of input representing verification data 450. The device 440 preferably includes the identification marker 472 for storing a value representing the verification status identified by the device 440 as the current verification status. Furthermore, the indicator 460 output from the device 440 preferably comprises the value of the identification marker 472, and the correspondence of such value with the predefined verification statuses of the device is previously known by the recipient. Again, none of the verification statuses actually reveal either of the verification data 450 or the prestored data 470; thus, no biometric value representing the sender's irreplaceable biometric characteristic is communicated to the recipient. However, the recipient can infer from the verification status the presence of the sender 420 from the reading of the biometric characteristic.

Figure 4B:
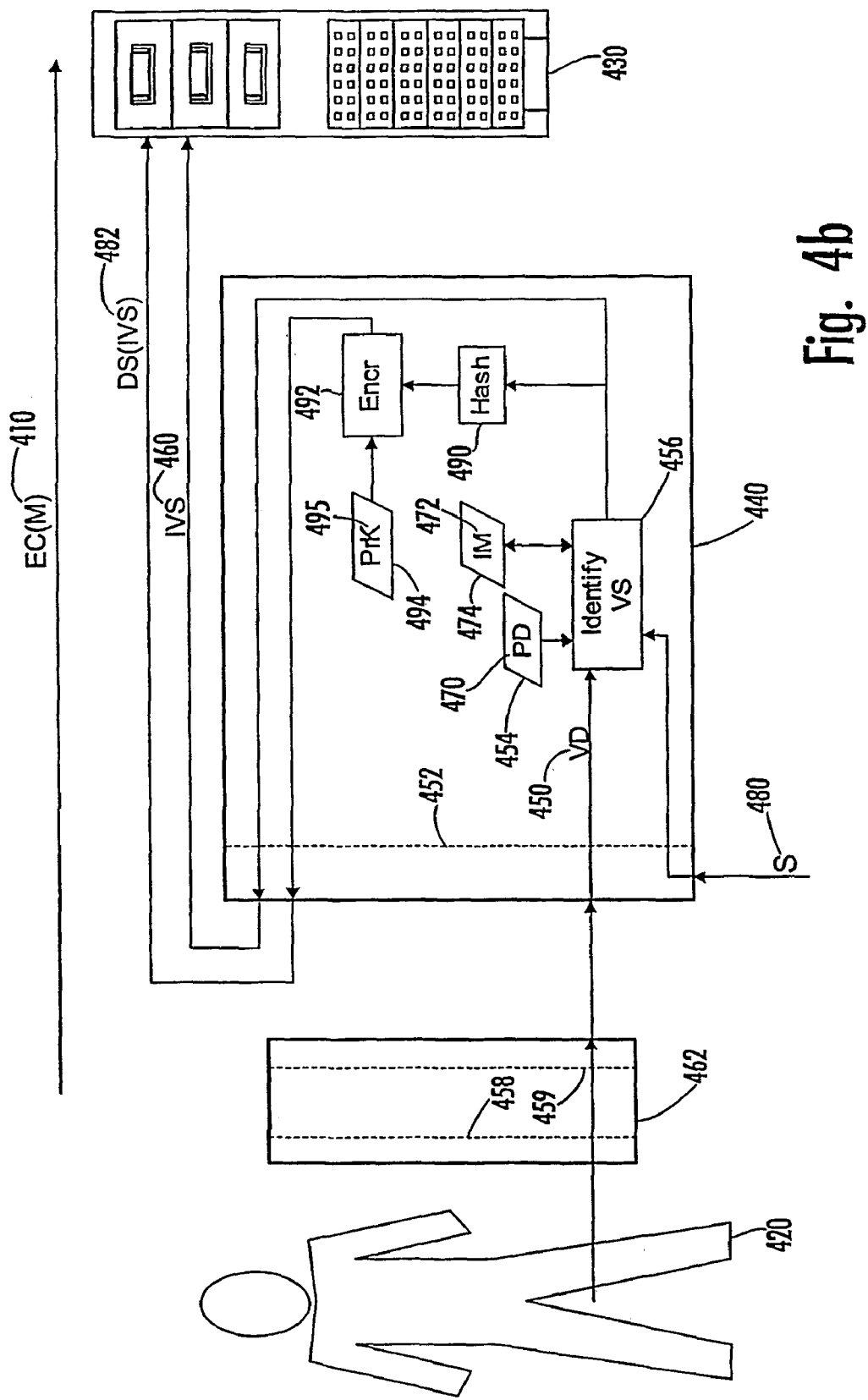
Figure 4C:
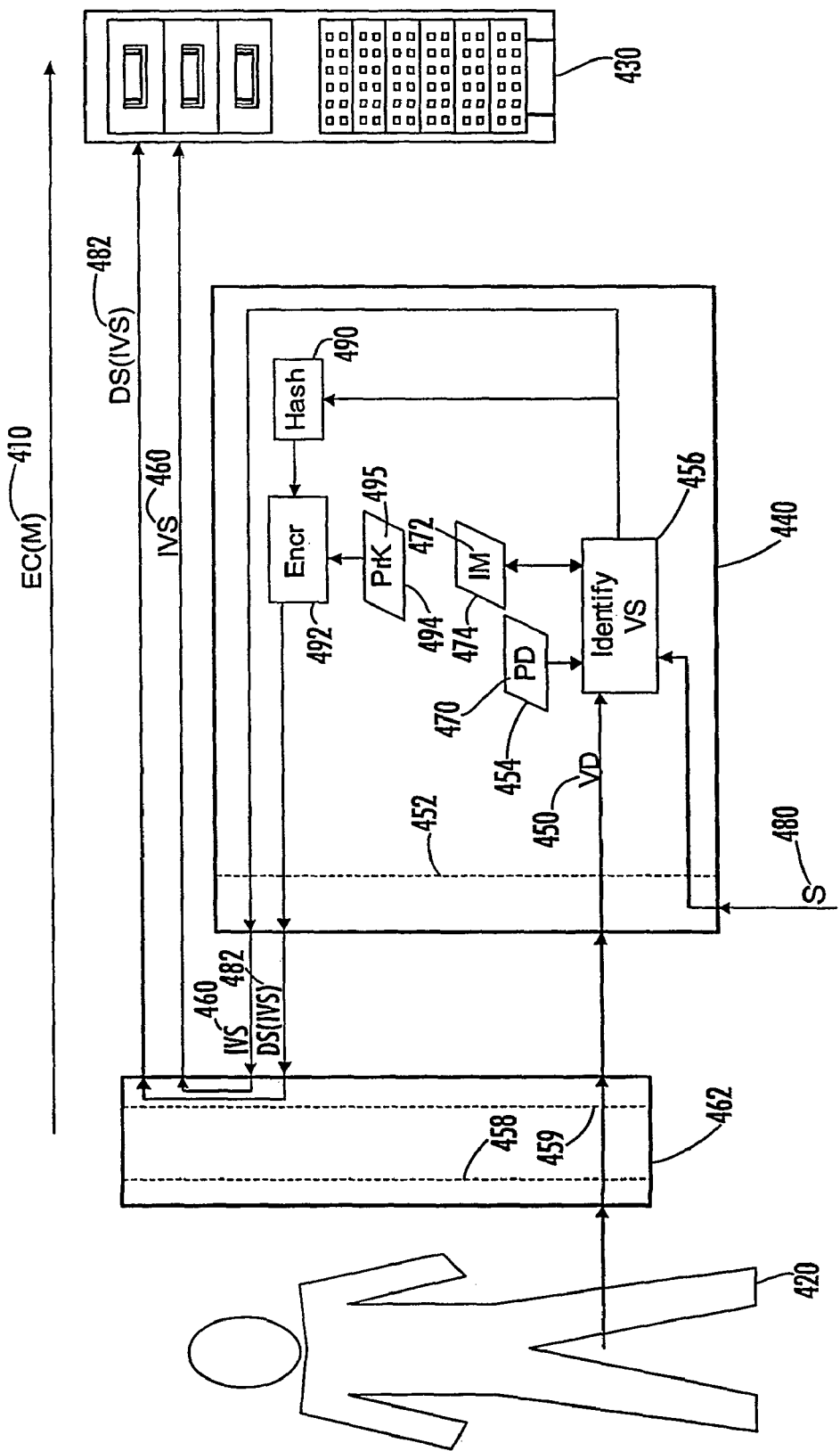

A variation based on the second preferred embodiment 400 of FIG. 4a is shown in FIG. 4b, and includes an I/O support element 462 from which the input representing the verification data 450 is received at the device interface 452. The I/O support element 462 includes a user interface 458 from which input from the sender 420 is received and an I/O interface 459 that communicates the input representing the verification data 450 to the device 440. Yet an additional variation thereof is shown in FIG. 4c, wherein the I/O support element 462 receives the indicator 460 and digital signature 482 therefor output from the device 440. The I/O support element 462, in turn, transmits the indicator 460 and digital signature 482 to the external electronic apparatus 430.

As shown, the indicator 460 transmitted from the I/O support element 462 is the same as the indicator 460 output from the device 440. However, the indicator transmitted from the I/O support element 462 may be different from the indicator output from the device 440, so long as the recipient is able to determine both the verification status as indicated by the indicator 460 output from the device 440, and the bit pattern of the indicator 460 for which the digital signature was originated by the device 440. For instance, the indicator transmitted from the I/O support element 462 may indicate not only the verification status of the device 440, but also a verification status of the I/O support element 462 when the I/O support element 462 itself identifies a verification status. Furthermore, the indicator 460 transmitted from the I/O support element 462 may be packaged or embedded within another communication—including additional information that is digitally signed by the I/O support element 462.

Furthermore, in FIGS. 4a, 4b, and 4c, the EC 410 is shown as being transmitted separate from the indicator 460 and digital signature 482. However, in the preferred embodiment of FIG. 4a and any variations thereof, the indicator 460 and digital signature 482 equally may be associated with the EC 410 by being transmitted as part of the EC 410. Furthermore, the EC 410 may be output from the device 440, an associated I/O support element 462 (not shown in FIG. 4a), or other apparatus.

A preferred mode 500 of operation of the device of FIGS. 4a, 4b, and 4c is illustrated in FIG. 5 and begins with a resetting Step 504 of the device following a timeout or powering on of the device at 502. During the reset, the identification marker is assigned a value corresponding to a verification status representing the receipt of no input representing verification data and further representing the fact that that no indicator has yet been output. The device then enters a repeating loop that begins at 506 and ends at 512 and continues within this loop until the device is reset, is powered off, or deactivates after a predetermined amount of time. The first step in the loop preferably includes the determination Step 508 whether any input representing verification data (VD) is received by the device. If the determination in Step 508 is positive, the current verification status (VS) of the device is identified Step 514 by comparing the verification data (VD) with the data prestored (PD) in memory of the device. The verification status identified then is recorded by assigning Step 516 a value to the identification marker stored within the memory of the device equal to the predefined value corresponding to the identified verification status.

If no input representing verification data is received in Step 508 or after the value of the identification marker has been assigned in Step 516, a determination is then made of whether a signal (S) has been or is being received by the device. If a signal is not received, then the loop restarts Step 506. When a signal is received, the determination in Step 510 is positive and a digital signature is originated Step 518 for the indicator of the current verification status. The indicator and the digital signature therefor then are output Step 520. As set forth above, the indicator comprises the value of the identification marker maintained in memory within the device. Following the output of the indicator and digital signature, the determination is made Step 522 whether the indicator output is the first indicator output since receipt of input representing verification data. The loop restarts Step 506 if the determination in Step 522 is negative. If the determination in Step 522 is positive, then the verification status is newly recorded by assigning Step 524 a value to the identification marker that further represents the fact that an indicator has been output since input representing verification data was received in Step 508. The loop then restarts Step 506.

3. Third Preferred Embodiment (Digital Signature for Message)

Figure 6A:
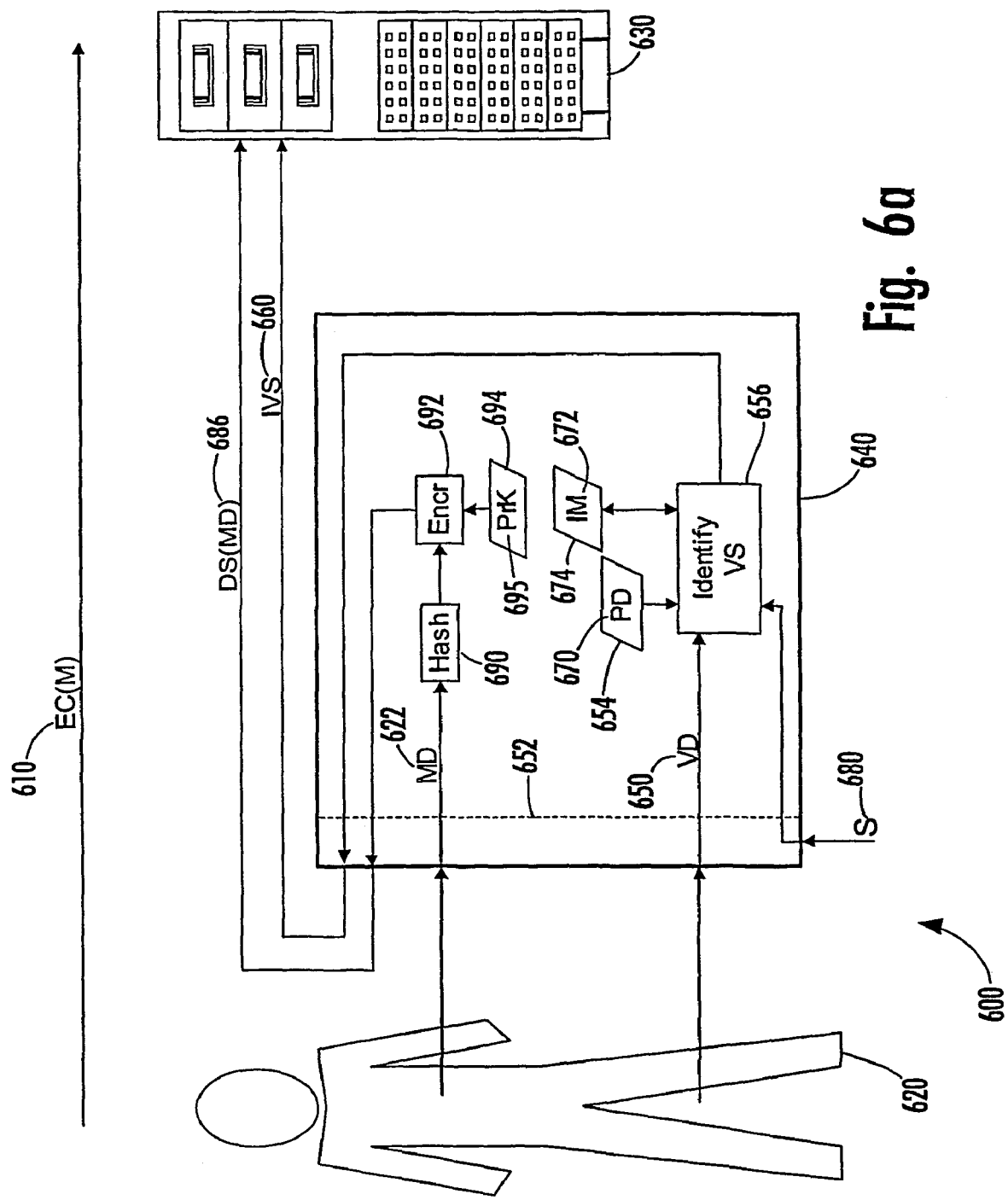
FIG. 6a illustrates a third preferred embodiment of the present invention.

A third preferred embodiment 600 of the present invention is illustrated in FIG. 6a, wherein an EC 610 including a message from a sender 620 is received by a recipient represented by an electronic apparatus 630, and wherein a device 640 receives input representing verification data (VD) 650 at a device interface 652. The device 640 includes a verification component therein that maintains data (PD) 670 of the sender 620 prestored in memory 654 of the device 640. The verification data 650 and prestored data 670 represent Secret or biometric values.

The verification component identifies at 656 a current verification status of the device 640 based on a comparison of the verification data 650 with the prestored data 670. Upon receipt of a signal (S) 680, the last identified (i.e., "current") verification status of the device 640 is communicated to the recipient by outputting from the device 640 an indicator 660 that then is transmitted to the recipient in association with the EC 610. The signal 680 is sent to the device 640, which triggers the device 640 to output the indicator 660. The signal 680 represents, for example, a request or command for the provision of the verification status to the recipient and is generated by the sender 620, by the electronic apparatus 630, or by another apparatus (not shown). The device interface 652 includes, as appropriate, one or more of the following: a user interface such as an alphanumeric keypad, a touch screen display, or a biometric scanner for receiving input directly from the sender 620; an electrical contact; a standard electronic interface with a computer bus; an antenna; or a communications port, such as a serial port, USB port, parallel port, infrared port or other wireless communications port.

The device 640 receives at the device interface 652 data (MD) 622 representing the message of the EC 610. The message data may comprise the message itself, a message digest thereof, or the result of some other processing of the message (M). The device 640 includes a digital signature component that, upon receipt of the message data 622, originates a digital signature (DS) 686 for the message data 622. The digital signature 686 is originated by calculating a hash value for the message data 622 at 690 and then encrypting the hash value at 692 using a private key 695 of a public-private key pair. For increased reliability and trust, the private key 695 is retained securely within memory 694 so that it is never exported from the device 640 and is not discoverable from outside of the device 640. The digital signature is originated in accordance with the ECDSA as specified in FIPS PUB 186-2. Accordingly, the digital signature 682 is generated using a random number generator, and the hash function at 690 is performed using SHA-1, which generates a 20-byte output regardless of the size of the input received. The digital signature 686 then is output from the device 640 and transmitted to the recipient with the indicator 660.

In alternative preferred embodiments, if the message data 622 has already been hashed before it is received by the device 640, then the hash function is omitted. In such alternative embodiments, the device 640 is configured not to hash any message data 622 or not to hash message data 622 if a specific instruction, signal, or command is received.

The device 640 also includes a set of predefined verification statuses each representing a relational correspondence between the verification data 650 and the prestored data 670. Verification statuses of the set further represent whether an indicator 660 has been output from the device 640 since the last successful verification or since the last receipt of input representing verification data. The set also contains one additional predefined verification status representing the lack of input representing verification data 650 since a resetting after a timeout or a powering on of the device 640. The indicator 660 output from the device 640 is based on the last comparison of the verification data 650 with the prestored data 670, but only if input representing verification data 650 has been received since the resetting of the device 640. Otherwise, the indicator 660 indicates the lack of input representing verification data 650 since the resetting of the device 640.

In either case, the indicator 660 is transmitted with the digital signature 686 in association with the EC 610, whereby the recipient is able to identify the indicator 660 and digital signature 686 as relating to the EC 610. The electronic apparatus 630 includes an interface (not shown) capable of receiving the indicator 660 and digital signature 686 from the device 640. The electronic apparatus 630 also includes logic circuitry or software incorporating business logic therein for determining the verification status of the device based on the indicator, and for evaluating the EC 610 received from the sender 620 based on the determined verification status. The electronic apparatus 630 also decrypts the digital signature 686 to confirm the authenticity of the message of the EC 610. The decryption is performed with the public key, which corresponds with the private key 695 and which may be received in association with the digital signature 686 or known or obtained beforehand by the recipient. Of course, in calculating a hash value for comparison, the electronic apparatus 630 performs any necessary processing to the message in order to produce the message data for which the digital signature was originated.

When the verification data 650 and the prestored data 670 comprise a Secret, the predefined set of verification statuses includes at least four verification statuses, comprising: a first verification status representing the lack of verification data 650 since a resetting of the device; a second verification status representing a match between the verification data 650 and the prestored data 670, and further representing no other indicator 660 being output from the device 640 since the match; a third verification status representing a failed match between the verification data 650 and the prestored data 670; and a fourth verification status representing a match between the verification data 650 and the prestored data 670, and further representing that an indicator 660 has been output since the match. The device 640 preferably includes an identification marker ("IM") 672 stored in memory 674 and comprising one of four binary numbers that represents the current verification status identified by the device 640. The four binary numbers respectively correspond to the four verification statuses and include: "00" identifying the first verification status; "01" identifying the second verification status; "10" identifying the third verification status; and "11" identifying the fourth verification status. Furthermore, the indicator 660 output from the device 640 preferably includes the value of the identification marker 672, with the correspondence of the value with the predefined verification statuses of the device being previously known by the recipient. None of the verification statuses actually reveal the verification data 650 or the prestored data 670; thus, no "shared secret" is required between the sender 620 and the recipient. However, the recipient can infer correct knowledge of the Secret from the verification status.

Alternatively, when the verification data 650 and the prestored data 670 comprise biometric values, the set of predefined verification statuses comprises the possible percentages of match—or degrees of difference—between the verification data 650 and prestored data 670, together with a verification status representing the lack of input representing verification data 650 since a resetting of the device 640. For example, the predefined verification statuses comprising the percentage match of the verification data 650 with the prestored data 670 may comprise the set of percentages ranging from 0% to 100% in increments of 1%. Preferably each one of the verification statuses representing a percentage match also further represents whether an indicator 660 has been output from the device 640 since the last receipt of input representing verification data 650. The device 640 preferably includes the identification marker 672 for storing a value representing the verification status identified by the device 640 as the current verification status. Furthermore, the indicator 660 output from the device 640 preferably comprises the value of the identification marker 672, with the correspondence of such value with the predefined verification statuses of the device being previously known by the recipient. Again, none of the verification statuses actually reveal either of the verification data 650 or the prestored data 670; thus, no biometric value representing the sender's irreplaceable biometric characteristic is communicated to the recipient. However, the recipient can infer from the verification status the presence of the sender from the reading of the biometric characteristic.

Figure 6B:
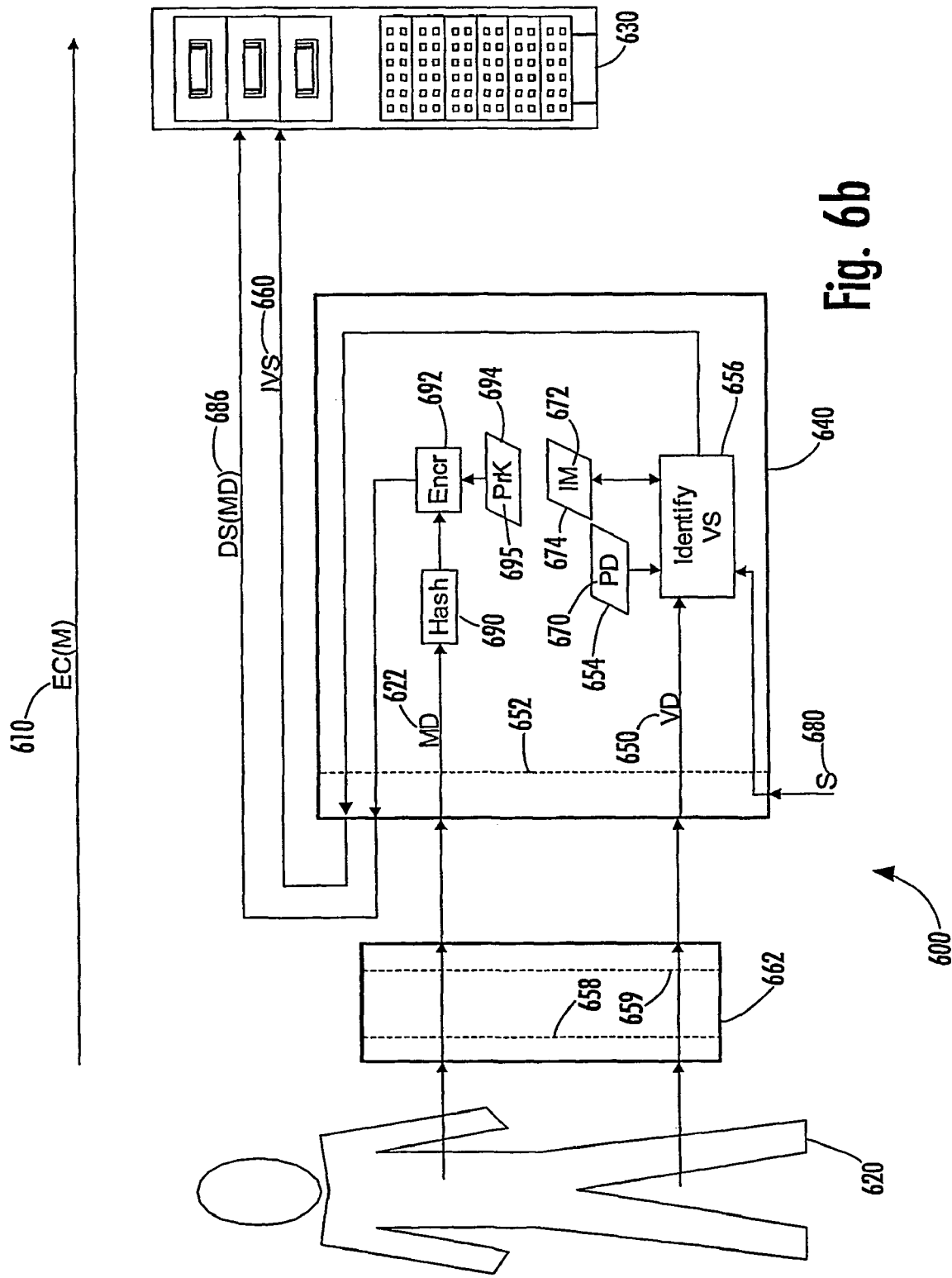
Figure 6C:
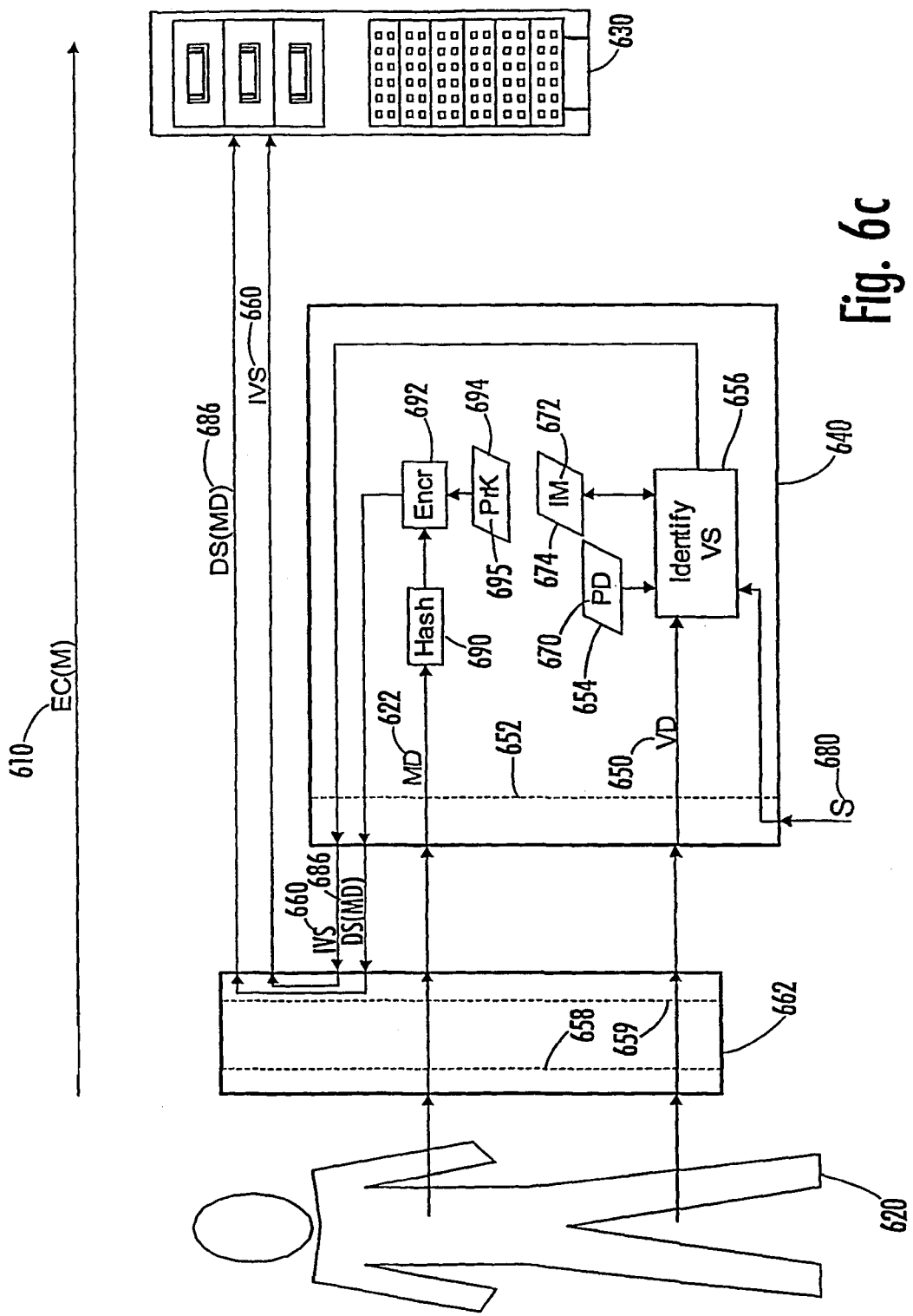

A variation based on the third preferred embodiment 600 of FIG. 6a is shown in FIG. 6b, and includes an I/O support element 662 from which input representing the verification data 650 and input representing the message data 622 are received by the device 640. The I/O support element 662 includes a user interface 658 from which input from the sender 620 is received and an I/O interface 659 that communicates the input representing the verification data 650 and input representing the message data 622 to the device 640. Although the message data 622 is shown coming from the I/O support element 662, it is possible for some or all of the message data 622 to be composed within the device 640 or another apparatus (not shown). Yet an additional variation thereof is shown in FIG. 6c, wherein the I/O support element 662 receives the indicator 660 and digital signature 686 output from the device 640. The I/O support element 662, in turn, transmits the indicator 660 and the digital signature 686 to the electronic apparatus 630.

As shown, the indicator 660 and digital signature 686 transmitted from the I/O support element 662 are the same as the indicator 660 and digital signature 686 output from the device 640. However, the indicator transmitted from the I/O support element 662 may be different from the indicator output from the device 640, so long as the recipient is able to determine the verification status as indicated by the indicator 660 output from the device 640. For instance, the indicator transmitted from the I/O support element 662 may indicate not only the verification status of the device 640, but also a verification status of the I/O support element 662 when the I/O support element 662 itself identifies a verification status. Furthermore, the indicator 660 and digital signature 686 transmitted from the I/O support element 662 may be packaged or embedded within another communication—including additional information that is digitally signed by the I/O support element 662.

Furthermore, in FIGS. 6a, 6b, and 6c, the EC 610 is shown as being transmitted separate from the indicator 660 and digital signature 686. However, in the preferred embodiment of FIG. 6a and any variations thereof, the indicator 660 and digital signature 686 equally may be associated with the EC 610 by being transmitted as part of the EC 610. Furthermore, the EC 610 may be output from the device 640, an associated I/O support element 662 (not shown in FIG. 6a), or other apparatus.

A preferred mode 700 of operation of the device of FIGS. 6a, 6b, and 6c is illustrated in FIG. 7 and begins with a resetting Step 704 of the device following a timeout or powering on of the device at 702. During the reset, the identification marker is assigned a value corresponding to a verification status representing the receipt of no input representing verification data and further representing the fact that that no indicator has yet been output. The device then enters a repeating loop that begins at 706 and ends at 714 and continues within this loop until the device is reset, is powered off, or deactivates after a predetermined amount of time. The first step in the loop preferably includes the determination Step 708 whether any input representing verification data (VD) is received by the device. If the determination in Step 708 is positive, the current verification status (VS) of the device is identified Step 716 by comparing the verification data (VD) with the data prestored (PD) in memory of the device. The verification status identified then is recorded by assigning Step 718 a value to the identification marker stored within the memory of the device equal to the predefined value corresponding to the identified verification status.

If no input representing verification data is received in Step 708 or after the value of the identification marker is recorded in Step 718, the next step in the loop preferably includes the determination Step 710 whether any input representing message data (MD) is received by the device. If the determination in Step 710 is positive, the device originates Step 720 a digital signature for the message data. The digital signature for the message data is then output Step 722 from the device.

If no input representing message data is received in Step 710 or after the digital signature for the message data is output in Step 722, a determination is then made of whether a signal (S) has been or is being received by the device. If a signal is not received, then the loop restarts Step 706. When a signal is received, the determination in Step 712 is positive and the indicator of the current verification status of the device is output Step 724. As set forth above, the indicator comprises the value of the identification marker maintained in memory within the device. Following the output of the indicator, the determination is made Step 726 whether the indicator output is the first indicator output since receipt of input representing verification data. The loop restarts Step 706 if the determination in Step 726 is negative. If the determination in Step 726 is positive, then the verification status is newly recorded by assigning Step 728 a value to the identification marker that further represents the fact that an indicator has been output since input representing verification data was received in Step 708. The loop then restarts Step 706.

4. Fourth Preferred Embodiment (Digital Signature for Prestored Message)

Figure 8A:
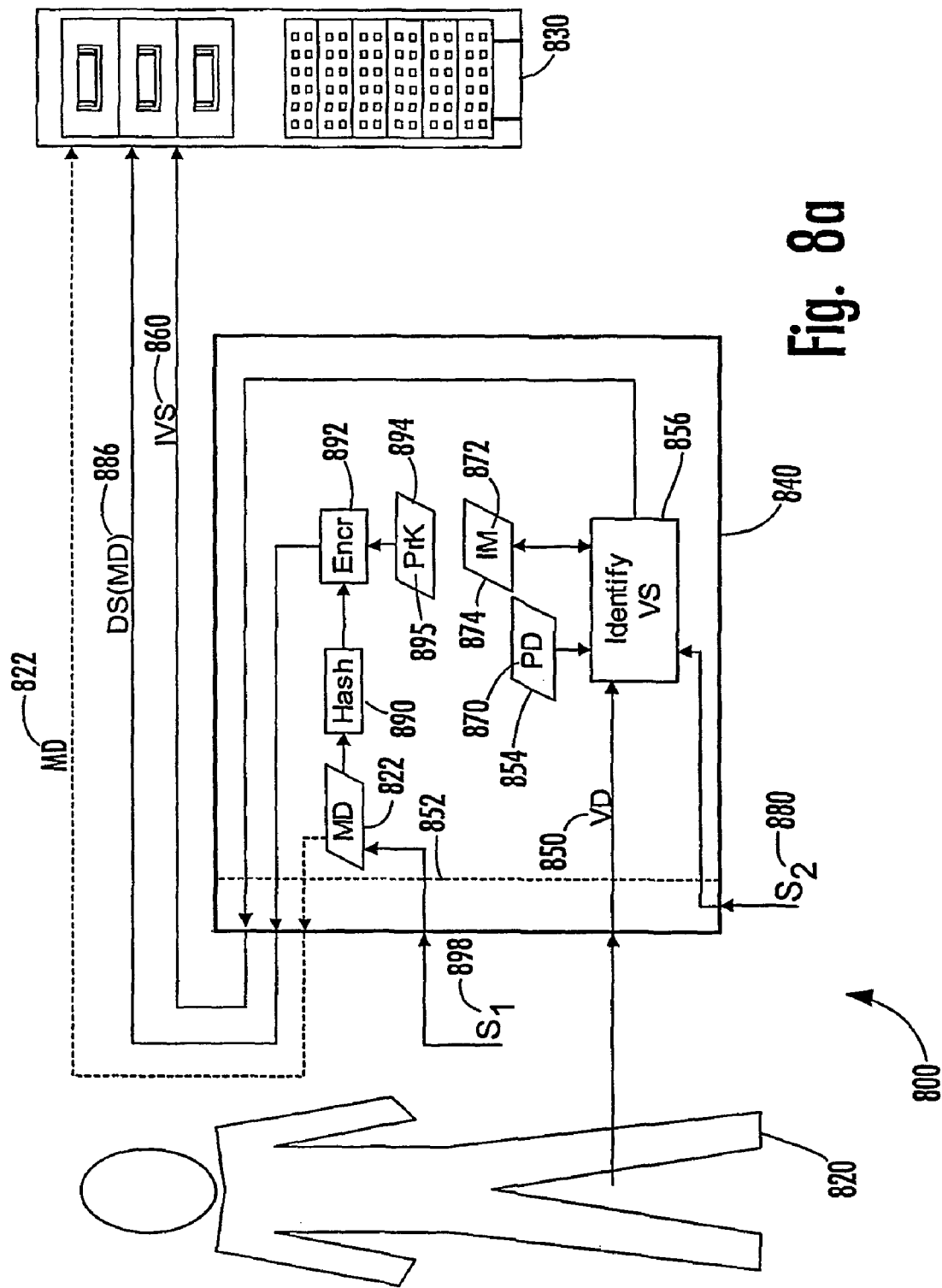
FIG. 8a illustrates a fourth preferred embodiment of the present invention.

A fourth preferred embodiment 800 of the present invention is illustrated in FIG. 8a, wherein a device 840 includes message data (MD) 822 representing a predefined message that is maintained in memory, of the device 840. Furthermore, it is preferred that the content of the predefined message be known in advance by the recipient, whereby the message is implicitly received by the recipient in the act of receiving a digital signature 886 for the message data 822. However, in the event that the recipient does not have knowledge of the predefined message, the device 840 preferably includes the option of exporting the message data 822 for communication to the recipient as shown by the dotted line in FIG. 8a.

The device 840 includes a digital signature component that, upon receipt of a signal ($S_1$) 898 at the device interface 852, originates the digital signature 886 for the message data 822 by calculating a hash value therefor at 890 and then encrypting the hash value at 892 using a private key 895 of a public-private key pair, and then outputs the digital signature 886 for transmitting to the recipient. For increased reliability and trust, the private key 895 is retained securely within memory 894 so that it is never exported from the device 840 and is not discoverable from outside of the device 840. The digital signature is originated in accordance with the ECDSA as specified in FIPS PUB 186-2. Accordingly, the digital signature 882 is generated using a random number generator, and the hash function at 890 is performed using SHA-1, which generates a 20-byte output regardless of the size of the input received.

The signal 898 represents, for example, a request or command generated by the sender 820 for the communication of the digital signature 886 to the recipient or, alternatively, the signal 898 may simply comprise the receipt from the sender 820 of input representing verification data 850 by the device 840. In this regard, the device 840 receives input representing verification data (VD) 850 at a device interface 852. The device 840 includes a verification component therein that maintains data (PD) 870 of the sender 820 prestored in memory 854 of the device 840. The verification data 850 and prestored data 870 represent Secret or biometric values. The verification component of the device 840 identifies at 856 a current verification status of the device 840 based on a comparison of the verification data 850 with the prestored data 870.

Upon receipt of a signal ($S_2$) 880, the last identified (i.e., "current") verification status of the device 840 is communicated to the recipient by outputting from the device 840 an indicator (IVS) 860 that then is transmitted to the recipient in association with the digital signature 886. The signal 880 is sent to the device 840, which triggers the device 840 to output the indicator 860. The signal 880 represents, for example, a request or command for the provision of the verification status to the recipient and is generated by the sender 820, by the electronic apparatus 830, or by another apparatus (not shown). Alternatively, the signal 880 may comprise the receipt of the input representing the verification data 850 itself; thus, it is possible for signal $(S_1)$ 898 and signal $(S_2)$ 880 to be the same signal.

The device interface 852 includes, as appropriate, one or more of the following: a user interface such as an alphanumeric keypad, a touch screen display, or a biometric scanner for receiving input directly from the sender 820; an electrical contact; a standard electronic interface with a computer bus; an antenna; or a communications port, such as a serial port, USB port, parallel port, infrared port or other wireless communications port.

The device 840 includes a set of predefined verification statuses each representing a relational correspondence between the verification data 850 and the prestored data 870. Verification statuses of the set further represent whether an indicator 860 has been output from the device 840 since the last successful verification or since the last receipt of input representing verification data 850. The set also contains one additional predefined verification status representing the lack of input representing verification data 850 since a resetting after a timeout or a powering on of the device 840. The indicator 860 output from the device 840 is based on the last comparison of the verification data 850 with the prestored data 870, but only if input representing verification data 850 has been received since the resetting of the device 840. Otherwise, the indicator 860 indicates the lack of input representing verification data 850 since the resetting of the device 840.

In either case, the indicator 860 is transmitted with the digital signature 886, whereby the recipient is able to identify the indicator 860 as relating to the digital signature 686. The electronic apparatus 830 includes an interface (not shown) capable of receiving the indicator 860 and digital signature 886. The electronic apparatus 830 also includes logic circuitry or software incorporating business logic therein for determining the verification status of the device 840 based on the indicator 860, and for evaluating the implicit (or explicit) message received from the sender 820 based on the determined verification status. The electronic apparatus 830 also decrypts the digital signature 886 to confirm the authenticity of the message. The decryption is performed with the public key, which corresponds with the private key 895 and which may be received in association with the digital signature 886 or known or obtained beforehand by the recipient.

When the verification data 850 and the prestored data 870 comprise a Secret, the predefined set of verification statuses includes at least four verification statuses, comprising: a first verification status representing the lack of verification data 850 since a resetting of the device; a second verification status representing a match between the verification data 850 and the prestored data 870, and further representing no other indicator 860 being output from the device 840 since the match; a third verification status representing a failed match between the verification data 850 and the prestored data 870; and a fourth verification status representing a match between the verification data 850 and the prestored data 870, and further representing the output of an indicator 860 since the match. The device 840 preferably includes an identification marker ("IM") 872 stored in memory 874 and comprising one of four binary numbers that represents the current verification status identified by the device 840. The four binary numbers respectively correspond to the four verification statuses and include: "00" identifying the first verification status; "01" identifying the second verification status; "10" identifying the third verification status; and "11" identifying the fourth verification status. Furthermore, the indicator 860 output from the device 840 preferably includes the value of the identification marker 872, with the correspondence of the value with the predefined verification statuses of the device being previously known by the recipient. None of the verification statuses actually reveal the verification data 850 or the prestored data 870; thus there is no "shared secret" between the sender 820 and the recipient. However, the recipient can infer correct knowledge of the Secret from the verification status.

Alternatively, when the verification data 850 and the prestored data 870 comprise biometric values, the set of predefined verification statuses comprises the possible percentages of match—or degrees of difference—between the verification data 850 and prestored data 870, together with a verification status representing the lack of input representing verification data 850 since a resetting of the device 840. For example, the predefined verification statuses comprising the percentage match of the verification data 850 with the prestored data 870 may comprise the set of percentages ranging from 0% to 100% in increments of 1%. Preferably each one of the verification statuses representing a percentage match also further represents whether an indicator 860 has been output from the device 840 since the last receipt of input representing verification data 850. The device 840 preferably includes the identification marker 872 for storing a value representing the verification status identified by the device 840 as the current verification status. Furthermore, the indicator 860 output from the device 840 preferably comprises the value of the identification marker 872, and the correspondence of such value with the predefined verification statuses of the device is previously known by the recipient. Again, none of the verification statuses actually reveal either of the verification data 850 or the prestored data 870; thus, no biometric value representing the sender's irreplaceable biometric characteristic is communicated to the recipient. However, the recipient can infer from the verification status the presence of the sender from the reading of the biometric characteristic.

Figure 8B:
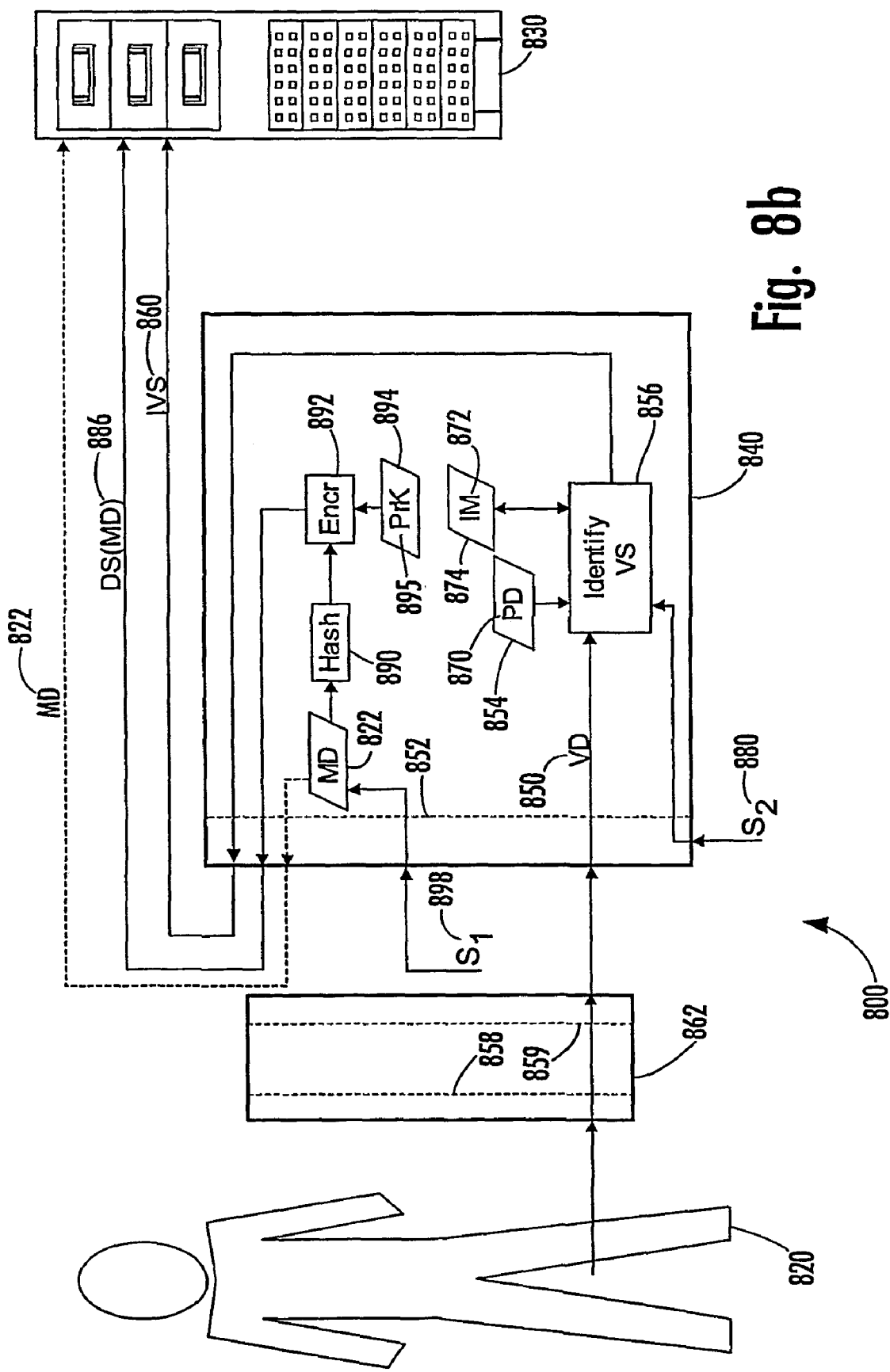
Figure 8C:
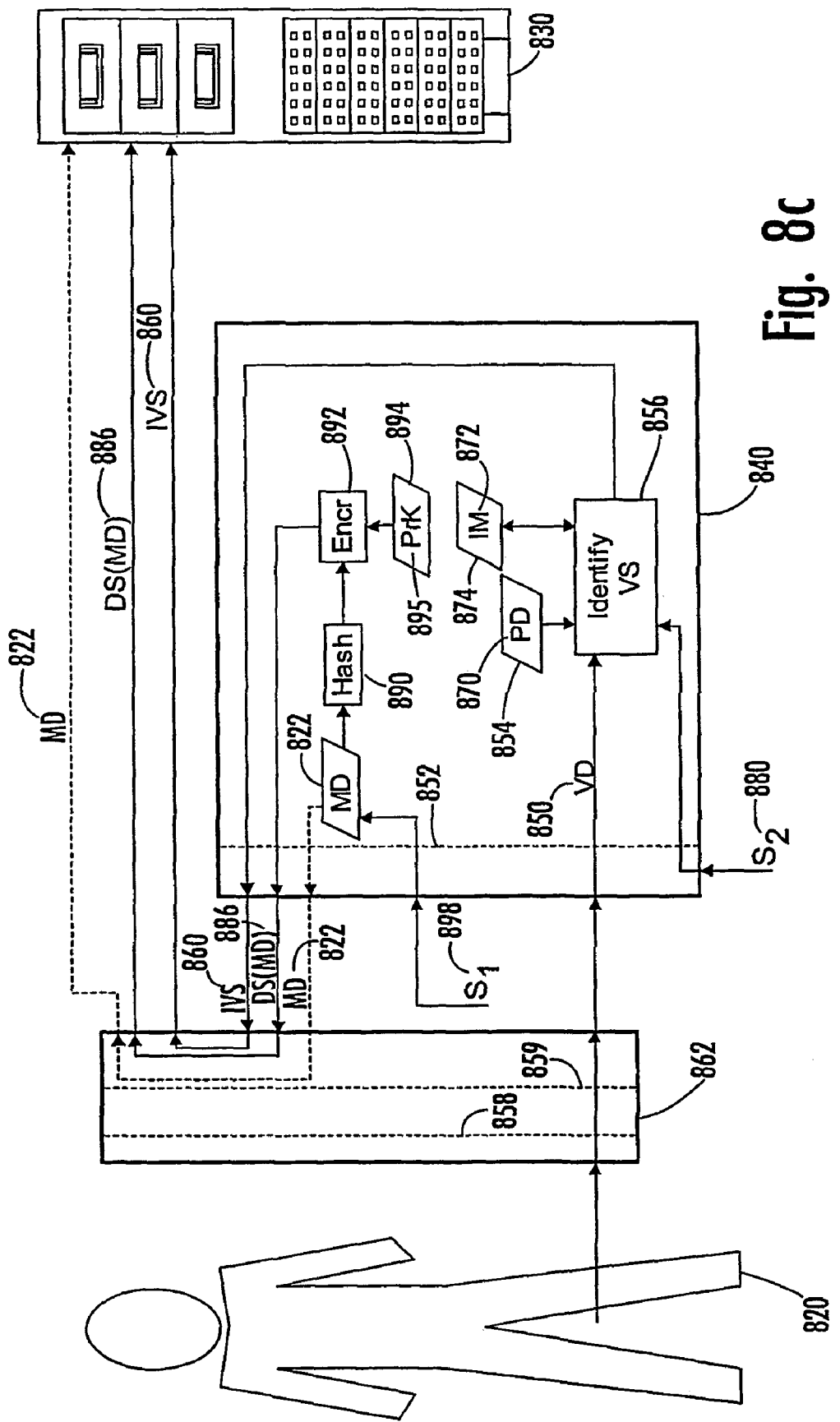

A variation based on the fourth preferred embodiment 800 of FIG. 8*a* is shown in FIG. 8*b*, and includes an I/O support element 862 from which input representing the verification data 850 is received by the device 840. The I/O support element 862 includes a user interface 858 from which input from the sender 820 is received and an I/O interface 859 that communicates the input representing the verification data 850 to the device 840. Yet an additional variation thereof is shown in FIG. 8*c*, wherein the I/O support element 862 receives the indicator 860 and digital signature 886 (and optionally the message data 822) output from the device 840. The I/O support element 862, in turn, transmits the indicator 860 and the digital signature 886 (and optionally the message data 822) to the electronic apparatus 830.

As shown, the indicator 860 and digital signature 886 transmitted from the I/O support element 862 are the same as the indicator 860 and digital signature 886 output from the device 840. However, the indicator transmitted from the I/O support element 862 may be different from the indicator output from the device 840, so long as the recipient is able to determine the verification status as indicated by the indicator 860 output from the device 840. For instance, the indicator transmitted from the I/O support element 862 may indicate not only the verification status of the device 840, but also a verification status of the I/O support element 862 when the I/O support element 862 itself identifies a verification status. Furthermore, the indicator 860 and digital signature 886 transmitted from the I/O support element 862 may be packaged or embedded within another communication—including additional information that is digitally signed by the I/O support element 862.

Figure 8D:
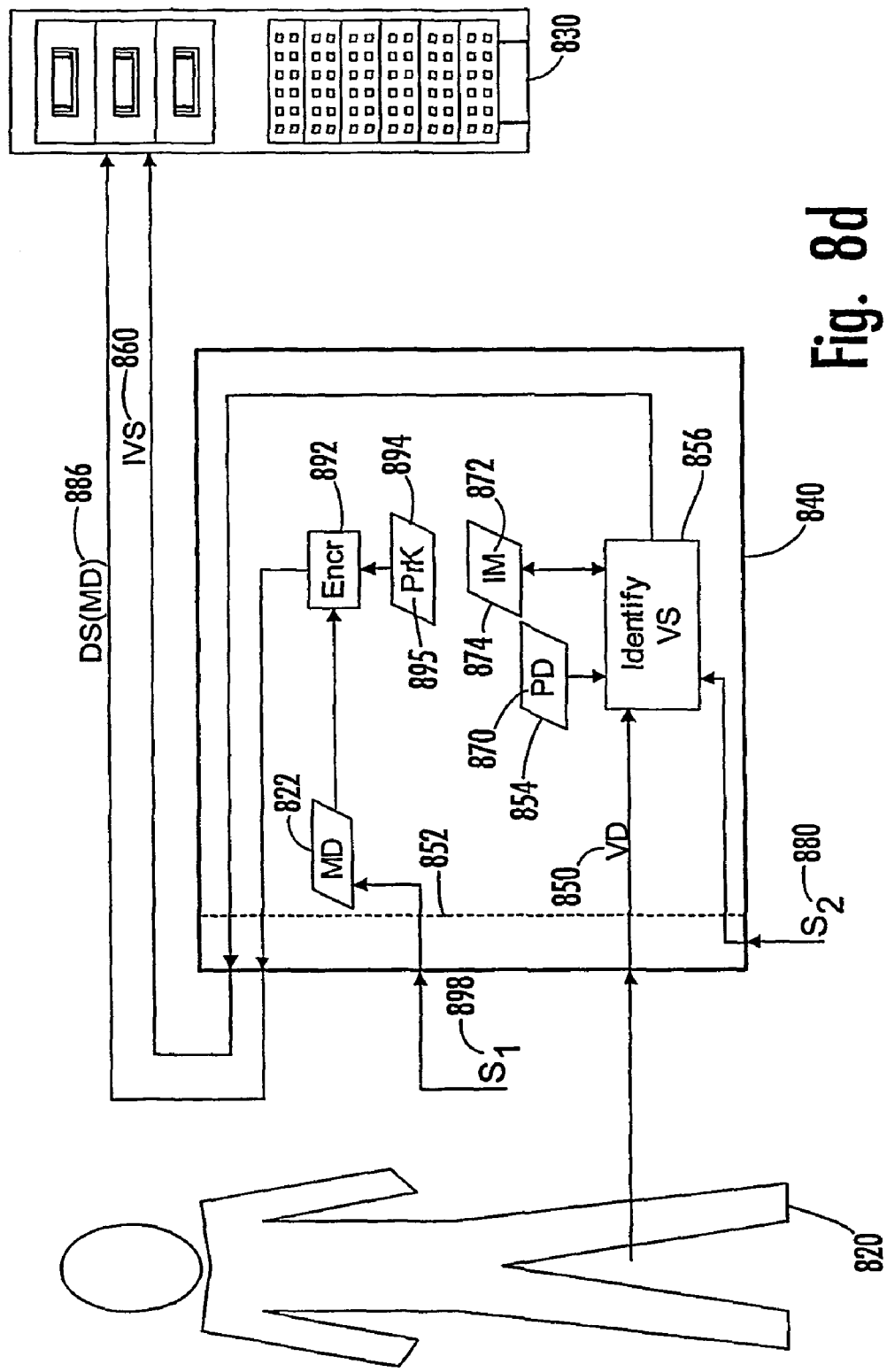

A further variation based on the fourth preferred embodiment 800 of FIG. 8a is shown in FIG. 8d, in which the message data 822 stored in the device 840 is a calculated hash value of the predefined message. In this case, the device 840 generates a digital signature 886 for the predefined message by directly encrypting the message data 822 at 892, and the component 890 for calculating the hash value in FIG. 8a is omitted from the device of FIG. 8d. In this example, it is assumed that the recipient knows the predefined message corresponding to the message data 822 stored within the device 840; thus, there is no need to communicate the message (or message data 822) from the device 840 to the recipient.

A preferred mode 900 of operation of the device of FIGS. 8a, 8b, 8c, and 8d is illustrated in FIG. 9 and begins with a resetting Step 904 of the device following a timeout or powering on of the device at 902. During the reset, the identification marker is assigned a value corresponding to a verification status representing the receipt of no input representing verification data and further representing the fact that that no indicator has yet been output. The device then enters a repeating loop that begins at 906 and ends at 914 and continues within this loop until the device is reset, is powered off, or deactivates after a predetermined amount of time. The first step in the loop preferably includes the determination Step 908 whether any input representing verification data (VD) is received by the device. If the determination in Step 908 is positive, the current verification status (VS) of the device is identified Step 916 by comparing the verification data (VD) with the data prestored (PD) in memory of the device. The verification status identified then is recorded by assigning Step 918 a value to the identification marker stored within the memory of the device equal to the predefined value corresponding to the identified verification status.

If no input representing verification data is received in Step 908 or after the value of the identification marker is recorded in Step 918, the next step in the loop preferably includes the determination Step 910 whether any signal $S_1$ is received by the device. If the determination in Step 910 is positive, the device originates Step 920 (or generates, as applicable) a digital signature for the predefined message data. The digital signature for the predefined message data is then output Step 922 from the device.

If signal $S_1$ is not received in Step 910 or after the digital signature for the predefined message data is output in Step 922, a determination is then made of whether a signal $S_2$ has been or is being received by the device. If a signal $S_2$ is not received, then the loop restarts Step 906. When a signal $S_2$ is received, the determination in Step 912 is positive and the indicator of the current verification status of the device is output Step 924. As set forth above, the indicator comprises the value of the identification marker maintained in memory within the device. Following the output of the indicator, the determination is made Step 926 whether the indicator output is the first indicator output since receipt of input representing verification data. The loop restarts Step 906 if the determination in Step 926 is negative. If the determination in Step 926 is positive, then the verification status is newly recorded by assigning Step 928 a value to the identification marker that further represents the fact that an indicator has been output since input representing verification data was received in Step 908. The loop then restarts Step 906.

5. Fifth Preferred Embodiment (Secret and Biometric Verification Data)

Figure 10A:
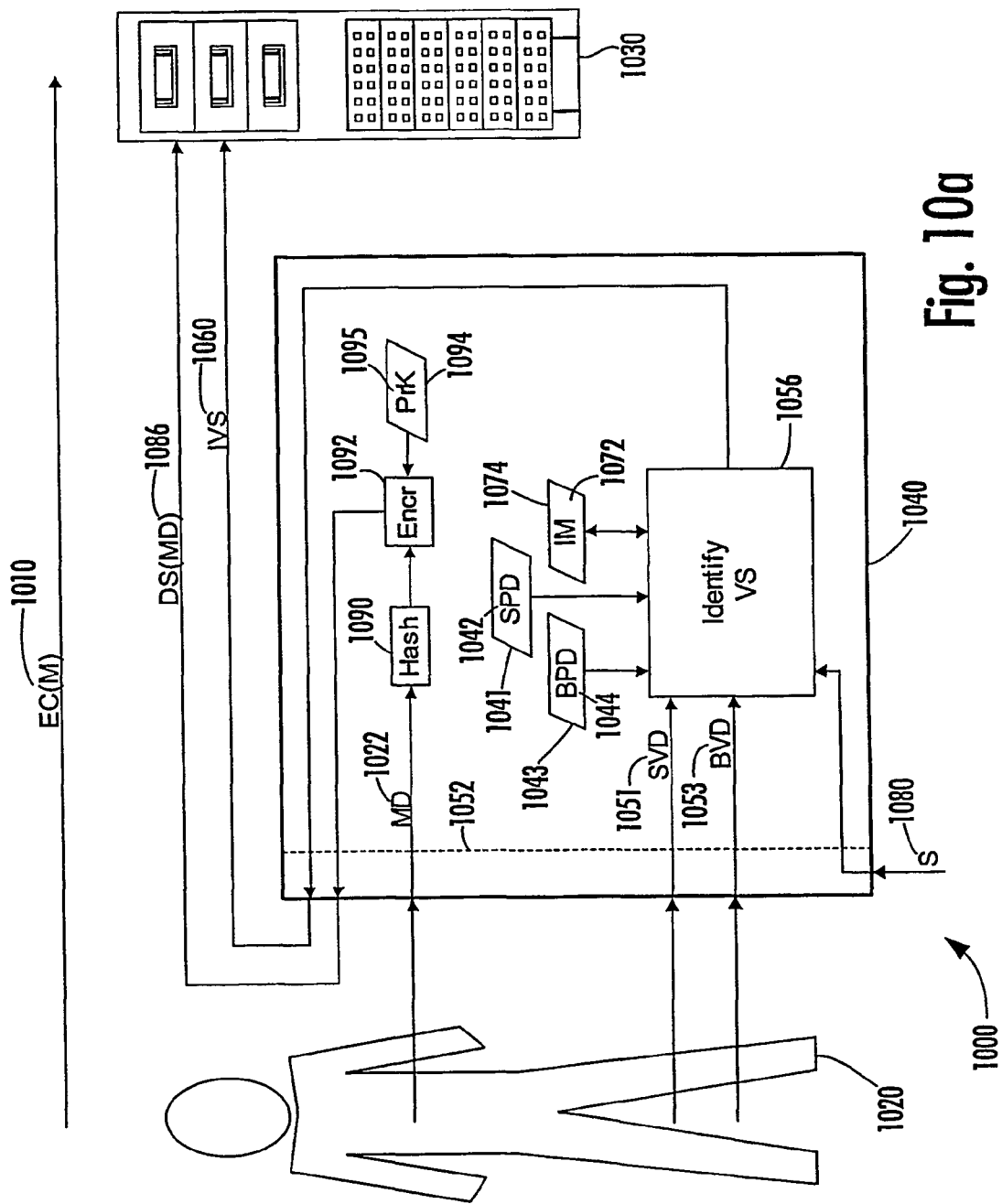
FIG. 10a illustrates a fifth preferred embodiment of the present invention.

A fifth preferred embodiment 1000 of the present invention is illustrated in FIG. 10a, wherein an EC 1010 including a message from a sender 1020 is received by a recipient represented by an electronic apparatus 1030, and wherein a device 1040 receives input representing verification data for a Secret (SVD) 1051 and input representing verification data for a biometric characteristic (BVD) 1053 at a device interface 1052. The device 1040 includes a verification component therein that maintains data of the sender 1020 prestored in memory of the device 1040. The prestored data (SPD) 1042 is located in memory 1041 and comprises a value for a Secret, and the prestored data (BPD) 1044 is located in memory 1043 and comprises a value for a biometric characteristic.

The verification component identifies at 1056 a current verification status of the device 1040 based on respective comparisons of the verification data 1051,1053 with the prestored data 1042,1044. Upon receipt of a signal (S) 1080, the last identified (i.e., "current") verification status of the device 1040 is communicated to the recipient by outputting from the device 1040 an indicator 1060 that is transmitted to the recipient in association with the EC 1010. The signal 1080 is sent to the device 1040, which triggers the device 1040 to output the indicator 1060. The signal 1080 represents, for example, a request or command for the provision of the verification status to the recipient and is generated by the sender 1020, by the electronic apparatus 1030, or by another apparatus (not shown). The device interface 1052 includes, as appropriate, one or more of the following: a user interface such as an alphanumeric keypad, a touch screen display, or a biometric scanner for receiving input directly from the sender 1020; an electrical contact; a standard electronic interface with a computer bus; an antenna; or a communications port, such as a serial port, USB port, parallel port, infrared port or other wireless communications port.

The device 1040 also receives at the device interface 1052 data (MD) 1022 representing the message of the EC 1010. The message data 1022 may comprise the message (M) itself, a message digest thereof, or the result of some other processing of the message. The device 1040 includes a digital signature component that, upon receipt of the message data 1022, originates a digital signature (DS) 1086 for the message data 1022 by calculating a hash value therefor at 1090 and then encrypting the hash value at 1092 using a private key 1095 of a public-private key pair. For increased reliability and trust, the private key 1095 is retained securely within memory 1094 so that it is never exported from the device 1040 and is not discoverable from outside of the device 1040. The digital signature 1086 then is output from the device 1040 and transmitted to the recipient with the indicator 1060. The digital signature is originated in accordance with the ECDSA as specified in FIPS PUB 186-2. Accordingly, the digital signature 1082 is generated using a random number generator, and the hash function at 1090 is performed using SHA-1, which generates a 20-byte output regardless of the size of the input received.

In alternative preferred embodiments, if the message data 1022 has already been hashed before it is received by the device 1040, then the hash function is omitted. In such alternative embodiments, the device 1040 is configured not to hash any message data 1022 or not to hash message data 1022 if a specific instruction, signal, or command is received.

The device 1040 also includes a set of predefined verification statuses each representing a relational correspondence between the verification data 1051,1053 and the prestored data 1042,1043. Verification statuses of the set further represent whether an indicator 1060 has been output from the device 1040 since the last successful verification or since the last receipt of input representing verification data. The set also contains one additional predefined verification status representing the lack of input representing verification data 1051 since a resetting after a timeout or a powering on of the device 1040, and one predefined verification status representing the lack of input representing verification data 1053 since a resetting after a timeout or a powering on of the device 1040. The indicator 1060 output from the device 1040 is based on the last comparison of each of verification data 1051 (if received) with prestored data 1042 and of verification data 1053 (if received) with prestored data 1044. Otherwise, the indicator 1060 indicates the lack of input representing verification data 1051,1053 since the resetting of the device 1040.

In either case, the indicator 1060 is transmitted with the digital signature 1086 in association with the EC 1010, whereby the recipient is able to identify the indicator 1060 and digital signature 1086 as relating to the EC 1010. The electronic apparatus 1030 includes an interface (not shown) capable of receiving the indicator 1060 and digital signature 1086. The electronic apparatus 1030 also includes logic circuitry or software incorporating business logic therein for determining the verification status of the device 1040 based on the indicator 1060, and for evaluating the EC 1010 received from the sender 1020 based on the determined verification status. The electronic apparatus 1030 also decrypts the digital signature 1086 to confirm the authenticity of the message of the EC 1010. The decryption is performed with the public key, which corresponds with the private key 1095 and which may be received in association with the digital signature 1086 or known or obtained beforehand by the recipient. In calculating a hash value for comparison, the electronic apparatus 1030 also performs any necessary processing to the message in order to produce the message digest for which the digital signature was originated.

Verification data 1051 and prestored data 1042 represent a Secret, and a comparison of verification data 1051 received with the prestored data 1042 produces a result preferably out of four possible outcomes, including: a first outcome representing the lack of verification data 1050 since a resetting of the device 1040; a second outcome representing a match between the verification data 1051 and the prestored data 1042, and further representing no other indicator 1060 being output from the device 1040 since the match; a third outcome representing a failed match between the verification data 1051 and the prestored data 1042; and a fourth outcome representing a match between the verification data 1051 and the prestored data 1042, and further representing the output of an indicator 1060 since the match.

Verification data 1053 and prestored data 1044 represent a biometric characteristic, and a comparison of verification data 1053 received with the prestored data 1044 produces a result preferably out of a predefined number of possible outcomes. Each outcome represents a possible percentage of match—or degree of difference—between the verification data 1053 and prestored data 1044 that is allowed, together with a verification status representing the lack of input for verification data 1053 since a resetting of the device 1040. For example, the predefined outcomes comprising the percentage match of the verification data 1053 with the prestored data 1044 may comprise the set of percentages ranging from 0% to 100% in increments of 1%. Preferably each one of the outcomes representing a percentage match also further represents whether an indicator 1060 has been output from the device 1040 since the last receipt of input representing verification data 1053.

The device 1040 preferably includes an identification marker ("IM") 1072 stored in memory 1074 and comprising one of the set of predefined verification statuses of the device. The set of predefined verification statuses preferably comprises all of the possible combinations of outcomes from the comparison of the verification data 1051 with the prestored data 1042 in addition to all of the possible outcomes from the comparison of the verification data 1053 with the prestored data 1044. Furthermore, the indicator 1060 output from the device 1040 preferably includes the value of the identification marker 1072, with the correspondence of the value of the identification marker with the predefined verification statuses of the device 1040 being previously known by the recipient. None of the verification statuses actually reveal any of the verification data 1051,1053 or the prestored data 1042,1044; thus, no "shared secret" is required between the sender 1020 and the recipient, and no biometric value representing the sender's irreplaceable biometric characteristic is communicated to the recipient. However, the recipient can infer correct knowledge of the Secret and correct input of a biometric value from the verification status.

Figure 10B:
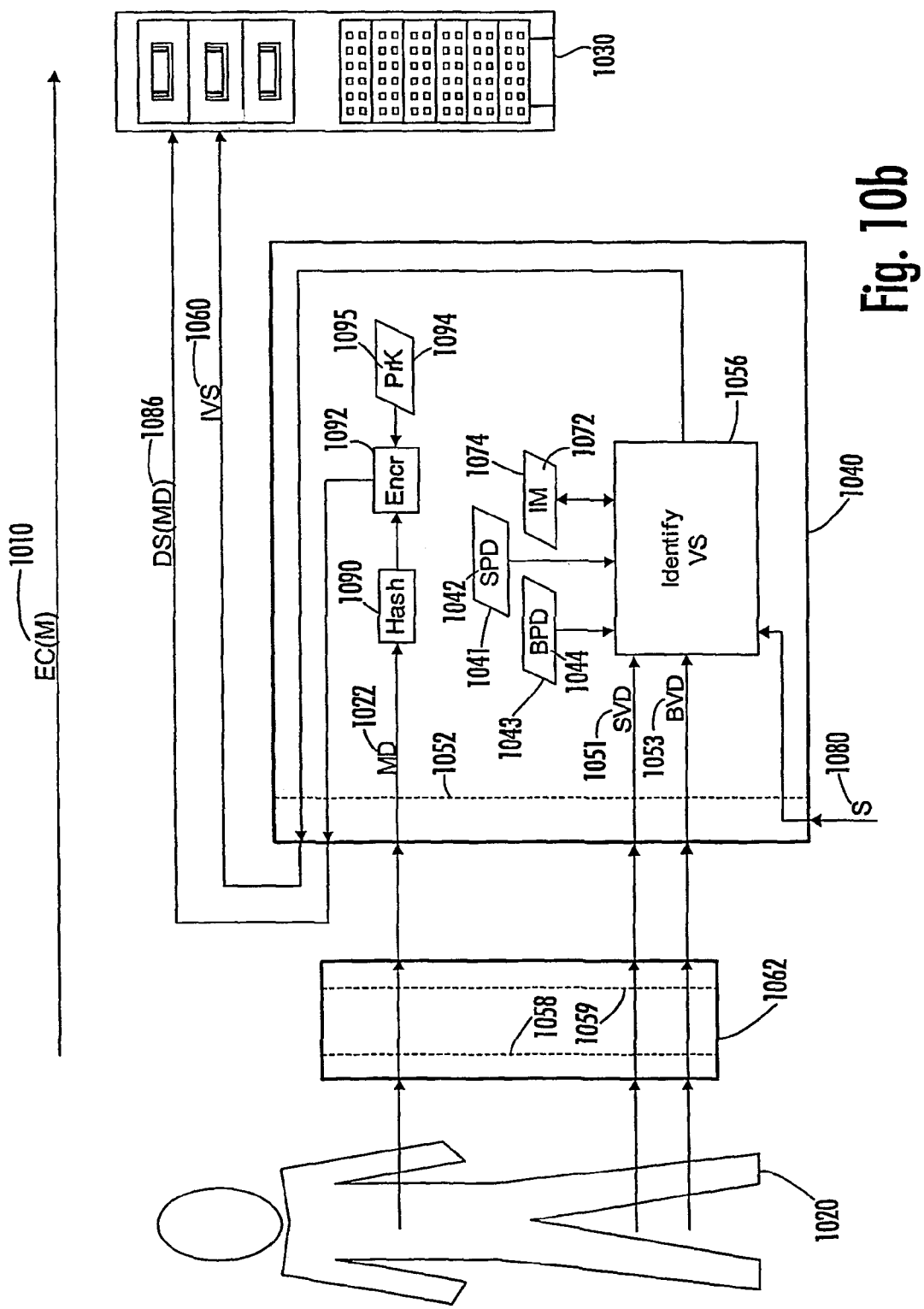
Figure 10C:
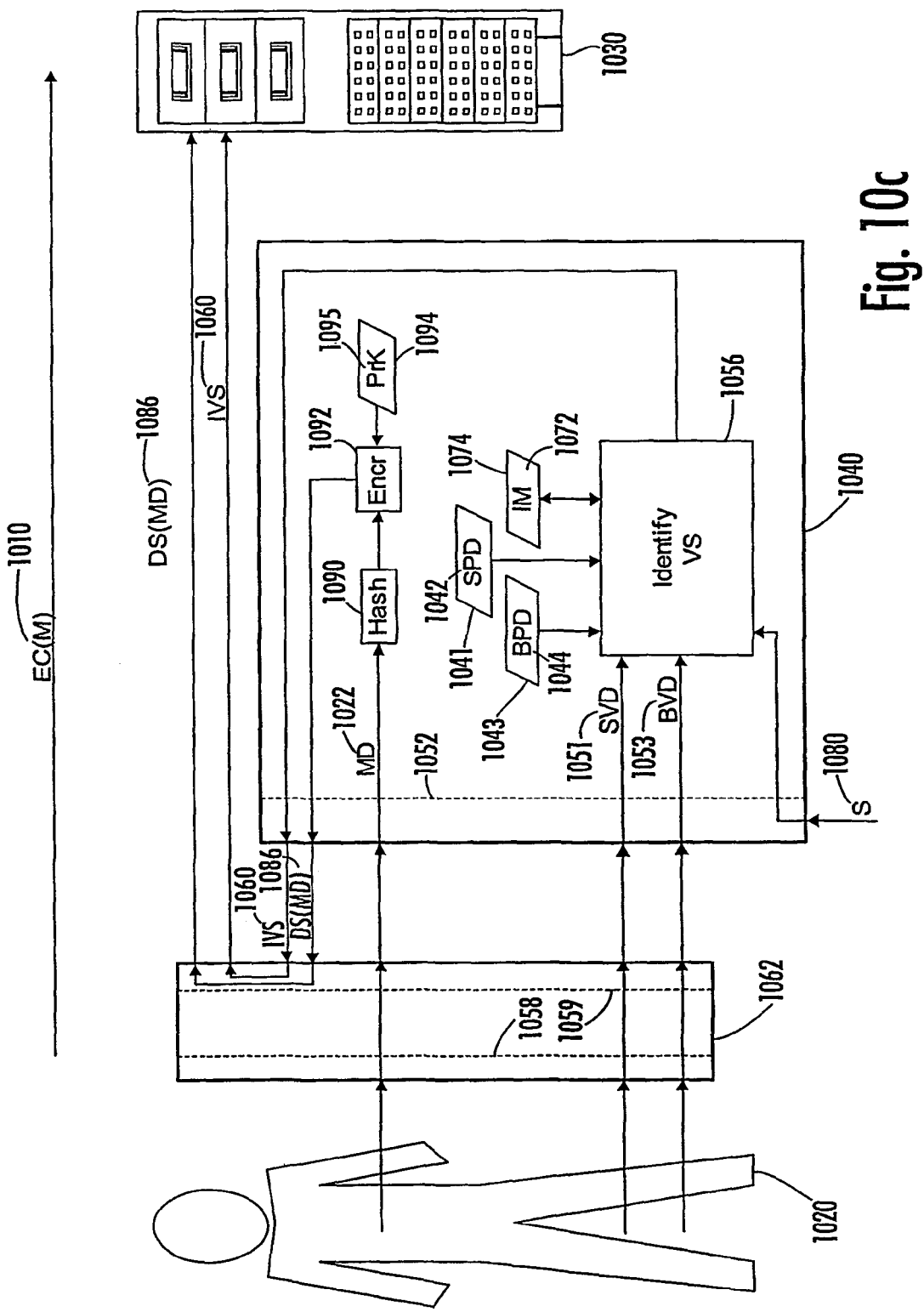

A variation based on the fifth preferred embodiment 1000 of FIG. 10a is shown in FIG. 10b, and includes an I/O support element 1062 from which input representing the verification data 1051,1053 and input representing the message data 1022 is received by the device 1040. The I/O support element 1062 includes a user interface 1058 from which input from the sender 1020 is received and an I/O interface 1059 that communicates the input representing the verification data 1051, 1053 to the device 1040. Although the message data 1022 is shown coming from the I/O support element 1062, it is possible for some or all of the message data 1022 to originate with the device 1040 or another apparatus (not shown). Yet an additional variation thereof is shown in FIG. 10c, wherein the I/O support element 1062 receives the indicator 1060 and digital signature 1086 output from the device 1040. The 110 support element 1062, in turn, transmits the indicator 1060 and the digital signature 1086 to the electronic apparatus 1030.

As shown, the indicator 1060 and digital signature 1086 transmitted from the 110 support element 1062 are the same as the indicator 1060 and digital signature 1086 output from the device 1040. However, the indicator transmitted from the I/O support element 1062 may be different from the indicator output from the device 1040, so long as the recipient is able to determine the verification status as indicated by the indicator 1060 output from the device 1040. For instance, the indicator transmitted from the I/O support element 1062 may indicate not only the verification status of the device 1040, but also a verification status of the 1(O support element 1062 when the I/O support element 1062 itself identifies a verification status. Furthermore, the indicator 1060 and digital signature 1086 transmitted from the I/O support element 1062 may be packaged or embedded within another communication—including additional information that is digitally signed by the I/O support element 1062.

Furthermore, in FIGS. 10a, 10b, and 10c, the EC 1010 is shown as being transmitted separate from the indicator 1060 and digital signature 1086. However, in the preferred embodiment of FIG. 10a and any variations thereof, the indicator 1060 and digital signature 1086 equally may be associated with the EC 1010 by being transmitted as part of the EC 1010.

Furthermore, the EC 1010 may be output from the device 1040, an associated I/O support element 1062 (not shown in FIG. 10*a*), or other apparatus.

A preferred mode 1100 of operation of the device of FIGS. 10*a*, 10*b*, and 10*c* is illustrated in FIG. 11 and begins with a resetting Step 1104 of the device following a timeout or powering on of the device at 1102. During the reset, the identification marker is assigned a value corresponding to a verification status representing the receipt of no input for verification data for either a Secret or a biometric characteristic and further representing the fact that that no indicator has yet been output. The device then enters a repeating loop that begins at 1106 and ends at 1116 and continues within this loop until the device is reset, is powered off, or deactivates after a predetermined amount of time.

Still referring to FIG. 11, the first step in the loop preferably includes the determination Step 1108 whether any input representing verification data for the Secret (SVD) is received by the device. If the determination in Step 1108 is positive, the current verification status (VS) of the device is identified Step 1118 by comparing the Secret verification data (SVD) with the data for the Secret (SPD) prestored in the memory of the device. The verification status identified then is recorded by assigning Step 1120 the identification marker stored within the memory of the device equal to the predefined value corresponding to the identified verification status.

If no input representing verification data for the Secret is received in Step 1108 or after the value of the identification marker is assigned in Step 1120, the next step in the loop preferably includes the determination Step 1110 whether any input representing verification data for the biometric characteristic (BVD) is received by the device. If the determination in Step 1110 is positive, the current verification status (VS) of the device is identified Step 1122 by comparing the biometric verification data (BVD) with the biometric data (BPD) prestored in the memory of the device. The verification status identified then is recorded by assigning Step 1124 the identification marker stored within the memory of the device equal to the predefined value corresponding to the identified verification status.

If no input representing verification data for the biometric characteristic is received in Step 1110 or after the value of the identification marker is recorded in Step 1124, the next step in the loop preferably includes the determination Step 1112 whether any input representing message data (MD) is received by the device. If the determination in Step 1112 is positive, the device originates Step 1126 a digital signature for the message data. The digital signature for the message data is then output Step 1128 from the device.

If no input representing message data is received in Step 1112 or after the digital signature for the message data is output in Step 1128, a determination is then made Step 1114 of whether a signal (S) has been or is being received by the device. If a signal is not received, then the loop restarts Step 1106. When a signal is received, the determination in Step 1114 is positive and the indicator of the current verification status of the device is output Step 1130. As set forth above, the indicator comprises the value of the identification marker maintained in memory within the device. Following the output of the indicator, the determination is made Step 1132 whether the indicator output is the first indicator output since receipt of input representing verification data for the Secret.

If the determination in Step 1132 is positive, then the verification status is newly recorded by assigning Step 1136 a value to the identification marker that further represents the fact that an indicator has been output since input representing verification data for the Secret was received in Step 1108. If the determination in Step 1132 is negative or after the value of the identification marker is newly recorded in Step 1136, the determination is made Step 1134 whether the indicator output is the first indicator output since receipt of input representing verification data for the biometric characteristic.

If the determination in Step 1134 is positive, then the verification status is newly recorded by assigning Step 1138 a value to the identification marker that further represents the fact that an indicator has been output since input representing verification data for the biometric characteristic was received in Step 1110. If the determination in Step 1134 is negative or after the value of the identification marker is newly recorded in Step 1138, then the loop restarts Step 1106.

6. Sixth Preferred Embodiment (Digital Signature as the Indicator)

Figure 12A:
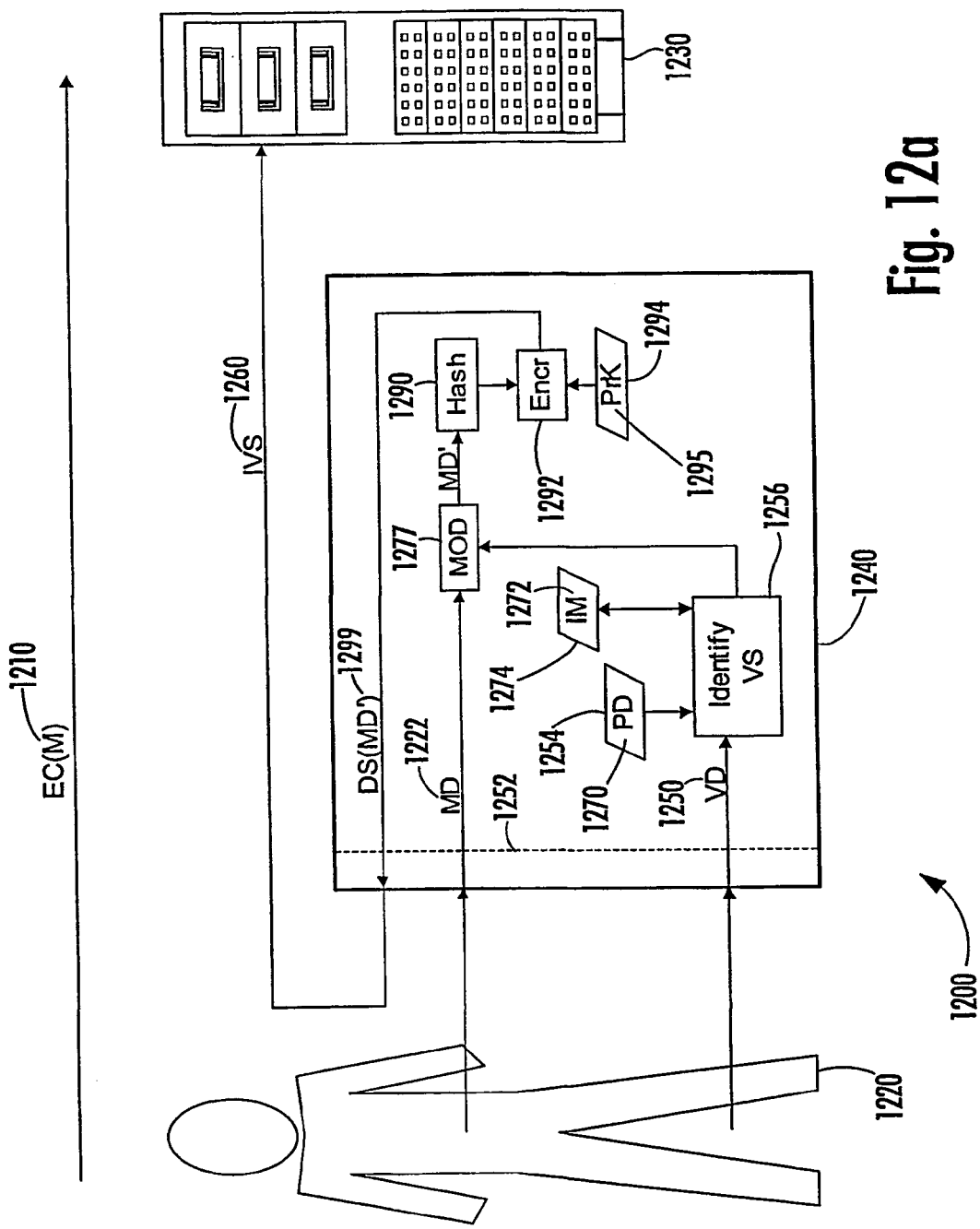
FIG. 12a illustrates a sixth preferred embodiment of the present invention.

A sixth preferred embodiment 1200 of the present invention is illustrated in FIG. 12*a*, wherein an EC 1210 including a message from a sender 1220 is received by a recipient represented by an electronic apparatus 1230, and wherein a device 1240 receives input representing verification data (VD) 1250 at a device interface 1252. The device interface 1252 includes, as appropriate, one or more of the following: a user interface such as an alphanumeric keypad, a touch screen display, or a biometric scanner for receiving input directly from the sender 1220; an electrical contact; a standard electronic interface with a computer bus; an antenna; or a communications port, such as a serial port, USB port, parallel port, infrared port or other wireless communications port.

The device 1240 includes a verification component therein that maintains data (PD) 1270 of the sender 1220 prestored in memory 1254. The verification data 1250 and prestored data 1270 represent Secret or biometric values. The verification component identifies at 1256 a current verification status of the device 1240 based on a comparison of the verification data 1250 with the prestored data 1270 and records the last identified (i.e., "current") verification status of the device 1240 by assigning a value to an identification marker (IM) 1272 that is stored in memory 1274.

The device 1240 also receives at the device interface 1252 data (MD) 1222 representing the message of the EC 1210. The message data may comprise the message itself, a message digest thereof, or the result of some other processing of the message (M). The device 1240 includes a digital signature component that, upon receipt of the message data 1222, obtains the value for the identification marker 1272 and modifies the message data at 1277 as a function of this value (as used herein, "function" may include the possible function $f(x)=x$ for a particular value of x).

The digital signature component then originates a digital signature 1299 for the modified message data (MD') by calculating a hash value therefor at 1290 and then encrypting the hash value at 1292 using a private key 1295 of a public-private key pair. For increased reliability and trust, the private key 1295 is retained securely within memory 1294 so that it is never exported from the device 1240 and is not discoverable from outside of the device 1240. The digital signature is originated in accordance with the ECDSA as specified in FIPS PUB 186-2. Accordingly, the digital signature 1299 is generated using a random number generator, and the hash function at 1290 is performed using SHA-1, which generates a 20-byte output regardless of the size of the input received. The digital signature 1299 then is output from the device 1240 for transmitting to the recipient as the indicator 1260 of the verification status of the device 1240. The digital signature 1299 output from the device 1240 actually comprises the indicator of the verification status (IVS) 1260 as a result of the modification process. The indicator 1260 then is transmitted to the recipient in association with the EC 1210, whereby the recipient is able to identify the indicator 1260 as pertaining to the EC 1210.

The device 1240 includes a set of predefined verification statuses each representing a relational correspondence between the verification data 1250 and the prestored data 1270. Verification statuses of the set further represent whether an indicator 1260 has been output from the device 1240 since the last successful verification or since the last receipt of input representing verification data. The set also contains an additional predefined verification status representing the lack of input representing verification data 1250 since a resetting after a timeout or a powering on of the device 1240. The indicator 1260 output from the device 1240 is based on the last comparison of the verification data 1250 with the prestored data 1270, but only if input representing verification data 1250 has been received since the resetting of the device 1240. Otherwise, the indicator 1260 indicates the lack of input representing verification data 1250 since the resetting of the device 1240.

The electronic apparatus 1230 includes an interface (not shown) capable of receiving the indicator 1260. The electronic apparatus 1230 also includes logic circuitry or software incorporating business logic therein for determining the verification status of the device based on the indicator 1260 and for evaluating the EC 1210 received from the sender 1220 based on the determined verification status. In this regard, the electronic apparatus 1230 decrypts the digital signature with the public key, which corresponds to the private key 1295 and which may be received in association with the digital signature or known or obtained beforehand by the recipient. The recipient also modifies—and then calculates a hash value for—the message for each one of the predefined verification statuses of the device until the calculated hash value equals the hash value of the decrypted digital signature. In calculating a hash value for comparison, the electronic apparatus 1230 also performs any necessary processing to the message in order to produce the message data that was modified within the device 1240. When the hash value calculated by the recipient equals the hash value of the decrypted digital signature, the recipient thereby determines the current verification status of the device 1240. This determination also confirms the authenticity of the message of the EC 1210. Furthermore, in order to minimize consumption of resources, the set of verification statuses of the device is predefined to contain only a limited number of verification statuses when this particular device 1240 of the preferred embodiment 1200 is used.

When the verification data 1250 and the prestored data 1270 comprise a Secret, the predefined set of verification statuses includes four verification statuses, comprising: a first verification status representing the lack of verification data 1250 since a resetting of the device; a second verification status representing a match between the verification data 1250 and the prestored data 1270, and further representing no other indicator 1260 being output from the device 1240 since the match; a third verification status representing a failed match between the verification data 1250 and the prestored data 1270; and a fourth verification status representing a match between the verification data 1250 and the prestored data 1270, and further representing the output of an indicator 1260 since the match. The identification marker 1272 stored in memory 1274 preferably comprises one of four binary numbers that represents the current verification status identified by the device 1240. Of course, the correspondence between the values of the identification marker 1272 and the predefined verification statuses of the device should be previously known by the recipient.

The four binary numbers respectively correspond to the four verification statuses and include: "00" identifying the first verification status; "01" identifying the second verification status; "10" identifying the third verification status; and "11" identifying the fourth verification status. Furthermore, the modification of the message data 1222 at 1277 preferably includes the embedding of the value of the identification marker 1272 within the message data, including insertion of the value at a predefined location within, or at the beginning or end of, the message data. As also will be appreciated, the "modification" of the message data for one of the verification statuses may include not modifying the message data, such as when the identification marker 1272 equals "00." Even in this case, however, the digital signature 1299 identifies the verification status of the device as representing the lack of verification data 1250 being received since a resetting of the device. Furthermore, it will be appreciated that the digital signature 1299 for the modified message neither reveals the verification data 1250 nor the prestored data 1270; thus, no "shared secret" is required between the sender and the recipient in the preferred embodiment 1200. However, the recipient can infer correct knowledge of the Secret from the verification status.

Alternatively, when the verification data 1250 and the prestored data 1270 comprise biometric values, the set of predefined verification statuses comprises the possible percentages of match—or degrees of difference—between the verification data 1250 and prestored data 1270, together with a verification status representing the lack of input representing verification data 1250 since a resetting of the device 1240. For example, the predefined verification statuses comprising the percentage match of the verification data 1250 with the prestored data 1270 may comprise the set of percentages ranging from 0% to 100% in increments of, in this embodiment, 20%. Preferably each one of the verification statuses representing a percentage match also further represents whether an indicator 1260 has been output from the device 1240 since the last receipt of input representing verification data 1250. The identification marker 1272 stored in memory 1274 preferably comprises the percentage match plus a flag regarding the output of the indicator 1260 as identified by the device 1240. Of course, the correspondence between the values of the identification marker 1272 and the predefined verification statuses of the device 1240 should be previously known by the recipient. Also, in this case, the modification of the message data 1222 at 1277 preferably includes the embedding of the value of the identification marker 1272 within the message data, including insertion of the value at a predefined location within, or at the beginning or end of, the message data. As also will be appreciated, the "modification" of the message data for one of the verification statuses may include not modifying the message data, such as when no verification data 1250 has been received since a resetting of the device 1240. Even in this case, however, the digital signature 1299 identifies the verification status of the device 1240 as representing the lack of verification data 1250 being received since a resetting of the device 1240. Furthermore, it will be appreciated that the digital signature 1299 for the modified message neither reveals the verification data 1250 nor the prestored data 1270; thus, no biometric value representing the sender's irreplaceable biometric characteristic is communicated to the recipient. However, the recipient can infer from the verification status the presence of the sender 1220 from the reading of the biometric characteristic.

Figure 12B:
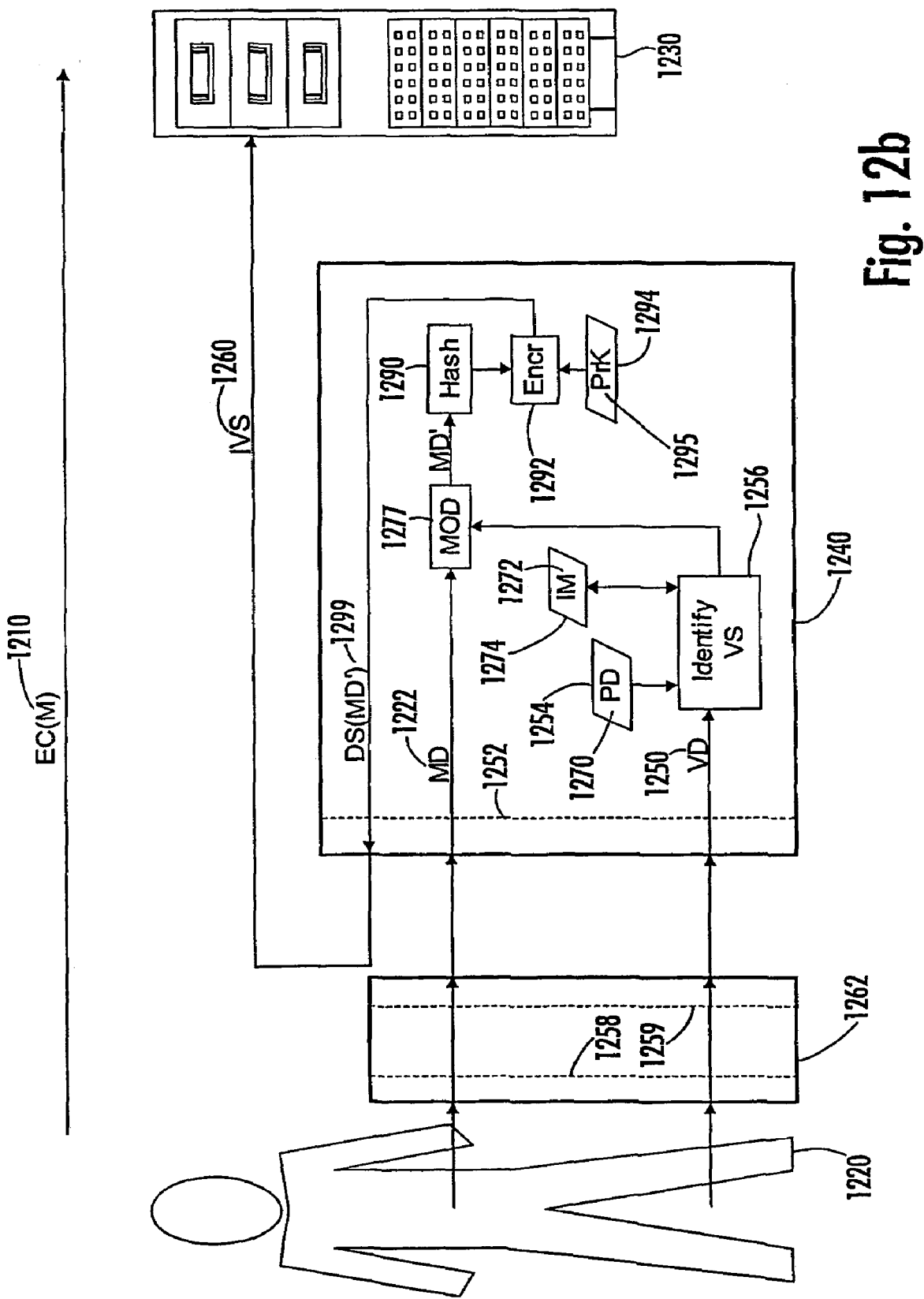
Figure 12C:
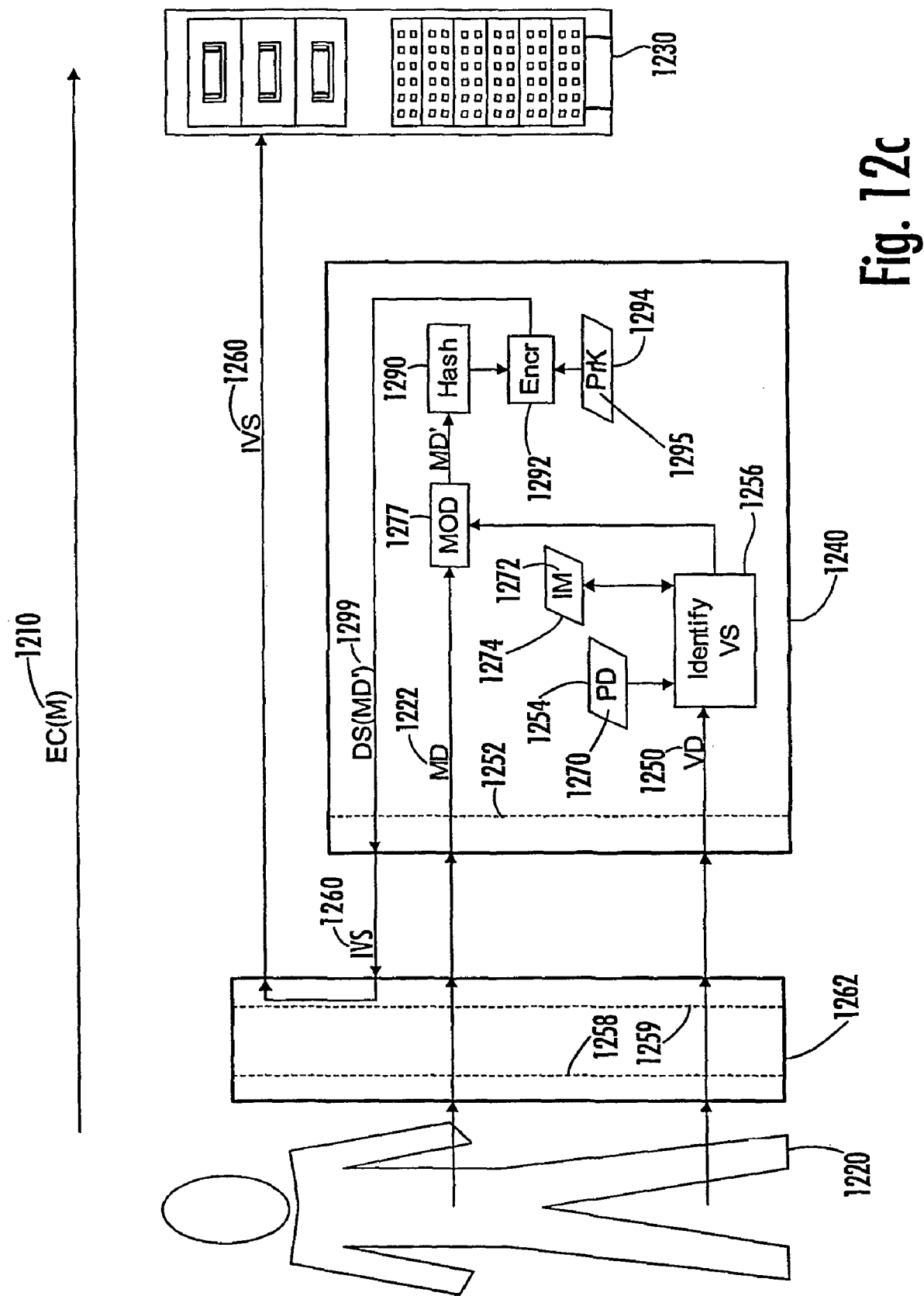

A variation based on the sixth preferred embodiment 1200 of FIG. 12*a* is shown in FIG. 12*b*, and includes an I/O support element 1262 from which input representing the verification data 1250 and input representing the message data 1222 is received by the device 1240. The I/O support element 1262 includes a user interface 1258 from which input from the sender 1220 is received and an I/O interface 1259 that communicates the input representing the verification data 1250 and input representing the message data 1222 to the device 1240. Although the message data 1222 is shown coming from the I/O support element 1262, it is possible for some or all of the message data 1222 to originate with the device 1240 or another apparatus (not shown). Yet an additional variation thereof is shown in FIG. 12*c*, wherein the I/O support element 1262 receives the indicator 1260 being output from the device 1240. The I/O support element 1262, in turn, transmits the indicator 1260 to the electronic apparatus 1230. As shown, the indicator 1260 transmitted from the I/O support element 1262 is the same as the indicator 1260 output from the device 1240. However, the indicator 1260 transmitted from the I/O support element 1262 may be packaged or embedded within another communication—including additional information that is digitally signed by the I/O support element 1262. Furthermore, in FIGS. 12*a*, 12*b*, and 12*c*, the EC 1210 is shown as being transmitted separate from the indicator 1260. However, in the preferred embodiment of FIG. 12*a* and any variations thereof, the indicator 1260 equally may be associated with the EC 1210 by being transmitted as part of the EC 1210. Furthermore, the EC 1210 may be output from the device 1240, an associated I/O support element 1262 (not shown in FIG. 12*a*), or other apparatus.

A preferred mode 1300 of operation of the device of FIGS. 12*a*, 12*b*, and 12*c* is illustrated in FIG. 13 and begins with a resetting Step 1304 of the device following a timeout or powering on of the device at 1302. During the reset, the identification marker is assigned a value corresponding to a verification status representing the receipt of no input of verification data and further representing the fact that that no indicator has yet been output. The device then enters a repeating loop that begins at 1306 and ends at 1312 and continues within this loop until the device is reset, is powered off, or deactivates after a predetermined amount of time.

Still referring to FIG. 13, the first step in the loop preferably includes the determination Step 1308 whether any input representing verification data is received by the device. If the determination in Step 1308 is positive, the current verification status (VS) of the device is identified Step 1314 by comparing the verification data (VD) with the data (PD) prestored in the memory of the device. The verification status identified then is recorded by assigning Step 1316 the identification marker stored within the memory of the device equal to the predefined value corresponding to the identified verification status.

If no input representing verification data is received in Step 1308 or after the value of the identification marker is recorded in Step 1316, the next step in the loop preferably includes the determination Step 1310 whether any input representing message data (MD) is received by the device. If the determination in Step 1310 is negative, the loop restarts Step 1306. If the determination in Step 1310 is positive, the device then modifies Step 1318 the message data based on the identification marker. Next, the device originates Step 1320 a digital signature for the modified message data. The digital signature for the modified message data is then output Step 1322 from the device. Following the output of the digital signature for the modified message, the determination is made Step 1324 whether the digital signature output is the first digital signature output since receipt of input for verification data in Step 1308. The loop restarts Step 1306 if the determination in Step 1324 is negative. If the determination in Step 1324 is positive, then the verification status is newly recorded Step 1326 by assigning a value to the identification marker that represents the verification status indicated by the digital signature output in Step 1322, and that further represents the fact that the digital signature has been output. The loop then restarts Step 1306.

7. Seventh Preferred Embodiment (Message and Indicator Digitally Signed)

Figure 14A:
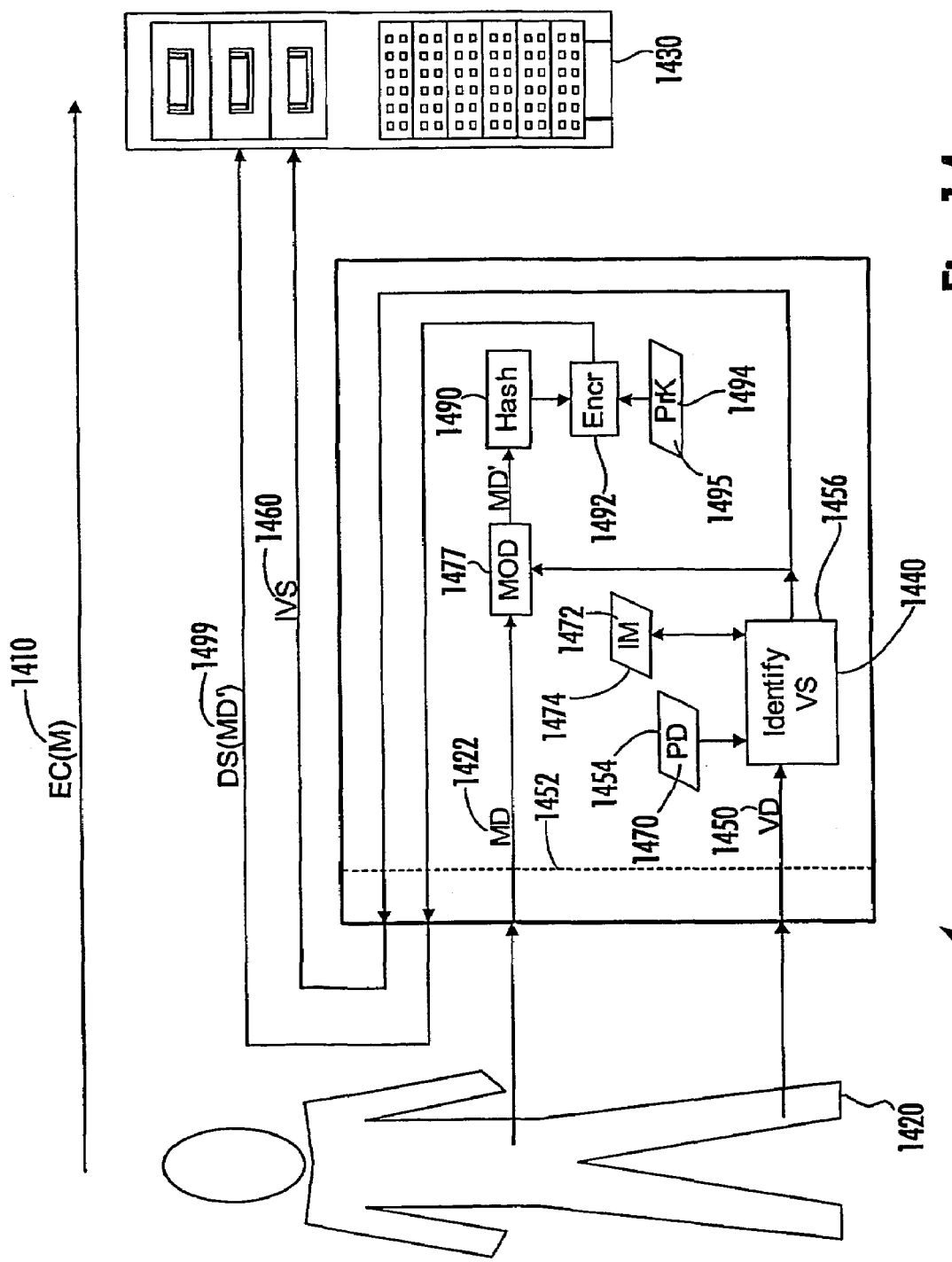
FIG. 14a illustrates a seventh preferred embodiment of the present invention.

A seventh preferred embodiment 1400 of the present invention is illustrated in FIG. 14*a*, wherein an EC 1410 including a message from a sender 1420 is received by a recipient represented by an electronic apparatus 1430, and wherein a device 1440 receives input representing verification data (VD) 1450 at a device interface 1452. The device interface 1452 includes, as appropriate, one or more of the following: a user interface such as an alphanumeric keypad, a touch screen display, or a biometric scanner for receiving input directly from the sender 1420; an electrical contact; a standard electronic interface with a computer bus; an antenna; or a communications port, such as a serial port, USB port, parallel port, infrared port or other wireless communications port.

The device 1440 includes a verification component therein that maintains data (PD) 1470 of the sender 1420 prestored in memory 1454. The verification data 1450 and prestored data 1470 represent Secret or biometric values. The verification component identifies at 1456 a current verification status of the device 1440 based on a comparison of the verification data 1450 with the prestored data 1470 and records the last identified (i.e., "current") verification status of the device 1440 by assigning a value to an identification marker (IM) 1472 that is stored in memory 1474.

The device 1440 also receives at the device interface 1452 message data (PD) 1422 representing the message (M) of the EC 1410. The message data 1422 may comprise the message itself, a message digest thereof, or the result of some other processing of the message. The device 1440 includes a digital signature component that, upon receipt of the message data 1422, obtains the value for the identification marker 1472 and modifies the message data at 1477 as a function of this value (as used herein, "function" may include the possible function f(x)=x for a particular value of x). The digital signature component then originates a digital signature 1499 for the modified message data (MD') by calculating a hash value therefor at 1490 and then encrypting the hash value at 1492 using a private key 1495 of a public-private key pair. For increased reliability and trust, the private key 1495 is retained securely within memory 1494 so that it is never exported from the device 1440 and is not discoverable from outside of the device 1440. The digital signature is originated in accordance with the ECDSA as specified in FIPS PUB 186-2. Accordingly, the digital signature 1499 is generated using a random number generator, and the hash function at 1490 is performed using SHA-1, which generates a 20-byte output regardless of the size of the input received. The digital signature 1499 then is output from the device 1440 together with the value of the identification marker 1472 as the indicator 1460 of the verification status (IVS) of the device 1440 for transmitting to the recipient. The digital signature 1499 and the indicator 1460 then are transmitted to the recipient in association with the EC 1410, whereby the recipient is able to identify the indicator 1460 as pertaining to the EC 1410.

The device 1440 includes a set of predefined verification statuses each representing a relational correspondence between the verification data 1450 and the prestored data 1470. Verification statuses of the set further represent whether an indicator 1460 has been output from the device 1440 since the last successful verification or since the last receipt of input representing verification data. The set also contains an additional predefined verification status representing the lack of input representing verification data 1450 since a resetting after a timeout or a powering on of the device 1440. The indicator 1460 output from the device 1440 is based on the last comparison of the verification data 1450 with the prestored data 1470, but only if input representing verification data 1450 has been received since the resetting of the device 1440. Otherwise, the indicator 1460 indicates the lack of input representing verification data 1450 since the resetting of the device 1440.

The electronic apparatus 1430 includes an interface (not shown) capable of receiving the indicator 1460. The electronic apparatus 1430 also includes logic circuitry or software incorporating business logic therein for determining the verification status of the device based on the indicator 1460 and for evaluating the EC 1410 received from the sender 1420 based on the determined verification status. In this regard, the electronic apparatus 1430 decrypts the digital signature with the public key, which corresponds to the private key 1495 and which may be received in association with the digital signature 1499 or known or obtained beforehand by the recipient. The recipient also modifies—and then calculates a hash value for—the message based on the verification status identified by the indicator 1460. In calculating a hash value for comparison, the electronic apparatus 1430 also performs any necessary processing to the message in order to produce the message data that was modified within the device 1440. When the hash value calculated by the recipient equals the hash value of the decrypted digital signature, the recipient confirms the authenticity of the current verification status of the device 1440 as indicated by the indicator 1460 as well as confirms the authenticity of the message of the EC 1410.

When the verification data 1450 and the prestored data 1470 comprise a Secret, the predefined set of verification statuses includes four verification statuses, comprising: a first verification status representing the lack of verification data 1450 since a resetting of the device; a second verification status representing a match between the verification data 1450 and the prestored data 1470, and further representing no other indicator 1460 being output from the device 1440 since the match; a third verification status representing a failed match between the verification data 1450 and the prestored data 1470; and a fourth verification status representing a match between the verification data 1450 and the prestored data 1470, and further representing the output of an indicator 1460 since the match. The identification marker 1472 stored in memory 1474 preferably comprises one of four binary numbers that represents the current verification status identified by the device 1440. Of course, the correspondence between the values of the identification marker 1472 and the predefined verification statuses of the device should be previously known by the recipient.

The four binary numbers respectively correspond to the four verification statuses and include: "00," identifying the first verification status; "01" identifying the second verification status; "10" identifying the third verification status; and "11" identifying the fourth verification status. Furthermore, the modification of the message data 1422 at 1477 preferably includes the embedding of the value of the identification marker 1472 within the message data, including insertion of the value at a predefined location within, or at the beginning or end of, the message data. As also will be appreciated, the "modification" of the message data for one of the verification statuses may include not modifying the message data, such as when the identification marker 1472 equals "00." Even in this case, however, the digital signature 1499 identifies the verification status of the device as representing the lack of verification data 1450 being received since a resetting of the device. Furthermore, it will be appreciated that neither the digital signature 1499 for the modified message nor the indicator 1460 reveals the verification data 1450 or the prestored data 1470; thus, no "shared secret" is required between the sender 1420 and the recipient in the preferred embodiment 1400. However, the recipient can infer correct knowledge of the Secret from the verification status.

Alternatively, when the verification data 1450 and the prestored data 1470 comprise biometric values, the set of predefined verification statuses comprises the possible percentages of match—or degrees of difference—between the verification data 1450 and prestored data 1470, together with a verification status representing the lack of input representing verification data 1450 since a resetting of the device 1440. For example, the predefined verification statuses comprising the percentage match of the verification data 1450 with the prestored data 1470 may comprise the set of percentages ranging from 0% to 100% in increments of 1%. Preferably each one of the verification statuses representing a percentage match also further represents whether an indicator 1460 has been output from the device 1440 since the last receipt of input representing verification data 1450. The identification marker 1472 stored in memory 1474 preferably comprises the percentage match plus a flag regarding the output of the indicator 1460 as identified by the device 1440. Of course, the correspondence between the values of the identification marker 1472 and the predefined verification statuses of the device 1440 should be previously known by the recipient.

Also, in this case, the modification of the message data 1422 at 1477 preferably includes the embedding of the value of the identification marker 1472 within the message data, including insertion of the value at a predefined location within, or at the beginning or end of, the message data. As also will be appreciated, the "modification" of the message data for one of the verification statuses may include not modifying the message data, such as when no verification data 1450 has been received since a resetting of the device 1440. Even in this case, however, the digital signature 1499 identifies the verification status of the device 1440 as representing the lack of verification data 1450 being received since a resetting of the device 1440. Furthermore, it will be appreciated that neither the digital signature 1499 for the modified message nor the indicator 1460 reveals the verification data 1450 or the prestored data 1470; thus, no biometric value representing the sender's irreplaceable biometric characteristic is communicated to the recipient. However, the recipient can infer from the verification status the presence of the sender 1420 from the reading of the biometric characteristic.

Figure 14B:
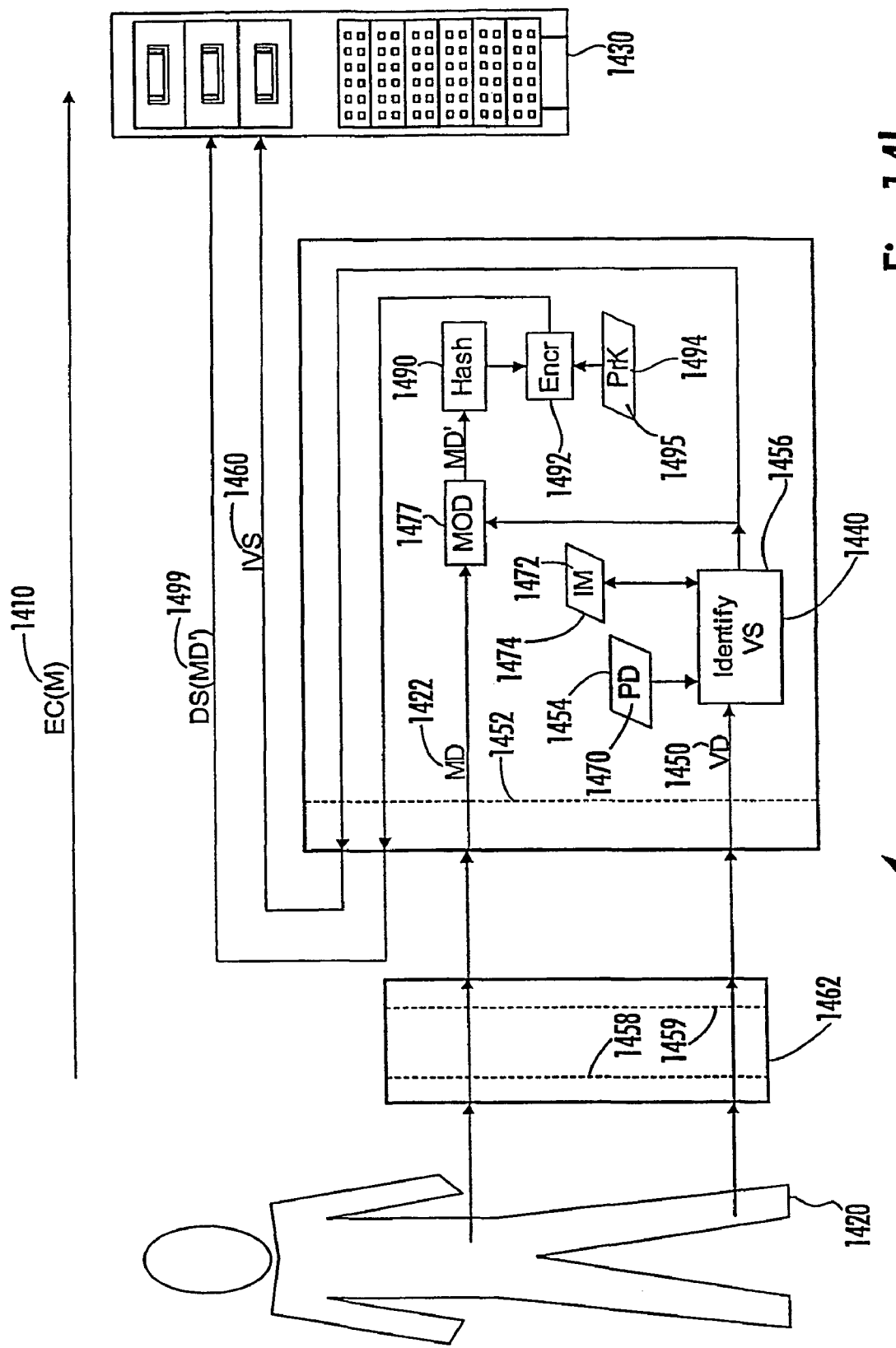
Figure 14C:
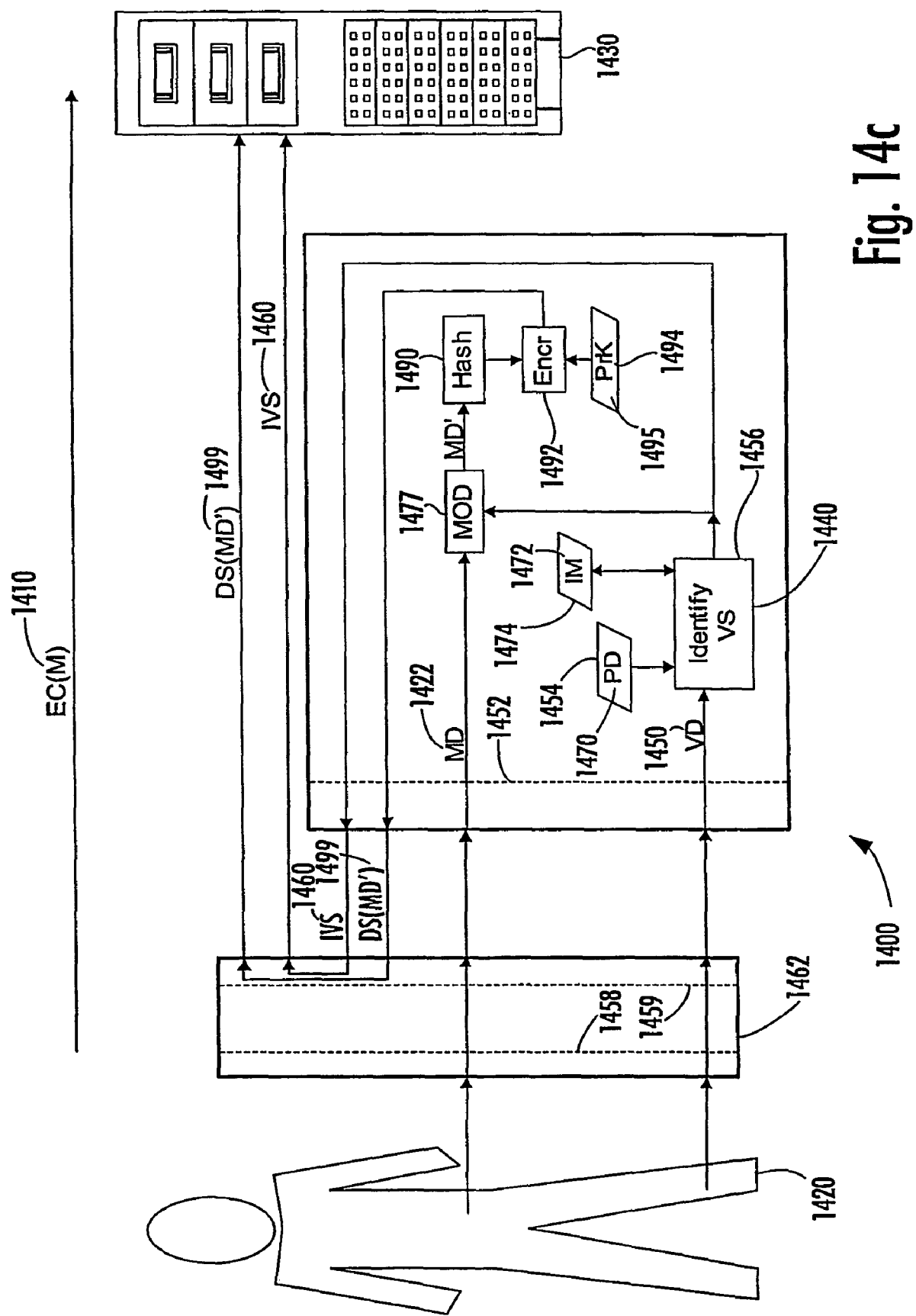

A variation based on the seventh preferred embodiment 1400 of FIG. 14*a* is shown in FIG. 14*b*, and includes an I/O support element 1462 from which input representing the verification data 1450 and input representing the message data 1422 is received by the device 1440. The I/O support element 1462 includes a user interface 1458 from which input from the sender 1420 is received and an I/O interface 1459 that communicates the input representing the verification data 1450 and input representing the message data 1422 to the device 1440. Although the message data 1422 is shown coming from the I/O support element 1462, it is possible for some or all of the message data 1422 to originate with the device 1440 or another apparatus (not shown). Yet an additional variation thereof is shown in FIG. 14*c,* wherein the I/O support element 1462 receives the indicator 1460 and digital signature 1499 output from the device 1440. The I/O support element 1462, in turn, transmits the indicator 1460 and the digital signature 1499 to the electronic apparatus 1430.

As shown, the indicator 1460 and digital signature 1499 transmitted from the I/O support element 1462 are the same as the indicator 1460 and digital signature 1486 output from the device 1440. However, the indicator transmitted from the I/O support element 1462 may be different from the indicator output from the device 1440, so long as the recipient is able to determine both the verification status as indicated by the indicator 1460 output from the device 1440, as well as the bit pattern of the identification marker 1472 based on which the message was modified. For instance, the indicator transmitted from the I/O support element 1462 may indicate not only the verification status of the device 1440, but also a verification status of the I/O support element 1462 when the I/O support element 1462 itself identifies a verification status. Furthermore, the indicator 1460 and digital signature 1499 transmitted from the I/O support element 1462 may be packaged or embedded within another communication—including additional information that is digitally signed by the I/O support element 1462.

Furthermore, in FIGS. 14*a,* 14*b,* and 14*c,* the EC 1410 is shown as being transmitted separate from the indicator 1460 and digital signature 1499. However, in the preferred embodiment of FIG. 14*a* and any variations thereof, the indicator 1460 and digital signature 1499 equally may be associated with the EC 1410 by being transmitted as part of the EC 1410. Furthermore, the EC 1410 may be output from the device 1440, an associated I/O support element 1462 (not shown in FIG. 14*a*), or other apparatus.

Figure 15:
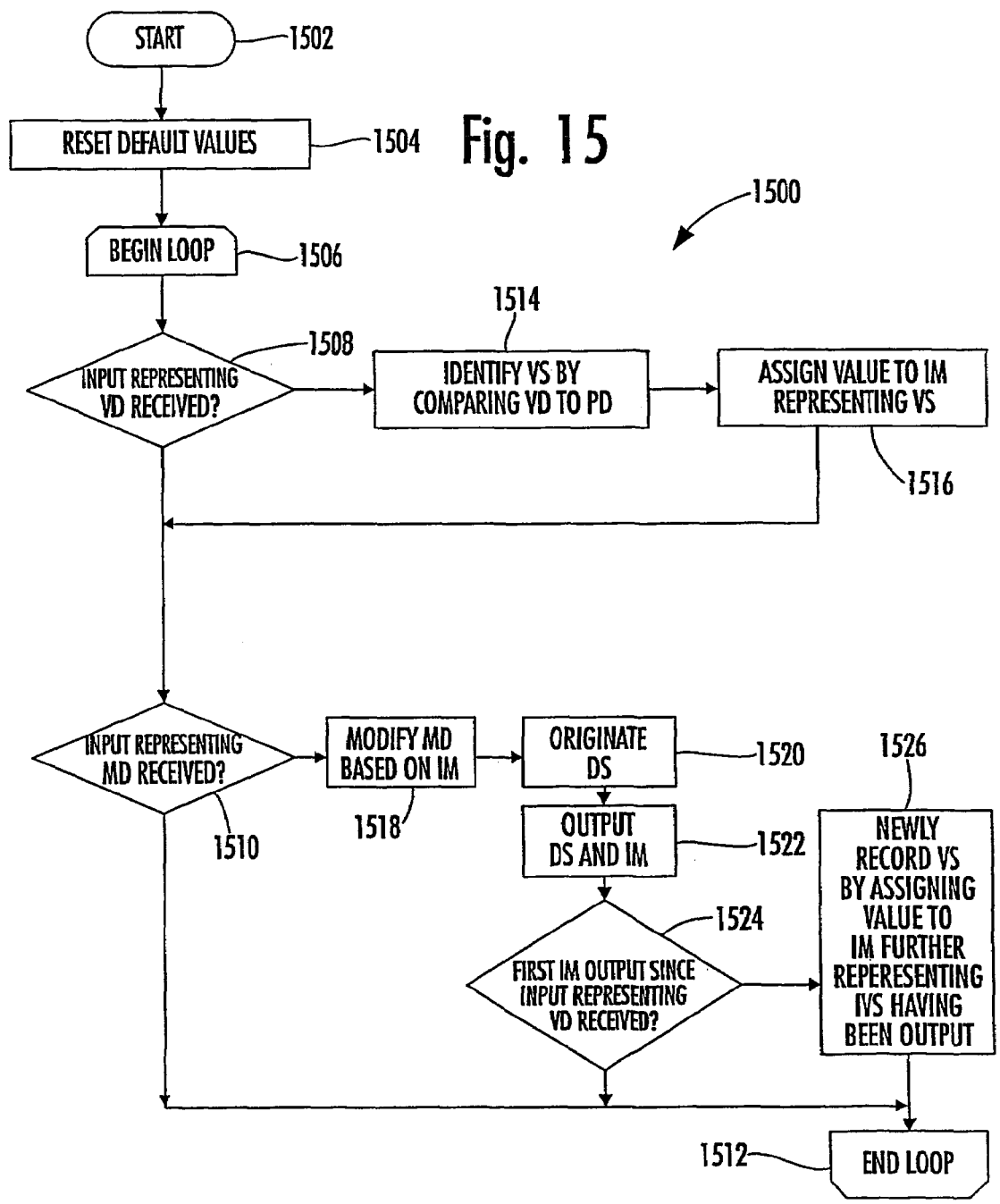
FIG. 15 illustrates a preferred mode of operation of the device of FIGS. 14a, 14b, and 14c.

A preferred mode 1500 of operation of the device of FIGS. 14*a,* 14*b,* and 14*c* is illustrated in FIG. 15 and begins with a resetting Step 1504 of the device following a timeout or powering on of the device at 1502. During the reset, the identification marker is assigned a value corresponding to a verification status representing the receipt of no input of verification data and further representing the fact that that no indicator has yet been output. The device then enters a repeating loop that begins at 1506 and ends at 1512 and continues within this loop until the device is reset, is powered off, or deactivates after a predetermined amount of time.

Still referring to FIG. 15, the first step in the loop preferably includes the determination Step 1508 whether any input representing verification data is received by the device. If the determination in Step 1508 is positive, the current verification status (VS) of the device is identified Step 1514 by comparing the verification data (VD) with the data (PD) prestored in the memory of the device. The verification status identified then is recorded by assigning Step 1516 the identification marker stored within the memory of the device equal to the predefined value corresponding to the identified verification status.

If no input representing verification data is received in Step 1508 or after the value of the identification marker is recorded in Step 1516, the next step in the loop preferably includes the determination Step 1510 whether any input representing message data (MD) is received by the device. If the determination in Step 1510 is negative, the loop restarts Step 1506.

If the determination in Step 1510 is positive, the device then modifies Step 1518 the message data based on the identification marker. Next, the device originates Step 1520 a digital signature for the modified message data. The digital signature for the modified message data and the value of the identification marker are then output Step 1522 from the device. Following the output of the digital signature for the modified message and value of the identification marker, the determination is made Step 1524 whether the value of the identification marker output is the first value thereof output since receipt of input representing verification data in Step 1508. The loop restarts Step 1506 if the determination in Step 1524 is negative. If the determination in Step 1524 is positive, then the verification status is newly recorded Step 1526 by assigning a value to the identification marker that represents the verification status identified by the value of the identification marker output in Step 1522, and that further represents the fact that the value of the identification marker has been output. The loop then restarts Step 1506.

8. Eighth Preferred Embodiment (Multiple Verification Data with Indicator and Message Digitally Signed)

Figure 16A:
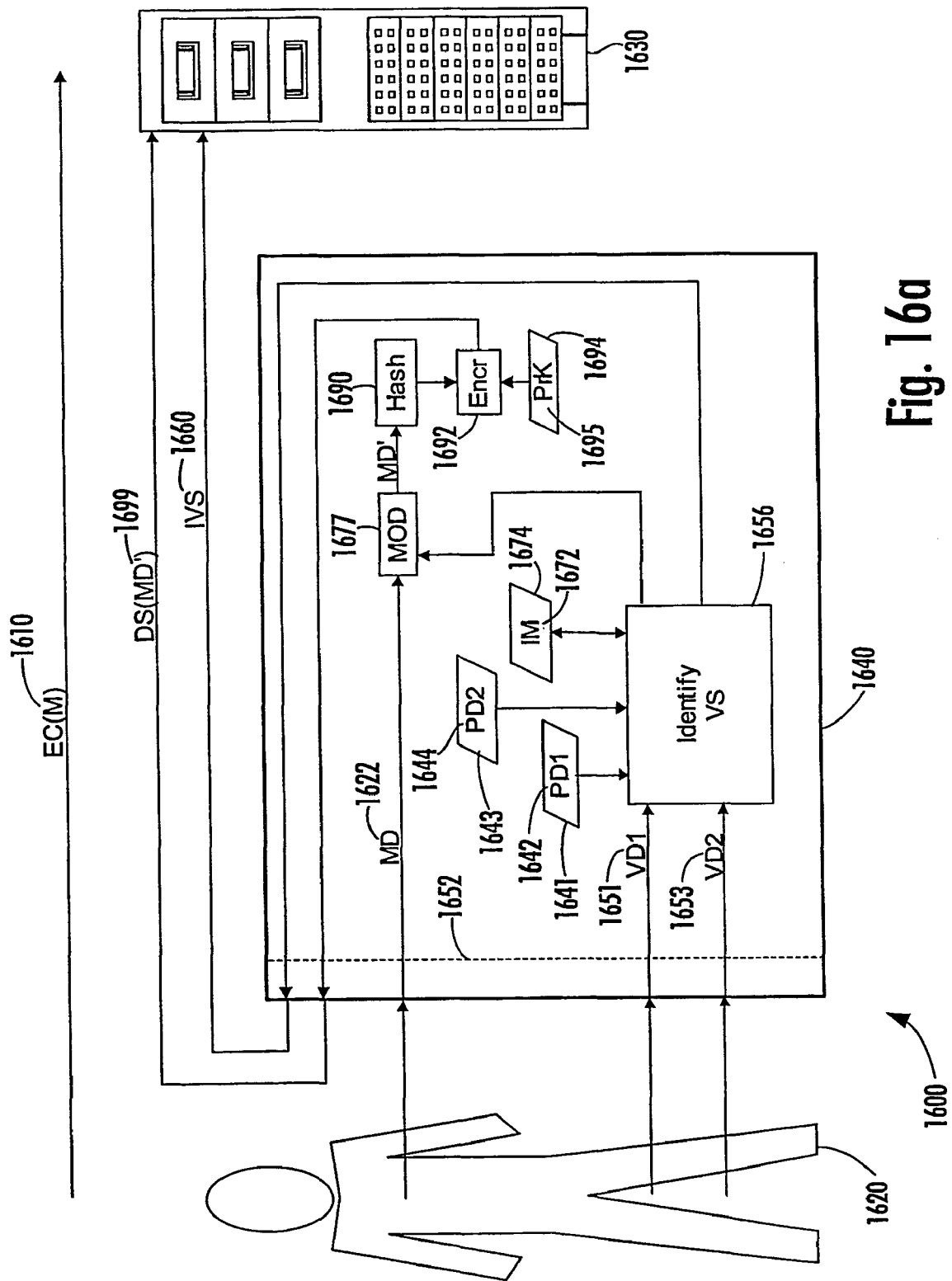
FIG. 16a illustrates an eighth preferred embodiment of the present invention.

An eighth preferred embodiment 1600 of the present invention is illustrated in FIG. 16*a,* wherein an EC 1610 including a message from a sender 1620 is received by a recipient represented by an electronic apparatus 1630, and wherein a device 1640 receives input representing first verification data (VD1) 1651 and input representing second verification data (VD2) 1653 at a device interface 1652. The device interface 1652 includes, as appropriate, one or more of the following: a user interface such as an alphanumeric keypad, a touch screen display, or a biometric scanner for receiving input directly from the sender 1620; an electrical contact; a standard electronic interface with a computer bus; an antenna; or a communications port, such as a serial port, USB port, parallel port, infrared port or other wireless communications port.

The device 1640 includes a verification component therein that maintains data prestored in memory of the device 1640. The first prestored data (PD1) 1642 is located in memory 1641, and the second prestored data (PD2) 1644 is located in memory 1643. The verification component identifies at 1656 a current verification status of the device 1640 based on a comparison of the first verification data 1651 with the first prestored data 1642 and the second verification data 1653 with the second prestored data 1644, and records the latest (i.e., "current") verification status of the device 1640 by assigning a value to an identification marker (IM) 1672 stored in memory 1674.

The device 1640 also receives at the device interface 1652 message data (MD) 1622 representing the message (M) of the EC 1610. The message data 1622 may comprise the message itself, a message digest thereof, or the result of some other processing of the message. The device 1640 includes a digital signature component that, upon receipt of the message data 1622, obtains the value for the identification marker 1672 and modifies the message data at 1677 as a function of this value (as used herein, "function" may include the possible function f(x)=x for a particular value of x). The modification of the message preferably includes the embedding of the value of the identification marker 1672 within the message data, including insertion of the value at a predefined location within, or at the beginning or end of, the message data. As also will be appreciated, the "modification" of the message data for one of the verification statuses may include not modifying the message data.

The digital signature component then originates a digital signature 1699 for the modified message data (MD') by calculating a hash value therefor at 1690 and then encrypting the hash value at 1692 using a private key 1695 of a public-private key pair. For increased reliability and trust, the private key 1695 is retained securely within memory 1694 so that it is never exported from the device 1640 and is not discoverable from outside of the device 1640. The digital signature is originated in accordance with the ECDSA as specified in FIPS PUB 186-2. Accordingly, the digital signature 1699 is generated using a random number generator, and the hash function at 1690 is performed using SHA-1, which generates a 20-byte output regardless of the size of the input received. The digital signature 1699 then is output from the device 1640 together with the value of the identification marker 1672 as the indicator 1660 of the verification status (IVS) of the device 1640 for transmitting to the recipient. The digital signature 1699 and the indicator 1660 then are transmitted to the recipient in association with the EC 1610, whereby the recipient is able to identify the indicator 1660 as pertaining to the EC 1610.

The device 1640 includes a set of predefined verification statuses each representing a relational correspondence between the verification data 1651,1653 and the prestored data 1642,1644. Verification statuses of the set further represent whether an indicator 1660 has been output from the device 1640 since the last successful verification based on either or both of the first and second verification data 1651, 1653, or since the last receipt of input representing either or both of the first and second verification data 1651,1653. The set also contains a predefined verification status representing the lack of input of both first and second verification data 1651,1653 since a resetting after a timeout or a powering on of the device 1640. The indicator 1660 output from the device 1640 is based on the last respective comparison of verification data with the prestored data, but only if input representing the respective verification data has been received since the resetting of the device 1640. Otherwise, the indicator 1660 indicates the lack of input for both the first and second verification data 1651,1653 since the resetting of the device 1640.

The electronic apparatus 1630 includes an interface (not shown) capable of receiving the indicator 1660. The electronic apparatus 1630 also includes logic circuitry or software incorporating business logic therein for determining the verification status of the device based on the indicator 1660 and for evaluating the EC 1610 received from the sender 1620 based on the determined verification status. In this regard, the electronic apparatus 1630 decrypts the digital signature with the public key, which corresponds to the private key 1695 and which may be received in association with the digital signature 1699 or known or obtained beforehand by the recipient. The recipient also modifies—and then calculates a hash value for—the message based on the verification status identified by the indicator 1660. In calculating a hash value for comparison, the electronic apparatus 1630 also performs any necessary processing to the message in order to produce the message data that was modified within the device 1640. When the hash value calculated by the recipient equals the hash value of the decrypted digital signature, the recipient confirms the authenticity of the current verification status of the device 1640 as indicated by the indicator 1660 as well as confirms the authenticity of the message of the EC 1610.

When either of the first or second verification data 1651, 1653—and the prestored data therefor—comprise a Secret, the predefined set of results for the comparison for such includes four possible outcomes, comprising: a first outcome representing the lack of verification data since a resetting of the device 1640; a second outcome representing a match between the verification data and the prestored data, and further representing no other indicator 1660 being output from the device 1640 since the match; a third outcome representing a failed match between the verification data and the prestored data; and a fourth outcome representing a match between the verification data and the prestored data, and further representing the output of an indicator 1660 since the match.

When either of the first or second verification data 1651, 1653—and the prestored data therefor—represent a biometric characteristic, the predefined set of results for the comparison for such produces a result preferably out of a predefined number of possible outcomes. Each outcome represents a possible percentage of match—or degree of difference—between the verification data and prestored data that is allowed, together with a verification status representing the lack of input for verification data since a resetting of the device 1640. For example, the predefined outcomes comprising the percentage match of the verification data with the prestored data may comprise the set of percentages ranging from 0% to 100% in increments of 1%. Preferably each one of the outcomes representing a percentage match also further represents whether an indicator 1660 has been output from the device 1640 since the last receipt of input representing verification data.

The identification marker 1672 is stored in memory 1674 and comprises a value representing one of the set of predefined verification statuses of the device 1640. The set of predefined verification statuses preferably comprises all of the possible combinations of outcomes from the respective comparisons for the first and second verification data 1651, 1653. Of course, the correspondence of the possible values for the identification marker 1672 with the predefined verification statuses of the device 1640 should be previously known by the recipient. Moreover, none of the verification statuses actually reveal any of the verification data 1651,1653 or the prestored data 1642,1644; thus, no "shared secret" is required between the sender 1620 and the recipient, and no biometric value representing the sender's irreplaceable biometric characteristic is communicated to the recipient. However, the recipient can infer from the verification status both the correct knowledge of the Secret and the presence of the sender from the reading of the biometric characteristic.

Figure 16B:
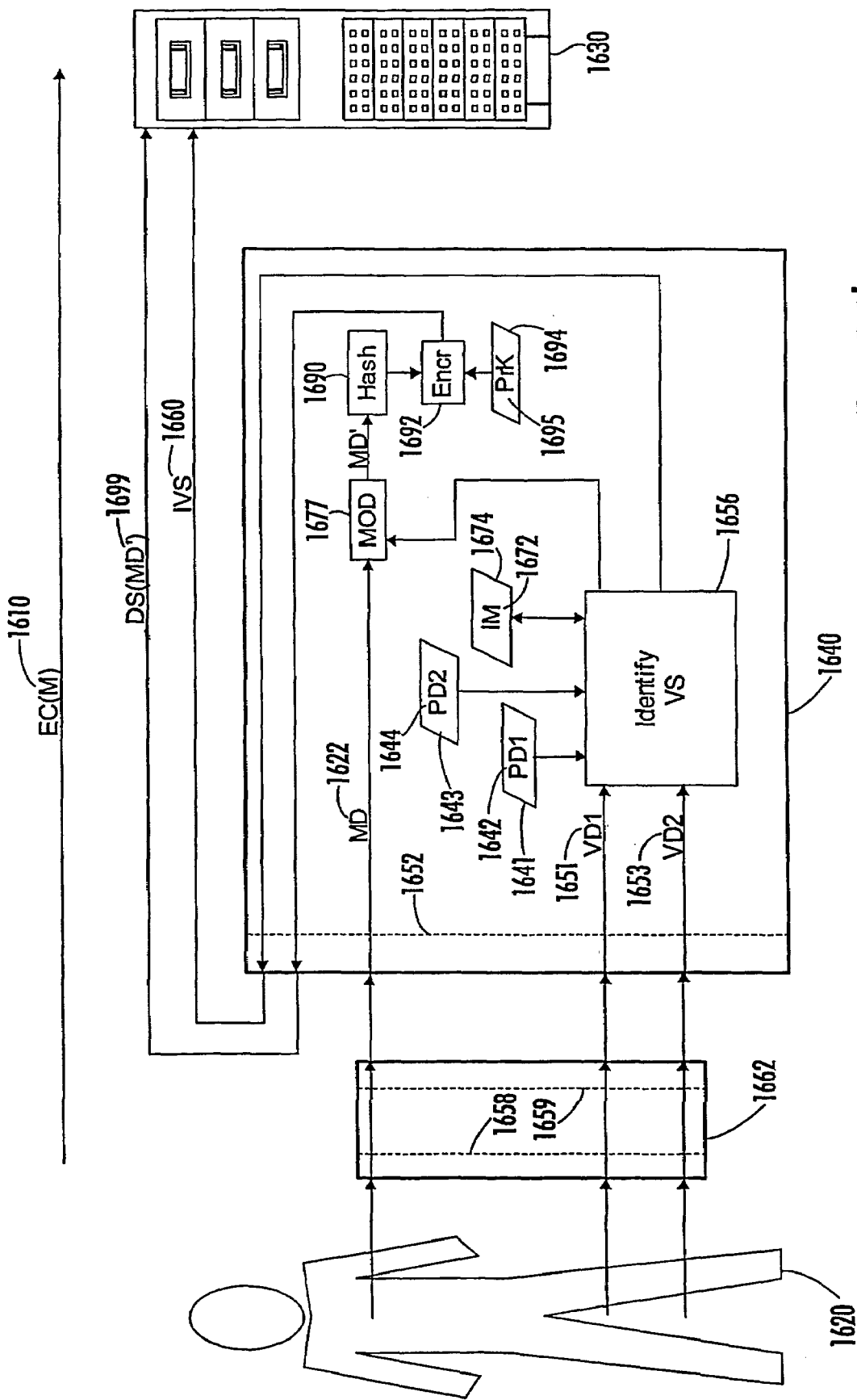

A variation based on the eighth preferred embodiment 1600 of FIG. 16a is shown in FIG. 16b, and includes an I/O support element 1662 from which input representing the first and second verification data 1651,1653 and input representing the message data 1622 is received by the device 1640. The I/O support element 1662 includes a user interface 1658 from which input from the sender 1620 is received and an I/O interface 1659 that communicates the input representing the first and second verification data 1651,1653 and input representing the message data 1622 to the device 1640.

Figure 16C:
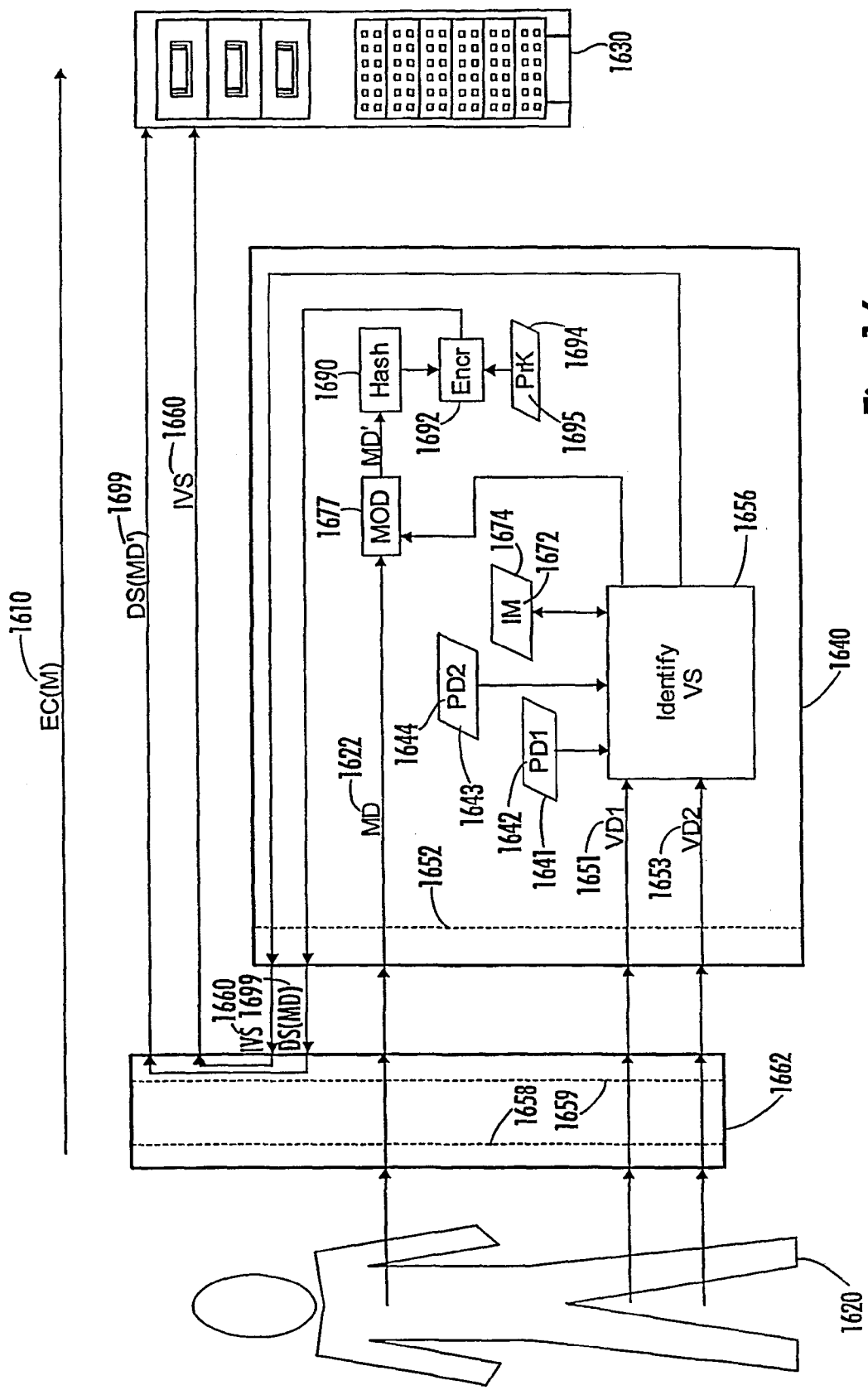

Although the message data 1622 is shown coming from the I/O support element 1662, it is possible for some or all of the message data 1622 to originate with the device 1640 or another apparatus (not shown). Yet an additional variation thereof is shown in FIG. 16c, wherein the I/O support element 1662 receives the indicator 1660 and digital signature 1699 output from the device 1640. The I/O support element 1662, in turn, transmits the indicator 1660 and the digital signature 1699 to the electronic apparatus 1630.

As shown, the indicator 1660 and digital signature 1699 transmitted from the I/O support element 1662 are the same as the indicator 1660 and digital signature 1686 output from the device 1640. However, the indicator transmitted from the I/O support element 1662 may be different from the indicator output from the device 1640, so long as the recipient is able to determine both the verification status as indicated by the indicator 1660 output by the device 1640, as well as the bit pattern of the identification marker 1672 based on which the message was modified. For instance, the indicator transmitted from the I/O support element 1662 may indicate not only the verification status of the device 1640, but also a verification status of the I/O support element 1662 when the I/O support element 1662 itself identifies a verification status. Furthermore, the indicator 1660 and digital signature 1699 transmitted from the I/O support element 1662 may be packaged or embedded within another communication—including additional information that is digitally signed by the I/O support element 1662.

Furthermore, in FIGS. 16*a*, 16*b*, and 16*c*, the EC 1610 is shown as being transmitted separate from the indicator 1660 and digital signature 1699. However, in the preferred embodiment of FIG. 16*a* and any variations thereof, the indicator 1660 and digital signature 1699 equally may be associated with the EC 1610 by being transmitted as part of the EC 1610. Furthermore, the EC 1610 may be output from the device 1640, an associated I/O support element 1662 (not shown in FIG. 16*a*), or other apparatus.

A preferred mode 1700 of operation of the device of FIGS. 16*a*, 16*b*, and 16*c* is illustrated in FIG. 17 and begins with a resetting Step 1704 of the device following a timeout or powering on of the device at 1702. During the reset, the identification marker is assigned a value corresponding to a verification status representing the receipt of no input of any verification data and further representing the fact that that no indicator has yet been output. The device then enters a repeating loop that begins at 1706 and ends at 1714 and continues within this loop until the device is reset, is powered off, or deactivates after a predetermined amount of time.

Still referring to FIG. 17, the first step in the loop preferably includes the determination Step 1708 whether any input representing the first verification data (VD1) is received by the device. If the determination in Step 1708 is positive, the current verification status (VS) of the device is identified Step 1716 by comparing the first verification data (VD1) with the first data (PD1) prestored in the memory of the device. The verification status identified then is recorded by assigning Step 1718 the identification marker stored within the memory of the device equal to the predefined value corresponding to the identified verification status. If no input representing the first verification data is received in Step 1708 or after the value of the identification marker is recorded in Step 1718, the next step in the loop preferably includes the determination Step 1710 whether any input representing the second verification data (VD2) is received by the device. If the determination in Step 1710 is positive, the current verification status (VS) of the device is identified Step 1720 by comparing the second verification data (VD2) with the second data (PD2) prestored in the memory of the device. The verification status identified then is recorded by assigning Step 1722 the identification marker stored within the memory of the device equal to the predefined value corresponding to the identified verification status.

If no input representing the second verification data is received in Step 1710 or after the value of the identification marker is recorded in Step 1722, the next step in the loop preferably includes the determination Step 1712 whether any input representing message data (MD) is received by the device. If the determination in Step 1712 is negative, the loop restarts Step 1706.

If the determination in Step 1712 is positive, the device then modifies Step 1724 the message data based on the identification marker. Next, the device originates Step 1726 a digital signature for the modified message data. The digital signature for the modified message data and the value of the identification marker are then output Step 1728 from the device. Following the output of the digital signature for the modified message and value of the identification marker, the determination is made Step 1730 whether the value of the identification marker output is the first value thereof output since receipt of input representing the first verification data in Step 1708.

If the determination in Step 1730 is positive, then the verification status is newly recorded Step 1734 by assigning a value to the identification marker that represents the verification status identified by the value of the identification marker output in Step 1728, and that further represents the fact that the value of the identification marker has been output. If the determination in Step 1730 is negative or after the value of the identification marker is newly recorded in Step 1734, the next step in the loop preferably includes the determination Step 1732 whether the value of the identification marker output is the first value thereof output since receipt of input representing the second verification data in Step 1710.

If the determination in Step 1732 is positive, then the verification status is newly recorded Step 1736 by assigning a value to the identification marker that represents the verification status identified by the value of the identification marker output in Step 1728, and that further represents the fact that the value of the identification marker has been output. If the determination in Step 1732 is negative or after the value of the identification marker is newly recorded in Step 1736, the loop then restarts Step 1706.

9. Ninth Preferred Embodiment (Multiple Verification Data with Digital Signature as Indicator)

Figure 18A:
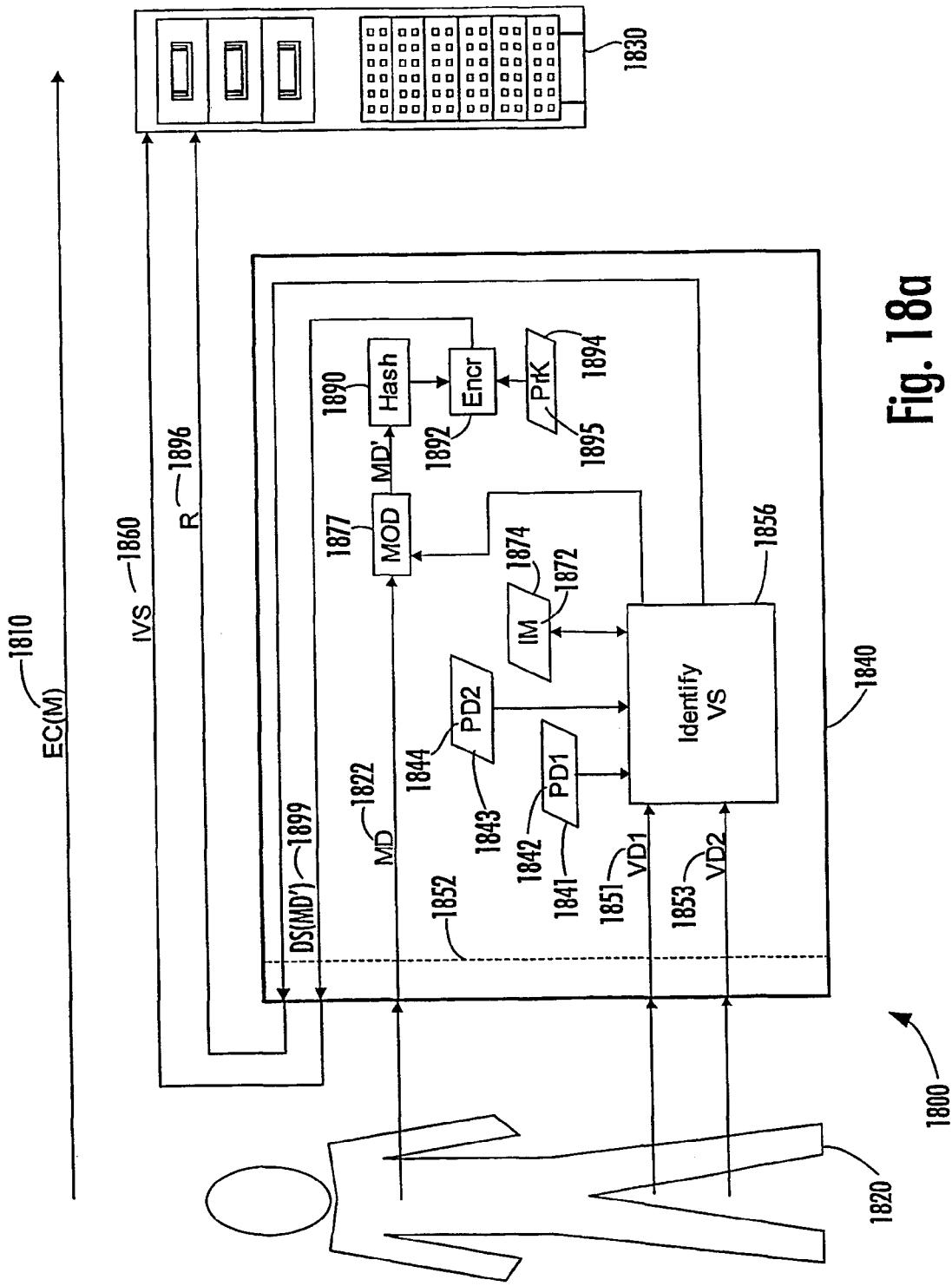
FIG. 18a illustrates a ninth preferred embodiment of the present invention.

A ninth preferred embodiment 1800 of the present invention is illustrated in FIG. 18*a*, wherein an EC 1810 including a message from a sender 1820 is received by a recipient represented by an electronic apparatus 1830, and wherein a device 1840 receives input representing first verification data (VD1) 1851 and input representing second verification data (VD2) 1853 at a device interface 1852. The device interface 1852 includes, as appropriate, one or more of the following: a user interface such as an alphanumeric keypad, a touch screen display, or a biometric scanner for receiving input directly from the sender 1820; an electrical contact; a standard electronic interface with a computer bus; an antenna; or a communications port, such as a serial port, USB port, parallel port, infrared port or other wireless communications port.

The device 1840 includes a verification component therein that maintains data prestored in memory of the device 1840. The first prestored data (PD1) 1842 is located in memory 1841, and the second prestored data (PD2) 1844 is located in memory 1843. The verification component identifies at 1856 a current verification status of the device 1840 based on a comparison of the first verification data 1851 with the first prestored data 1842 and the second verification data 1853 with the second prestored data 1844, and records the latest (i.e., "current") verification status of the device 1840 by assigning a value to an identification marker (IM) 1872 stored in memory 1874. In this case wherein comparisons of more than one input of verification data is made, the identification marker 1872 comprises a value assigned to a first comparison marker representing the result of the first comparison and a value assigned to a second comparison marker representing the result of the second comparison.

The device 1840 also receives at the device interface 1852 message data (MD) 1822 representing the message (M) of the EC 1810. The message data 1822 may comprise the message itself, a message digest thereof, or the product of some other processing of the message. The device 1840 includes a digital signature component that, upon receipt of the message data 1822, obtains the value for the identification marker 1872 and modifies the message data at 1877 as a function of this value (as used herein, "function" may include the possible function f(x)=x for a particular value of x). The modification of the message preferably includes the embedding of the value of the identification marker 1872 within the message data, including insertion of the value at a predefined location within, or at the beginning or end of, the message data. As also will be appreciated, the "modification" of the message data for one of the verification statuses may include not modifying the message data.

The digital signature component then originates a digital signature 1899 for the modified message data (MD') by calculating a hash value therefor at 1890 and then encrypting the hash value at 1892 using a private key 1895 of a public-private key pair. For increased reliability and trust, the private key 1895 is retained securely within memory 1894 so that it is never exported from the device 1840 and is not discoverable from outside of the device 1840. The digital signature is originated in accordance with the ECDSA as specified in FIPS PUB 186-2. Accordingly, the digital signature 1899 is generated using a random number generator, and the hash function at 1890 is performed using SHA-1, which generates a 20-byte output regardless of the size of the input received. The digital signature 1899 then is output from the device 1840 as the indicator 1860 of the verification status (IVS) of the device 1840 for transmitting to the recipient. The digital signature 1899 output from the device 1840 actually comprises the indicator of the verification status (IVS) 1860 as a consequence of the modification process. The current outcome of the first comparison (results of VD1 and PD1 comparison) is also output as a result (R) 1896. The indicator 1860 and result 1896 then are transmitted to the recipient in association with the EC 1810, whereby the recipient is able to identify the indicator 1860 and result 1896 as pertaining to the EC 1810.

The device 1840 includes a set of predefined verification statuses each representing a relational correspondence between the verification data 1851,1853 and the prestored data 1842,1844. Verification statuses of the set further represent whether an indicator 1860 has been output from the device 1840 since the last successful verification based on either or both of the first and second verification data 1851, 1853, or since the last receipt of input representing either or both of the first and second verification data 1851,1853. The set also contains a predefined verification status representing the lack of input of both first and second verification data 1851,1853 since a resetting after a timeout or a powering on of the device 1840. The indicator 1860 output from the device 1840 is based on the last respective comparisons of verification data with the prestored data, but only if input representing verification data has been received since the resetting of the device 1840. Otherwise, the indicator 1860 indicates the lack of input for both the first and second verification data 1851, 1853 since the resetting of the device 1840.

The electronic apparatus 1830 includes an interface (not shown) capable of receiving the indicator 1860. The electronic apparatus 1830 also includes logic circuitry or software incorporating business logic therein for determining the verification status of the device based on the indicator 1860 and for evaluating the EC 1810 received from the sender 1820 based on the determined verification status. In this regard, the electronic apparatus 1830 decrypts the digital signature with the public key, which corresponds to the private key 1895 and which may be received in association with the digital signature 1899 or known or obtained beforehand by the recipient. The recipient also modifies—and then calculates a hash value for—the message based on the result 1896 and for each possible outcome of the second comparison until the calculated hash value equals the hash value of the decrypted digital signature. In calculating a hash value for comparison, the electronic apparatus 1830 also performs any necessary processing to the message in order to produce the message data that was modified within the device 1840. When the hash value calculated by the recipient equals the hash value of the decrypted digital signature, the recipient thereby determines the current verification status of the device 1840. This determination also confirms the authenticity of the message of the EC 1810. Furthermore, in order to minimize consumption of resources, the second set of outcomes for the second comparison (VD2 with PD2) is predefined to contain only a limited number of outcomes. For instance, the first verification data and prestored data therefor preferably represent a biometric characteristic, and the second verification data and prestored data therefor preferably represent a Secret.

When either of the first or second verification data 1851, 1853—and the prestored data therefor—comprise a Secret, the predefined set of outcomes for the comparison for such includes four possible outcomes, comprising: a first outcome representing the lack of verification data since a resetting of the device 1840; a second outcome representing a match between the verification data and the prestored data, and further representing no other indicator 1860 being output from the device 1840 since the match; a third outcome representing a failed match between the verification data and the prestored data; and a fourth outcome representing a match between the verification data and the prestored data, and further representing the output of an indicator 1860 since the match.

When either of the first or second verification data 1851, 1853—and the prestored data therefor—represent a biometric characteristic, the predefined set of outcomes for the comparison for such produces a result preferably out of a predefined number of possible outcomes. Each outcome represents a possible percentage of match—or degree of difference—between the verification data and prestored data that is allowed, together with a verification status representing the lack of input for verification data since a resetting of the device 1840. For example, the predefined outcomes comprising the percentage match of the verification data with the prestored data may comprise the set of percentages ranging from 0% to 100% in increments of 1%. Preferably each one of the outcomes represents a percentage match also further represents whether an indicator 1860 has been output from the device 1840 since the last receipt of input representing verification data.

The identification marker 1872 is stored in memory 1874 and comprises a value representing one of the set of predefined verification statuses of the device 1840. The set of predefined verification statuses preferably comprises all of the possible combinations of outcomes from the respective comparisons for the first and second verification data 1851, 1853. Of course, the correspondence of the possible values for the identification marker 1872 with the predefined verification statuses of the device 1840 should be previously known by the recipient. Moreover, none of the verification statuses actually reveal any of the verification data 1851,1853 or the prestored data 1842,1844; thus, no "shared secret" is required between the sender 1820 and the recipient, and no biometric value representing the sender's irreplaceable biometric characteristic is communicated to the recipient. However, the recipient can infer from the verification status both the correct knowledge of the Secret and the presence of the sender.

Figure 18B:
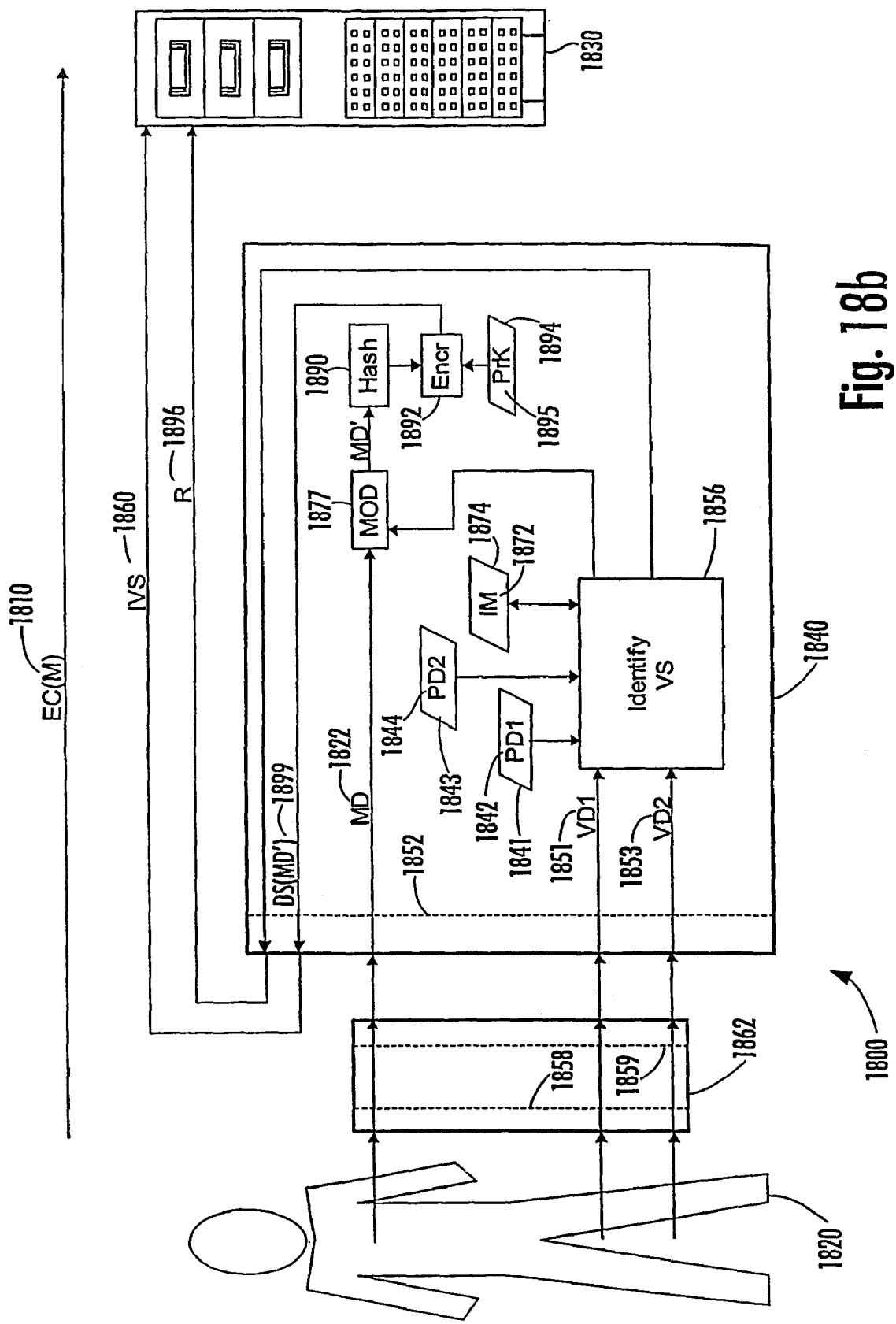
Figure 18C:
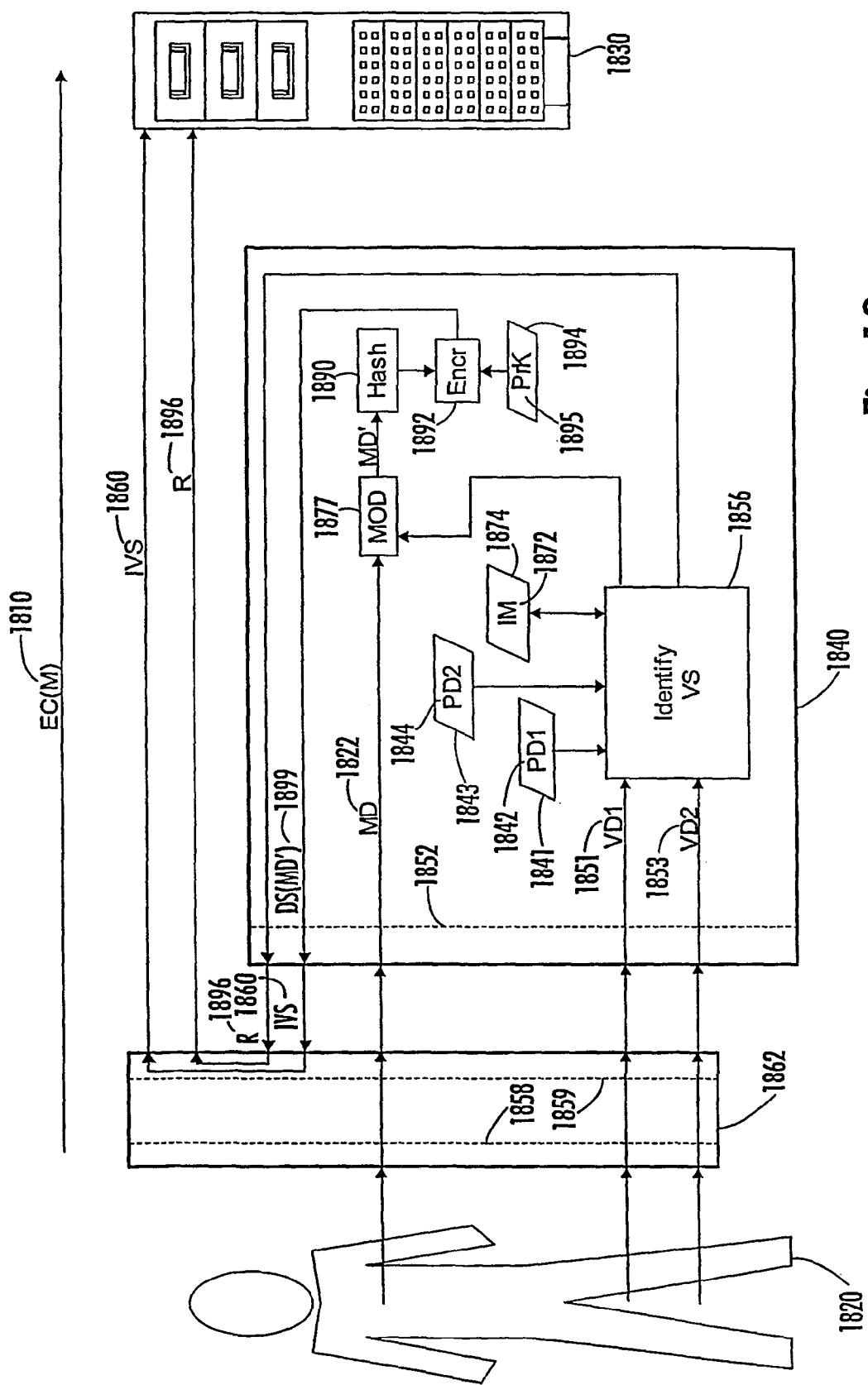

A variation based on the ninth preferred embodiment 1800 of FIG. 18*a* is shown in FIG. 18*b*, and includes an I/O support element 1862 from which input representing the first and second verification data 1851,1853 and input representing the message data 1822 is received by the device 1840. The I/O support element 1862 includes a user interface 1858 from which input from the sender 1820 is received and an I/O interface 1859 that communicates the input representing the first and second verification data 1851,1853 and input representing the message data 1822 to the device 1840. Although the message data 1822 is shown coming from the I/O support element 1862, it is possible for some or all of the message data 1822 to originate with the device 1840 or another apparatus (not shown). Yet an additional variation thereof is shown in FIG. 18*c*, wherein the I/O support element 1862 receives the indicator 1860 and the result 1896 output from the device 1840. The I/O support element 1862, in turn, transmits the indicator 1860 and the result 1896 to the electronic apparatus 1830.

As shown, the indicator 1860 and result 1896 transmitted from the I/O support element 1862 are the same as the indicator 1860 and result 1896 output from the device 1840. However, the result transmitted from the I/O support element 1862 may be different from the result output from the device 1840, so long as the recipient is able to determine the bit pattern of the result 1872 based in part on which the message was modified. For instance, the result transmitted from the I/O support element 1862 may indicate not only the result of the comparison of the first verification data input into the device 1840, but also a verification status of the I/O support element 1862 when the I/O support element 1862 itself identifies a verification status. Furthermore, the indicator 1860 and result 1896 transmitted from the I/O support element 1862 may be packaged or embedded within another communication—including additional information that is digitally signed by the I/O support element 1862.

Furthermore, in FIGS. 18*a*, 18*b*, and 18*c*, the EC 1810 is shown as being transmitted separate from the indicator 1860 and result 1896. However, in the preferred embodiment of FIG. 18*a* and any variations thereof, the indicator 1860 and result 1896 equally may be associated with the EC 1810 by being transmitted as part of the EC 1810. Furthermore, the EC 1810 may be output from the device 1840, an associated I/O support element 1862 (not shown in FIG. 18*a*), or other apparatus.

Figure 19:
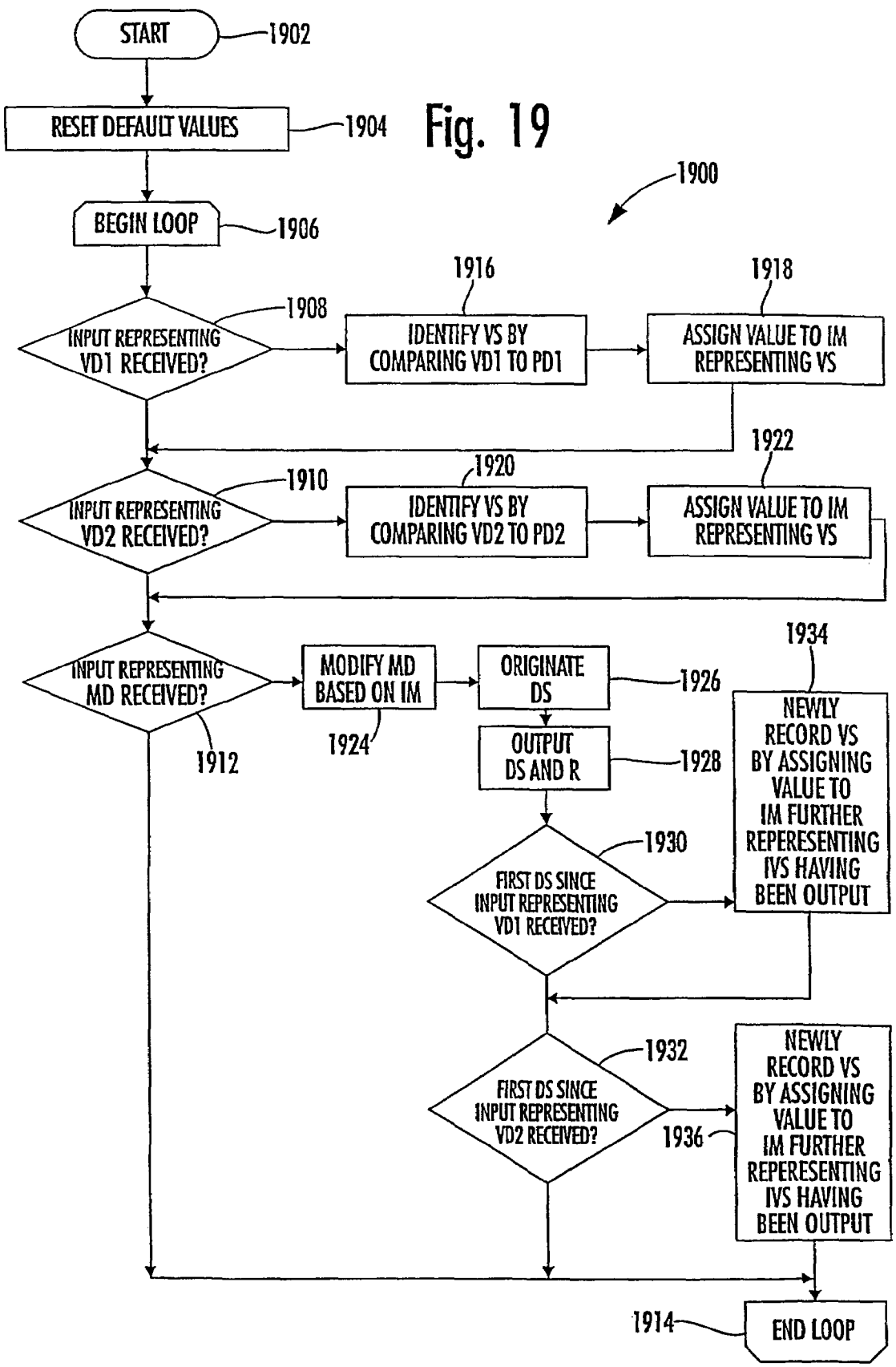
FIG. 19 illustrates a preferred mode of operation of the device of FIGS. 18a, 18b, and 18c.

A preferred mode 1900 of operation of the device of FIGS. 18*a*, 18*b*, and 18*c* is illustrated in FIG. 19 and begins with a resetting Step 1904 of the device following a timeout or powering on of the device at 1902. During the reset, the identification marker is assigned a value corresponding to a verification status representing the receipt of no input of any verification data and further representing the fact that that no indicator has yet been output. The device then enters a repeating loop that begins at 1906 and ends at 1914 and continues within this loop until the device is reset, is powered off, or deactivates after a predetermined amount of time.

Still referring to FIG. 19, the first step in the loop preferably includes the determination Step 1908 whether any input representing the first verification data (VD1) is received by the device. If the determination in Step 1908 is positive, the current verification status (VS) of the device is identified Step 1916 by comparing the first verification data (VD1) with the first data (PD1) prestored in the memory of the device. The verification status identified then is recorded by assigning Step 1918 the identification marker stored within the memory of the device equal to the predefined value corresponding to the identified verification status. If no input representing the first verification data is received in Step 1908 or after the value of the identification marker is recorded in Step 1918, the next step in the loop preferably includes the determination Step 1910 whether any input representing the first verification data (VD1) is received by the device. If the determination in Step 1910 is positive, the current verification status (VS) of the device is identified Step 1920 by comparing the second verification data (VD2) with the second data (PD2) prestored in the memory of the device. The verification status identified then is recorded by assigning Step 1922 the identification marker stored within the memory of the device equal to the predefined value corresponding to the identified verification status.

If no input representing the second verification data is received in Step 1910 or after the value of the identification marker is recorded in Step 1922, the next step in the loop preferably includes the determination Step 1912 whether any input representing message data (MD) is received by the device. If the determination in Step 1912 is negative, the loop restarts Step 1906.

If the determination in Step 1912 is positive, the device then modifies Step 1924 the message data based on the identification marker. Next, the device originates Step 1926 a digital signature for the modified message data. The digital signature for the modified message data and the value of the result for the first comparison are then output Step 1928 from the device. Following the output of the digital signature for the modified message and value of the result of the first comparison, the determination is made Step 1930 whether the digital signature is the first output since receipt of input representing the first verification data in Step 1908. If the determination in Step 1930 is positive, then the verification status is newly recorded Step 1934 by assigning a value to the identification marker that represents the verification status identified by the digital signature marker output in Step 1928, and that further represents the fact that the digital signature has been output.

If the determination in Step 1930 is negative or after the value of the identification marker is newly recorded in Step 1934, the next step in the loop preferably includes the determination Step 1932 whether the digital signature is the first output since receipt of input representing the second verification data in Step 1910. If the determination in Step 1932 is positive, then the verification status is newly recorded Step 1936 by assigning a value to the identification marker that represents the verification status identified by the digital signature output in Step 1928, and that further represents the fact that the digital signature has been output. If the determination in Step 1932 is negative or after the value of the identification marker is newly recorded in Step 1936, the loop then restarts Step 1906.

C. Data Formats, Embodiments and Implementations of the Present Invention

In accordance with all of the aspects of the present invention, the device comprises hardware, software and/or firmware and, specifically, comprises a computer chip, an integrated circuit, a computer-readable medium having suitable software therein, or a combination thereof. The device further may comprise a physical object such as a hardware token or an embedded token, the token containing such a computer chip, integrated circuitry, software, or combination thereof. If the device is a hardware token, it preferably takes the form of a ring or other jewelry; a dongle; an electronic key; a card, such as an IC card, smart card, debit card, credit card, ID badge, security badge, parking card, or transit card; or the like. If the device is an embedded token, it preferably takes the form of a cell phone; a telephone; a television; a personal digital assistant (PDA); a watch; a computer; computer hardware; or the like. The device preferably includes a device interface comprising a port—including a wireless communications port, a serial port, a USB port, a parallel port, or an infrared port—or some other physical interface for communicating with at least an external electronic apparatus, whether contact or contactless. The device also may include a trusted platform module (TPM) comprising hardware and software components providing increased trust in a platform, as set forth and described in the TCPA Documents cited above. Some of the above devices require use of an I/O support element to enable the device to receive message data or verification data. Some of the devices require an I/O support element to receive specific types of verification data but not others. Some of the devices require use of an I/O support element to transmit information regarding verification statuses, digital signatures, and messages to recipients of the ECs. Some of the devices are self-contained, which means that they can generate and transmit messages, digital signatures, and indicators of verification status without the use of external apparatuses; some devices, although self-contained, are capable of interacting with such external apparatuses, such as an I/O support element, if desired. An I/O support element may take the form of any number of different apparatuses, depending upon the particular application in which it is used and depending upon the type of device with which it interacts.

For higher security applications, the device—or the device in combination with an I/O support element—preferably includes the following components: a keypad (alphanumeric), interactive display, or other type of user data entry mechanism (collectively referred to herein as "User Interface") that allows the sender of an EC to compose or modify a message; a User Interface for inputting Secret verification data (it should be noted that the User Interface for generating or modifying a message may, but does not have to, be the same as the User Interface for the entry of the Secret verification data); a display for showing the message and/or Secret to the sender of the EC using the device; a scanner or reader for receiving at least one type of biometric verification data; memory for securely storing the Secret(s), prestored biometric data, and the private key (PrK); a processor or circuitry for performing the various comparisons and for identifying a verification status of the device; a processor or circuitry for generating or originating digital signatures; and a means for outputting information from the device and transmitting it to the electronic apparatus. Preferably, the device also includes memory for storing and exporting the public key (PuK) associated with the particular private key (PrK), and for storing additional user information such as account information, user ID's, and the like. For lower security applications, not all of the above elements are necessary.

To this point, the discussion of the present invention has focused on the flow of data into and out of the device and the manipulation of such data performed by components within the device or in communication with the device. This section provides further detail regarding, for example, preferred database formats and exemplary data values and structures for verification data, prestored data, verification statuses, and identification markers and indicators of verification status. This section also illustrates preferred methodologies for identifying verification statuses when verification data represents a Secret, biometric characteristic, or a combination of both. Additionally, this section illustrates the functional aspects of a preferred computer chip that may be used as the device or as part of a device of the present invention. Finally, this section provides several specific implementations of a device—in this case an IC card—adapted for use in accordance with the present invention.

1. Prestored Data, Verification Data, and Indicators of Verification Status
   a. Record Formats for Prestored Data As shown in FIGS. 20*a*, 20*b*, and 20*c*, the prestored data of an authorized user of a device (generally referred to as PD) may be maintained in suitable records 2000*a*, 2000*b*, and 2000*c*, respectively, within a database of the device. As shown in FIG. 20*a*, for simple applications in which the device is adapted to receive and process only a Secret, such as a PIN 2003, record 2000*a* would simply contain the "value" 2005 for the Secret Prestored Data (SPD) 2042 (or referred to generically as PD 2070). As shown in FIG. 20*b*, for slightly more complex applications in which the device is adapted to receive and process only one specified type 2002 of biometric data 2007, record 2000*b* would simply contain the "value" 2009 for the applicable Biometric Prestored Data (BPD) 2044 (also referred to generically as PD 2070).

As shown in FIG. 20*c*, for other applications in which the device is adapted to receive and process more than one specified type of verification data, the record 2000*c* includes a list of the possible verification data types 2002 representing both a Secret and a biometric characteristic. Each type 2002 of verification data (whether Secret or biometric) has associated therewith a corresponding pre-set identifier 2004 and a corresponding unique value 2006 comprising the prestored data 2070 therefor. The specific identifiers 2004 associated with particular data types 2002, as shown in FIG. 20*c*, are arbitrary and may be formatted or established to conform with any industry standard or convention now or hereinafter developed (such as, for example, the standards set forth in *Biometric Information Management and Security for the Financial Services Industry*, Document Number X9.84-2000 WD, American National Standards Institute, 2000, which is incorporated herein by reference and which is available for download at http://webstore.ansi.org). Further, the list of types 2002 of data shown in FIG. 20*c*, is only intended to be exemplary and, in practice, record 2000*c* may include more, less, or different specific types 2002 of data.

In addition, although the types 2002 of data are shown in records 2000*a*, 2000*b*, and 2000*c* for ease of reference and explanation, it is not necessary that the information that appears in the column showing the types 2002 actually be maintained in these records if the relationship between each data type 2002 and its corresponding identifier 2004 is otherwise known. Except for the prestored data (values 2005, 2008) for the PINs, which is conventionally includes a 4-10 digit alphanumeric string, the values 2009,2010 associated with each type 2002 of biometric data will generally be a numeric value corresponding to a digital representation of an authorized user's biometric characteristic. For example, the current F.B.I. standard for electronic fingerprint scans is "40 point minutiae." Such a value may be obtained by an appropriate and conventional biometric scanner capable of scanning and converting such scan into a digital representation of the particular biometric data type 2002. Generally, for any particular biometric data type 2002, it is preferably that the same standard, scale, or convention be used at both the personalization stage of the device, when such data is input into the device for the purpose of creating the prestored data, as well as each time verification data is later input into the device for the purpose of identifying a verification status. If no data has been prestored for comparison with a particular type 2002 of data, then the corresponding value 2012 for that data type 2002 is set to zero, null, or comparable equivalent value.

b. Verification Data Formats Input into the Device

As shown in FIG. 21*a,* for simple applications in which the device is adapted to receive and process only a Secret (again, such as a PIN), it is preferable that the verification data 2150 comprise Secret Verification Data (SVD) 2151 having a value 2102 input by the sender of an EC when using the device. As shown in FIG. 21*b,* for slightly more complex applications in which the device is adapted to receive and process only one specified type of biometric verification data, it is preferable that the verification data 2150 comprise Biometric Verification Data (BVD) 2153 having a value 2104 input in response, to a scan of a biometric characteristic provided by the sender when using the device. Finally, as shown in FIG. 21*c,* for other applications in which the device is adapted to receive and process more than one specified type of verification data, whether Secret or biometric, it is preferable that the verification data 2150 comprise both an identifier 2106 and a corresponding value 2108. The identifier 2106 indicates the type of verification data being input into the device, and, hence, indicates the prestored data the device will need to reference for comparison purposes. Although not shown, it should be understood that instead of using identifiers, it is possible to use software or device commands or instructions in combination with the input of verification data 2150 to notify the device of the particular type of the verification data 2150 being input.

c. Comparison Process and Identification of Verification Status

Referring now to FIGS. 22, 23*a,* 23*b,* and 24, several exemplary processes by which a device compares the verification data with prestored data and thereby identifies the verification status are set forth in greater detail. Again, as shown in FIG. 22, and referring initially to simple applications in which the device is, adapted to receive and process only verification data for a Secret, the device first determines if input representing verification data (e.g. as shown in Step 308 in FIG. 3) has in fact been received and, if so, determines (Step 2202) whether such verification data is for a Secret. If verification data for the Secret is not received, then the device maintains Step 2204 the current verification status (the start-up default value of which is "No PIN entered").

If verification data for a Secret is received, then the device retrieves Step 2206 the corresponding prestored data (SPD), e.g., value 2005 from record 2000*a* in FIG. 20*a*. Next, the device compares Step 2208 the input value with the prestored data value. If the result (Rs) of the comparison is that the values are equal, then the device identifies Step 2210 the verification status as "PIN match." If the result (Rs) of the comparison is that the values are not equal, then the device identifies Step 2212 the verification status as "PIN no match." Furthermore, although FIG. 22 shows the verification statuses in a descriptive format (e.g., "No PIN entered;" "PIN match;" and "PIN no match"), it should be understood that the device, preferably, sets an identification marker (IM) to an arbitrary value that directly maps to a respective verification status which, in this simple example, is also equal to the result of the comparison (Rs). A few possible examples of equivalent identification marker values are illustrated in FIG. 25*a*. Nevertheless, it should be obvious to one skilled in the art that innumerable different types, conventions, or formats for suitable equivalent verification statuses corresponding to those listed in FIG. 25*a* may be chosen within the scope of the present invention. As shown in FIG. 25*a,* a first identification marker comprising a Secret verification result ($Rs_1$)) 2502 is in cardinal number format. A second identification marker comprising a Secret verification result ($Rs_2$) 2504 is in binary format. Additionally, a third identification marker comprising a Secret verification result ($Rs_3$) 2506 that is shown is merely a different character string representation of the verification statuses listed in the first column of FIG. 25*a*. Referring back to FIG. 22, the resulting identification marker values shown in Steps 2210 and 2212 use the second convention described above.

Referring now to FIGS. 23*a* and 23*b,* for slightly more complex applications in which the device is adapted to receive and process only one specified type of biometric verification data, the device first determines Step 2302 that biometric verification data has, in fact, been received. If no biometric verification data has been received, then the device maintains Step 2304 the current verification status (the start-up default value of which is "No BIO input"). If the device has received biometric verification data, then the device retrieves Step 2306 the corresponding prestored data (BVD) (e.g. value 2009 from record 2000*b* in FIG. 20*b*). In biometric data comparisons, unlike in Secret data comparisons, it is preferred that the result (Rb) of the comparison comprise the degree or percentage of match (or difference) between the verification data and the prestored data. Thus, in preferred embodiments, the device identifies Step 2308*a* a verification status by dividing the biometric verification data by the prestored data to obtain a percentage match between the two values and assigning the result (Rb) to the identification marker.

As shown in FIG. 23*b,* the device may alternatively obtain a percentage difference between the two values by calculating Step 2308*b* the absolute value of the difference between the two values and dividing that number by the prestored data, and then assigning the result (Rb) to the identification marker. Several examples of equivalent biometric identification marker values are illustrated in FIG. 26; however, it should be obvious to one skilled in the art that many different types, conventions, or formats for identification marker values showing degree or percentage of match or difference between the biometric verification data and the prestored data (e.g., such as those set forth in FIG. 26) may be chosen within the scope of the present invention. For example, a first identification marker comprising a biometric verification result ($Rb_1$) 2602 is a percentage value (to 2 digits) corresponding to the degree of match or difference between the two values (with the calculated number substituted for the "##"). A second identification marker comprising a biometric verification result ($Rb_2$) 2604 is a decimal value (to 2 digits) corresponding to the degree of match or difference between the two values. A third identification marker comprising biometric verification result ($Rb_3$) 2606 is a character string associated with the corresponding verification status in the first column of the figure.

As has been described previously, in the preferred embodiment, the device outputs an indicator of the verification status based on biometric verification data in the form of a degree (or percentage) of match or degree (or percentage) of difference between the biometric verification data and the prestored data. By providing the verification status in this manner, the electronic apparatus (or recipient) is allowed to determine, based on its own logic or business rules, whether the degree of match obtained and provided by the device meets a required security threshold for a particular business purpose or application. This enables the device to be used easily with different recipients, each with its own threshold requirements for biometric verification data. Alternatively, it should be understood that the device itself could be pre-programmed or pre-hardwired to determine within the device whether the biometric verification data qualifies as a "match" or "no match" with the prestored data relative to an arbitrarily determined threshold—in which case, its identification marker would be similar merely to that for a comparison of verification data for a Secret.

Referring now to FIG. 24, for other applications in which the device is adapted to receive and process Secret and biometric verification data, the device first initiates Step 2402 a loop for the purpose of processing each input for those applications in which more than one type of verification data is received. In the first step within the loop, the device determines Step 2404 whether verification data has been received. If verification data has not been received, then the device maintains Step 2406 the current verification status (which at start-up is "No PIN entered; No BIO entered"). If verification data has been received, then the device retrieves Step 2410 the prestored data (2006 from FIG. 2000c) corresponding with the identifier (2106 from FIG. 21c) for such verification data. As an aside and as stated previously, another embodiment allows a device or computer command sent with the verification data to indicate the type of verification data being input without the use of an identifier 2106 (as shown in FIG. 21c). Next, the device determines Step 2412, based on the identifier (or command input), whether the verification data represents a Secret or a biometric characteristic.

If the verification data represents a Secret, then the device compares Step 2414 the verification data with the corresponding prestored data for such Secret. If the values are equal, then the device identifies Step 2416 the result of the comparison as a "match" and, in this example, sets Rs equal to a value of "01" (using the binary convention from FIG. 25a). The loop then restarts Step 2408. If the values are not equal, then the device identifies Step 2416 the results of the comparison as a "no match" and, in this example, sets Rs equal to a value of "10" (again using the binary convention from FIG. 25a). The loop then restarts at Step 2408. On the other hand, if the device determines that the verification data represents a biometric characteristic, then the device identifies Step 2420 the verification status by comparing the verification data with the corresponding prestored data and calculating a percentage match therebetween. In this regard, the device sets Rb for the particular type of biometric verification data (designated by ###) equal to the value of the percentage match. The loop then restarts at Step 2408. In this example, the value of the identification marker (IM) corresponding with the verification status includes the value for Rs as well as the values for each Rb for each biometric verification type.

Several examples using specific numbers will help explain this process. In the first example, suppose a PIN and one type of biometric verification data, such as a right handprint, is entered into the device by a sender of an EC who is using the device. In this example (using the conventions discussed above with regard to FIGS. 20c and 21c and with regard to column 2504 of FIG. 25a and column 2702 of FIG. 26) a suitable verification status is represented by an identification marker including the following value:

001,10,012,90 (with or without the commas)

This identification marker indicates a verification status in which an incorrect PIN was received and a right handprint having a 90% degree of match was received.

In a second example, suppose three types of biometric verification data (a right thumb, a left thumb, and a right iris scan) are entered. In this second example (again using the same conventions), a suitable verification status is represented by an identification marker including the following value:

002,95,007,93,018,87 (with or without the commas)

This identification marker indicates a verification status in which a right thumbprint bad a 95% match, a left thumbprint had a 93% match, and a right iris scan produced an 87% match.

In an alternate embodiment, after performing the above steps, the device identifies the verification status as an identification marker containing every possible identifier 2004 (or some subset thereof from FIG. 20c) followed by its corresponding Rs or Rb value. Thus, even though an input is not provided for every single type of verification data, the identification marker nevertheless includes all identifiers 2004 and their corresponding Rs and Rb values. For those types for which no input is received, the corresponding value for Rs or Rb is its default value preferably comprising zero or null, or a suitable equivalent. In this third example, a suitable verification status is represented as an identification marker of:

001,01,002,00,003,00,004,0.25,005,00,006,0.96, . . . 024, 0.95

Assuming that the " . . . " merely includes each identifier between 007 and 023 followed by a "00" (i.e., no verification data inputs corresponding with identifiers 007 through 023), the identification marker in this example indicates a verification status in which a correct PIN was input, a right middle fingerprint had a 25% match, a right pinky fingerprint had a 96% match, and a DNA scan had a 95% match. Just for comparison purposes, unlike the previous examples, this example uses the conventions for Rb discussed above with regard to column 2604 of FIG. 26.

In another alternative embodiment, it is possible to eliminate all of the identifiers 2004 from the identification marker if the recipient knows what convention is used by the device, including the sequence of presenting each verification data type within the identification marker value or data stream. For example, using both conventions as described above for all twenty three identifiers (column 2504 of FIG. 25a for the Rs value and column 2602 of FIG. 26 for the Rb values in the first identification marker below, and column 2504 of FIG. 25a for the Rs value and column 2604 of FIG. 26 for the Rs values in the second identification marker below) and assuming that the order of verification data types is the same as the twenty-three identifiers 2004 in FIG. 20c, the identification marker for the above-described verification status could be presented, alternatively, as follows:

0100000.25000.96000000000000000000000000000000000.95 or

010000250096000000000000000000000000000000000095

Each identification marker above identifies a verification status in which a correct PIN was input, a right middle fingerprint had a 25% match, a right pinky fingerprint had a 96% match, and a DNA scan had a 95% match.

2. Associating Specific Sender Approval for EC

It is also possible and advantageous for the device to provide additional information to the recipient of an EC as to whether the verification status of the device is in a "persistent" state or whether the verification status applies specifically to the EC with which the indicator of verification status is associated. Such information can be used by the recipient to determine whether the sender of the EC input the correct Secret for a previous message or whether the correct Secret was input as specific approval or authorization of the transaction or request contained within the EC that is digitally signed. The same advantages apply in the case of a biometric characteristic.

For example, as stated above, for devices configured only to receive verification data for a Secret, such as a PIN, there are three verification statuses, or "states", that can be identified by the identification marker using the format of FIG. 25a: no PIN entered (Rs=00); correct PIN (Rs=01); and incorrect PIN (Rs=10). In accordance with this additional feature of the present invention, an additional "state" is added to these three as shown more fully in FIG. 25b. This additional state represents that a correct PIN was entered, but that since then, an indicator of the verification status was output or a digital signature was generated in association with an EC. This fourth state may be shown using any of the formats previously discussed, including a cardinal number format shown in column 2508 of FIG. 25b; a binary format shown in column 2510 of FIG. 25b; and a character string format shown in column 2512 of FIG. 25b. Using the binary format, the fourth state is identified whenever an indicator is output or a digital signature is generated with the identification marker equaling "01" by setting, thereafter, the identification marker equal to "11".

Alternatively, the device maintains a counter or "digital signature flag" (referred to hereinafter generically as "DSFlag"). In this regard, the DSFlag is initially set to zero and counts to one or more each time an indicator of verification status is output from or a digital signature is generated by the device. Thereafter, the DSFlag remains at one (or continues counting by one) for each indicator output or digital signature generated until verification data again is received by the device, after which the DSFlag is reset to zero. In this case, the value of the DSFlag is incorporated into the value of the identification marker as an additional bit of information. For example, possible values of an identification marker thus include the following, wherein "/" separates the binary value of Rs and the corresponding DSFlag value for purposes of illustration: 00/0 (no PIN input; no IVS or DS output); 00/1 (no PIN input; IVS or DS output); 01/0 (PIN match; no IVS or DS output since PIN match); 01/1 (PIN match; IVS or DS output since PIN match); 10/0 (PI no match; no IVS or DS output); and 10/1 (PIN no match; IVS or DS output).

For a device configured to receive one type of biometric verification data only, the device preferably includes a DSFlag as part of the identification marker in similar manner to the methodology just described. For example, for a device that originates digital signatures and is only capable of receiving and processing one particular type of biometric verification data, the identification marker includes the degree of match as well as the value of the DSFlag. Thus, if the sender of an EC had submitted a thumbprint, which was determined to have a 90% match, and if no digital signature had been generated, a suitable value of the identification marker is "90/0" (with the "/" merely to indicate the separation of the two values), with the value of "90" for Rb indicating the degree of match and the value of "0" for the DSFlag indicating that no digital signature had been generated since last receipt of verification data. Conversely, in the above example, if one or more digital signatures have been generated by the device since the thumbprint scan was submitted to the device, the identification marker would be "90/1" (or in the case of a counter, "90/x" where "x" is any number greater than 0).

For devices capable of receiving multiple types of verification data input (Secret and/or biometric), it is preferable for each comparison result (R) for each type of verification data to have its own DSFlag. In this situation, every time a digital signature is originated, all of the DSFlags are set to one (or otherwise incremented as described above); however, each time additional verification data is received by the device, the DSFlag for that particular type of verification data is set to zero. For transmission of information to the electronic apparatus in this scenario, it is preferred to include the particular identifier, as discussed previously. Using the example from the previous section, a suitable identification marker appears as:

001,01,1,002,00,1,003,00,1,004,0.25,0,005,00,1,006, 0.96,1, . . . 024,0.95,1

This identification marker indicates a verification status in which a correct Secret was input, a right middle fingerprint had a 25% match, a right pinky fingerprint had a 96% match, a DNA scan had a 95% match, and the right middle fingerprint was entered since the last digital signature was generated by the device.

Turning now to FIG. 27, a table illustrates a hypothetical series of actions (primarily inputs of different types of verification data) into a device of the present invention and the resulting change (if any) to the value of the identification marker. In this example, the device maintains a PIN, a digitized value for the right thumbprint (identifier=002) of an authorized user of the device, and a digitized version of the right retina (identifier=016) of an authorized user of the device. In addition, in this example, the identification marker (IM) of the device comprises the Rs value, the Rb(002) value, DSFlag(002) value, Rb(016) value, and DSFlag(016) value. The identification marker uses the two digit binary convention for the value of Rs (i.e., from column 2510 from FIG. 25b), a two-digit percentage match convention for the values of Rb(002) and Rb(016) (from column 2602 from FIG. 26), and binary values for the DSFlag associated with each biometric verification data type. Thus, the DSFlag values are either "0"—indicating no generation of a digital signature or output of an indicator of the verification status since the particular type of biometric verification data was received, or "1"—indicating generation of a digital signature or output of an indicator since the particular type of biometric verification data was received.

A series of thirteen actions is illustrated in sequence in the first column of the table of FIG. 27. The impact of each of these actions upon the device and, more specifically, upon the identification marker of the device, which identifies the current verification status of the device, is shown horizontally across the remaining columns of the table. In the first action, the device is activated, turned on, or otherwise reset. This action causes each of the values that make up the identification marker to reset to their default values of zero, as shown. In the second action, an incorrect PIN is entered, which causes the value of Rs to change to "10." A subsequent correct PIN entry into the device, switches the Rs value to "01." The generation of a digital signature, output of the value of the identification marker, or other output of the verification status of the device causes the value of Rs to switch to "11" and both of the DSFlags to toggle to "1." It should be noted that the value of Rs that was included within the output of the fourth action step was the "01" (from the previous row of the table, which was the "current" value of Rs at the time of the output). As illustrated by the fifth action, a second generation of a digital signature, output of the value of the identification marker, or other output of the verification status of the device has no effect upon the value of identification marker; however, it should be noted that the value of Rs and of the DSFlags will be different from the values that were output during the fourth action.

A correct PIN input as the sixth action sets the value of Rs to "01," but noticeably has no impact on the DSFlags for the right thumbprint and right retina. In the seventh action, a right thumbprint is provided to the device and results in an 85% match with the prestored right thumbprint value. This causes the value of Rb(002) to be set to "85" and the value of DSFlag(002) to be set to "0." In the eighth action, a right retina scan result is provided to the device and results in a 90% match with the prestored value. This causes the value of Rb(016) to be set to "90" and also the value of DSFlag(016) to be set to "0."

Still referring to FIG. 27, the ninth action is a third generation of a digital signature, output of the identification marker, or other output of the verification status of the device including the identification marker that was in effect after the eighth action, which causes Rs to switch to "11" and both of the DSFlags to toggle back to "1." In the tenth action, a second right thumbprint is provided to the device, which results in an 88% match, which changes the value of Rb(002) to "88" and the value of DSFlag(002) to "0." An incorrect PIN entry at this point, in the eleventh action, merely changes the value of Rs to "10." In the twelfth action, the fourth generation of a digital signature, output of the identification marker, or other output of the verification status of the device causes DSFlag(002) to toggle back to "1" but has not effect upon the Rs value or upon the DSFlag(016) value, which is already set to "1." In the thirteenth action, a second right retina provided to the device, which results in an 89% match, changes the value of Rb(016) to "89" and switches the value of DSFlag(016) back to "0." In the fourteenth action (not specifically shown), a reset signal to the device resets all of the values back to those shown after the first action.

Additional features and benefits of the present invention, including those relating to identification markers and indicators of verification status, will become apparent from the following discussions regarding specific devices and implementations of the present invention.

3. Computer Chip Design

Turning now to FIG. 28, a preferred computer chip 50 that may be used in conjunction with an IC card, PDA, cell phone, personal computer, or other device in accordance with the present invention is illustrated. As shown, the computer chip 50 receives power 52, a clock input 54, and a reset or master clear input 56 from an external source 90. The computer chip 50 is also connected to ground 58 and exchanges input and output data 60 through external source 90. The external source 90 may be part of the IC card, PDA, cell phone, personal computer or other device in which the computer chip 50 is installed or it may be part of an I/O support element (not shown) with which the IC card, PDA, cell phone, personal computer, or other device is in communication, as the case may be.

Internally, the computer chip 50 includes an I/O router 62, a central controller 64, a memory location 66 for securely storing a private key of a public-private key pair, a memory location 68 for storing the corresponding public key of the public/private key pair, a dedicated public/private key generator circuit 70, a private key destruction circuit 72, a memory location 65 for storing a default prestored message, a digital signature circuit 71 (which includes a hash function circuit 73, a random number generator 74, and an encryption circuit 75), a memory location 76 for prestoring data (Secret and/or biometric data), a selection multiplexer 78 for retrieving selected prestored data from memory location 76, a memory location 80 for storing various account and other user information, a selection multiplexer 82 for retrieving selected information from memory location 80, a memory location 83 for storing the current verification status (preferably in the form of an identification marker (IM)) of the computer chip 50, which includes the value of Rs (for the Secret) and the values for each Rb (for each biometric verification data type stored within the device 50) and the values for the DSFlags corresponding with the Rs and Rb values), and a selection multiplexer 84 for reading and writing to the memory location 83.

Preferably, the computer chip 50 is designed with the following capabilities: the ability to store data securely and permanently (especially the private key); the ability to create a public-private key pair on the chip on a one-time only basis using a random number produced within the chip from the random number generator 74; and the ability to originate digital signatures, when requested, using a random number produced within the chip from the random number generator 74 in accordance with FIPS PUB 186-2. The computer chip 50 further preferably is resistant to tampering and is immune to Differential Power Attacks and other physical analysis. The prestored data for the Secret preferably also is protected from exhaustive search attacks. One method of "protecting" the private key is by designing the computer chip 50 with the destruct circuit 72, which destroys the private key when triggered by any tampering or attempted theft of the private key by electronic, physical, and other known means. Under such circumstances, the destruct circuit 72 renders the computer chip 50 useless by preventing the computer chip 50 from being able to generate further digital signatures and by destroying the information retained in memory location 66.

Still referring to FIG. 28, the computer chip 50 also includes non-modifiable operating software either loaded into the chip during manufacture or permanently etched into read-only memory (ROM) on the chip 50. Such software enables the computer chip 50 to respond to and act upon a specific set of commands. Such commands enable, for example, the computer chip 50 to be personalized. Personalization includes the input and prestoring of data for a Secret, a biometric characteristic, user name, and account number(s). Preferably, the prestored data for the Secret is capable of being changed, upon successful input of the current Secret verification data. The biometric prestored data, however, preferably is permanent once loaded into memory.

The software further includes a command that causes the key generation circuit 70 to create a unique public-private key pair directly within the computer chip 50 on a one-time only basis. As stated previously, the private key is stored securely in memory location 66. The public key is stored in memory location 68. The software includes a command that enables the public key to be exported from the computer chip 50. The command to export the public key may be executable multiple times or one time only, depending upon whether strict control over access to the public key is desired. The software also includes a command that notifies the computer chip 50 that verification data is being input. Optionally, separate commands (or separate information included with the command)

are used to indicate whether the verification data being input is for a Secret or a biometric characteristic and, if for a biometric characteristic, the biometric type. Preferably, the computer chip 50 also automatically identifies a verification status whenever it receives verification data.

The software further includes a command that notifies the computer chip 50 that message data is being input. In many situations, it is necessary or desirable for the message data input or provided to the computer chip 50 to incorporate specific account information or other user data maintained in memory location 80 on the computer chip 50. There are generally two techniques for extracting such information from memory location 80 and including it within the message data sent to the computer chip 50.

In the first technique, all of the account and other user information is extracted from the computer chip 50 and the user is prompted through a display to select the appropriate account or user information to be included as part of the message to be digitally signed using the computer chip 50. A message data command then is sent to the computer chip 50 for the origination of a digital signature, with the selected account or user information included in the message data. For example, when the computer chip 50 is used in an IC card in conjunction with a reader or other I/O support element, the I/O support element sends a command to the computer chip 50 for the extraction of all account and user information. The user then selects the appropriate account or user information from a display provided by the I/O support element to be included as part of the message to be digitally signed using the computer chip 50. Thereafter a message data command is sent to the computer chip 50 for the origination of a digital signature, with the selected account or user information included in the message data.

In the second technique, the message data command provided to the computer chip 50 includes one or more "null fields" or other appropriate "tags" which identify a particular account field or user information field, but in which no value is supplied. In response to the tag, the computer chip 50 searches content addressable memory to identify a corresponding field maintained in memory. Upon location of the corresponding field, the computer chip 50 supplies the value of such field in the message data in substitution for the null value of the tag. With this methodology, each data cell containing account or user information in memory location 80 has its own tag or content address. Preferably, such tags or content addresses are standardized so that account or user information can be correctly stored in memory location 80 and easily retrieved using a tag when later needed. Such tags may include XML tags.

For example, a message data command could be sent to the computer chip 50 in which the message data contains a null field or tag requesting that <user name> be inserted into a particular location within the text of the message data. Whenever such message data is provided to the computer chip 50, the computer chip 50 automatically completes the message data by inserting, in this case, the "user name" stored in the third cell of memory location 80 of the chip 50. Preferably, a tag could be used to extract and insert any of the various field values (e.g., credit card account number; banking account number; user name; employer account number; web site account number, etc.) maintained in memory location 80 of the computer chip 50.

Once the message data is "completed" with all requested account and user information using one of the above techniques, such message data is then ready for: modification by the current verification status of the computer chip (using the value of IM); calculation of the hash value for the modified message data; encryption of the hash value to generate a digital signature; and output of the digital signature.

Alternatively, the computer chip 50 generates a digital signature in the same manner using a prestored message in memory location 65—rather than imported message data—in response to a suitable command to generate a digital signature.

As will be appreciated, a computer chip including components and functionality described above, and which is used in providing a verification status in accordance with the present invention, is itself novel and nonobvious and, accordingly, such a computer chip indeed comprises an aspect of the present invention.

4. Specific Implementations of the Present Invention

FIGS. 29-33 (with frequent reference back to FIG. 28) illustrate how a single IC card 95, configured to function in accordance with the present invention and containing a suitable computer chip 50 (such as described above with reference to FIG. 28), may be used in many different applications and settings by a suspect user 46 of the IC card 95. The structure of the IC card 95 is conventional in that it has the computer chip 50 embedded therein and surface contacts for enabling communication between an IC card reader and the computer chip 50 in the IC card 95. The surface contacts are ISO/IEC 7816 compliant. It is also possible to have an ISO/IEC 14443 compliant proximity card or a combination card capable of both 7816 and 14443 operations.

For purposes of these examples, it is assumed that the computer chip 50 (as shown in FIG. 28) already contains a unique public/private key pair created in the manner previously described. It is further assumed that a PIN (the Secret in these examples) and digitized versions of the authorized user's right thumbprint, right retina, and voice print have been input and prestored in memory location 76 (cells 001, 002, 016, and 020 respectively) of the chip 50 (again, as shown in FIG. 28). It is also assumed that the authorized user's name, credit card account number, checking account number, relevant employee ID number for building and computer access, and website broker account number have been suitably prestored in memory location 80 for access as needed using an appropriate tag contained within message data provided to the IC card 95 from an external source, as discussed above. Additionally, it is assumed that the public key stored on the computer chip 50 has been provided to the authorized user's employer, credit card account company, bank, and broker, each of which has, in turn, associated in its own database the public key with the authorized user's account. For purposes of the present examples, we will also assume that the computer chip 50 outputs the value for the identification marker (IM), which is a data string containing the value of Rs using the convention as set forth in column 2504 of FIG. 25*a* (i.e., no PIN (Rs=00), correct PIN and not used for IVS or DS (Rs=01), and incorrect PIN (Rs=10). The value for the identification marker further includes the type identifier (0xx) and the value of Rb (in the format of a two-digit percentage match (xx) as set forth in column 2602 of FIG. 26) for every biometric verification data type. Furthermore, the identification marker includes a respective DSFlag associated with the Rs value and with each Rb value.

Now, referring specifically to FIG. 29, a first example illustrates the IC card 95 being used by the suspect user 46. In this first example, the suspect user 46 presents the IC card 95 to gain access to a parking area 2902. The parking area 2902 is secured by a parking gate 2904, which has an arm 2906 and which is controlled by a parking gate controller 2908. In turn, the parking gate controller 2908 is in communication with an IC card reader 2910. Although shown as separate from the parking gate 2904, the controller 2908 and the IC card reader 2910 could, in fact, be physically installed within the housing of the parking gate 2904.

To get the arm 2906 to lift, the suspect user 46 inserts the IC card 95 into the reader 2910 (or positions the card near the reader in case of 14443 operations). As this is a relatively low security parking area 2902, the IC card reader 2910 does not have an associated keypad or biometric scanner; thus, there is no means by which the suspect user 46 can input any verification data. Correspondingly, access to the parking area is not dependent upon any particular verification status of the IC card 95. The parking gate controller 2908 opens the parking gate 2906 merely upon proper presentation of the IC card 95, which is pre-registered with the parking gate controller 2908. Preferably, pre-registration involves the authorized user of the card providing his name ("user name") as retained in the memory 80 (as shown in FIG. 28) of the computer chip 50 to the parking gate controller 2908 or, conversely, having the operator of the parking gate 2904 (e.g., the authorized user's employer or agent) "approve" the IC card 95 for use with the parking gate system by inputting an employee account number into memory location 80 (as shown in FIG. 28) of the computer chip 50. For improved security, the authorized user of the card 95 also provides his public key (retained on the chip 50) to the parking gate controller 2908, which associates the user's name or employee account number (hereinafter generally referred to as "user information") therewith.

When the IC card 95 is inserted into the card reader 2910 (or brought into proximity to the card reader 2910), the card reader 2910 is initialized. Initialization of the card reader 2910 is conventional and is accomplished either by the card reader 2910 physically detecting an IC card 95, or by the IC card 95 outputting a "reset" message to the card reader 2910 as part of its start-up protocol when it first receives power from the card reader 2910. Once the IC card 95 receives power, the identification marker and all DSFlags for the PIN and each applicable biometric type are reset. Alternatively, all such values may be reset when power is removed from the card 95.

Following initialization, the card reader 2910 sends a message input command to the IC card 95. At a minimum, the message input command includes a tag requesting user information, such as "user name" or "employee account number" from the appropriate data field in memory location 80 (as shown in FIG. 28). In this example, there is no additional message data other than the tag.

Once the message input command is received by the IC card 95, the computer chip 50 (as shown in FIG. 28) on the IC card 95 retrieves the requested user information from memory location 80 (as shown in FIG. 28), with such user information becoming part of the message data; retrieves the current value of the identification marker; modifies the message data with the value of the identification marker by prepending the value to the message data; calculates a hash value of the modified message data; encrypts the hash value to generate a digital signature; and exports the digital signature, requested user information, and value of the identification marker to the card reader 2910, which forwards such data on to the controller 2908 for processing.

Thereafter, the controller 2908 first compares the requested user information (name or employee account number) received from the IC card 95 with a list of authorized names or authorized employee account numbers maintained in its database. For low security having no regard for authentication, the controller 2908 opens the parking gate 2906 if the user information received from the IC card 95 matches one of the authorized names or authorized employee account numbers in its database. For higher security to guard against a counterfeit IC card, the controller 2908 decrypts the digital signature received from the IC card 95 using the public key associated with the matching user information. If the decrypted hash value from the digital signature matches a hash value calculated based on the user information (i.e., message data) provided by the IC card 95, as modified by the value of the identification marker received from the IC card 95, then the controller 2908 determines that the IC card 95 from which the digital signature is received contains the unique private key associated with the user who pre-registered with the operator of the parking gate 2904, and lifts the parking gate arm 2906—the decision in this case to raise the gate being based on Factor A Entity Authentication.

Turning now to FIGS. 30 and 31, the same IC card 95 may be used by the suspect user 46 first to gain access into secure building 3002 and then into secure room 3102, which is located within the secure building 3002. As shown in FIG. 30, one IC card reader 3004 is mounted next to the secure entrance 3010 into the building 3002. This IC card reader 3004 includes an alphanumeric keypad 3006 and a display screen 3008. The IC card reader 3004 is in electronic communication with a building security controller 3014, which controls the locking mechanism 3012 of the entrance 3010. Inside the building, as shown in FIG. 31, another IC card reader 3104 is mounted on the wall next to secure door 3110. This IC card reader 3104 includes a retina scanner 3106 and a display 3108. Likewise, this IC card reader 3104 is in electronic communication with the building security controller 3114, which controls the locking mechanism 3112 of the door 3110. If the parking area 2902 (from FIG. 29) is part of the same facility as secure building 3002, it is possible that parking gate controller 2908 and building security controllers 3014, 3114 are the same apparatus, part of the same computer system, or share the same database of information regarding the authorized user and public key for IC card 95.

First, with regard to FIG. 30, for access into the secure building 3002, the IC card 95 is inserted into the IC card reader 3004 (or brought into proximity to the card reader 3004). The reader 3004 is initialized in much the same way as the card reader 2910 in FIG. 29. The identification marker and all DSFlags are reset when power is first supplied to the IC card 95.

Once initialized, the card reader 3004, using the display 3008, prompts the suspect user 46 to input a PIN. Once the PIN is entered using the keypad 3006, the card reader 3004 transmits the same, not to the building security controller 3014, but directly to the IC card 95.

Once the IC card 95 receives the PIN verification data, the controller 64 on the computer chip 50 (as shown in FIG. 28) retrieves the prestored PIN data from memory location 76 (cell 001) and compares the two values (Factor B Entity Authentication). A match/no-match determination is made by the controller 64, which identifies the verification status as either Rs=01 (match) or Rs=10 (no match).

After a suitable but brief delay, which is programmed into the controls of the card reader 3304, the card reader 3004 sends a message input command to the IC card 95. As was described previously in relation to FIG. 29, the message input command includes a "tag" requesting user information (e.g. "user name" or "employee account number") from the appropriate data field in memory location 80 (as shown in FIG. 28). Again, it is assumed that the message data comprises the tag only and no additional information.

Once the message input command is received by the IC card 95, the computer chip 50 on the IC card 95 retrieves the requested user information from memory location 80 (as shown in FIG. 28); retrieves the current value of the identification marker; modifies the user information (i.e., message data) with the value of the identification marker by pre-pending the value to the user information; calculates a hash value of the modified user information to generate a digital signature; encrypts the hash value; and exports the digital signature, requested user information, and value of the identification marker to the card reader 3004. The computer chip 50 (as shown in FIG. 28) then increments the value of all of the DSFlags to "1". Equivalently, the computer chip 50 only increments the value of the DSFlags to "1" for the specific verification data types for which any verification data input has been received since powering on of the card 95.

The digital signature, value of the identification marker, and user information received by the card reader 3004 are communicated to the building security controller 3014. The building security controller 3014 first confirms that the user information matches either an authorized name or an authorized employee account number for access to the building 3002. If so, the building security controller 3014 then decrypts the digital signature using the public key associated with the matching authorized user information. If the decrypted hash value from the digital signature matches a hash value calculated based on the user information received from the IC card 95, as modified by the value of the identification marker received from the IC card 95, then the building security controller 3014 determines that the IC card 95 from which the digital signature is received contains the unique private key. Finally, the building security controller 3014 checks the verification status indicated by the value of the identification marker to determine whether the suspect user 46 of the IC card 95 is in fact the authorized user of the IC card 95. If the indicated verification status represents a match (i.e., value of Rs=01), the building security controller 3014 infers that the suspect user 46 is the authorized user, and then sends a signal to the locking mechanism 3012 to unlock the entrance and/or open the door 3010.

For access into the secure room 3102 of FIG. 31, the IC card 95 is inserted into the IC card reader 3104 (or brought into proximity to the card reader 3104). The reader 3104 is initialized in much the same way as the card reader 3004, with the identification marker and all DSFlags being reset when power is first supplied to the IC card 95. Once initialized, the card reader 3104, using the display 3108, prompts the suspect user 46 to place his right eye before the scanner 3106. The retina scanner 3106 scans the right eye of the suspect user 46 and obtains a digitized version thereof. The card reader 3104 then transmits the biometric verification data (which includes an identifier and a value of the digitized scan of the right retina), not to the building security controller 3114, but to the IC card 95 for comparison.

Once the biometric verification data is received by the IC card 95, the controller 64 (as shown in FIG. 28) determines the type of biometric verification data received (based on the identifier), retrieves the corresponding prestored biometric data for the authorized user's right retina from memory location 76 (cell 016), and compares the two values (Factor C Entity Authentication). A degree of match determination/calculation is made by the controller 64, which sets Rb(016) to a two-digit number corresponding with the percentage match (again, as shown in FIG. 28).

After a suitable but brief delay, the card reader 3104 sends a message input command to the IC card 95. As was described previously, the message input command includes a tag requesting user information from the appropriate data field in memory location 80. Again, it is assumed that the message data comprises the tag only and no additional information.

Once the message input command is received by the IC card 95, the computer chip 50 on the IC card 95 retrieves the requested user information from memory location 80; retrieves the current value of the identification marker (including therein the value of Rb(016) and the value of the DSFlag(016), which was reset to zero when the card was inserted into the card reader 3104); modifies the user information with the value of the identification marker by prepending the value to the user information, calculates a hash value of the modified user information; encrypts the hash value to generate a digital signature; and exports the digital signature, requested user information, and value of the identification marker to the card reader 3104. The computer chip 50 then increments the value of all of the DSFlags to "1."

The digital signature, user information, and value of the identification marker received from the IC card 95 are then communicated by the card reader 3104 to the building security controller 3114. The building security controller 3114 first confirms that the user information received from the IC card 95 matches an authorized user name or employee account number for access to the room 3102. If so, the building security controller 3114 then decrypts the digital signature using the public key associated with the matching user information. If the decrypted hash value from the digital signature matches a hash value calculated based on the user information received from the IC card 95, as modified by the value of the identification marker received from the IC card 95, then the building security controller 3114 determines that the IC card 95 from which the digital signature is received contains the unique private key. Finally, the building security controller 3114 checks the verification status indicated by the value of the identification marker to determine whether the suspect user 46 is in fact the authorized user of the IC card 95. In this regard, if the degree of match between the value for the scanned retina and the prestored value for the retina of the authorized user meets a threshold requirement (e.g. 90% match or better) set by the building security controller 3114, then the building security controller 3114 infers that the suspect user 46 is the authorized user and sends a signal to the locking mechanism 3112 to unlock and/or open the door 3110.

The building security controller 3114 may include business logic that denies access to the room 3102 if there is a "perfect" or 100% match between the scanned retina and the prestored retina, since such a comparison likely indicates a fraudulently input verification data. If the degree of match received from the card 95 does not exceed the required threshold set by the building security controller 3114 for this room 3102, an additional retina scan may be requested and the above procedure repeated. If the IC card 95 was not removed from the card reader 3104, and if the IC card 95 generates a digital signature before a new retina scan is taken or successfully transmitted into the IC card 95, the verification status output by the card 95 will include the DSFlag for the right retina set to a value of "1," which signals the building security controller 3114 that a new retina scan was not input or correctly received by the IC card 95. When a new retina scan is taken and transmitted to the IC card 95, the DSFlag for the right retina (DSFlag(016)) is reset to zero. Since retina scans of the same eye will generally vary slightly with each scan (as do most scans of other types of biometric information), the building security controller 3114 will be alert to the potential of a fraudulent biometric verification data received by the IC card 95 when a new degree of match determination is exactly identical to a previous determination for the same biometric characteristic from the same IC card 95.

Even if the initial degree of match received from the card 95 exceeds the required threshold set by the building security controller 3114 for this room 3102, the building security controller 3114 may nevertheless request a follow-up retina scan from the suspect user 46 simply for the purpose of determining if the biometric input was fraudulent (i.e., is the follow-up degree of match identical to the initial degree of match?). The building security controller 3114 may also include business logic that denies access to the room 3102 if there is a "perfect" or 100% match between the scanned retina and the prestored retina, since such a comparison also likely indicates a fraudulently input verification data. Referring to FIG. 32a, the suspect user 46 now sits at his desk to access his personal computer 3202. The computer 3202 is conventional in that it includes a keyboard 3204, a monitor 3206, and a mouse 3208. The computer 3202 also includes a card reader 3210, which exchanges data with the computer 3202 through a suitable port (e.g., serial, parallel, USB, etc.) of the computer 3202. The card reader 3210 is similar to those discussed above and is capable of exchanging information with an IC card 95 when inserted therein (or brought within proximity thereof). In the present example, the computer 3202 also includes a microphone 3212 for receipt of audio input, such as the voice of the suspect user 46. Although it is possible to prevent the computer 3202 from powering on without a proper IC card 95 inserted into the card reader 3210, the present example assumes that the computer 3202 will power on and "boot up" to a security screen (using suitable software installed on the computer 3202), but that no substantive access, such as to programs or databases maintained on, or to the operating system of, the computer 3202 is enabled until the suspect user 46 is authenticated. Alternatively, the building security controller 3114 may also request additional PIN and/or bio input if there suspicion of fraudulent input.

After powering on, the computer 3202 prompts, on a security screen displayed on the monitor 3206, the suspect user 46 to insert the IC card 95 into card reader 3210, to enter a PIN into a suitable data entry window also displayed on the screen, and to state (audibly) his name—first name, middle initial, and last name—for the purpose of obtaining a voiceprint.

When the IC card 95 is inserted into the reader 3210, the reader 3210 is initialized (as described previously) and the power supplied to the card 95 causes the identification marker and all of the DSFlags on the computer chip 50 to be reset. Once the PIN has been entered using the keyboard 3204 and once the suspect user 46 states his name into the microphone 3212, the computer 3202 transmits both the PIN and a digitized version of the voiceprint, via the card reader 3210, to the IC card 95. The card reader 3210 transmits the value of the PIN and digitized voiceprint along with an identifier (e.g., 001 for the PIN and 020 for the voiceprint) for each to identify to the card 95 the type and order of the verification data input.

Upon receipt of the PIN and biometric verification data by the IC card 95, the controller 64 on the computer chip 50 (referring back to FIG. 28) first determines the type of verification data received based on the identifiers and then retrieves the appropriate prestored data from memory location 76. In this example, the controller 64 first retrieves the prestored data for the PIN from memory location data cell 001 in memory location 76, and then compares the value with the value of the PIN verification data received from the card reader 3210 (Factor B Entity Authentication). A match/no-match determination is made by the controller 64, which sets the value of the Rs as either "01" (match) or "10" (no match). Next, the controller 64 retrieves the prestored data for the authorized user's voiceprint from data cell 020 in memory location 76, and then compares this value with the digitized voiceprint received from the card reader 3210 (Factor C Entity Authentication). A degree of match determination/calculation is made by the controller 64, which sets the value of Rb(020) to a two-digit number corresponding to the percentage match.

After a suitable but brief delay, the computer 3202 then sends a message input command to the IC card 95 via the card reader 3210. In this case, the message input command includes a tag requesting user information from the appropriate data field in memory location 80 (again, as shown in FIG. 28). Again, it is assumed that the message data comprises the tag only and no additional information.

Once the message input command is received by the IC card 95, the computer chip 50 on the IC card 95 retrieves the requested authorized user information (as the message data) from memory location 80; retrieves the current value of the identification marker (which includes the value of Rs and the value of DSFlag(001), which was reset to zero when the card was inserted into the card reader 3210, and which also includes the value of Rb(020) and the value of the DSFlag (020), which was also reset to zero), modifies the message data with the identification marker by pre-pending the value to the message data, calculates a hash value of the modified message data, encrypts the hash value to generate a digital signature, and exports the digital signature, requested user information, and value of the identification marker to the card reader 3210. The computer chip 50 then increments the value of all of the DSFlags on the computer chip 50 to "1" (at a minimum, the DSFlags for the PIN and for the voiceprint, namely DSFlag(001) and DSFlag(020), are incremented to "1").

The digital signature, user information, and value of the identification marker received by the card reader 3210 are then communicated to the computer 3202 for processing. If the computer 3202 is a stand-alone computer, processing is performed within the computer 3202 itself. More likely, however, computer 3202 will be networked and in communication with a server (not shown), which will actually determine whether the suspect user 46 will gain access to the computer 3202.

Assuming a server is involved, the server first confirms that the user information received from the IC card 95 matches an authorized user name or employee account number for access to and use of the specific computer 3202. The server then decrypts the digital signature using the public key associated with the matching user information. If the decrypted hash value from the digital signature matches a hash value calculated based on the user information received from the IC card 95, as modified by the value of the identification marker received from the IC card 95, then the server determines that the IC card 95 from which the digital signature is received contains the unique private key. Finally, the server checks the verification status indicated by the value of the identification marker to determine whether the suspect user 46 is in fact the authorized user of the IC card 95. This is a two-step process since two different types of verification data have been received by the IC card 95 and used to identify the verification status of the card 95. In the first step, if the value of Rs is "01" (match), then the server infers that the suspect user 46 is the authorized user. In the second step, the server uses business logic or a rule base to determine if the voiceprint provided by the suspect user 46 is sufficiently similar to the voiceprint of the authorized user stored on the IC card 95 so as to infer again that the suspect user 46 is the authorized user.

The business logic and rule base of the server may be programmed to accept varying combinations of Rs and Rb values (PIN and voiceprint) to infer that the suspect user 46 is the authorized user. For example, a correct PIN by itself, a correct PIN plus at least a 70% match of voiceprint, an incorrect PIN if the voiceprint exceeds 95%, and an incorrect PIN but two voiceprints exceeding 90% are all different types of verification statuses that may be sufficient for the server to infer that the suspect user 46 is the authorized user and grant access to the computer 3202. Obviously, the business logic or rule base can vary widely, depending upon the necessary security desired.

Turning now to FIG. 32*b,* the IC card 95 may also be used by the suspect user 46 in accessing a secure website over an insecure network, such as the Internet 3222. In this further example, we will assume that the suspect user 46 is accessing the secure website 3224 of his broker 3220, with whom he already has an established account. The brokerage company 3220 that operates the website 3224 already has the authorized user's public key from the IC card 95 stored in its account database 3225 and associated with the authorized user's account. We will also assume that the suspect user 46 is accessing the website 3224 using computer 3202 from FIG. 32*a* and that the card 95 has not been removed from the card reader 3210 since it was used to gain access to the computer 3202; thus, the DSFlags remain set to "1".

When accessing the website 3224, the suspect user 46 enters a user ID in a login screen for the website. The user ID enables the brokerage company 3220 readily to locate the appropriate account of the user, as is conventional. However, rather than encrypting the user ID together with a password and then sending the encrypted information over the Internet, the computer 3202 sends the user ID to the IC card 95 via the card reader 3210. The process by which the website 3224 instructs the computer 3202 to send the user ID to the IC card 95 rather than directly over the Internet to the website 3224 is beyond the scope of this invention; however, it may be readily accomplished in several different manners. In one example, the website 3224 has a dedicated login page for use only by users having a suitable IC card 95 (or other device of the present invention), in which case, entry of the user ID into such login page automatically instructs the computer 3202 to send the user ID to the IC card 95 for processing. Alternatively, the login page for the website 3224 could enable the user to select a conventional login using an ID and password or to login using his IC card 95. In either of the above examples, the user ID could actually be prestored in a "cookie" in memory on the computer 3202, as is conventional, which would enable the user merely to click one button on the login page of the website 3224, which causes the computer 3202 to send the user ID to the IC card 95.

Once a message input command comprising the user ID is received by the IC card 95, the computer chip 50 on the IC card 95 retrieves the current value of the identification marker, modifies the user ID received from the card reader 3210 with the value of the identification marker by pre-pending the value to the user ID, calculates a hash value of the modified user ID, encrypts the hash value to generate a digital signature, and returns the digital signature and the value of the identification marker to the computer 3202 via the card reader 3210. In this case, the values of the DSFlags are not incremented since they are already set to a value of "1."

The user ID, the digital signature, and value of the identification marker then are communicated in an EC by the computer 3202 over the Internet 3222 to the website 3224 for processing. Computer programming associated with the website 3224 first confirms that the suspect user 46 maintains an account with the brokerage company by matching the user ID with an account. If an account with a matching user ID is found, then the computer programming next decrypts the digital signature using the public key associated with the identified account. If the decrypted hash value from the digital signature matches a hash value calculated based on the user ID received from the IC card 95, as modified by the value of the identification marker received from the IC card 95, then it is determined that the IC card 95 from which the digital signature is received contains the unique private key corresponding with the account of the user. Finally, the computer programming associated with the website 3224 checks the verification status indicated by the value of the identification marker to determine whether the suspect user 46 is in fact the authorized user of the IC card 95.

Preferably, the computer programming extracts only the value of the Rs from the value of the identification marker for initial evaluation. If the value of Rs is "00" (no PIN input), then the website 3224 sends a request data back to the computer 3202 requesting input of the user's PIN. If the value of Rs is "10" (incorrect PIN), then the website 3224 sends a request for the suspect user 46 to reenter the PIN. In either case, a suitable screen is displayed on the monitor 3206 of the computer 3202 to enable the suspect user 46 to enter the PIN. It should again be emphasized that such PIN will be transmitted by a keyboard of the computer 3202 to the card 95 but not transmitted over the Internet 3222. If the value of Rs is "01" (correct PIN), then the website 3224 infers that the suspect user 46 is in fact the authorized user and grants access to the website 3224. Thus, for mere access to the website 3224, it is not necessary that the PIN be entered just prior to the generation of the digital signature for the user ID—previous entry of a correct PIN is satisfactory for access to the website 3224.

On the other hand, if after perusing the website 3224, the "now-authorized" user requests a transaction, such as purchase of stock, then the website 3224 transmits a detailed confirmation of the requested transaction and specifically requests entry of a PIN to confirm specific approval for the purchase order. Once the PIN has been input by the suspect user 46, the computer 3202 provides the same to the IC card 95.

Upon receipt of the PIN, the controller 64 first retrieves the prestored data for the PIN from memory location data cell 001 in memory location 76 and compares it with the PIN received from the computer 3202. A match/no-match determination then is made by the controller 64, and the value of Rs is set to either "01" representing a match or to "10" representing a failed match, and the DSFlag(001) also is set to "0".

After a suitable but brief delay, the computer 3202 then sends a message input command (which contains the purchase order) to the IC card 95. The computer chip 50 on the IC card 95 retrieves the current value of the identification marker (including therein the value of Rs and DSFlag(001)); modifies the message data received from the computer 3202 with the value of the identification marker by pre-pending the value to the message data; calculates a hash value of the modified message data; encrypts the hash value to generate a digital signature; and exports the digital signature and value of the identification marker to the computer 3202, which then forwards the same on to the website 3224. The computer chip 50 then increments the value of all of the DSFlags to "1." In this example, the website 3224 will only approve the requested transaction when the value of the identification marker includes therein a value of Rs of "01" and a value of DSFlag(001) as "0".

If desired, the communication between the computer 3202 and the website 3224 may be performed using a Secure Socket Layering (SSL) protocol, as is conventional. Such a protocol is set forth, for example, in U.S. Pat. No. 5,848,161, which is incorporated herein by reference. In such protocol, it is customary for the computer 3202 to generate a random number for use in creating a session key for the SSL communication. In accordance with a further feature of the present invention, the IC card 95 is used for the provision of the random number for creation of the session key. In particular, a digital signature is originated by the IC card 95 and used as the random number itself for the purpose of creating the session key. An indirect result of the DSA and ECDSA specified in FIPS PUB 186-2 is that the resulting digital signature itself is a random number. A session key for communication using pretty good privacy (PGP) encryption also may be created based on the digital signature of the IC card 95.

Turning now to FIG. 33, use of the IC card 95 at a point of sale location is illustrated. A point of sale card reader 3308 includes an alphanumeric keypad 3310, a display 3314, and, in this case, a thumbprint reader 3312. The point of sale card reader 3308 is in communication via data connector 3306 with a merchant cash register/terminal 3302, which has its own display 3304. The point of sale card reader 3308 is also in communication over an insecure network, such as the Internet 3322, with a banking authority 3320. The banking authority 3320 is either a financial institution that maintains a banking or credit card account on behalf of the authorized user of the IC card 95 or is an authorized approval agent or clearance authority for such a financial institution. In either case, the banking authority 3320 maintains a database 3325, which associates the public key of the card 95 with the corresponding account of the authorized user of the IC card 95, and has the authority to approve or disapprove online transactions requested against such account.

When an item is purchased by the suspect user 46, the merchant "rings up" the item on the merchant cash register/terminal 3302 and the total balance due is displayed to the suspect user 46 on the display 3304. To pay, the suspect user 46 inserts the IC card 95 into the point of sale card reader 3308 (or brings the IC card 95 into proximity to the card reader 3308). Upon insertion (or approach), the point of sale card reader 3308 is initialized in a manner similar to the card readers previously described. The identification marker and all the DSFlags on the computer chip 50 of the IC card 95 are reset when power is first supplied to the card 95 by the point of sale card reader 3308.

Next, the merchant cash register/terminal 3302 transmits the balance due to the point of sale card reader 3308 via data connector 3306. The point of sale card reader 3308 displays the balance due on display 3314. In one embodiment, the display 3314 also prompts the suspect user 46 to select whether he wants to pay using either a debit account or a credit card account. In an alternative embodiment, the point of sale card reader 3308 sends a "retrieve account information" command to the IC card 95, which returns a list of all available checking, credit card, or other accounts maintained in memory location 80 on the computer chip 50 from which payment may be made. In this alternative embodiment, the display 3314 prompts the suspect user 46 to select one of the retrieved accounts for payment. The display 3314 next prompts the suspect user 46 to enter a PIN using the alphanumeric keypad 3310 and to place his right thumb on the thumbprint scanner 3312. Once the PIN and thumbprint have been input, the point of sale card reader 3308 transmits both the PIN and a digitized version of the thumbprint to the IC card 95. The card reader 3308 transmits the value of the PIN and digitized thumbprint along with an identifier (e.g., 001 for the PIN and 002 for the thumbprint) for each so that the card 95 "knows" the type and order of the verification data input.

Upon receipt of the PIN and digitized version of the thumbprint by the IC card 95, the computer chip 50 on the card 95 identifies the verification status of the IC card 95 in the manner previously described. After a suitable but brief delay, the point of sale card reader 3308 then sends a message input command to the IC card 95. In this case, the message input command includes message data comprising a receipt for the item purchased, the total balance due, and the payment account specified by the suspect user 46. In the first embodiment, the account would be retrieved from memory location 80 (on the computer chip 50) and inserted into the message data using a suitable "tag," indicating whether the primary debit account or primary credit card account number should be used. In the alternative embodiment, the account number for the account specifically selected by the suspect user 46 from the list of available accounts displayed on display 3314 is included in the message data received from the card reader 3308.

Once the message input command is received by the IC card 95, the computer chip 50 on the IC card 95 retrieves the current value of the identification marker (including therein the value of Rs and DSFlag(001), and including therein the values of Rb(002) and DSFlag(002)), modifies the message data received from the point of sale card reader 3308 with the value of the identification marker by pre-pending the value to the message data, calculates a hash value of the modified message data, encrypts the hash value to generate a digital signature, and exports the digital signature and value of the identification marker to the point of sale card reader 3308. The computer chip 50 then increments the value of all of the DSFlags to "1." The digital signature, value of the identification marker, and message data (including account number and amount of the purchase) are then communicated by the point of sale card reader 3308 to banking authority 3320 for processing.

The banking authority 3320 first confirms that the specified account number is a valid account number. The banking authority 3320 then decrypts the digital signature using the public key associated with the identified account number in the database 3325. If the decrypted hash value from the digital signature matches a hash value of the message data, as modified by the value of the identification marker received from the IC card 95, then it is determined that the IC card 95 from which the digital signature is received contains the unique private key and that the message data containing the receipt and total balance due has not been modified since it was digitally signed.

Next, the banking authority 3320 checks the verification status indicated by the value of the identification marker provided by the IC card 95 to determine whether the suspect user 46 is in fact the authorized user of the IC card 95. This is a two-step process as two different types of verification data are received by the IC card 95 and used to identify the verification status of the IC card 95. In the first step, if the value of Rs is "01"(match), then the banking authority 3320 infers that the suspect user 46 is the authorized user. In the second step, the banking authority 3320 uses business logic or a rule base to determine if the thumbprint provided by the suspect user 46 is sufficiently similar to the thumbprint of the authorized user stored on the card 95 so as to infer again that the suspect user 46 is the authorized user.

The business logic and rule base of the banking authority 3320 is such that it may rely upon varying combinations of values for Rs (PIN) and Rb(002) (thumbprint) in accepting the suspect user 46 as the authorized user. For example, a correct PIN by itself, a correct PIN plus at least a 60% match of thumbprint, an incorrect PIN if the thumbprint exceeds 96%, and an incorrect PIN but two thumbprints exceeding 90% (but not identical) are all different types of verification statuses that may be sufficient for the banking authority 3320 to accept Factors B and C Entity Authentication of the suspect user 46 by the card 95.

Finally, if the specified account has a sufficient balance or credit to cover the requested purchase amount and there are no other factors (e.g. card reported stolen, duplicate request, etc.) that would warrant refusal of the transaction, the banking authority 3320 grants approval of the transaction and transmit confirmation of the same back to the point of sale card reader 3308. Obviously, the business logic, rule base, and other factors that are taken into consideration by the banking authority 3320 can vary widely, depending upon the necessary level of security desired by the banking authority 3320.

5. Additional Security and Privacy Measures a. Protecting Against Fraudulent Displays A risk of using a device, such as the IC card 95, in conjunction with the example given in FIG. 33 is the fact that the user of the IC card 95 must rely upon the display 3314 of the card reader 3308, which is under the control of the point of sale merchant, to present an actual representation of the message displayed for generating a digital signature with the IC card 95. It is possible for an unscrupulous merchant, for example, to display a purchase price of one amount but have the message data that is transmitted by the card reader 3308 to the IC card 95 to have a higher purchase price. To minimize the risk of such fraud, it is preferable for the computer chip 50, described in FIG. 28, to be installed in a more sophisticated device, such as a PDA or cell phone, which has its own display (presumably under the control of the owner of the device). Since a PDA or cell phone could be programmed to display the full text of message data accurately prior to the generation of a digital signature thereof with the device, it would be more difficult for a merchant to "present" one purchase price to the customer but actually have a different purchase price included within the message to be digitally signed.

b. Protecting Account Information

Unlike an IC card 95, a PDA or cell phone also provides the user with much greater flexibility and privacy. For example, continuing with the illustration from FIG. 33, rather than having the point of sale reader 3308 prompt the user to select from only a limited number of primary payment accounts, a PDA or cell phone enables the user to store and select from all payment accounts stored on the device. In addition, rather than having the point of sale reader 3308 actually retrieve all available payment accounts from the IC card 95, which potentially raises some privacy concerns, a PDA or cell phone allows the user to select an account from a list presented by the device and not by the point of sale merchant. Thus, the point of sale merchant never becomes privy to the list of account numbers maintained by the device.

c. Protecting Against Replay Attacks

In all of the examples illustrated in FIGS. 29-33, the party receiving the digital signature generated by the IC card 95 is potentially subject to a replay attack. A replay attack occurs when an original digital signature from a device is copied and then reused in an unauthorized manner. Since both the original and copy of a digital signature will decrypt with the appropriate public key, the party receiving the digital signature needs to have some way of distinguishing between the original and a later copy.

To prevent the acceptance of recorded digital signatures, it is merely necessary for the party guarding against the replay attack to include a random number or unique message (e.g., time of day, date, and counter combination) as part of each message input command sent to a device for originating a digital signature and require that the random number or unique message be included in what is digitally signed. The party receiving back the digital signature thereby is able to confirm, upon Message Authentication, that the digital signature received from the device was actually generated by the device in direct response to the corresponding message input command. Such techniques are set forth, for example, in *Federal Information Processing Standards Publication* 196, *Entity Authentication Using Public Key Cryptography,* US DOC/NBS, Feb. 18, 1997 (hereinafter "FIPS PUB 196"), which is incorporated herein by reference and which is available for download at http://csrc.nist.gov/publications/fips.

For applications in which the party receiving the digital signature (e.g., a card reader or associated controller) is involved in only one authentication session at any given time and when a response is expected substantially contemporaneously (e.g. while the device is in or near a reader), it is only necessary to maintain the random number or unique message in computer memory long enough to ensure that the digital signature received back within the expected time interval contains the appropriate random number or unique message. This random number or unique message is good for only one digital signature and it is assumed that the first digital signature received by the party is the original and that subsequent identical digital signatures, if any, are fraudulent copies and handled as such.

For applications in which the party receiving the digital signature is involved in more than one authentication session at any given time, such as, for example, a website that is entertaining simultaneous requests from multiple users for entry to the site and/or for transactions through the site, it is necessary for the party to maintain a log of all random numbers or unique messages that have been sent out to all devices for the generation of digital signatures. It is also necessary for the party to link or otherwise associate each such random number or unique message with the particular session in which it is used. Thus, when a digital signature is received back within a particular session, the party can confirm that the correct random number was received and digitally signed for such session The generation of random numbers may be performed, for example, using any of the random number generators specified in appendix 3 of FIPS PUB 186-2.

Accordingly, it readily will be understood by those persons skilled in the art that, in view of the above detailed description of the preferred embodiments, devices, and methods of the present invention, the present invention is susceptible of broad utility and application. Many methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred methods and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

What is claimed is:

1. A method of providing a verification status of a device, comprising:
    (a) identifying within a device a current verification status out of a plurality of verification statuses of the device as a function of a comparison of biometric verification data input into the device to biometric data prestored within the device and as a function of whether an indicator was output since verification data was last input into the device, wherein the plurality of verification statuses comprise:
    a first verification status indicating a lack of verification data since a resetting of the device;
    a second verification status indicating a match between input data and data prestored where no indicator has been output from the device since the match;
    a third verification status indicating a failed match; and
    a fourth verification status indicating a match where an indicator has been output since the match; and
    (b) independent of the verification status identified, transmitting an indicator of said identified verification status to an electronic apparatus external to the device, the indicator revealing said identified verification status without revealing either of the biometric verification data or the prestored biometric data.

2. The method of claim 1, further comprising outputting from the device the indicator of said identified verification status.

3. The method of claim 1, wherein one verification status out of the plurality of predefined verification statuses of the device is representative of the verification data being the same as the prestored biometric data, and at least one other predefined verification status is representative of the verification data being different from the prestored biometric data.

4. The method of claim 1, wherein identifying a current verification status includes assigning an identification marker within the device equal to a value out of a set of predefined values corresponding to the predefined verification statuses.

5. The method of claim 4, wherein the identification marker is assigned a value representing the type of prestored biometric data.

6. The method of claim 1, further comprising evaluating with business logic incorporated within the electronic apparatus a request based on said identified verification status.

7. The method of claim 1, wherein the biometric verification data is selected from the group including: digitized fingerprint, digitized handprint or hand geometry, digitized retina, digitized iris, digitized voice print, digitized facial scan, digitized written signature, and digitized DNA sample.

8. The method of claim 1, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

9. A method of providing a verification status regarding an entity authentication, comprising:
    (a) receiving within a device input comprising biometric verification data of an entity;
    (b) identifying within the device a current verification status out of a plurality of verification statuses of the device as a function of the biometric verification data and biometric data prestored within the device and as a function of whether an indicator was output since verification data was last input into the device, wherein the plurality of verification statuses comprise:—
    a first verification status indicating a lack of verification data since a resetting of the device;
    a second verification status indicating a match between input data and data prestored where no indicator has been output from the device since the match;
    a third verification status indicating a failed match; and
    a fourth verification status indicating a match where an indicator has been output since the match; and
    (c) independent of the verification status identified, outputting from the device an indicator of said identified verification status, the indicator revealing said identified verification status without revealing either of the biometric verification data or the prestored biometric data.

10. The method of claim 9, wherein one verification status out of the plurality of predefined verification statuses of the device is representative of the verification data being the same as the prestored biometric data, and at least one other predefined verification status is representative of the verification data being different from the prestored biometric data.

11. The method of claim 9, wherein identifying a current verification status includes assigning an identification marker within the device equal to a value out of a set of predefined values corresponding to the predefined verification statuses.

12. The method of claim 11, wherein the identification marker is assigned a value representing the type of prestored biometric data.

13. The method of claim 11, wherein the identification marker is assigned a value equated with a successful verification, and wherein the indicator comprises said assigned value of the identification marker.

14. The method of claim 13, wherein the device generates digital signatures and wherein said assigned value further represents whether any digital signatures were generated by the device since verification data was last input into the device.

15. The method of claim 9, further comprising receiving and evaluating a request based on said output indicator.

16. The method of claim 9, wherein the biometric verification data is selected from the group including: digitized fingerprint, digitized handprint or hand geometry, digitized retina, digitized iris, digitized voice print, digitized facial scan, digitized written signature, and digitized DNA sample.

17. The method of claim 9, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

18. A method of authenticating a first entity to a second entity, comprising:
    (a) within a verification component of a device, (i) storing biometric data of the first entity during a personalization of the verification component, (ii) later receiving biometric verification data input within the device, and (iii) identifying a current verification status out of a plurality of verification statuses of the device as a function of the biometric verification data and the prestored biometric data and as a function of whether an indicator was output since verification data was last input into the device, wherein the plurality of verification statuses comprise:

a first verification status indicating a lack of verification data since a resetting of the device;

a second verification status indicating a match between input data and data prestored where no indicator has been output from the device since the match;

a third verification status indicating a failed match; and a fourth verification status indicating a match where an indicator has been output since the match; and (b) independent of the verification status identified, communicating said identified verification status to the second entity by outputting from the verification component an indicator of said identified verification status and transmitting said output indicator to the second entity, the indicator revealing said identified verification status without revealing either of the biometric verification data or the prestored biometric data.

19. The method of claim 18, wherein one verification status out of the plurality of predefined verification statuses of the device is representative of the verification data being the same as the prestored biometric data, and at least one other predefined verification status is representative of the verification data being different from the prestored biometric data.

20. The method of claim 18, wherein identifying a current verification status includes assigning an identification marker within the device equal to a value out of a set of predefined values corresponding to the predefined verification statuses.

21. The method of claim 20, wherein the identification marker is assigned a value representing the type of prestored biometric data.

22. The method of claim 18, further comprising receiving and evaluating a request based on said communicated verification status.

23. The method of claim 18, wherein the biometric verification data is selected from the group including: digitized fingerprint, digitized handprint or hand geometry, digitized retina, digitized iris, digitized voice print, digitized facial scan, digitized written signature, and digitized DNA sample.

24. The method of claim 18, wherein the prestored biometric data is selected from the group including: digitized fingerprint, digitized handprint or hand geometry, digitized retina, digitized iris, digitized voice print, digitized facial scan, digitized written signature, and digitized DNA sample.

25. A method of providing a verification status regarding an entity authentication, comprising:

(a) maintaining within a device prestored biometric data of an entity for identifying a verification status of the device as a function of the prestored biometric data and biometric verification data later input into the device;

(b) identifying within the device a current verification status out of a plurality of verification statuses of the device representing whether an indicator was output since verification data was last input into the device, wherein the verification statuses comprise:

a first verification status indicating a lack of verification data since a resetting of the device;

a second verification status indicating a match between input data and data prestored where no indicator has been output from the device since the match;

a third verification status indicating a failed match; and a fourth verification status indicating a match where an indicator has been output since the match;

(c) outputting from the device an indicator of said identified verification status for evaluation thereof;

(d) receiving within the device input comprising verification data;

(e) identifying within the device a current verification status out of a plurality of predefined verification statuses of the device by comparing said received verification data with the prestored biometric data; and (f) again outputting from the device an indicator of said identified verification status for evaluation thereof, the second indicator revealing said identified verification status based on said comparison but neither revealing the verification data nor the prestored biometric data.

26. The method of claim 25, wherein one verification status out of the plurality of predefined verification statuses of the device is representative of the verification data being the same as the prestored biometric data, and at least one other predefined verification status is representative of the verification data being different from the prestored biometric data.

27. The method of claim 25, wherein identifying a current verification status out of a plurality of verification statuses includes assigning an identification marker within the device equal to a value out of a set of predefined values corresponding to the predefined verification statuses.

28. The method of claim 27, wherein the identification marker is assigned a value representing the type of prestored biometric data.

29. The method of claim 28, wherein the identification marker is assigned a value equated with a successful verification, and wherein the indicator comprises said assigned value of the identification marker.

30. The method of claim 29, wherein the device generates digital signatures and wherein said assigned value further represents whether a digital signature was generated by the device since verification data was last input into the device.

31. The method of claim 25, wherein the biometric verification data is selected from the group including: digitized fingerprint, digitized handprint or hand geometry, digitized retina, digitized iris, digitized voice print, digitized facial scan, digitized written signature, and digitized DNA sample.

32. The method of claim 25, wherein the prestored biometric data is selected from the group including: digitized fingerprint, digitized handprint or hand geometry, digitized retina, digitized iris, digitized voice print, digitized facial scan, digitized written signature, and digitized DNA sample.

33. A method of providing a verification status of a device, comprising:

(a) identifying within a device a current verification status out of a plurality of verification statuses of the device as a function of whether an indicator was output since verification data was last input into the device and as a function of biometric verification data input into the device and a plurality of biometric data prestored within the device, wherein the verification statuses comprise:

a first verification status indicating a lack of verification data since a resetting of the device;

a second verification status indicating a match between input data and data prestored where no indicator has been output from the device since the match;

a third verification status indicating a failed match;

a fourth verification status indicating a match where an indicator has been output since the match;

and wherein the verification status further includes an indication of a type of biometric data from among the plurality of biometric data prestored within the device; and (b) independent of the verification status identified, transmitting an indicator of said identified verification status to an electronic apparatus external to the device, the indicator revealing said identified verification status without revealing either of the verification data or the prestored biometric data.

34. The method of claim 33, further comprising outputting from the device the indicator of said identified verification status.

35. The method of claim 33, wherein one verification status out of the plurality of predefined verification statuses of the device is representative of the verification data being the same as the prestored biometric data, and at least one other predefined verification status is representative of the verification data being different from the prestored biometric data.

36. The method of claim 33, wherein identifying a current verification status includes assigning an identification marker within the device equal to a value out of a set of predefined values corresponding to the predefined verification statuses.

37. The method of claim 36, wherein the identification marker is assigned a value representing the type of prestored biometric data.

38. The method of claim 33, further comprising evaluating with business logic incorporated within the electronic apparatus a request based on said identified verification status.

39. The method of claim 33, wherein the biometric verification data is selected from the group including: digitized fingerprint, digitized handprint or hand geometry, digitized retina, digitized iris, digitized voice print, digitized facial scan, digitized written signature, and digitized DNA sample.

40. The method of claim 33, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

41. A method of providing a verification status of a device, comprising:
 (a) identifying within a device a current verification status out of a plurality of verification statuses of the device as a function of whether an indicator was output since verification data was last input into the device and as a function of a plurality of biometric verification data input into the device and a plurality of biometric data prestored within the device, wherein the verification statuses comprise:
 a first verification status indicating a lack of verification data since a resetting of the device;
 a second verification status indicating a match between input data and data prestored where no indicator has been output from the device since the match;
 a third verification status indicating a failed match;
 a fourth verification status indicating a match where an indicator has been output since the match;
 and wherein the verification status further includes an identification marker corresponding to a value out of a set of predefined values, each value representing at least two types of biometric verification data from among the plurality of biometric verification data input into the device; and
 (b) independent of the verification status identified, transmitting an indicator of said identified verification status to an electronic apparatus external to the device, the indicator revealing said identified verification status without revealing either of the verification data or the prestored biometric data.

42. The method of claim 41, further comprising outputting from the device the indicator of said identified verification status.

43. The method of claim 41, wherein one verification status out of the plurality of predefined verification statuses of the device is representative of the verification data being the same as the prestored biometric data, and at least one other predefined verification status is representative of the verification data being different from the prestored biometric data.

44. The method of claim 41, wherein identifying a current verification status includes assigning an identification marker within the device equal to a value out of a set of predefined values corresponding to the predefined verification statuses.

45. The method of claim 44, wherein the identification marker is assigned a value representing the type of prestored biometric data.

46. The method of claim 41, further comprising evaluating with business logic incorporated within the electronic apparatus a request based on said identified verification status.

47. The method of claim 41, wherein the biometric verification data is selected from the group including: digitized fingerprint, digitized handprint or hand geometry, digitized retina, digitized iris, digitized voice print, digitized facial scan, digitized written signature, and digitized DNA sample.

48. The method of claim 41, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

49. A method of providing a verification status regarding an entity authentication, comprising:
 (a) receiving within a device input comprising biometric verification data of an entity;
 (b) identifying within the device a current verification status out of a plurality of verification statuses of the device as a function of whether an indicator was output since verification data was last input into the device and as a function of the biometric verification data and a plurality of biometric data prestored within the device, wherein the verification statuses comprise:
 a first verification status indicating a lack of verification data since a resetting of the device;
 a second verification status indicating a match between input data and data prestored where no indicator has been output from the device since the match;
 a third verification status indicating a failed match;
 a fourth verification status indicating a match where an indicator has been output since the match;
 and wherein the verification status further includes an indication of a type of biometric data from among the plurality of biometric data prestored within the device; and
 (c) independent of the verification status identified, outputting from the device an indicator of said identified verification status, the indicator revealing said identified verification status without revealing either of the biometric verification data or the prestored biometric data.

50. The method of claim 49, wherein one verification status out of the plurality of predefined verification statuses of the device is representative of the verification data being the same as the prestored biometric data, and at least one other predefined verification status is representative of the verification data being different from the prestored biometric data.

51. The method of claim 49, wherein identifying a current verification status includes assigning an identification marker within the device equal to a value out of a set of predefined values corresponding to the predefined verification statuses.

52. The method of claim 51, wherein the identification marker is assigned a value representing the type of biometric data.

53. The method of claim 51, wherein the identification marker is assigned a value equated with a successful verification, and wherein the indicator comprises said assigned value of the identification marker.

54. The method of claim 53, wherein the device generates digital signatures and wherein said assigned value further represents whether any digital signatures were generated by the device since verification data was last input into the device.

55. The method of claim 49, further comprising receiving and evaluating a request based on said output indicator.

56. The method of claim 49, wherein the biometric verification data is selected from the group including: digitized fingerprint, digitized handprint or hand geometry, digitized retina, digitized iris, digitized voice print, digitized facial scan, digitized written signature, and digitized DNA sample.

57. The method of claim 49, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

58. A method of providing a verification status regarding an entity authentication, comprising:
   (a) receiving within a device input comprising a plurality of biometric verification data of an entity;
   (b) identifying within the device a current verification status out of a plurality of verification statuses of the device as a function of the plurality of biometric verification data and a plurality of biometric data prestored within the device and as a function of whether an indicator was output since verification data was last input into the device, wherein the verification statuses comprise:
   a first verification status indicating a lack of verification data since a resetting of the device;
   a second verification status indicating a match between input data and data prestored where no indicator has been output from the device since the match;
   a third verification status indicating a failed match;
   a fourth verification status indicating a match where an indicator has been output since the match;
   and wherein the verification status further includes an identification marker corresponding to a value out of a set of predefined values, each value representing at least two types of biometric verification data from among the plurality of biometric verification data input into the device; and
   (c) independent of the verification status identified, outputting from the device an indicator of said identified verification status, the indicator revealing said identified verification status without revealing either of the biometric verification data or the prestored biometric data.

59. The method of claim 58, wherein one verification status out of the plurality of predefined verification statuses of the device is representative of the verification data being the same as the prestored biometric data, and at least one other predefined verification status is representative of the verification data being different from the prestored biometric data.

60. The method of claim 58, wherein identifying a current verification status includes assigning an identification marker within the device equal to a value out of a set of predefined values corresponding to the predefined verification statuses.

61. The method of claim 60, wherein the identification marker is assigned a value representing the type of biometric data.

62. The method of claim 60, wherein the identification marker is assigned a value equated with a successful verification, and wherein the indicator comprises said assigned value of the identification marker.

63. The method of claim 62, wherein the device generates digital signatures and wherein said assigned value further represents whether any digital signatures were generated by the device since verification data was last input into the device.

64. The method of claim 58, further comprising receiving and evaluating a request based on said output indicator.

65. The method of claim 58, wherein the biometric verification data is selected from the group including: digitized fingerprint, digitized handprint or hand geometry, digitized retina, digitized iris, digitized voice print, digitized facial scan, digitized written signature, and digitized DNA sample.

66. The method of claim 58, wherein the biometric data prestored within the device is selected from the group including: digitized fingerprint, digitized handprint or hand geometry, digitized retina, digitized iris, digitized voice print, digitized facial scan, digitized written signature, and digitized DNA sample.

67. A method of authenticating a first entity to a second entity, comprising:
   (a) within a verification component of a device, (i) storing a plurality of biometric data of the first entity during a personalization of the verification component, (ii) later receiving biometric verification data input within the device, and (iii) identifying, as a function of whether an indicator was output since verification data was last input into the device and as a function of the biometric verification data and the plurality of prestored biometric data, a current verification status out of a plurality of verification statuses of the device, wherein the verification statuses comprise:
   a first verification status indicating a lack of verification data since a resetting of the device;
   a second verification status indicating a match between input data and data prestored where no indicator has been output from the device since the match;
   a third verification status indicating a failed match;
   a fourth verification status indicating a match where an indicator has been output since the match;
   and wherein the verification status further includes an indication of a type of biometric data from among the plurality of prestored biometric data; and
   (b) independent of the verification status identified, communicating said identified verification status to the second entity by outputting from the verification component an indicator of said identified verification status and transmitting said output indicator to the second entity, the indicator revealing said identified verification status without revealing either of the biometric verification data or the prestored biometric data.

68. The method of claim 67, wherein one verification status out of the plurality of predefined verification statuses of the device is representative of the verification data being the same as the prestored biometric data, and at least one other predefined verification status is representative of the verification data being different from the prestored biometric data.

69. The method of claim 67, wherein identifying a current verification status includes assigning an identification marker within the device equal to a value out of a set of predefined values corresponding to the predefined verification statuses.

70. The method of claim 69, wherein the identification marker is assigned a value representing the type of prestored biometric data.

71. The method of claim 67, further comprising receiving and evaluating a request based on said communicated verification status.

72. The method of claim 67, wherein the biometric verification data is selected from the group including: digitized fingerprint, digitized handprint or hand geometry, digitized retina, digitized iris, digitized voice print, digitized facial scan, digitized written signature, and digitized DNA sample.

73. The method of claim 67, wherein the prestored biometric data is selected from the group including: digitized fingerprint, digitized handprint or hand geometry, digitized retina, digitized iris, digitized voice print, digitized facial scan, digitized written signature, and digitized DNA sample.

74. A method of authenticating a first entity to a second entity, comprising:
(a) within a verification component of a device, (i) storing a plurality of biometric data of the first entity during a personalization of the verification component, (ii) later receiving a plurality of biometric verification data input within the device, and (iii) identifying, as a function of whether an indicator was output since verification data was last input into the device and as a function of the plurality of biometric verification data and the plurality of prestored biometric data, a current verification status out of a plurality of verification statuses of the device, wherein the verification statuses comprise:
 a first verification status indicating a lack of verification data since a resetting of the device;
 a second verification status indicating a match between input data and data prestored where no indicator has been output from the device since the match;
 a third verification status indicating a failed match;
 a fourth verification status indicating a match where an indicator has been output since the match;
 and wherein the verification status further includes an identification marker corresponding to a value out of a set of predefined values, each value representing at least two types of biometric verification data from among the plurality of biometric verification data input; and
(b) independent of the verification status identified, communicating said identified verification status to the second entity by outputting from the verification component an indicator of said identified verification status and transmitting said output indicator to the second entity,
 the indicator revealing said identified verification status without revealing either of the biometric verification data or the prestored biometric data.

75. The method of claim 74, wherein one verification status out of the plurality of predefined verification statuses of the device is representative of the verification data being the same as the prestored biometric data, and at least one other predefined verification status is representative of the verification data being different from the prestored biometric data.

76. The method of claim 74, wherein identifying a current verification status includes assigning an identification marker within the device equal to a value out of a set of predefined values corresponding to the predefined verification statuses.

77. The method of claim 76, wherein the identification marker is assigned a value representing the type of prestored biometric data.

78. The method of claim 74, further comprising receiving and evaluating a request based on said communicated verification status.

79. The method of claim 74, wherein the prestored biometric data is selected from the group including: digitized fingerprint, digitized handprint or hand geometry, digitized retina, digitized iris, digitized voice print, digitized facial scan, digitized written signature, and digitized DNA sample.

80. The method of claim 74, wherein the prestored biometric data is selected from the group including: digitized fingerprint, digitized handprint or hand geometry, digitized retina, digitized iris, digitized voice print, digitized facial scan, digitized written signature, and digitized DNA sample.

* * * * *